US012459991B2

(12) United States Patent
Kyratsous et al.

(10) Patent No.: US 12,459,991 B2
(45) Date of Patent: Nov. 4, 2025

(54) COMPOSITIONS AND METHODS FOR USING BISPECIFIC ANTIBODIES TO BIND COMPLEMENT AND A TARGET ANTIGEN

(71) Applicant: Regeneron Pharmaceuticals, Inc., Tarrytown, NY (US)

(72) Inventors: Christos Kyratsous, Irvington, NY (US); Chia-Yang Lin, Scarsdale, NY (US); Andrew J. Murphy, Croton-on-Hudson, NY (US); Brinda Prasad, Princeton, NJ (US); Neil Stahl, Carmel, NY (US)

(73) Assignee: REGENERON PHARMACEUTICALS, INC., Tarrytown, NY (US)

( * ) Notice: Subject to any disclaimer, the term of this patent is extended or adjusted under 35 U.S.C. 154(b) by 886 days.

(21) Appl. No.: 17/430,117

(22) PCT Filed: Feb. 12, 2020

(86) PCT No.: PCT/US2020/017889
§ 371 (c)(1),
(2) Date: Aug. 11, 2021

(87) PCT Pub. No.: WO2020/167919
PCT Pub. Date: Aug. 20, 2020

(65) Prior Publication Data
US 2022/0153819 A1    May 19, 2022
US 2024/0254208 A2    Aug. 1, 2024

Related U.S. Application Data

(60) Provisional application No. 62/804,358, filed on Feb. 12, 2019.

(51) Int. Cl.
| C07K 16/12 | (2006.01) |
| *A61K 39/00* | (2006.01) |
| *A61P 31/04* | (2006.01) |
| *A61P 31/16* | (2006.01) |
| C07K 16/10 | (2006.01) |
| C07K 16/28 | (2006.01) |

(52) U.S. Cl.
CPC .......... C07K 16/1271 (2013.01); *A61K 39/00* (2013.01); *A61P 31/04* (2018.01); *A61P 31/16* (2018.01); C07K 16/1018 (2013.01); C07K 16/1214 (2013.01); C07K 16/2878 (2013.01); C07K 16/2887 (2013.01); *A61K 2039/505* (2013.01); *C07K 2317/31* (2013.01); *C07K 2317/565* (2013.01); *C07K 2317/622* (2013.01); *C07K 2317/734* (2013.01); *C07K 2317/92* (2013.01)

(58) Field of Classification Search
CPC ............ C07K 16/1271; C07K 16/1018; C07K 16/1214; C07K 16/2878; C07K 16/2887; C07K 2317/31; C07K 231/565; C07K 2317/622; C07K 2314/734; C07K 2317/92; A61P 31/04; A61P 31/16; A61K 39/00; A61K 2039/505
See application file for complete search history.

(56) References Cited

U.S. PATENT DOCUMENTS

| | | | |
|---|---|---|---|
| 5,500,362 A | 3/1996 | Robinson et al. |
| 5,821,337 A | 10/1998 | Carter et al. |
| 6,596,541 B2 | 7/2003 | Murphy et al. |
| 7,582,298 B2 | 9/2009 | Stevens et al. |
| 7,786,255 B2 | 8/2010 | Pier et al. |
| 8,586,713 B2 | 11/2013 | Davis et al. |
| 9,359,437 B2 | 6/2016 | Davis et al. |
| 9,657,102 B2 | 5/2017 | Smith et al. |
| 10,865,236 B2 | 12/2020 | Prasad et al. |
| 2003/0099656 A1 | 5/2003 | Patti et al. |
| 2010/0104589 A1 | 4/2010 | Govindan et al. |
| 2010/0166772 A1 | 7/2010 | Anderson et al. |
| 2011/0195454 A1 | 8/2011 | McWhirter et al. |

(Continued)

FOREIGN PATENT DOCUMENTS

| WO | WO 2005/103081 | 11/2005 |
|---|---|---|
| WO | WO 2006/063150 | 6/2006 |

(Continued)

OTHER PUBLICATIONS

Skolnick et al. (Trends in Biotechnology 18: 34-39, 2000).*

(Continued)

*Primary Examiner* — Robert A Zeman
(74) *Attorney, Agent, or Firm* — FisherBroyles, LLP; Cara L. Crowley-Weber; Gabriele Amodeo

(57) ABSTRACT

According to certain embodiments, the present disclosure provides bispecific antigen-binding molecules comprising a first antigen-binding domain that specifically binds a target antigen and a second antigen binding domain that binds a complement component. In certain embodiments, the bispecific antigen-binding molecules of the present disclosure are capable of binding to the target antigen with an $EC_{50}$ of about 10 nM or less, and/or are capable of promoting complement deposition on the target antigen with an $EC_{50}$ of about 10 nM. In certain embodiments, the bispecific antigen-binding molecules of the disclosure are useful for treating diseases in which inhibition or reduction of the growth of an infectious agent or cancer cell is desired and/or therapeutically beneficial.

7 Claims, 23 Drawing Sheets
Specification includes a Sequence Listing.

(56) References Cited

U.S. PATENT DOCUMENTS

| | | |
|---|---|---|
| 2015/0266966 A1 | 9/2015 | Smith et al. |
| 2016/0068589 A1 | 3/2016 | Lydon |
| 2016/0176953 A1 | 6/2016 | Purcell Ngambo et al. |
| 2017/0355774 A1 | 12/2017 | Delfino et al. |
| 2018/0194841 A1 | 7/2018 | Smith et al. |
| 2018/0282411 A1 | 10/2018 | Davis et al. |

FOREIGN PATENT DOCUMENTS

| | | |
|---|---|---|
| WO | WO 2008/119353 | 10/2008 |
| WO | WO 2009/029132 | 3/2009 |
| WO | WO 2012/170807 | 12/2012 |
| WO | WO 2013/039954 | 3/2013 |
| WO | WO 2014/027656 | 2/2014 |
| WO | WO 2014/074540 | 5/2014 |
| WO | WO 2015/187779 | 12/2015 |
| WO | WO 2018/128973 | 7/2018 |
| WO | WO 2019/067682 | 4/2019 |

OTHER PUBLICATIONS

Casadevall et al. (PNAS, vol. 109 No. 31, pp. 12272-12273).*
Giusti et al. (Proc. Natl. Acad. Sci. USA. May 1987; 84 (9): 2926-2930).*
Winkler et al (J. Imm., 265:4505-4514, 2000).*
Chien et al. (Proc. Natl. Acad. Sci. USA. Jul. 1989; 86 (14): 5532-5536).*
Caldas et al. (Mol. Immunol. May 2003; 39 (15): 941-952).*
Kontermann et al. (1997) "Complement Recruitment Using Bispecific Diabodies", Nature Biotechnology, 15:629-631.
Martin et al. (1989) "Modeling Antibody Hypervariable Loops: A Combined Algorithm", Proc. Natl. Acad. Sci. USA 86:9268-9272.
Melis et al. (2015) "Complement in Therapy and Disease Regulating the Complement System with Antibody-Based Therapeutics", Molecular Immunology. 67, 117-130.
Mordenti et al. (1991) "Interspecies Scaling of Clearance and Volume of Distribution Data for Five Therapeutic Proteins", Pharmaceut. Res. 8(11):1351-1359.
O'Keeffe et al. (2015) "Manipulation of Autophagy in Phagocytes Facilitates Staphylococcus aureus Bloodstream Infection", Infect Immun., 83(9):3445-3457.
Pancari et al. (2012) "Characterization of the Mechanism of Protection Mediated by CS-D7, a Monoclonal Antibody to Staphylococcus aureus Iron Regulated Surface Determinant B (IsdB)", Frontiers in Cellular and Infection Microbiology, 2:1-13.
PCT International Search Report and Written Opinion in International Application PCT/US2018/053064, mailed Mar. 14, 2019, 25 pages.
Pearson (1994) "Using the FASTA Program to Search Protein and DNA Sequence Databases", Methods Mol. Biol. 24: 307-331.
Pearson (2000) "Flexible Sequence Similarity Searching with the FASTA3 Program Package", Methods in Molecular Biology 132:185-219.
Powell et al. (1998) "Compendium of excipients for parenteral formulations", PDA J Pharm Sci Technol 52:238-311.
Rauch et al. (2012) "Abscess Formulation and Alpha-Hemolysin Induced Toxicity in a Mouse model of Staphylococcus aureus Peritoneal Infection", Infect Immun., 80(10):3721-32.
Reineke (2004) "Antibody Epitope Mapping Using Arrays of Synthetic Peptides", Methods Mol Biol, 248:443-463.
Rudikoff et al., (1982) "Single Amino Acid Substitution Altering Antigen-Binding Specificity", PNSAS USA, 79(6):1979-1983.
Schaffer and Lee (2008) "Vaccination and Passive Immunisation Against Staphylococcus aureus", International Journal of Antimicrobial Agents, 32S:S71-S78.
Sefton (1987) "Implantable Pumps", CRC Crit. Ref. Biomed. Eng. 14:201-240.
Sela-Culang et al. (2013) "The Structure Basis of Antibody-Antigen Recognition", Frontiers in Immunology, 4(302):1-13.
Shield et al. (2002) "Lack of Fucose on Human IgG1 N-Linked Oligosaccharide Improves Binding to Human Fc yRIII and Antibody-dependent Cellular Toxicity", JBC 277:26733-26740.
Shriver, et al. (2015) "Antibody-Based Strategies to Prevent and Treat Influenza", Frontiers in Immunology, 6(315):1-6.
Smith et al. (2015) "A Novel, Native-Format Bispecific Antibody Triggering T-Cell Killing of B-Cells is Robustly Active in Mouse Tumor Models and Cynomolgus Monkeys", Sci Rep. 5:17943.
Taylor et al. (1992) "A Transgenic Mouse That Expresses a Diversity of Human Sequence Heavy and light Chain Immunoglobulins", Nucl. Acids Res. 20:6287-6295.
Terajima et al. (2011) "Complement-Dependent Lysis of Influenza A Virus-Infected Cells by Broadly Cross-Reactive Human Monoclonal Antibodies", Journal of Virology. 85(24):13463-13467.
Thammavongsa et al. (2009) "Staphylococcus aureus Synthesizes Adenosine to Escape Host Immune Responses", J Exp Med 206(11):2417-2427.
Tomer (2000) "Characterization of a Discontinuous Epitope of the Human Immunodeficiency Virus (HIV) Core Protein p24 by Epitope Excision and Differential Chemical Modification Followed by Mass Spectrometric Peptide Mapping Analysis", Protein Science, 9:487-496.
Valenzuela et al. (2003) "High-Throughput Engineering of the Mouse Genome Coupled with High-Resolution Expression Analysis", Nat. Biotech., 21(6):652-659.
Wen et al. (2013) "Construction and Screening of an Antigen-Derived Peptide Library Displayed on Yeast Cell Surface for CD4+ T Cell Epitope Identification", Methods Mol Biol. 1061:245-264.
Wu et al. (1987) "Receptor-Mediated in Vitro Gene Transformation by a Soluble DNA Carrier System", J. Biol. Chem. 262:4429-4432.
Protein [Internet]. Bethesda (MD): National Library of Medicine (US), National Center for Biotechnology Information, [1988]— Accession No. NP_683700.1, "Tumor Necrosis Factor Receptor Superfamily Member 18 Isoform 3 Precursor [Homo sapiens]", cited on Jul. 11, 2021, [online], [retrieved on Sep. 9, 2021]. Retrieved from: https://www.ncbi.nlm.nihm.gov/protein/NP_683700, 3 pages.
Protein [Internet]. Bethesda (MD): National Library of Medicine (US), National Center for Biotechnology Information; [1988]— Accession No. WP_063557416.1, "Heme Uptake Protein IsdB [Staphylococcus aureus]", cited on Jun. 3, 2019, [online], [retrieved on Jan. 6, 2021]. Retrieved from: https://www.ncbi.nlm.nih.gov/protein/1025823084, 1 page.
Protein [Internet]. Bethesda (MD): National Library of Medicine (US), National Center for Biotechnology Information; [1988]— Accession No. WP_099560907.1, "Heme Uptake Protein IsdB [Staphylococcus aureus]", cited on Jun. 2, 2019, [online], [retrieved on Sep. 9, 2021]. Retrieved from: https://www.ncbi.nlm.nih.gov/protein/WP_099560907, 1 page.
Protein [Internet]. Bethesda (MD): National Library of Medicine (US), National Center for Biotechnology Information; [1988]— Accession No. NP_000482.3, "Complement C1q Subcomponent Subunit B Isoform 1 Precursor [Homo sapiens]", cited on Jun. 26, 2021, [online], [retrieved on Sep. 9, 2021]. Retrieved from: https://www.ncbi.nlm.nih.gov/protein/NP_000482, 4 pages.
Protein [Internet]. Bethesda (MD): National Library of Medicine (US), National Center for Biotechnology Information; [1988]— Accession No. NP_057075.1, "Complement C1q Subcomponent Subunit A Precursor [Homo sapiens]", cited on Jul. 19, 2021, [online], [retrieved on Sep. 9, 2021]. Retrieved from: https://www.ncbi.nlm.nih.gov/protein/NP_057075, 4 pages.
Protein [Internet]. Bethesda (MD): National Library of Medicine (US), National Center for Biotechnology Information; [1988]— Accession No. NP_758957.2, "Complement C1q Subcomponent Subunit C Isoform 1 Precursor [Homo sapiens]", cited on Jun. 24, 2021, [online], [retrieved on Sep. 9, 2021]. Retrieved from: https://www.ncbi.nlm.nih.gov/protein/NP_758957, 4 pages.
Al-Lazikani et al. (1997) "Standard Conformations for the Canonical Structures of Immunoglobulins", J. Mol. Biol. 273:927-948.
Altschul et al. (1990) "Basic Local Alignment Search Tool", J. Mol. Biol. 215:403-410.

(56) References Cited

OTHER PUBLICATIONS

Altschul et al. (1997) "Gapped BLAST and PSI-BLAST: a New Generation of Protein Database Search Programs", Nucleic Acids Res. 25:3389-3402.
Angal et al. (1993) "A Single Amino Acids Substitution Abolishes the Heterogeneity of Chimeric Mouse/Human (lgG4) Antibody", Molecular Immunology 30:105-108.
Blok, et al. (1998) "A Bispecific Monoclonal Antibody Directed Against Both the Membrane-Bound Complement Regulator CD55 and the Renal Tumor-Associated Antigen G250 Enhances C3 Deposition and Tumor Cell Lysis by Complement", J. Immunol., 160:3437-3443.
Boersma and Pluckthun (2011) "DARPins and Other Repeat Protein Scaffolds: Advances in Engineering and Applications", Curr. Opin. Biotechnol. 22:849-857.
Brinkmann et al. (2017) "The Making of Bispecific Antibodies", Mabs 9(2):182-212.
Brekke and Sandlie (2003) "Therapeutic Antibodies for Human Diseases at the Dawn of the Twenty-First Century", Nature, 2:52-62.
Byrd et.al. (2009) "Genetic and Biochemical Analyses of the Pseudomonas Aeruginosa Psl Exopolysaccharide Reveal Overlapping Roles for Polysaccharide Synthesis Enzymes in Psl and LPS Production", Mol.Microb.73:622-638.
Chen et al. (2018) "Influenza Infection in Human Induces Broadly Cross-Reactive and Protective Neuraminidase-Reactive Antibodies", Cell. 173, 417-429.
Clynes et al. (1998) "Fc Receptors are Required in Passive and Active Immunity to Melanoma", Proc. Natl. Acad. Sci. (USA) 95:652-656.
Cramton et al. (2001) "Anaerobic Conditions Induce Expression of Polysaccharide Intercellular Adhesin in *Staphylococcus aureus* and *Staphylococcus epidermis*", Infect. Immun.69:4079-4085.
Daum et al. (2012) "Progress Toward a *Staphylococcus aureus* Vaccine", Clin Inf. Dis., 54:560-567.
Digiandomenico et al. (2012) "Identification of Broadly Protective Human Antibodies to Pseudomonas Aeruginosa Exopolysaccharide Psl by Phenotypic Screening", J. Exp. Med. 209:1273-1287.
Edwards (2003) "The remarkable flexibility of the human antibody repertoire; isolation of over one thousand different antibodies to a single protein", BlyS. Journal of Molecular Biology, 334:103-118.
Ehring (1999) "Hydrogen Exchange/Electrospray Ionization Mass Spectrometry Studies of Structural Features of Proteins and Protein/Protein Interactions", Analytical Biochemistry, 267(2):252-259.
Engen and Smith (2001) "Investigating Protein Structures and Dynamics by Hydrogen Exchange MS", Anal. Chem., 73:256A-265A.
Farrell et al. (1975) "Detection of IgG Aggregates or Immune Complexes Using Sold-Phase C1q and Protein A-Rich *Staphylococcus aureus* as an Indicator System", Scandinavian Journal of Immunology, 4(7):673-680.
Flieger et al. (2000) "Mechanism of Cytotoxicity Induced by Chimeric Mouse Human Monoclonal Antibody IDEC-C2B8 in CD20-Expressing Lymphoma Cell Lines", Cellular Immunology, 204(1):55-63.
Protein [Internet]. Bethesda (MD): National Library of Medicine (US), National Center for Biotechnology Information; [1988]— Accession No. AAP34324.1 "Hemagglutinin [Influenza A Virus (A/New Caledonia/20/1999(H1N1)]", cited on Sep. 3, 2003, [online], [retrieved on Sep. 9, 2021]. Retrieved from: https://www.ncbi.nlm.nih.gov/protein/AAP34324, 1 page.
Protein [Internet]. Bethesda (MD): National Library of Medicine (US), National Center for Biotechnology Information; [1988]— Accession No. AFH69349.1 "IsdA [*Staphylococcus aureus* subsp. *aureus* 71193]", cited on May 5, 2017, [online], [retrieved on Sep. 9, 2021]. Retrieved from: https://www.ncbi.nlm.nih.gov/protein/AFH69349, 1 page.
Protein [Internet]. Bethesda (MD): National Library of Medicine (US), National Center for Biotechnology Information; [1988]— Accession No. AGE10362.1 "Protein A [*Staphylococcus aureus*]", cited on Apr. 29, 2013, [online], [retrieved on Sep. 9, 2021]. Retrieved from: https://www.ncbi.nlm.nih.gov/protein/AGE10362, 2 pages.
Protein [Internet]. Bethesda (MD): National Library of Medicine (US), National Center for Biotechnology Information; [1988]— Accession No. RUQ57133.1 "MSCRAMM Family Adhesin Clumping Factor ClfA [*Staphylococcus aureus*]", cited on Jan. 1, 2019, [online], [retrieved on Sep. 9, 2021]. Retrieved from: https://www.ncbi.nlm.nih.gov/protein/RUQ57133, 2 pages.
Protein [Internet]. Bethesda (MD): National Library of Medicine (US), National Center for Biotechnology Information; [1988]— Accession No. NP_690605.1 "B-lymphocyte Antigen CD20 [*Homo sapiens*]", cited on Aug. 29, 2021, [online], [retrieved on Sep. 9, 2021]. Retrieved from: https://www.ncbi.nlm.nih.gov/protein/NP_690605, 3 pages.
Glennie et al., (2007) "Mechanisms of Killing by Anti-CD20 Monoclonal Antibodies", Molecular Immunology, 44(16):3823-3837.
Goel, et al. (2004) "Plasticity within the Antigen Combining Site May Manifest as Molecular Mimicry in the Humoral Immune Response", The Journal of Immunology, 173(12):7358-7367.
Gonnet et al. (1992) "Exhaustive Matching of the Entire Protein Sequence Database", Science, 256:1443-1445.
Greenspan et al., (1999) "Defining epitopes: It's not as easy as it seems", Nature Biotechnology, 17:936-937.
International Search Report and Written Opinion for International Application No. PCT/US2020/017889 mailed Jul. 27, 2020 (19 pages).
Third Party Observation received for International Application No. PCT/US2020/017889 submitted on Jun. 14, 2021 (10 pages).
Jayasekera et al. (2007) "Natural Antibody and Complement Mediate Neutralization of Influenza Virus in the Absence of Prior Immunity", Journal of Virology. 81(7):3487-3494.
Jia, et al. (2010) "A Novel Trifunctional IgG-like Bispecific Antibody to Inhibit HIV-1 Infection and Enhance Lysis of HIV by Targeting Activation of Complement", Viorology Journal, 7:142, pp. 1-4.
Junghans et al. (1990) "Anti-Tac-H, a Humanized Antibody to the Interleukin 2 Receptor with New Features for Immunotherapy in Malignant and Immune Disorders", Cancer Res., 50:1495-1502.
Klein et al. (2012) "Progress in Overcoming the Chain Association Issue in Bispecific Heterodimeric IgG Antibodies", MAbs 4(6):1-11.
Klein et al. (2016) "The Use of CrossMAb Technology for the Generation of Bi- and Multispecific Antibodies", MAbs 8(6):1010-1020.
Kotsiou et al. (2011) "Dimerization of Soluble Disfulfide Trap Single-Chain Major Histocompatibility Complex Class I Molecules Dependent on Peptide Binding Affinity", Antiox Redox Signal. 15(3):635-644.
Langer (1990) "New Methods of Drug Delivery", Science 249:1527-1533.
Laursen et al. (2018) "Potent Activation of the Classical Pathway by Bispecific Antibodies", Abstracts/Molecular Immunology 102:129-235 (Presented at the 27th International Complement Workshop in Santa Fe, NM).
Lindmark et al. (1983) "Binding of Immunoglobulins to Protein A and Immunoglobulin Levels in Mammalian Sera", J Immunol Methods, 62(1):1-13.
Lu, et al. (2016) "Tetravalent Anti-CD20/CD3 Bispecific Antibody for the Treatment of B Cell Lymphoma," Biochemical and Biophysical Research Communications, 473:808-813.
Lu and Kishore (2017) "C1 Complex: An Adaptable Proteolytic Module for Complement and Non-Complement Functions", Frontiers in Immunology, vol. 8, Article 592, pp. 1-11.

\* cited by examiner

FIG. 21

FIG. 22

SEQUENCE LISTING

```
<160> NUMBER OF SEQ ID NOS: 91

<210> SEQ ID NO 1
<211> LENGTH: 357
<212> TYPE: DNA
<213> ORGANISM: Artificial Sequence
<220> FEATURE:
<223> OTHER INFORMATION: synthetic

<400> SEQUENCE: 1
gaagtgcagc tggtggagtc tgggggaggc gtggtacagc ctgggggtc cctgagactc      60 tcctgtgcag cctctggatt cagccttgat gattatgcca tgcactgggt ccgtcaaact     120
ccagggaagg gtctggagtg ggtctctctt attagtgggg atggtagtcg cacatcctat     180
gcagactctg tgaagggccg attcaccatc tccagagaca acagcaaaaa ctccctgtat     240
ctgaaaatga acagtctgag aactgaggac accgccttgt attactgtac aaaagatccc     300
cataactcca actggttcga ccctggggc cagggaaccc tggtcaccgt ctcctca       357

<210> SEQ ID NO 2
<211> LENGTH: 119
<212> TYPE: PRT
<213> ORGANISM: Artificial Sequence
<220> FEATURE:
<223> OTHER INFORMATION: synthetic

<400> SEQUENCE: 2

Glu Val Gln Leu Val Glu Ser Gly Gly Gly Val Val Gln Pro Gly Gly
1               5                   10                  15

Ser Leu Arg Leu Ser Cys Ala Ala Ser Gly Phe Ser Leu Asp Asp Tyr
            20                  25                  30

Ala Met His Trp Val Arg Gln Thr Pro Gly Lys Gly Leu Glu Trp Val
        35                  40                  45

Ser Leu Ile Ser Gly Asp Gly Ser Arg Thr Ser Tyr Ala Asp Ser Val
    50                  55                  60

Lys Gly Arg Phe Thr Ile Ser Arg Asp Asn Ser Lys Asn Ser Leu Tyr
65                  70                  75                  80

Leu Lys Met Asn Ser Leu Arg Thr Glu Asp Thr Ala Leu Tyr Tyr Cys
                85                  90                  95

Thr Lys Asp Pro His Asn Ser Asn Trp Phe Asp Pro Trp Gly Gln Gly
            100                 105                 110

Thr Leu Val Thr Val Ser Ser
        115

<210> SEQ ID NO 3
<211> LENGTH: 24
```

```
<212> TYPE: DNA
<213> ORGANISM: Artificial Sequence
<220> FEATURE:
<223> OTHER INFORMATION: synthetic

<400> SEQUENCE: 3
ggattcagcc ttgatgatta tgcc                                          24

<210> SEQ ID NO 4
<211> LENGTH: 8
<212> TYPE: PRT
<213> ORGANISM: Artificial Sequence
<220> FEATURE:
<223> OTHER INFORMATION: synthetic

<400> SEQUENCE: 4

Gly Phe Ser Leu Asp Asp Tyr Ala
1               5

<210> SEQ ID NO 5
<211> LENGTH: 24
<212> TYPE: DNA
<213> ORGANISM: Artificial Sequence
<220> FEATURE:
<223> OTHER INFORMATION: synthetic

<400> SEQUENCE: 5
attagtgggg atggtagtcg caca                                          24

<210> SEQ ID NO 6
<211> LENGTH: 8
<212> TYPE: PRT
<213> ORGANISM: Artificial Sequence
<220> FEATURE:
<223> OTHER INFORMATION: synthetic

<400> SEQUENCE: 6

Ile Ser Gly Asp Gly Ser Arg Thr
1               5

<210> SEQ ID NO 7
<211> LENGTH: 36
<212> TYPE: DNA
<213> ORGANISM: Artificial Sequence
<220> FEATURE:
<223> OTHER INFORMATION: synthetic

<400> SEQUENCE: 7
acaaaagatc cccataactc caactggttc gacccc                             36

<210> SEQ ID NO 8
<211> LENGTH: 12
<212> TYPE: PRT
<213> ORGANISM: Artificial Sequence
<220> FEATURE:
<223> OTHER INFORMATION: synthetic

<400> SEQUENCE: 8

Thr Lys Asp Pro His Asn Ser Asn Trp Phe Asp Pro
1               5                   10

<210> SEQ ID NO 9
<211> LENGTH: 324
<212> TYPE: DNA
<213> ORGANISM: Artificial Sequence
<220> FEATURE:
<223> OTHER INFORMATION: synthetic
```

<400> SEQUENCE: 9

```
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccgtca   180
aggttcagtg gcagtggatc tgggacagat ttcactctca ccatcagcag tctgcaacct   240
gaagattttg caacttacta ctgtcaacag agttacagta cccctccgat caccttcggc   300
caagggacac gactggagat taaa                                          324
```

<210> SEQ ID NO 10
<211> LENGTH: 108
<212> TYPE: PRT
<213> ORGANISM: Artificial Sequence
<220> FEATURE:
<223> OTHER INFORMATION: synthetic

<400> SEQUENCE: 10

```
Asp Ile Gln Met Thr Gln Ser Pro Ser Ser Leu Ser Ala Ser Val Gly
1               5                   10                  15
Asp Arg Val Thr Ile Thr Cys Arg Ala Ser Gln Ser Ile Ser Ser Tyr
            20                  25                  30
Leu Asn Trp Tyr Gln Gln Lys Pro Gly Lys Ala Pro Lys Leu Leu Ile
        35                  40                  45
Tyr Ala Ala Ser Ser Leu Gln Ser Gly Val Pro Ser Arg Phe Ser Gly
    50                  55                  60
Ser Gly Ser Gly Thr Asp Phe Thr Leu Thr Ile Ser Ser Leu Gln Pro
65                  70                  75                  80
Glu Asp Phe Ala Thr Tyr Tyr Cys Gln Gln Ser Tyr Ser Thr Pro Pro
                85                  90                  95
Ile Thr Phe Gly Gln Gly Thr Arg Leu Glu Ile Lys
            100                 105
```

<210> SEQ ID NO 11
<211> LENGTH: 18
<212> TYPE: DNA
<213> ORGANISM: Artificial Sequence
<220> FEATURE:
<223> OTHER INFORMATION: synthetic

<400> SEQUENCE: 11

```
cagagcatta gcagctat                                                  18
```

<210> SEQ ID NO 12
<211> LENGTH: 6
<212> TYPE: PRT
<213> ORGANISM: Artificial Sequence
<220> FEATURE:
<223> OTHER INFORMATION: synthetic

<400> SEQUENCE: 12

```
Gln Ser Ile Ser Ser Tyr
1               5
```

<210> SEQ ID NO 13
<211> LENGTH: 9
<212> TYPE: DNA
<213> ORGANISM: Artificial Sequence
<220> FEATURE:
<223> OTHER INFORMATION: synthetic

<400> SEQUENCE: 13 gctgcatcc                                                                              9

<210> SEQ ID NO 14
<211> LENGTH: 3
<212> TYPE: PRT
<213> ORGANISM: Artificial Sequence
<220> FEATURE:
<223> OTHER INFORMATION: synthetic

<400> SEQUENCE: 14

Ala Ala Ser
1

<210> SEQ ID NO 15
<211> LENGTH: 30
<212> TYPE: DNA
<213> ORGANISM: Artificial Sequence
<220> FEATURE:
<223> OTHER INFORMATION: synthetic

<400> SEQUENCE: 15
caacagagtt acagtacccc tccgatcacc                                                      30

<210> SEQ ID NO 16
<211> LENGTH: 10
<212> TYPE: PRT
<213> ORGANISM: Artificial Sequence
<220> FEATURE:
<223> OTHER INFORMATION: synthetic

<400> SEQUENCE: 16

Gln Gln Ser Tyr Ser Thr Pro Pro Ile Thr
1               5                   10

<210> SEQ ID NO 17
<211> LENGTH: 351
<212> TYPE: DNA
<213> ORGANISM: Artificial Sequence
<220> FEATURE:
<223> OTHER INFORMATION: synthetic

<400> SEQUENCE: 17
gaggtgcagc tggtgcagtc tggagcagag gtgaaaaagc ccggggagtc tctgaagatc     60
ttctgtaagg gttctggata cagctttatc aacgactgga tcggctgggt gcgccagatg    120
cccgggaaag gcctggaatg gatgggtctg atctttcctg gtgactctga taccagatat    180
agtccggttt ccaaggcca cgtcaccatc tcagccgacc agtccatcga caccgcctat    240
ctgcagtgga acagcctgaa ggcctcggac accgccatat attactgtgc ggtgttacga    300
tactggcact cgctatctg gggccgtggc accctggtca ccgtctcctc a              351

<210> SEQ ID NO 18
<211> LENGTH: 117
<212> TYPE: PRT
<213> ORGANISM: Artificial Sequence
<220> FEATURE:
<223> OTHER INFORMATION: synthetic

<400> SEQUENCE: 18

Glu Val Gln Leu Val Gln Ser Gly Ala Glu Val Lys Lys Pro Gly Glu
1               5                   10                  15

Ser Leu Lys Ile Phe Cys Lys Gly Ser Gly Tyr Ser Phe Ile Asn Asp
            20                  25                  30

Trp Ile Gly Trp Val Arg Gln Met Pro Gly Lys Gly Leu Glu Trp Met
            35                  40                  45

Gly Leu Ile Phe Pro Gly Asp Ser Asp Thr Arg Tyr Ser Pro Val Phe
     50                  55                  60

Gln Gly His Val Thr Ile Ser Ala Asp Gln Ser Ile Asp Thr Ala Tyr
 65                  70                  75                  80

Leu Gln Trp Asn Ser Leu Lys Ala Ser Asp Thr Ala Ile Tyr Tyr Cys
                 85                  90                  95

Ala Val Leu Arg Tyr Trp His Phe Ala Ile Trp Gly Arg Gly Thr Leu
            100                 105                 110

Val Thr Val Ser Ser
        115

<210> SEQ ID NO 19
<211> LENGTH: 24
<212> TYPE: DNA
<213> ORGANISM: Artificial Sequence
<220> FEATURE:
<223> OTHER INFORMATION: synthetic

<400> SEQUENCE: 19
ggatacagct ttatcaacga ctgg                                          24

<210> SEQ ID NO 20
<211> LENGTH: 8
<212> TYPE: PRT
<213> ORGANISM: Artificial Sequence
<220> FEATURE:
<223> OTHER INFORMATION: synthetic

<400> SEQUENCE: 20

Gly Tyr Ser Phe Ile Asn Asp Trp
1               5

<210> SEQ ID NO 21
<211> LENGTH: 24
<212> TYPE: DNA
<213> ORGANISM: Artificial Sequence
<220> FEATURE:
<223> OTHER INFORMATION: synthetic

<400> SEQUENCE: 21
atctttcctg gtgactctga tacc                                          24

<210> SEQ ID NO 22
<211> LENGTH: 8
<212> TYPE: PRT
<213> ORGANISM: Artificial Sequence
<220> FEATURE:
<223> OTHER INFORMATION: synthetic

<400> SEQUENCE: 22

Ile Phe Pro Gly Asp Ser Asp Thr
1               5

<210> SEQ ID NO 23
<211> LENGTH: 30
<212> TYPE: DNA
<213> ORGANISM: Artificial Sequence
<220> FEATURE:
<223> OTHER INFORMATION: synthetic

<400> SEQUENCE: 23

```
gcggtgttac gatactggca cttcgctatc                                          30
```

<210> SEQ ID NO 24
<211> LENGTH: 10
<212> TYPE: PRT
<213> ORGANISM: Artificial Sequence
<220> FEATURE:
<223> OTHER INFORMATION: synthetic

<400> SEQUENCE: 24

```
Ala Val Leu Arg Tyr Trp His Phe Ala Ile
1               5                   10
```

<210> SEQ ID NO 25
<211> LENGTH: 375
<212> TYPE: DNA
<213> ORGANISM: Artificial Sequence
<220> FEATURE:
<223> OTHER INFORMATION: synthetic

<400> SEQUENCE: 25

```
gaagtgcagc tggtggagtc tgggggaggt ctggtacagc ctggcaggtc cctgagactc         60
tcctgtacaa cctctggatt cacctttgat gattatgcca tgcactgggt ccggcaagtt        120
ccagggcagg gcctggagtg ggtcgcaggt cttagctgga acagtgatac cataggctat        180
gcggactctg tgaagggccg attcaccatc tccagagaca cgccaagaa ttccctgtat         240 ctgcaaatga aaagtctgaa agctgaggac acggcttat attactgtac aaaagatttc        300
taccatagtt tgaataattg gaactactac tactttgact actggggcca gggaaccctg        360
gtcaccgtct cctca                                                        375
```

<210> SEQ ID NO 26
<211> LENGTH: 125
<212> TYPE: PRT
<213> ORGANISM: Artificial Sequence
<220> FEATURE:
<223> OTHER INFORMATION: synthetic

<400> SEQUENCE: 26

```
Glu Val Gln Leu Val Glu Ser Gly Gly Gly Leu Val Gln Pro Gly Arg
1               5                   10                  15

Ser Leu Arg Leu Ser Cys Thr Thr Ser Gly Phe Thr Phe Asp Asp Tyr
            20                  25                  30

Ala Met His Trp Val Arg Gln Val Pro Gly Gln Gly Leu Glu Trp Val
        35                  40                  45

Ala Gly Leu Ser Trp Asn Ser Asp Thr Ile Gly Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Lys Ser Leu Lys Ala Glu Asp Thr Ala Leu Tyr Tyr Cys
                85                  90                  95

Thr Lys Asp Phe Tyr His Ser Leu Asn Asn Trp Asn Tyr Tyr Tyr Phe
            100                 105                 110

Asp Tyr Trp Gly Gln Gly Thr Leu Val Thr Val Ser Ser
        115                 120                 125
```

<210> SEQ ID NO 27
<211> LENGTH: 24
<212> TYPE: DNA
<213> ORGANISM: Artificial Sequence
<220> FEATURE:

<223> OTHER INFORMATION: synthetic

<400> SEQUENCE: 27
ggattcacct ttgatgatta tgcc        24

<210> SEQ ID NO 28
<211> LENGTH: 8
<212> TYPE: PRT
<213> ORGANISM: Artificial Sequence
<220> FEATURE:
<223> OTHER INFORMATION: synthetic

<400> SEQUENCE: 28

Gly Phe Thr Phe Asp Asp Tyr Ala
1               5

<210> SEQ ID NO 29
<211> LENGTH: 24
<212> TYPE: DNA
<213> ORGANISM: Artificial Sequence
<220> FEATURE:
<223> OTHER INFORMATION: synthetic

<400> SEQUENCE: 29
cttagctgga acagtgatac cata        24

<210> SEQ ID NO 30
<211> LENGTH: 8
<212> TYPE: PRT
<213> ORGANISM: Artificial Sequence
<220> FEATURE:
<223> OTHER INFORMATION: synthetic

<400> SEQUENCE: 30

Leu Ser Trp Asn Ser Asp Thr Ile
1               5

<210> SEQ ID NO 31
<211> LENGTH: 54
<212> TYPE: DNA
<213> ORGANISM: Artificial Sequence
<220> FEATURE:
<223> OTHER INFORMATION: synthetic

<400> SEQUENCE: 31
acaaaagatt tctaccatag tttgaataat tggaactact actactttga ctac        54

<210> SEQ ID NO 32
<211> LENGTH: 18
<212> TYPE: PRT
<213> ORGANISM: Artificial Sequence
<220> FEATURE:
<223> OTHER INFORMATION: synthetic

<400> SEQUENCE: 32

Thr Lys Asp Phe Tyr His Ser Leu Asn Asn Trp Asn Tyr Tyr Tyr Phe
1               5                   10                  15

Asp Tyr

<210> SEQ ID NO 33
<211> LENGTH: 357
<212> TYPE: DNA
<213> ORGANISM: Artificial Sequence
<220> FEATURE:
<223> OTHER INFORMATION: synthetic

<400> SEQUENCE: 33

```
caggtgcacc tggtggagtc tgggggaggc gtggtccagc ctgggaggtc cctgagactc    60
tcctgttcag tctctggact caccttcaat agctatggca tgcactgggt ccgccaggct   120
ccaggcaagg ggctggagtg ggtgacaatg atttcatatg atggaagtga taaatattat   180
ctagactccg tgaagggccg atttaccatc tccagagaca attccaagaa catcctgtat   240
ctgcaaatta acagcctgag acctgaggac acggctgtat attactgtgt gaactgggat   300
aattggaggg gaaactttga ctattgggc cagggaaccc tggtcaccgt ctcctca     357
```

```
<210> SEQ ID NO 34
<211> LENGTH: 119
<212> TYPE: PRT
<213> ORGANISM: Artificial Sequence
<220> FEATURE:
<223> OTHER INFORMATION: synthetic
```

<400> SEQUENCE: 34

```
Gln Val His Leu Val Glu Ser Gly Gly Gly Val Val Gln Pro Gly Arg
1               5                   10                  15
Ser Leu Arg Leu Ser Cys Ser Val Ser Gly Leu Thr Phe Asn Ser Tyr
            20                  25                  30
Gly Met His Trp Val Arg Gln Ala Pro Gly Lys Gly Leu Glu Trp Val
        35                  40                  45
Thr Met Ile Ser Tyr Asp Gly Ser Asp Lys Tyr Tyr Leu Asp Ser Val
    50                  55                  60
Lys Gly Arg Phe Thr Ile Ser Arg Asp Asn Ser Lys Asn Ile Leu Tyr
65                  70                  75                  80
Leu Gln Ile Asn Ser Leu Arg Pro Glu Asp Thr Ala Val Tyr Tyr Cys
                85                  90                  95
Val Asn Trp Asp Asn Trp Arg Gly Asn Phe Asp Tyr Trp Gly Gln Gly
            100                 105                 110
Thr Leu Val Thr Val Ser Ser
        115
```

```
<210> SEQ ID NO 35
<211> LENGTH: 24
<212> TYPE: DNA
<213> ORGANISM: Artificial Sequence
<220> FEATURE:
<223> OTHER INFORMATION: synthetic
```

<400> SEQUENCE: 35

```
ggactcacct tcaatagcta tggc                                          24
```

```
<210> SEQ ID NO 36
<211> LENGTH: 8
<212> TYPE: PRT
<213> ORGANISM: Artificial Sequence
<220> FEATURE:
<223> OTHER INFORMATION: synthetic
```

<400> SEQUENCE: 36

```
Gly Leu Thr Phe Asn Ser Tyr Gly
1               5
```

```
<210> SEQ ID NO 37
<211> LENGTH: 24
<212> TYPE: DNA
<213> ORGANISM: Artificial Sequence
<220> FEATURE:
```

<223> OTHER INFORMATION: synthetic

<400> SEQUENCE: 37
atttcatatg atggaagtga taaa   24

<210> SEQ ID NO 38
<211> LENGTH: 8
<212> TYPE: PRT
<213> ORGANISM: Artificial Sequence
<220> FEATURE:
<223> OTHER INFORMATION: synthetic

<400> SEQUENCE: 38

Ile Ser Tyr Asp Gly Ser Asp Lys
1               5

<210> SEQ ID NO 39
<211> LENGTH: 36
<212> TYPE: DNA
<213> ORGANISM: Artificial Sequence
<220> FEATURE:
<223> OTHER INFORMATION: synthetic

<400> SEQUENCE: 39
gtgaactggg ataattggag gggaaacttt gactat   36

<210> SEQ ID NO 40
<211> LENGTH: 12
<212> TYPE: PRT
<213> ORGANISM: Artificial Sequence
<220> FEATURE:
<223> OTHER INFORMATION: synthetic

<400> SEQUENCE: 40

Val Asn Trp Asp Asn Trp Arg Gly Asn Phe Asp Tyr
1               5                   10

<210> SEQ ID NO 41
<211> LENGTH: 360
<212> TYPE: DNA
<213> ORGANISM: Artificial Sequence
<220> FEATURE:
<223> OTHER INFORMATION: synthetic

<400> SEQUENCE: 41
caggtccacc tggtgcagtc tgggccagag gtgaagaagc ctgggtcctc ggtgaaggtc   60
tcctgcaagg cttctggagt caccttcatc agtcatgcta tcagctgggt gcgacaggcc   120
cctggacaag gcttgaatg gtgggagga atcatcgcta tctttggtac aacaaactac   180
gcacagaagt tccagggcag agtcacggtt acaacggaca atccacgaa cacagtctac   240 atggaattga gcagactgag atctgaggac acggccattt attactgtgc gcgaggtgag   300
acctactacg agggaaactt tgacttctgg ggccagggaa ccctggtcac cgtctcctca   360

<210> SEQ ID NO 42
<211> LENGTH: 120
<212> TYPE: PRT
<213> ORGANISM: Artificial Sequence
<220> FEATURE:
<223> OTHER INFORMATION: synthetic

<400> SEQUENCE: 42

Gln Val His Leu Val Gln Ser Gly Pro Glu Val Lys Lys Pro Gly Ser
1               5                   10                  15

Ser Val Lys Val Ser Cys Lys Ala Ser Gly Val Thr Phe Ile Ser His
                20                  25                  30

Ala Ile Ser Trp Val Arg Gln Ala Pro Gly Gln Gly Leu Glu Trp Val
            35                  40                  45

Gly Gly Ile Ile Ala Ile Phe Gly Thr Thr Asn Tyr Ala Gln Lys Phe
    50                  55                  60

Gln Gly Arg Val Thr Val Thr Thr Asp Lys Ser Thr Asn Thr Val Tyr
65                  70                  75                  80

Met Glu Leu Ser Arg Leu Arg Ser Glu Asp Thr Ala Ile Tyr Tyr Cys
                85                  90                  95

Ala Arg Gly Glu Thr Tyr Tyr Glu Gly Asn Phe Asp Phe Trp Gly Gln
            100                 105                 110

Gly Thr Leu Val Thr Val Ser Ser
        115                 120

<210> SEQ ID NO 43
<211> LENGTH: 24
<212> TYPE: DNA
<213> ORGANISM: Artificial Sequence
<220> FEATURE:
<223> OTHER INFORMATION: synthetic

<400> SEQUENCE: 43
ggagtcacct tcatcagtca tgct                                        24

<210> SEQ ID NO 44
<211> LENGTH: 8
<212> TYPE: PRT
<213> ORGANISM: Artificial Sequence
<220> FEATURE:
<223> OTHER INFORMATION: synthetic

<400> SEQUENCE: 44

Gly Val Thr Phe Ile Ser His Ala
1               5

<210> SEQ ID NO 45
<211> LENGTH: 24
<212> TYPE: DNA
<213> ORGANISM: Artificial Sequence
<220> FEATURE:
<223> OTHER INFORMATION: synthetic

<400> SEQUENCE: 45
atcatcgcta tctttggtac aaca                                        24

<210> SEQ ID NO 46
<211> LENGTH: 8
<212> TYPE: PRT
<213> ORGANISM: Artificial Sequence
<220> FEATURE:
<223> OTHER INFORMATION: synthetic

<400> SEQUENCE: 46

Ile Ile Ala Ile Phe Gly Thr Thr
1               5

<210> SEQ ID NO 47
<211> LENGTH: 39
<212> TYPE: DNA
<213> ORGANISM: Artificial Sequence
<220> FEATURE:
<223> OTHER INFORMATION: synthetic

<400> SEQUENCE: 47
gcgcgaggtg agacctacta cgagggaaac tttgacttc                39

<210> SEQ ID NO 48
<211> LENGTH: 13
<212> TYPE: PRT
<213> ORGANISM: Artificial Sequence
<220> FEATURE:
<223> OTHER INFORMATION: synthetic

<400> SEQUENCE: 48

Ala Arg Gly Glu Thr Tyr Tyr Glu Gly Asn Phe Asp Phe
1               5                   10

<210> SEQ ID NO 49
<211> LENGTH: 360
<212> TYPE: DNA
<213> ORGANISM: Artificial Sequence
<220> FEATURE:
<223> OTHER INFORMATION: synthetic

<400> SEQUENCE: 49
caggtgcagc tgcaggagtc gggcccagga ctggtgaagc cttcggagac cctgtccctc      60
acctgcattg tctctggtgg ctccatcagt ggttacttct ggaactggat ccggcagccc     120
ccagggaagg gacttgaatg gattggttat atctattaca gtgggaccac catctacaac     180
ccctccctca agagtcgatt caccatatca ctagacacgt ccaagaacca gttctcccta     240
aagctgacct ctgtgaccgc tgcggacacg gccgtatatt actgtgcgag agagtcgtat     300
aatccctcgc gcgatatttt tgaccactgg ggccaggaa ccctggtcac cgtctcctca      360

<210> SEQ ID NO 50
<211> LENGTH: 120
<212> TYPE: PRT
<213> ORGANISM: Artificial Sequence
<220> FEATURE:
<223> OTHER INFORMATION: synthetic

<400> SEQUENCE: 50

Gln Val Gln Leu Gln Glu Ser Gly Pro Gly Leu Val Lys Pro Ser Glu
1               5                   10                  15

Thr Leu Ser Leu Thr Cys Ile Val Ser Gly Gly Ser Ile Ser Gly Tyr
            20                  25                  30

Phe Trp Asn Trp Ile Arg Gln Pro Pro Gly Lys Gly Leu Glu Trp Ile
        35                  40                  45

Gly Tyr Ile Tyr Tyr Ser Gly Thr Thr Ile Tyr Asn Pro Ser Leu Lys
    50                  55                  60

Ser Arg Phe Thr Ile Ser Leu Asp Thr Ser Lys Asn Gln Phe Ser Leu
65                  70                  75                  80

Lys Leu Thr Ser Val Thr Ala Ala Asp Thr Ala Val Tyr Tyr Cys Ala
                85                  90                  95

Arg Glu Ser Tyr Asn Pro Ser Pro Arg Tyr Phe Asp His Trp Gly Gln
            100                 105                 110

Gly Thr Leu Val Thr Val Ser Ser
        115                 120

<210> SEQ ID NO 51
<211> LENGTH: 24
<212> TYPE: DNA
<213> ORGANISM: Artificial Sequence
<220> FEATURE:

<223> OTHER INFORMATION: synthetic

<400> SEQUENCE: 51
ggtggctcca tcagtggtta cttc                                           24

<210> SEQ ID NO 52
<211> LENGTH: 8
<212> TYPE: PRT
<213> ORGANISM: Artificial Sequence
<220> FEATURE:
<223> OTHER INFORMATION: synthetic

<400> SEQUENCE: 52

Gly Gly Ser Ile Ser Gly Tyr Phe
1               5

<210> SEQ ID NO 53
<211> LENGTH: 21
<212> TYPE: DNA
<213> ORGANISM: Artificial Sequence
<220> FEATURE:
<223> OTHER INFORMATION: synthetic

<400> SEQUENCE: 53
atctattaca gtgggaccac c                                              21

<210> SEQ ID NO 54
<211> LENGTH: 7
<212> TYPE: PRT
<213> ORGANISM: Artificial Sequence
<220> FEATURE:
<223> OTHER INFORMATION: synthetic

<400> SEQUENCE: 54

Ile Tyr Tyr Ser Gly Thr Thr
1               5

<210> SEQ ID NO 55
<211> LENGTH: 42
<212> TYPE: DNA
<213> ORGANISM: Artificial Sequence
<220> FEATURE:
<223> OTHER INFORMATION: synthetic

<400> SEQUENCE: 55
gcgagagagt cgtataatcc ctcgccgcga tattttgacc ac                       42

<210> SEQ ID NO 56
<211> LENGTH: 14
<212> TYPE: PRT
<213> ORGANISM: Artificial Sequence
<220> FEATURE:
<223> OTHER INFORMATION: synthetic

<400> SEQUENCE: 56

Ala Arg Glu Ser Tyr Asn Pro Ser Pro Arg Tyr Phe Asp His
1               5                   10

<210> SEQ ID NO 57
<211> LENGTH: 351
<212> TYPE: DNA
<213> ORGANISM: Artificial Sequence
<220> FEATURE:
<223> OTHER INFORMATION: synthetic

<400> SEQUENCE: 57

```
gaggtgcagc tggtggagtc tgggggaggc ttggtacagc ctggggggtc cctgagactc      60
tcctgtgcag cctctggatt caccttcact agctacgaca tgcactgggt ccgccaagct     120
acaggaaaag gtctggagtg ggtctcaaat attgatcccg ctggtaacac attctatcca     180
ggctccgtga agggccgatt caccatctcc agagaaaatg ccaagaagtc cttgtatctt     240
caaatgaaca gccttagagc cggggacacg gctgtatatt actgtgcaag aaacctaggt     300
aactggggat atgaccactg gggccaggga accctggtca ccgtctcctc a             351
```

<210> SEQ ID NO 58
<211> LENGTH: 117
<212> TYPE: PRT
<213> ORGANISM: Artificial Sequence
<220> FEATURE:
<223> OTHER INFORMATION: synthetic

<400> SEQUENCE: 58

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Ser Tyr
            20                  25                  30

Asp Met His Trp Val Arg Gln Ala Thr Gly Lys Gly Leu Glu Trp Val
        35                  40                  45

Ser Asn Ile Asp Pro Ala Gly Asn Thr Phe Tyr Pro Gly Ser Val Lys
    50                  55                  60

Gly Arg Phe Thr Ile Ser Arg Glu Asn Ala Lys Lys Ser Leu Tyr Leu
65                  70                  75                  80

Gln Met Asn Ser Leu Arg Ala Gly Asp Thr Ala Val Tyr Tyr Cys Ala
                85                  90                  95

Arg Asn Leu Gly Asn Trp Gly Tyr Asp His Trp Gly Gln Gly Thr Leu
            100                 105                 110

Val Thr Val Ser Ser
        115

<210> SEQ ID NO 59
<211> LENGTH: 24
<212> TYPE: DNA
<213> ORGANISM: Artificial Sequence
<220> FEATURE:
<223> OTHER INFORMATION: synthetic

<400> SEQUENCE: 59
ggattcacct tcactagcta cgac                                            24

<210> SEQ ID NO 60
<211> LENGTH: 8
<212> TYPE: PRT
<213> ORGANISM: Artificial Sequence
<220> FEATURE:
<223> OTHER INFORMATION: synthetic

<400> SEQUENCE: 60

Gly Phe Thr Phe Thr Ser Tyr Asp
1               5

<210> SEQ ID NO 61
<211> LENGTH: 21
<212> TYPE: DNA
<213> ORGANISM: Artificial Sequence
<220> FEATURE:
<223> OTHER INFORMATION: synthetic

<400> SEQUENCE: 61
attgatcccg ctggtaacac a                                              21

<210> SEQ ID NO 62
<211> LENGTH: 7
<212> TYPE: PRT
<213> ORGANISM: Artificial Sequence
<220> FEATURE:
<223> OTHER INFORMATION: synthetic

<400> SEQUENCE: 62

Ile Asp Pro Ala Gly Asn Thr
1               5

<210> SEQ ID NO 63
<211> LENGTH: 33
<212> TYPE: DNA
<213> ORGANISM: Artificial Sequence
<220> FEATURE:
<223> OTHER INFORMATION: synthetic

<400> SEQUENCE: 63
gcaagaaacc taggtaactg gggatatgac cac                                 33

<210> SEQ ID NO 64
<211> LENGTH: 11
<212> TYPE: PRT
<213> ORGANISM: Artificial Sequence
<220> FEATURE:
<223> OTHER INFORMATION: synthetic

<400> SEQUENCE: 64

Ala Arg Asn Leu Gly Asn Trp Gly Tyr Asp His
1               5                   10

<210> SEQ ID NO 65
<211> LENGTH: 369
<212> TYPE: DNA
<213> ORGANISM: Artificial Sequence
<220> FEATURE:
<223> OTHER INFORMATION: synthetic

<400> SEQUENCE: 65
gaagtgcagc tggtggagtc tgggggaggc ttggtacagc ctggcaggtc cctgagagtc    60
tcttgtgcag cctctggatt cacctttgat gattatgcca tgcactgggt ccggcaaatt   120
ccagggaagg gcctggagtg ggtctcaggt attagatgga atagtgacac tataggctat   180
gcggactctg tgaagggccg attcaccatt tccagagaca acgccaagaa ttttctatat   240
ctacaaatga acagtctgag aactgaagac acggccttat attactgtgt caaagatatg   300
agggttcggg gaattataat gtacggtatg acgtctgggg ccaagggac cacggtcacc    360 gtctcctca                                                           369

<210> SEQ ID NO 66
<211> LENGTH: 123
<212> TYPE: PRT
<213> ORGANISM: Artificial Sequence
<220> FEATURE:
<223> OTHER INFORMATION: synthetic

<400> SEQUENCE: 66

Glu Val Gln Leu Val Glu Ser Gly Gly Gly Leu Val Gln Pro Gly Arg
1               5                   10                  15

Ser Leu Arg Val Ser Cys Ala Ala Ser Gly Phe Thr Phe Asp Asp Tyr
            20                  25                  30

Ala Met His Trp Val Arg Gln Ile Pro Gly Lys Gly Leu Glu Trp Val
        35                  40                  45

Ser Gly Ile Arg Trp Asn Ser Asp Thr Ile Gly Tyr Ala Asp Ser Val
    50                  55                  60

Lys Gly Arg Phe Thr Ile Ser Arg Asp Asn Ala Lys Asn Phe Leu Tyr
65                  70                  75                  80

Leu Gln Met Asn Ser Leu Arg Thr Glu Asp Thr Ala Leu Tyr Tyr Cys
                85                  90                  95

Val Lys Asp Met Arg Val Arg Gly Ile Ile Met Tyr Gly Met Asp Val
            100                 105                 110

Trp Gly Gln Gly Thr Thr Val Thr Val Ser Ser
        115                 120

<210> SEQ ID NO 67
<211> LENGTH: 24
<212> TYPE: DNA
<213> ORGANISM: Artificial Sequence
<220> FEATURE:
<223> OTHER INFORMATION: synthetic

<400> SEQUENCE: 67
ggattcacct ttgatgatta tgcc                                          24

<210> SEQ ID NO 68
<211> LENGTH: 8
<212> TYPE: PRT
<213> ORGANISM: Artificial Sequence
<220> FEATURE:
<223> OTHER INFORMATION: synthetic

<400> SEQUENCE: 68

Gly Phe Thr Phe Asp Asp Tyr Ala
1               5

<210> SEQ ID NO 69
<211> LENGTH: 24
<212> TYPE: DNA
<213> ORGANISM: Artificial Sequence
<220> FEATURE:
<223> OTHER INFORMATION: synthetic

<400> SEQUENCE: 69
attagatgga atagtgacac tata                                          24

<210> SEQ ID NO 70
<211> LENGTH: 8
<212> TYPE: PRT
<213> ORGANISM: Artificial Sequence
<220> FEATURE:
<223> OTHER INFORMATION: synthetic

<400> SEQUENCE: 70

Ile Arg Trp Asn Ser Asp Thr Ile
1               5

<210> SEQ ID NO 71
<211> LENGTH: 48
<212> TYPE: DNA
<213> ORGANISM: Artificial Sequence
<220> FEATURE:
<223> OTHER INFORMATION: synthetic

<400> SEQUENCE: 71
gtcaaagata tgagggttcg gggaattata atgtacggta tggacgtc        48

<210> SEQ ID NO 72
<211> LENGTH: 16
<212> TYPE: PRT
<213> ORGANISM: Artificial Sequence
<220> FEATURE:
<223> OTHER INFORMATION: synthetic

<400> SEQUENCE: 72

Val Lys Asp Met Arg Val Arg Gly Ile Ile Met Tyr Gly Met Asp Val
1               5                   10                  15

<210> SEQ ID NO 73
<211> LENGTH: 451
<212> TYPE: PRT
<213> ORGANISM: Artificial Sequence
<220> FEATURE:
<223> OTHER INFORMATION: REGN5738 ClfA Heavy Chain

<400> SEQUENCE: 73

Gln Val Gln Leu Lys Glu Ser Gly Pro Gly Leu Val Lys Pro Ser Gln
1               5                   10                  15

Thr Leu Ser Ile Thr Cys Thr Ile Ser Gly Phe Ser Leu Ser Arg Tyr
                20                  25                  30

Ser Val His Trp Val Arg Gln Pro Pro Gly Lys Gly Leu Glu Trp Leu
            35                  40                  45

Gly Met Ile Trp Gly Gly Gly Asn Thr Asp Tyr Asn Ser Ala Leu Lys
        50                  55                  60

Ser Arg Leu Ser Ile Ser Lys Asp Asn Ser Lys Asn Gln Val Phe Leu
65                  70                  75                  80

Lys Met Asn Ser Leu Thr Ala Ala Asp Thr Ala Val Tyr Tyr Cys Ala
                85                  90                  95

Arg Lys Gly Glu Phe Tyr Tyr Gly Tyr Asp Gly Phe Val Tyr Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val

```
                 275                 280                 285
    His Asn Ala Lys Thr Lys Pro Arg Glu Glu Gln Tyr Asn Ser Thr Tyr
        290                 295                 300

Arg Val Val Ser Val Leu Thr Val Leu His Gln Asp Trp Leu Asn Gly
    305                 310                 315                 320

Lys Glu Tyr Lys Cys Lys Val Ser Asn Lys Ala Leu Pro Ala Pro Ile
                    325                 330                 335

Glu Lys Thr Ile Ser Lys Ala Lys Gly Gln Pro Arg Glu Pro Gln Val
                340                 345                 350

Tyr Thr Leu Pro Pro Ser Arg Asp Glu Leu Thr Lys Asn Gln Val Ser
            355                 360                 365

Leu Thr Cys Leu Val Lys Gly Phe Tyr Pro Ser Asp Ile Ala Val Glu
        370                 375                 380

Trp Glu Ser Asn Gly Gln Pro Glu Asn Asn Tyr Lys Thr Thr Pro Pro
    385                 390                 395                 400

Val Leu Asp Ser Asp Gly Ser Phe Phe Leu Tyr Ser Lys Leu Thr Val
                    405                 410                 415

Asp Lys Ser Arg Trp Gln Gln Gly Asn Val Phe Ser Cys Ser Val Met
                420                 425                 430

His Glu Ala Leu His Asn His Tyr Thr Gln Lys Ser Leu Ser Leu Ser
            435                 440                 445

Pro Gly Lys
        450

<210> SEQ ID NO 74
<211> LENGTH: 219
<212> TYPE: PRT
<213> ORGANISM: Artificial Sequence
<220> FEATURE:
<223> OTHER INFORMATION: REGN5738 ClfA Light Chain

<400> SEQUENCE: 74

Asp Ile Val Met Thr Gln Ser Pro Asp Ser Leu Ala Val Ser Leu Gly
    1               5                   10                  15

Glu Arg Val Thr Met Asn Cys Lys Ser Ser Gln Ser Val Leu Tyr Ser
                20                  25                  30

Ser Asn Gln Lys Asn Tyr Leu Ala Trp Tyr Gln Gln Lys Pro Gly Gln
            35                  40                  45

Ser Pro Lys Leu Leu Ile Tyr Trp Ala Ser Thr Arg Glu Ser Gly Val
        50                  55                  60

Pro Asp Arg Phe Ser Gly Ser Gly Ser Gly Thr Asp Phe Thr Leu Thr
    65                  70                  75                  80

Ile Ser Ser Val Gln Ala Glu Asp Leu Ala Val Tyr Tyr Cys His Gln
                    85                  90                  95

Tyr Leu Ser Ser Tyr Thr Phe Gly Gly Gly Thr Lys Leu Glu Ile Lys
                100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
        130                 135                 140

Tyr Pro Arg Glu Ala Lys Val Gln Trp Lys Val Asp Asn Ala Leu Gln
    145                 150                 155                 160

Ser Gly Asn Ser Gln Glu Ser Val Thr Glu Gln Asp Ser Lys Asp Ser
                    165                 170                 175

Thr Tyr Ser Leu Ser Ser Thr Leu Thr Leu Ser Lys Ala Asp Tyr Glu
```

```
                180                 185                 190
Lys His Lys Val Tyr Ala Cys Glu Val Thr His Gln Gly Leu Ser Ser
            195                 200                 205

Pro Val Thr Lys Ser Phe Asn Arg Gly Glu Cys
        210                 215

<210> SEQ ID NO 75
<211> LENGTH: 469
<212> TYPE: PRT
<213> ORGANISM: Artificial Sequence
<220> FEATURE:
<223> OTHER INFORMATION: REGN5738 Heavy Chain H1xH17736P ScFv

<400> SEQUENCE: 75

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Gly Gly Gly Gly
            100                 105                 110

Ser Gly Gly Gly Gly Ser Gly Gly Gly Ser Glu Val Gln Leu Val
        115                 120                 125

Glu Ser Gly Gly Gly Val Val Gln Pro Gly Gly Ser Leu Arg Leu Ser
130                 135                 140

Cys Ala Ala Ser Gly Phe Ser Leu Asp Asp Tyr Ala Met His Trp Val
145                 150                 155                 160

Arg Gln Thr Pro Gly Lys Gly Leu Glu Trp Val Ser Leu Ile Ser Gly
                165                 170                 175

Asp Gly Ser Arg Thr Ser Tyr Ala Asp Ser Val Lys Gly Arg Phe Thr
            180                 185                 190

Ile Ser Arg Asp Asn Ser Lys Asn Ser Leu Tyr Leu Lys Met Asn Ser
        195                 200                 205

Leu Arg Thr Glu Asp Thr Ala Leu Tyr Tyr Cys Thr Lys Asp Pro His
        210                 215                 220

Asn Ser Asn Trp Phe Asp Pro Trp Gly Gln Gly Thr Leu Val Thr Val
225                 230                 235                 240

Ser Ser Asp Lys Thr His Thr Cys Pro Pro Cys Pro Ala Pro Glu Leu
                245                 250                 255

Leu Gly Gly Pro Ser Val Phe Leu Phe Pro Pro Lys Pro Lys Asp Thr
            260                 265                 270

Leu Met Ile Ser Arg Thr Pro Glu Val Thr Cys Val Val Val Asp Val
        275                 280                 285

Ser His Glu Asp Pro Glu Val Lys Phe Asn Trp Tyr Val Asp Gly Val
        290                 295                 300

Glu Val His Asn Ala Lys Thr Lys Pro Arg Glu Glu Gln Tyr Asn Ser
305                 310                 315                 320

Thr Tyr Arg Val Val Ser Val Leu Thr Val Leu His Gln Asp Trp Leu
```

```
                    325                 330                 335
Asn Gly Lys Glu Tyr Lys Cys Lys Val Ser Asn Lys Ala Leu Pro Ala
                340                 345                 350

Pro Ile Glu Lys Thr Ile Ser Lys Ala Lys Gly Gln Pro Arg Glu Pro
            355                 360                 365

Gln Val Tyr Thr Leu Pro Pro Ser Arg Asp Glu Leu Thr Lys Asn Gln
    370                 375                 380

Val Ser Leu Thr Cys Leu Val Lys Gly Phe Tyr Pro Ser Asp Ile Ala
385                 390                 395                 400

Val Glu Trp Glu Ser Asn Gly Gln Pro Glu Asn Asn Tyr Lys Thr Thr
                405                 410                 415

Pro Pro Val Leu Asp Ser Asp Gly Ser Phe Phe Leu Tyr Ser Lys Leu
            420                 425                 430

Thr Val Asp Lys Ser Arg Trp Gln Gln Gly Asn Val Phe Ser Cys Ser
    435                 440                 445

Val Met His Glu Ala Leu His Asn Arg Phe Thr Gln Lys Ser Leu Ser
450                 455                 460

Leu Ser Pro Gly Lys
465

<210> SEQ ID NO 76
<211> LENGTH: 454
<212> TYPE: PRT
<213> ORGANISM: Artificial Sequence
<220> FEATURE:
<223> OTHER INFORMATION: REGN5536 PNAG Heavy Chain

<400> SEQUENCE: 76

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Gly Tyr
                20                  25                  30

Tyr Trp Ser Trp Ile Arg Gln Pro Pro Gly Lys Gly Leu Glu Trp Ile
            35                  40                  45

Gly Tyr Ile His Tyr Ser Arg Ser Thr Asn Ser Asn Pro Ala Leu Lys
    50                  55                  60

Ser Arg Val Thr Ile Ser Ser Asp Thr Ser Lys Asn Gln Leu Ser Leu
65                  70                  75                  80

Arg Leu Ser Ser Val Thr Ala Ala Asp Thr Ala Val Tyr Tyr Cys Ala
                85                  90                  95

Arg Asp Thr Tyr Tyr Tyr Asp Ser Gly Asp Tyr Glu Asp Ala Phe Asp
            100                 105                 110

Ile Trp Gly Gln Gly Thr Met Val Thr Val Ser Ser Ala Ser Thr Lys
    115                 120                 125

Gly Pro Ser Val Phe Pro Leu Ala Pro Ser Ser Lys Ser Thr Ser Gly
130                 135                 140

Gly Thr Ala Ala Leu Gly Cys Leu Val Lys Asp Tyr Phe Pro Glu Pro
145                 150                 155                 160

Val Thr Val Ser Trp Asn Ser Gly Ala Leu Thr Ser Gly Val His Thr
                165                 170                 175

Phe Pro Ala Val Leu Gln Ser Ser Gly Leu Tyr Ser Leu Ser Ser Val
            180                 185                 190

Val Thr Val Pro Ser Ser Leu Gly Thr Gln Thr Tyr Ile Cys Asn
    195                 200                 205

Val Asn His Lys Pro Ser Asn Thr Lys Val Asp Lys Lys Val Glu Pro
```

Lys Ser Cys Asp Lys Thr His Thr Cys Pro Pro Cys Pro Ala Pro Glu
225                 230                 235                 240

Leu Leu Gly Gly Pro Ser Val Phe Leu Phe Pro Pro Lys Pro Lys Asp
            245                 250                 255

Thr Leu Met Ile Ser Arg Thr Pro Glu Val Thr Cys Val Val Val Asp
                260                 265                 270

Val Ser His Glu Asp Pro Glu Val Lys Phe Asn Trp Tyr Val Asp Gly
        275                 280                 285

Val Glu Val His Asn Ala Lys Thr Lys Pro Arg Glu Glu Gln Tyr Asn
    290                 295                 300

Ser Thr Tyr Arg Val Val Ser Val Leu Thr Val Leu His Gln Asp Trp
305                 310                 315                 320

Leu Asn Gly Lys Glu Tyr Lys Cys Lys Val Ser Asn Lys Ala Leu Pro
                325                 330                 335

Ala Pro Ile Glu Lys Thr Ile Ser Lys Ala Lys Gly Gln Pro Arg Glu
                340                 345                 350

Pro Gln Val Tyr Thr Leu Pro Pro Ser Arg Asp Glu Leu Thr Lys Asn
        355                 360                 365

Gln Val Ser Leu Thr Cys Leu Val Lys Gly Phe Tyr Pro Ser Asp Ile
    370                 375                 380

Ala Val Glu Trp Glu Ser Asn Gly Gln Pro Glu Asn Asn Tyr Lys Thr
385                 390                 395                 400

Thr Pro Pro Val Leu Asp Ser Asp Gly Ser Phe Phe Leu Tyr Ser Lys
                405                 410                 415

Leu Thr Val Asp Lys Ser Arg Trp Gln Gln Gly Asn Val Phe Ser Cys
                420                 425                 430

Ser Val Met His Glu Ala Leu His Asn His Tyr Thr Gln Lys Ser Leu
            435                 440                 445

Ser Leu Ser Pro Gly Lys
    450

<210> SEQ ID NO 77
<211> LENGTH: 217
<212> TYPE: PRT
<213> ORGANISM: Artificial Sequence
<220> FEATURE:
<223> OTHER INFORMATION: REGN5536 PNAG Light Chain

<400> SEQUENCE: 77

Gln Leu Val Leu Thr Gln Ser Pro Ser Ala Ser Ala Ser Leu Gly Ala
1               5                   10                  15

Ser Val Lys Leu Thr Cys Thr Leu Ser Ser Gly His Ser Asn Tyr Ala
            20                  25                  30

Ile Ala Trp His Gln Gln Pro Gly Lys Gly Pro Arg Tyr Leu Met
            35                  40                  45

Lys Val Asn Arg Asp Gly Ser His Ile Arg Gly Asp Gly Ile Pro Asp
    50                  55                  60

Arg Phe Ser Gly Ser Thr Ser Gly Ala Glu Arg Tyr Leu Thr Ile Ser
65                  70                  75                  80

Ser Leu Gln Ser Glu Asp Glu Ala Asp Tyr Tyr Cys Gln Thr Trp Gly
                85                  90                  95

Ala Gly Ile Arg Val Phe Gly Gly Gly Thr Lys Leu Thr Val Leu Gly
            100                 105                 110

Gln Pro Lys Ala Ala Pro Ser Val Thr Leu Phe Pro Pro Ser Ser Glu

```
            115                 120                 125
Glu Leu Gln Ala Asn Lys Ala Thr Leu Val Cys Leu Ile Ser Asp Phe
        130                 135                 140

Tyr Pro Gly Ala Val Thr Val Ala Trp Lys Ala Asp Ser Ser Pro Val
145                 150                 155                 160

Lys Ala Gly Val Glu Thr Thr Thr Pro Ser Lys Gln Ser Asn Asn Lys
                165                 170                 175

Tyr Ala Ala Ser Ser Tyr Leu Ser Leu Thr Pro Glu Gln Trp Lys Ser
            180                 185                 190

His Arg Ser Tyr Ser Cys Gln Val Thr His Glu Gly Ser Thr Val Glu
        195                 200                 205

Lys Thr Val Ala Pro Thr Glu Cys Ser
        210                 215

<210> SEQ ID NO 78
<211> LENGTH: 450
<212> TYPE: PRT
<213> ORGANISM: Artificial Sequence
<220> FEATURE:
<223> OTHER INFORMATION: REGN5409 Ps1 Heavy Chain

<400> SEQUENCE: 78

Gln Val Arg Leu Gln Gln Ser Gly Pro Gly Leu Val Lys Pro Ser Glu
1               5                   10                  15

Thr Leu Ser Leu Thr Cys Thr Val Ser Gly Gly Ser Thr Ser Pro Tyr
            20                  25                  30

Phe Trp Ser Trp Leu Arg Gln Pro Pro Gly Lys Gly Leu Glu Trp Ile
        35                  40                  45

Gly Tyr Ile His Ser Asn Gly Gly Thr Asn Tyr Asn Pro Ser Leu Lys
    50                  55                  60

Ser Arg Leu Thr Ile Ser Gly Asp Thr Ser Lys Asn Gln Phe Ser Leu
65                  70                  75                  80

Asn Leu Ser Phe Val Thr Ala Ala Asp Thr Ala Leu Tyr Tyr Cys Ala
                85                  90                  95

Arg Thr Asp Tyr Asp Val Tyr Gly Pro Ala Phe Asp Ile Trp Gly Gln
            100                 105                 110

Gly Thr Met Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
```

```
                260                 265                 270
Asp Pro Glu Val Lys Phe Asn Trp Tyr Val Asp Gly Val Glu Val His
            275                 280                 285

Asn Ala Lys Thr Lys Pro Arg Glu Glu Gln Tyr Asn Ser Thr Tyr Arg
        290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 79
<211> LENGTH: 214
<212> TYPE: PRT
<213> ORGANISM: Artificial Sequence
<220> FEATURE:
<223> OTHER INFORMATION: REGN5409 Ps1 Light Chain

<400> SEQUENCE: 79

Ser Ser Glu Leu Thr Gln Asp Pro Ala Val Ser Val Ala Leu Gly Gln
1               5                   10                  15

Thr Val Arg Ile Thr Cys Gln Gly Asp Ser Leu Arg Ser Tyr Tyr Ala
            20                  25                  30

Ser Trp Tyr Gln Gln Lys Pro Gly Gln Ala Pro Val Leu Val Ile Tyr
        35                  40                  45

Gly Lys Asn Asn Arg Pro Ser Gly Ile Pro Asp Arg Phe Ser Gly Ser
    50                  55                  60

Ser Ser Gly Asn Thr Ala Ser Leu Thr Ile Thr Gly Ala Gln Ala Glu
65                  70                  75                  80

Asp Glu Ala Asp Tyr Tyr Cys Asn Ser Arg Asp Ser Ser Gly Asn His
                85                  90                  95

Val Val Phe Gly Gly Gly Thr Lys Leu Thr Val Leu Gly Gln Pro Lys
            100                 105                 110

Ala Ala Pro Ser Val Thr Leu Phe Pro Pro Ser Ser Glu Glu Leu Gln
        115                 120                 125

Ala Asn Lys Ala Thr Leu Val Cys Leu Ile Ser Asp Phe Tyr Pro Gly
    130                 135                 140

Ala Val Thr Val Ala Trp Lys Ala Asp Ser Ser Pro Val Lys Ala Gly
145                 150                 155                 160

Val Glu Thr Thr Thr Pro Ser Lys Gln Ser Asn Asn Lys Tyr Ala Ala
```

```
                165                 170                 175
Ser Ser Tyr Leu Ser Leu Thr Pro Glu Gln Trp Lys Ser His Arg Ser
            180                 185                 190

Tyr Ser Cys Gln Val Thr His Glu Gly Ser Thr Val Glu Lys Thr Val
        195                 200                 205

Ala Pro Thr Glu Cys Ser
        210

<210> SEQ ID NO 80
<211> LENGTH: 583
<212> TYPE: PRT
<213> ORGANISM: Artificial Sequence
<220> FEATURE:
<223> OTHER INFORMATION: REGN2655 IsdB-6xhis Amino acids 1-583 (amino
      acids A41-T613 of accession number  WP099560907);
      Linker: AS (1-2); IsdB:  3-575; Linker: LE
      (576-577); 6xHis: 578-583

<400> SEQUENCE: 80

Ala Ser Ala Ala Glu Glu Thr Gly Gly Thr Asn Thr Glu Ala Gln Pro
1               5                   10                  15

Lys Thr Glu Ala Val Ala Ser Pro Thr Thr Thr Ser Glu Lys Ala Pro
            20                  25                  30

Glu Thr Lys Pro Val Ala Asn Ala Val Ser Val Ser Asn Lys Glu Val
        35                  40                  45

Glu Ala Pro Thr Ser Glu Thr Lys Glu Ala Lys Glu Val Lys Glu Val
    50                  55                  60

Lys Ala Pro Lys Glu Thr Lys Glu Val Lys Pro Ala Ala Lys Ala Thr
65                  70                  75                  80

Asn Asn Thr Tyr Pro Ile Leu Asn Gln Glu Leu Arg Glu Ala Ile Lys
                85                  90                  95

Asn Pro Ala Ile Lys Asp Lys Asp His Ser Ala Pro Asn Ser Arg Pro
            100                 105                 110

Ile Asp Phe Glu Met Lys Lys Lys Asp Gly Thr Gln Gln Phe Tyr His
        115                 120                 125

Tyr Ala Ser Ser Val Lys Pro Ala Arg Val Ile Phe Thr Asp Ser Lys
    130                 135                 140

Pro Glu Ile Glu Leu Gly Leu Gln Ser Gly Gln Phe Trp Arg Lys Phe
145                 150                 155                 160

Glu Val Tyr Glu Gly Asp Lys Lys Leu Pro Ile Lys Leu Val Ser Tyr
                165                 170                 175

Asp Thr Val Lys Asp Tyr Ala Tyr Ile Arg Phe Ser Val Ser Asn Gly
            180                 185                 190

Thr Lys Ala Val Lys Ile Val Ser Ser Thr His Phe Asn Asn Lys Glu
        195                 200                 205

Glu Lys Tyr Asp Tyr Thr Leu Met Glu Phe Ala Gln Pro Ile Tyr Asn
    210                 215                 220

Ser Ala Asp Lys Phe Lys Thr Glu Glu Asp Tyr Lys Ala Glu Lys Leu
225                 230                 235                 240

Leu Ala Pro Tyr Lys Lys Ala Lys Thr Leu Glu Arg Gln Val Tyr Glu
                245                 250                 255

Leu Asn Lys Ile Gln Asp Lys Leu Pro Glu Lys Leu Lys Ala Glu Tyr
            260                 265                 270

Lys Lys Lys Leu Glu Asp Thr Lys Lys Ala Leu Asp Glu Gln Val Lys
        275                 280                 285

Ser Ala Ile Thr Glu Phe Gln Asn Val Gln Pro Thr Asn Glu Lys Met
```

```
                    290                 295                 300

Thr Asp Leu Gln Asp Thr Lys Tyr Val Tyr Glu Ser Val Glu Asn
305                 310                 315                 320

Asn Glu Ser Met Met Asp Thr Phe Val Lys His Pro Ile Lys Thr Gly
                325                 330                 335

Met Leu Asn Gly Lys Lys Tyr Met Val Met Glu Thr Thr Asn Asp Asp
                340                 345                 350

Tyr Trp Lys Asp Phe Met Val Glu Gly Gln Arg Val Arg Thr Ile Ser
                355                 360                 365

Lys Asp Ala Lys Asn Asn Thr Arg Thr Ile Ile Phe Pro Tyr Val Glu
370                 375                 380

Gly Lys Thr Leu Tyr Asp Ala Ile Val Lys Val His Val Lys Thr Ile
385                 390                 395                 400

Asp Tyr Asp Gly Gln Tyr His Val Arg Ile Val Asp Lys Glu Ala Phe
                405                 410                 415

Thr Lys Ala Asn Thr Asp Lys Ser Asn Lys Lys Glu Gln Gln Asp Asn
                420                 425                 430

Ser Ala Lys Lys Glu Ala Thr Pro Ala Thr Pro Ser Lys Pro Thr Pro
                435                 440                 445

Ser Pro Val Glu Lys Glu Ser Gln Lys Gln Asp Ser Gln Lys Asp Asp
                450                 455                 460

Asn Lys Gln Leu Pro Ser Val Glu Lys Glu Asn Asp Ala Ser Ser Glu
465                 470                 475                 480

Ser Gly Lys Asp Lys Thr Pro Ala Thr Lys Pro Thr Lys Gly Glu Val
                485                 490                 495

Glu Ser Ser Ser Thr Thr Pro Thr Lys Val Val Ser Thr Thr Gln Asn
                500                 505                 510

Val Ala Lys Pro Thr Thr Ala Ser Ser Lys Thr Thr Lys Asp Val Val
                515                 520                 525

Gln Thr Ser Ala Gly Ser Ser Glu Ala Lys Asp Ser Ala Pro Leu Gln
                530                 535                 540

Lys Ala Asn Ile Lys Asn Thr Asn Asp Gly His Thr Gln Ser Gln Asn
545                 550                 555                 560

Asn Lys Asn Thr Gln Glu Asn Lys Ala Lys Ser Leu Pro Gln Thr Leu
                565                 570                 575

Glu His His His His His His
                580

<210> SEQ ID NO 81
<211> LENGTH: 570
<212> TYPE: PRT
<213> ORGANISM: Artificial Sequence
<220> FEATURE:
<223> OTHER INFORMATION: Influenza H1N1 New Caledonia ecto (1-519;
      Y98F:18-519)-foldon-BirA- His6: REGN3919: Amino
      acids 1-570 (amino acids 1-519; Y108F of
      accession number AAP34324); Signal sequence: 1-17

<400> SEQUENCE: 81

Met Lys Ala Lys Leu Leu Val Leu Leu Cys Thr Phe Thr Ala Thr Tyr
1               5                   10                  15

Ala Asp Thr Ile Cys Ile Gly Tyr His Ala Asn Asn Ser Thr Asp Thr
                20                  25                  30

Val Asp Thr Val Leu Glu Lys Asn Val Thr Val Thr His Ser Val Asn
                35                  40                  45

Leu Leu Glu Asp Ser His Asn Gly Lys Leu Cys Leu Leu Lys Gly Ile
```

```
             50                  55                  60
Ala Pro Leu Gln Leu Gly Asn Cys Ser Val Ala Gly Trp Ile Leu Gly
 65                  70                  75                  80

Asn Pro Glu Cys Glu Leu Leu Ile Ser Lys Glu Ser Trp Ser Tyr Ile
                     85                  90                  95

Val Glu Thr Pro Asn Pro Glu Asn Gly Thr Cys Phe Pro Gly Tyr Phe
                100                 105                 110

Ala Asp Tyr Glu Glu Leu Arg Glu Gln Leu Ser Ser Val Ser Ser Phe
            115                 120                 125

Glu Arg Phe Glu Ile Phe Pro Lys Glu Ser Ser Trp Pro Asn His Thr
        130                 135                 140

Val Thr Gly Val Ser Ala Ser Cys Ser His Asn Gly Lys Ser Ser Phe
145                 150                 155                 160

Tyr Arg Asn Leu Leu Trp Leu Thr Gly Lys Asn Gly Leu Tyr Pro Asn
                165                 170                 175

Leu Ser Lys Ser Tyr Val Asn Asn Lys Glu Lys Glu Val Leu Val Leu
            180                 185                 190

Trp Gly Val His His Pro Pro Asn Ile Gly Asn Gln Arg Ala Leu Tyr
        195                 200                 205

His Thr Glu Asn Ala Tyr Val Ser Val Val Ser Ser His Tyr Ser Arg
    210                 215                 220

Arg Phe Thr Pro Glu Ile Ala Lys Arg Pro Lys Val Arg Asp Gln Glu
225                 230                 235                 240

Gly Arg Ile Asn Tyr Tyr Trp Thr Leu Leu Glu Pro Gly Asp Thr Ile
                245                 250                 255

Ile Phe Glu Ala Asn Gly Asn Leu Ile Ala Pro Trp Tyr Ala Phe Ala
            260                 265                 270

Leu Ser Arg Gly Phe Gly Ser Gly Ile Ile Thr Ser Asn Ala Pro Met
        275                 280                 285

Asp Glu Cys Asp Ala Lys Cys Gln Thr Pro Gln Gly Ala Ile Asn Ser
    290                 295                 300

Ser Leu Pro Phe Gln Asn Val His Pro Val Thr Ile Gly Glu Cys Pro
305                 310                 315                 320

Lys Tyr Val Arg Ser Ala Lys Leu Arg Met Val Thr Gly Leu Arg Asn
                325                 330                 335

Ile Pro Ser Ile Gln Ser Arg Gly Leu Phe Gly Ala Ile Ala Gly Phe
            340                 345                 350

Ile Glu Gly Gly Trp Thr Gly Met Val Asp Gly Trp Tyr Gly Tyr His
        355                 360                 365

His Gln Asn Glu Gln Gly Ser Gly Tyr Ala Ala Asp Gln Lys Ser Thr
    370                 375                 380

Gln Asn Ala Ile Asn Gly Ile Thr Asn Lys Val Asn Ser Val Ile Glu
385                 390                 395                 400

Lys Met Asn Thr Gln Phe Thr Ala Val Gly Lys Glu Phe Asn Lys Leu
                405                 410                 415

Glu Arg Arg Met Glu Asn Leu Asn Lys Lys Val Asp Asp Gly Phe Leu
            420                 425                 430

Asp Ile Trp Thr Tyr Asn Ala Glu Leu Leu Val Leu Leu Glu Asn Glu
        435                 440                 445

Arg Thr Leu Asp Phe His Asp Ser Asn Val Lys Asn Leu Tyr Glu Lys
    450                 455                 460

Val Lys Ser Gln Leu Lys Asn Asn Ala Lys Glu Ile Gly Asn Gly Cys
465                 470                 475                 480
```

Phe Glu Phe Tyr His Lys Cys Asn Asn Glu Cys Met Glu Ser Val Lys
                485                 490                 495

Asn Gly Thr Tyr Asp Tyr Pro Lys Tyr Ser Glu Ser Lys Leu Asn
            500                 505                 510

Arg Glu Lys Ile Asp Gly Val Gly Tyr Ile Pro Glu Ala Pro Arg Asp
        515                 520                 525

Gly Gln Ala Tyr Val Arg Lys Asp Gly Glu Trp Val Leu Leu Ser Thr
    530                 535                 540

Phe Leu Gly Gly Gly Leu Asn Asp Ile Phe Glu Ala Gln Lys Ile
545                 550                 555                 560

Glu Trp His Glu His His His His His His
                565                 570

<210> SEQ ID NO 82
<211> LENGTH: 165
<212> TYPE: PRT
<213> ORGANISM: Artificial Sequence
<220> FEATURE:
<223> OTHER INFORMATION: hGITR.mmh (REGN2135): Amino acids 1-165 (amino
      acids Q26-P162 of accession number NP_683700.1);
      hGITR(ecto): 1-135; mmh - 136-165

<400> SEQUENCE: 82

Gln Arg Pro Thr Gly Gly Pro Gly Cys Gly Pro Gly Arg Leu Leu Leu
1               5                   10                  15

Gly Thr Gly Thr Asp Ala Arg Cys Cys Arg Val His Thr Thr Arg Cys
            20                  25                  30

Cys Arg Asp Tyr Pro Gly Glu Glu Cys Cys Ser Glu Trp Asp Cys Met
        35                  40                  45

Cys Val Gln Pro Glu Phe His Cys Gly Asp Pro Cys Cys Thr Thr Cys
    50                  55                  60

Arg His His Pro Cys Pro Pro Gly Gln Gly Val Gln Ser Gln Gly Lys
65                  70                  75                  80

Phe Ser Phe Gly Phe Gln Cys Ile Asp Cys Ala Ser Gly Thr Phe Ser
                85                  90                  95

Gly Gly His Glu Gly His Cys Lys Pro Trp Thr Asp Cys Thr Gln Phe
            100                 105                 110

Gly Phe Leu Thr Val Phe Pro Gly Asn Lys Thr His Asn Ala Val Cys
        115                 120                 125

Val Pro Gly Ser Pro Pro Ala Glu Pro Glu Gln Lys Leu Ile Ser Glu
    130                 135                 140

Glu Asp Leu Gly Gly Glu Gln Lys Leu Ile Ser Glu Glu Asp Leu His
145                 150                 155                 160

His His His His
                165

<210> SEQ ID NO 83
<211> LENGTH: 449
<212> TYPE: PRT
<213> ORGANISM: Artificial Sequence
<220> FEATURE:
<223> OTHER INFORMATION: mAb20631-C1q Full Length Heavy Chain with
      hIgG1* constant

<400> SEQUENCE: 83

Glu Val Gln Leu Val Glu Ser Gly Gly Gly Val Val Gln Pro Gly Gly
1               5                   10                  15

Ser Leu Arg Leu Ser Cys Ala Ala Ser Gly Phe Ser Leu Asp Asp Tyr

```
                    20                  25                  30
Ala Met His Trp Val Arg Gln Thr Pro Gly Lys Gly Leu Glu Trp Val
            35                  40                  45
Ser Leu Ile Ser Gly Asp Gly Ser Arg Thr Ser Tyr Ala Asp Ser Val
        50                  55                  60
Lys Gly Arg Phe Thr Ile Ser Arg Asp Asn Ser Lys Asn Ser Leu Tyr
65                  70                  75                  80
Leu Lys Met Asn Ser Leu Arg Thr Glu Asp Thr Ala Leu Tyr Tyr Cys
                85                  90                  95
Thr Lys Asp Pro His Asn Ser Asn Trp Phe Asp Pro Trp Gly Gln Gly
            100                 105                 110
Thr Leu Val Thr Val Ser Ser Ala Ser Thr Lys Gly Pro Ser Val Phe
        115                 120                 125
Pro Leu Ala Pro Ser Ser Lys Ser Thr Ser Gly Gly Thr Ala Ala Leu
    130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
            180                 185                 190
Ser Ser Leu Gly Thr Gln Thr Tyr Ile Cys Asn Val Asn His Lys Pro
        195                 200                 205
Ser Asn Thr Lys Val Asp Lys Lys Val Glu Pro Lys Ser Cys Asp Lys
    210                 215                 220
Thr His Thr Cys Pro Pro Cys Pro Ala Pro Glu Leu Leu Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
            260                 265                 270
Pro Glu Val Lys Phe Asn Trp Tyr Val Asp Gly Val Glu Val His Asn
        275                 280                 285
Ala Lys Thr Lys Pro Arg Glu Glu Gln Tyr Asn Ser Thr Tyr Arg Val
    290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
            340                 345                 350
Leu Pro Pro Ser Arg Asp Glu Leu Thr Lys Asn Gln Val Ser Leu Thr
        355                 360                 365
Cys Leu Val Lys Gly Phe Tyr Pro Ser Asp Ile Ala Val Glu Trp Glu
    370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
Ser Arg Trp Gln Gln Gly Asn Val Phe Ser Cys Ser Val Met His Glu
            420                 425                 430
Ala Leu His Asn Arg Phe Thr Gln Lys Ser Leu Ser Leu Ser Pro Gly
        435                 440                 445
```

Lys

<210> SEQ ID NO 84
<211> LENGTH: 455
<212> TYPE: PRT
<213> ORGANISM: Artificial Sequence
<220> FEATURE:
<223> OTHER INFORMATION: mAb20295:-IsdB Full Length Heavy Chain with IgG constant

<400> SEQUENCE: 84

```
Glu Val Gln Leu Val Glu Ser Gly Gly Gly Leu Val Gln Pro Gly Arg
1               5                   10                  15

Ser Leu Arg Leu Ser Cys Thr Thr Ser Gly Phe Thr Phe Asp Asp Tyr
            20                  25                  30

Ala Met His Trp Val Arg Gln Val Pro Gly Gln Gly Leu Glu Trp Val
        35                  40                  45

Ala Gly Leu Ser Trp Asn Ser Asp Thr Ile Gly Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Lys Ser Leu Lys Ala Glu Asp Thr Ala Leu Tyr Tyr Cys
                85                  90                  95

Thr Lys Asp Phe Tyr His Ser Leu Asn Asn Trp Asn Tyr Tyr Tyr Phe
            100                 105                 110

Asp Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205

Asn Val Asn His Lys Pro Ser Asn Thr Lys Val Asp Lys Lys Val Glu
    210                 215                 220

Pro Lys Ser Cys Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350
```

```
Glu Pro Gln Val Tyr Thr Leu Pro Pro Ser Arg Asp Glu Leu Thr Lys
            355                 360                 365

Asn Gln Val Ser Leu Thr Cys Leu Val Lys Gly Phe Tyr Pro Ser Asp
        370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
            420                 425                 430

Cys Ser Val Met His Glu Ala Leu His Asn His Tyr Thr Gln Lys Ser
            435                 440                 445

Leu Ser Leu Ser Pro Gly Lys
        450                 455
```

<210> SEQ ID NO 85
<211> LENGTH: 215
<212> TYPE: PRT
<213> ORGANISM: Artificial Sequence
<220> FEATURE:
<223> OTHER INFORMATION: Full length Light Chain ULC 1-39

<400> SEQUENCE: 85

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215
```

<210> SEQ ID NO 86
<211> LENGTH: 449
<212> TYPE: PRT
<213> ORGANISM: Artificial Sequence
<220> FEATURE:
<223> OTHER INFORMATION: mAb14303: CD20 Full length Heavy Chain

<400> SEQUENCE: 86

```
Gln Val His Leu Val Glu Ser Gly Gly Val Val Gln Pro Gly Arg
1               5                   10                  15

Ser Leu Arg Leu Ser Cys Ser Val Ser Gly Leu Thr Phe Asn Ser Tyr
            20                  25                  30

Gly Met His Trp Val Arg Gln Ala Pro Gly Lys Gly Leu Glu Trp Val
        35                  40                  45

Thr Met Ile Ser Tyr Asp Gly Ser Asp Lys Tyr Tyr Leu Asp Ser Val
    50                  55                  60

Lys Gly Arg Phe Thr Ile Ser Arg Asp Asn Ser Lys Asn Ile Leu Tyr
65                  70                  75                  80

Leu Gln Ile Asn Ser Leu Arg Pro Glu Asp Thr Ala Val Tyr Tyr Cys
                85                  90                  95

Val Asn Trp Asp Asn Trp Arg Gly Asn Phe Asp Tyr Trp Gly Gln Gly
            100                 105                 110

Thr Leu Val Thr Val Ser Ser Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

Ser Asn Thr Lys Val Asp Lys Lys Val Glu Pro Lys Ser Cys Asp Lys
    210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Asp Glu Leu Thr Lys Asn Gln Val Ser Leu Thr
        355                 360                 365

Cys Leu Val Lys Gly Phe Tyr Pro Ser Asp Ile Ala Val Glu Trp Glu
    370                 375                 380

Ser Asn Gly Gln Pro Glu Asn Asn Tyr Lys Thr Thr Pro Pro Val Leu
385                 390                 395                 400
```

-continued

```
Asp Ser Asp Gly Ser Phe Phe Leu Tyr Ser Lys Leu Thr Val Asp Lys
            405                 410                 415

Ser Arg Trp Gln Gln Gly Asn Val Phe Ser Cys Ser Val Met His Glu
            420                 425                 430

Ala Leu His Asn His Tyr Thr Gln Lys Ser Leu Ser Leu Ser Pro Gly
            435                 440                 445

Lys

<210> SEQ ID NO 87
<211> LENGTH: 450
<212> TYPE: PRT
<213> ORGANISM: Artificial Sequence
<220> FEATURE:
<223> OTHER INFORMATION: mAb11829: Influenza HA Full length Heavy Chain

<400> SEQUENCE: 87

Gln Val His Leu Val Gln Ser Gly Pro Glu Val Lys Lys Pro Gly Ser
1               5                   10                  15

Ser Val Lys Val Ser Cys Lys Ala Ser Gly Val Thr Phe Ile Ser His
                20                  25                  30

Ala Ile Ser Trp Val Arg Gln Ala Pro Gly Gln Gly Leu Glu Trp Val
            35                  40                  45

Gly Gly Ile Ile Ala Ile Phe Gly Thr Thr Asn Tyr Ala Gln Lys Phe
        50                  55                  60

Gln Gly Arg Val Thr Val Thr Thr Asp Lys Ser Thr Asn Thr Val Tyr
65                  70                  75                  80

Met Glu Leu Ser Arg Leu Arg Ser Glu Asp Thr Ala Ile Tyr Tyr Cys
                85                  90                  95

Ala Arg Gly Glu Thr Tyr Tyr Glu Gly Asn Phe Asp Phe Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300
```

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
            325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365

Thr Cys Leu Val Lys Gly Phe Tyr Pro Ser Asp Ile Ala Val Glu Trp
        370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 88
<211> LENGTH: 450
<212> TYPE: PRT
<213> ORGANISM: Artificial Sequence
<220> FEATURE:
<223> OTHER INFORMATION: mAb14536: GITR Full length Heavy Chain

<400> SEQUENCE: 88

Gln Val Gln Leu Gln Glu Ser Gly Pro Gly Leu Val Lys Pro Ser Glu
1               5                   10                  15

Thr Leu Ser Leu Thr Cys Ile Val Ser Gly Gly Ser Ile Ser Gly Tyr
            20                  25                  30

Phe Trp Asn Trp Ile Arg Gln Pro Pro Gly Lys Gly Leu Glu Trp Ile
        35                  40                  45

Gly Tyr Ile Tyr Tyr Ser Gly Thr Thr Ile Tyr Asn Pro Ser Leu Lys
    50                  55                  60

Ser Arg Phe Thr Ile Ser Leu Asp Thr Ser Lys Asn Gln Phe Ser Leu
65                  70                  75                  80

Lys Leu Thr Ser Val Thr Ala Ala Asp Thr Ala Val Tyr Tyr Cys Ala
            85                  90                  95

Arg Glu Ser Tyr Asn Pro Ser Pro Arg Tyr Phe Asp His Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
            165                 170                 175

Leu Gln Ser Ser Gly Leu Tyr Ser Leu Ser Ser Val Val Thr Val Pro
        180                 185                 190

Ser Ser Ser Leu Gly Thr Gln Thr Tyr Ile Cys Asn Val Asn His Lys
    195                 200                 205

Pro Ser Asn Thr Lys Val Asp Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
                275                 280                 285

Asn Ala Lys Thr Lys Pro Arg Glu Glu Gln Tyr Asn Ser Thr Tyr Arg
290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
            355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Lys
    450

<210> SEQ ID NO 89
<211> LENGTH: 447
<212> TYPE: PRT
<213> ORGANISM: Artificial Sequence
<220> FEATURE:
<223> OTHER INFORMATION: mAb18395: C1q: Full length Heavy Chain

<400> SEQUENCE: 89

Glu Val Gln Leu Val Gln Ser Gly Ala Glu Val Lys Lys Pro Gly Glu
1               5                   10                  15

Ser Leu Lys Ile Phe Cys Lys Gly Ser Gly Tyr Ser Phe Ile Asn Asp
            20                  25                  30

Trp Ile Gly Trp Val Arg Gln Met Pro Gly Lys Gly Leu Glu Trp Met
        35                  40                  45

Gly Leu Ile Phe Pro Gly Asp Ser Asp Thr Arg Tyr Ser Pro Val Phe
    50                  55                  60

Gln Gly His Val Thr Ile Ser Ala Asp Gln Ser Ile Asp Thr Ala Tyr
65                  70                  75                  80

Leu Gln Trp Asn Ser Leu Lys Ala Ser Asp Thr Ala Ile Tyr Tyr Cys
                85                  90                  95

Ala Val Leu Arg Tyr Trp His Phe Ala Ile Trp Gly Arg Gly Thr Leu
            100                 105                 110

```
Val Thr Val Ser Ser Ala Ser Thr Lys Gly Pro Ser Val Phe Pro Leu
            115                 120                 125

Ala Pro Ser Ser Lys Ser Thr Ser Gly Gly Thr Ala Ala Leu Gly Cys
130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
            165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
            195                 200                 205

Thr Lys Val Asp Lys Lys Val Glu Pro Lys Ser Cys Asp Lys Thr His
            210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
            245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
            275                 280                 285

Thr Lys Pro Arg Glu Glu Gln Tyr Asn Ser Thr Tyr Arg Val Val Ser
            290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
            325                 330                 335

Ser Lys Ala Lys Gly Gln Pro Arg Glu Pro Gln Val Tyr Thr Leu Pro
            340                 345                 350

Pro Ser Arg Asp Glu Leu Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
            405                 410                 415

Trp Gln Gln Gly Asn Val Phe Ser Cys Ser Val Met His Glu Ala Leu
            420                 425                 430

His Asn Arg Phe Thr Gln Lys Ser Leu Ser Leu Ser Pro Gly Lys
            435                 440                 445

<210> SEQ ID NO 90
<211> LENGTH: 447
<212> TYPE: PRT
<213> ORGANISM: Artificial Sequence
<220> FEATURE:
<223> OTHER INFORMATION: mAb15144: Protein A: Full Length Heavy Chain

<400> SEQUENCE: 90

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Thr Ser Tyr
            20                  25                  30
```

Asp Met His Trp Val Arg Gln Ala Thr Gly Lys Gly Leu Glu Trp Val
         35                  40                  45

Ser Asn Ile Asp Pro Ala Gly Asn Thr Phe Tyr Pro Gly Ser Val Lys
 50                  55                  60

Gly Arg Phe Thr Ile Ser Arg Glu Asn Ala Lys Lys Ser Leu Tyr Leu
 65                  70                  75                  80

Gln Met Asn Ser Leu Arg Ala Gly Asp Thr Ala Val Tyr Tyr Cys Ala
                 85                  90                  95

Arg Asn Leu Gly Asn Trp Gly Tyr Asp His Trp Gly Gln Gly Thr Leu
                100                 105                 110

Val Thr Val Ser Ser Ala Ser Thr Lys Gly Pro Ser Val Phe Pro Leu
            115                 120                 125

Ala Pro Ser Ser Lys Ser Thr Ser Gly Gly Thr Ala Ala Leu Gly Cys
130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
        195                 200                 205

Thr Lys Val Asp Lys Lys Val Glu Pro Lys Ser Cys Asp Lys Thr His
    210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
        275                 280                 285

Thr Lys Pro Arg Glu Glu Gln Tyr Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Asp Glu Leu Thr Lys Asn Gln Val Ser Leu Thr Cys Leu
        355                 360                 365

Val Lys Gly Phe Tyr Pro Ser Asp Ile Ala Val Glu Trp Glu Ser Asn
    370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
            420                 425                 430

His Asn His Tyr Thr Gln Lys Ser Leu Ser Leu Ser Pro Gly Lys
        435                 440                 445

<210> SEQ ID NO 91
<211> LENGTH: 453
<212> TYPE: PRT
<213> ORGANISM: Artificial Sequence
<220> FEATURE:
<223> OTHER INFORMATION: mAb20334:IsdA: Full Length Heavy Chain

<400> SEQUENCE: 91

```
Glu Val Gln Leu Val Glu Ser Gly Gly Gly Leu Val Gln Pro Gly Arg
1               5                   10                  15

Ser Leu Arg Val Ser Cys Ala Ala Ser Gly Phe Thr Phe Asp Asp Tyr
            20                  25                  30

Ala Met His Trp Val Arg Gln Ile Pro Gly Lys Gly Leu Glu Trp Val
        35                  40                  45

Ser Gly Ile Arg Trp Asn Ser Asp Thr Ile Gly Tyr Ala Asp Ser Val
    50                  55                  60

Lys Gly Arg Phe Thr Ile Ser Arg Asp Asn Ala Lys Asn Phe Leu Tyr
65                  70                  75                  80

Leu Gln Met Asn Ser Leu Arg Thr Glu Asp Thr Ala Leu Tyr Tyr Cys
                85                  90                  95

Val Lys Asp Met Arg Val Arg Gly Ile Ile Met Tyr Gly Met Asp Val
            100                 105                 110

Trp Gly Gln Gly Thr Thr Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160

Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Lys
    210                 215                 220

Ser Cys Asp Lys Thr His Thr Cys Pro Pro Cys Pro Ala Pro Glu Leu
225                 230                 235                 240

Leu Gly Gly Pro Ser Val Phe Leu Phe Pro Pro Lys Pro Lys Asp Thr
                245                 250                 255

Leu Met Ile Ser Arg Thr Pro Glu Val Thr Cys Val Val Val Asp Val
            260                 265                 270

Ser His Glu Asp Pro Glu Val Lys Phe Asn Trp Tyr Val Asp Gly Val
        275                 280                 285

Glu Val His Asn Ala Lys Thr Lys Pro Arg Glu Glu Gln Tyr Asn Ser
    290                 295                 300

Thr Tyr Arg Val Val Ser Val Leu Thr Val Leu His Gln Asp Trp Leu
305                 310                 315                 320

Asn Gly Lys Glu Tyr Lys Cys Lys Val Ser Asn Lys Ala Leu Pro Ala
                325                 330                 335

Pro Ile Glu Lys Thr Ile Ser Lys Ala Lys Gly Gln Pro Arg Glu Pro
            340                 345                 350

Gln Val Tyr Thr Leu Pro Pro Ser Arg Asp Glu Leu Thr Lys Asn Gln
        355                 360                 365

Val Ser Leu Thr Cys Leu Val Lys Gly Phe Tyr Pro Ser Asp Ile Ala
```

-continued

```
            370                 375                 380
Val Glu Trp Glu Ser Asn Gly Gln Pro Glu Asn Asn Tyr Lys Thr Thr
385                 390                 395                 400

Pro Pro Val Leu Asp Ser Asp Gly Ser Phe Phe Leu Tyr Ser Lys Leu
                405                 410                 415

Thr Val Asp Lys Ser Arg Trp Gln Gln Gly Asn Val Phe Ser Cys Ser
            420                 425                 430

Val Met His Glu Ala Leu His Asn His Tyr Thr Gln Lys Ser Leu Ser
        435                 440                 445

Leu Ser Pro Gly Lys
        450
```

COMPOSITIONS AND METHODS FOR USING BISPECIFIC ANTIBODIES TO BIND COMPLEMENT AND A TARGET ANTIGEN

CROSS-REFERENCE TO RELATED APPLICATIONS

This application is a U.S. National Phase Application filed under 35 U.S.C. § 371 of PCT Application No. PCT/US2020/017889 filed Feb. 12, 2020, which claims priority to U.S. Provisional Application Ser. No. 62/804,358, filed Feb. 12, 2019, each of the applications of which are incorporated by reference in their entireties.

GOVERNMENT LICENSE RIGHTS

This invention was made with Government support under Agreement HHSO100201700020C, awarded by the U.S. Department of Health and Human Services. The Government has certain rights in the invention.

FIELD OF THE DISCLOSURE

The present disclosure relates to bispecific antigen binding molecules that bind to a target antigen and a complement component, and uses thereof.

BACKGROUND

Therapeutics that direct powerful effector functions of the immune system towards target cells hold great promise in settings of therapeutic resistance of infectious diseases and cancer. The complement system is an ancient and well-conserved branch of innate immunity which recognizes and clears pathogens by direct lysis, opsonization, and recruitment of effector cells. Targeting these activities to target organisms and/or cells associated with disease can provide a novel modality to add to the therapeutic arsenal.

Classical complement activation is initiated by the C1 complex, composed of C1q, C1r, and C1s proteins. C1q is a hexameric protein comprised of one stalk domain and six head domains which recognize molecular patterns on cell surfaces, as well as antigen-antibody complexes via binding to IgG1 or IgG3 Fc domains. C1q binds to individual Fc domains with low affinity, but antigen-induced multimerization of Fc domains results in avidity-driven enhancement of C1q binding. The ensuing serine protease cascade results in sequential recruitment and cleavage of complement components that culminates in the insertion of the lytic membrane attack complex (MAC, C5b9) pore causing rapid loss of cell viability. Cell-surface bound C1q can also be directly recognized by C1q binding proteins or a C1q receptor on a variety of effector cells leading to phagocytosis or cytotoxicity.

Directed complement recruitment has not been effectively harnessed for broad therapeutic application. To date, therapeutic antibodies engaging complement do so via their IgG1 Fc domains and therefore potency is dependent on the density and geometry of antibody binding to the target antigen. For example, anti-CD20 IgG1 mAbs, such as rituximab, induce complement dependent cytotoxicity (CDC) [e.g. MAC-mediated lysis] of CD20-expressing B cells in vitro, with potency related to CD20 density. However in vivo, the relative contribution of CDC versus effector cell-mediated death such as antibody-dependent cell-mediated cytotoxicity (ADCC) is unknown.

Thus, there is a need to develop compositions and methods for enhancing complement deposition and mediating cytotoxicity of bacterial, mammalian and virally-infected target cells.

BRIEF SUMMARY OF THE DISCLOSURE

According to a first aspect, the present disclosure provides bispecific antigen-binding molecules comprising a first antigen-binding domain (D1) that binds a target antigen; and a second antigen-binding domain (D2) that binds a complement component. Classical complement components comprise C1q, C1r, C1s, C2, C3, C4, C5, C6, C7, C8, C9, or any fragments thereof (including proteolytic fragments generated by the complement cascade). In embodiments, the complement component is C1q. In yet other embodiments the C1q is a human C1q.

In some embodiments, the target antigen is: (a) expressed on the surface of a cell or organism; or (b) a soluble antigen. In some embodiments, the target antigen is expressed on the surface of a cell (e.g., a eukaryotic cell, e.g., a human cell) or an organism. In some embodiments, the target antigen is expressed on the surface of the cell, such as but not limited to an immune cell, a blood or hematopoietic cell, a tissue or organ cell, a stem cell, or a precursor cell. In some embodiments, the cell is a diseased cell (e.g., a cancer cell or a bacterially- or virally-infected cell). In some embodiments, the cell is a non-diseased cell.

In embodiments, the target antigen is on the surface of a cell or organism; wherein the target antigen is a marker of a disease state of a subject. In embodiments, the target antigen comprises an antigen found on the surface of a bacteria, on the surface of a virus, on the surface of a bacterial or virus infected cell, on the surface of a cancer cell, or on the surface of an immune cell. In some embodiments, the disease state of the subject comprises a bacterial infection, a viral infection, cancer or an immune dysfunction.

In some embodiments, the target antigen is a soluble antigen that is not bound to a cell, bacteria, or virus, e.g., a soluble multimer.

In embodiments, the bispecific antigen-binding molecule binds to the target antigen with an $EC_{50}$ of about 10 nM or less. In further embodiments, the bispecific antigen-binding molecule promotes deposition of a complement component on the target antigen with an $EC_{50}$ of about 10 nM or less.

In embodiments, the target antigen comprises a *Staphylococcus* species target antigen, a *Pseudomonas* species target antigen, an Influenza strain target antigen, a B cell antigen, a cancer cell antigen, or a T cell antigen.

In some embodiments, the bispecific antigen-binding molecule binds to a bacterial target antigen. In embodiments, the bacterial target antigen is from a species of bacteria other than a *Staphylococcus* species. In embodiments, the bacterial target antigen is a Gram-positive bacterial target antigen. In embodiments, the bacterial target antigen is a Gram-positive bacterial target antigen from a species of bacteria other than a *Staphylococcus* species. In embodiments, the bacterial target antigen is a Gram-negative bacterial target antigen.

In some embodiments, the target antigen comprises a *Staphylococcus* species target antigen. In embodiments, a *Staphylococcus* species is *Staphylococcus aureus* or *Staphylococcus epidermidis*. In embodiments, the *Staphylococcus* species target antigen comprises capsular polysaccharide type 5, capsular polysaccharide type 8, protein A, IsdB, IsdA, IsdH, lipoteichoic acid, wall teichoic acid, lipase, V8 lipase, fatty acid modifying enzyme, microbial surface components recognizing adhesive matrix molecules (eg. adhesins, fibrinogen binding molecules, fibronectin binding protein A, fibronectin binding protein B), clumping factor A (ClfA), poly-N-acetyl glucosamine (PNAG), or combinations thereof. In embodiments, the *Staphylococcus* species target antigen is iron regulated surface determinant B (IsdB). In embodiments, the *Staphylococcus* species target antigen is iron regulated surface determinant A (IsdA). In embodiments, the *Staphylococcus* species target antigen is protein A. In embodiments, the *Staphylococcus* species target antigen is poly-N-acetyl glucosamine (PNAG). In embodiments, the *Staphylococcus* species target antigen is clumping factor A (ClfA).

According to certain exemplary embodiments, the bispecific antigen-binding molecules bind to the *Staphylococcus* species target antigen iron regulated surface determinant B (IsdB) and to the complement component C1q, e.g., human C1q; such bispecific antigen-binding molecules are also referred to herein as "anti-IsdB× anti-C1q bispecific molecules." The anti-IsdB antigen binding domain of the anti-IsdB× anti-C1q bispecific molecule is useful for targeting microbes that express IsdB (e.g., *Staphylococcus aureus*), and the anti-C1q antigen binding domain of the bispecific molecule is useful for promoting deposition of C1q on the *Staphylococcus* species. The simultaneous binding of antigen binding molecules to a target antigen, such as IsdB. on a microbe and to human C1q facilitates directed killing (cell lysis) of the targeted microbe. The anti-IsdB× anti-C1q bispecific antigen-binding molecules of the disclosure are therefore useful, inter alia, for treating diseases and disorders related to or caused by microbes (e.g., infection, sepsis, and the like). Exemplary anti-IsdB antibodies are described in U.S. Ser. No. 16/143,901 and PCT/US2018/053064.

According to certain exemplary embodiments, the bispecific antigen-binding molecules bind to the *Staphylococcus* species target antigen protein A and to the complement component C1q, e.g., human C1q; such bispecific antigen-binding molecules are also referred to herein as "anti-protein A× anti-C1q bispecific molecules." The anti-protein A antigen binding domain of the anti-protein A× anti-C1q bispecific molecule is useful for targeting microbes that express protein A (e.g., *Staphylococcus aureus*), and the anti-C1q antigen binding domain of the bispecific molecule is useful for promoting deposition of C1q on the *Staphylococcus* species. The simultaneous binding of antigen binding molecules to a target antigen, such as protein A, on a microbe and to human C1q facilitates directed killing (cell lysis) of the targeted microbe. The anti-protein A× anti-C1q bispecific antigen-binding molecules of the disclosure are therefore useful, inter alia, for treating diseases and disorders related to or caused by microbes (e.g., infection, sepsis, and the like).

According to certain exemplary embodiments, the bispecific antigen-binding molecules bind to the *Staphylococcus* species target antigen heme binding protein IsdA and to the complement component C1q, e.g., human C1q; such bispecific antigen-binding molecules are also referred to herein as "anti-IsdA× anti-C1q bispecific molecules." The anti-IsdA antigen binding domain of the anti-IsdA× anti-C1q bispecific molecule is useful for targeting microbes that express IsdA (e.g., *Staphylococcus aureus*), and the anti-C1q antigen binding domain of the bispecific molecule is useful for promoting deposition of C1q on the *Staphylococcus* species. The simultaneous binding of antigen binding molecules to a target antigen, such as IsdA, on a microbe and to human C1q facilitates directed killing (cell lysis) of the targeted microbe. The anti-protein A× anti-C1q bispecific antigen-binding molecules of the disclosure are therefore useful, inter alia, for treating diseases and disorders related to or caused by microbes (e.g., infection, sepsis, and the like).

According to certain exemplary embodiments, the bispecific antigen-binding molecules bind to the *Staphylococcus* species target antigen exopolysaccharide Poly-N-Acetylglucosamine (PNAG) and to the complement component C1q, e.g., human C1q; such bispecific antigen-binding molecules are also referred to herein as "anti-PNAG×anti-C1q bispecific molecules." The anti-PNAG antigen binding domain of the anti-PNAG× anti-C1q bispecific molecule is useful for targeting microbes that express PNAG (e.g., *Staphylococcus aureus*), and the anti-C1q antigen binding domain of the bispecific molecule is useful for promoting deposition of C1q on the *Staphylococcus* species. The simultaneous binding of antigen binding molecules to a target antigen, such as PNAG, on a microbe and to human C1q facilitates directed killing (cell lysis) of the targeted microbe. The anti-PNAG× anti-C1q bispecific antigen-binding molecules of the disclosure are therefore useful, inter alia, for treating diseases and disorders related to or caused by microbes (e.g., infection, sepsis, and the like). Exemplary anti-PNAG antibodies are described in U.S. Pat. No. 7,786,255.

According to certain exemplary embodiments, the bispecific antigen-binding molecules bind to the *Staphylococcus* species target antigen Clumping factor A (ClfA) and to the complement component C1q, e.g., human C1q; such bispecific antigen-binding molecules are also referred to herein as "anti-ClfA× anti-C1q bispecific molecules." The anti-ClfA antigen binding domain of the anti-ClfA× anti-C1q bispecific molecule is useful for targeting microbes that express ClfA (e.g., *Staphylococcus aureus*), and the anti-C1q antigen binding domain of the bispecific molecule is useful for promoting deposition of C1q on the *Staphylococcus* species. The simultaneous binding of antigen binding molecules to a target antigen, such as ClfA, on a microbe and to human C1q facilitates directed killing (cell lysis) of the targeted microbe. The anti-ClfA× anti-C1q bispecific antigen-binding molecules of the disclosure are therefore useful, inter alia, for treating diseases and disorders related to or caused by microbes (e.g., infection, sepsis, and the like). Exemplary antibodies are described in U.S. Publication No. US2003/0099656.

In some embodiments, the bispecific antigen-binding molecule binds to a Gram-negative bacterial target antigen. In embodiments, the bacterial target antigen is from a species of *Pseudomonas*. In embodiments, a *Pseudomonas* species is *Pseudomonas aeruginosa* PAO-1. In embodiments, the *Pseudomonas* species target antigen comprises an exopolysaccharide Ps1 antigen. According to certain exemplary embodiments, the bispecific antigen-binding molecules bind to a *Pseudomonas* species target antigen Ps1 and to the complement component C1q, e.g., human C1q; such bispecific antigen-binding molecules are also referred to herein as "anti-Ps1× anti-C1q bispecific molecules." The anti-Ps1 antigen binding domain of the anti-Ps1× anti-C1q bispecific molecule is useful for targeting microbes that express Ps1 (e.g., *Pseudomonas aeruginosa*), and the anti-C1q antigen binding domain of the bispecific molecule is useful for promoting deposition of C1q on the *Pseudomonas* species. The anti-Ps1× anti-C1q bispecific antigen-binding molecules of the disclosure are therefore useful, inter alia, for treating diseases and disorders related to or caused by microbes (e.g., infection, sepsis, and the like). Exemplary anti-Ps1 antibodies are described in WO2012/170807.

In some embodiments, the bispecific antigen-binding molecule binds to a viral target antigen. In embodiments, the viral target antigen is from an enveloped virus such as Influenza. In embodiments, a target antigen on Influenza or an Influenza infected cell is hemagglutinin (HA). In embodiments, the viral target antigen is from a virus strain that is capable of infecting a eukaryotic host, e.g., a human host, such Influenza A or Influenza B. Influenza strains in the A group can be further subtyped by the subtype of HA and the subtype of Neuraminidase (NA). Pathogenic strains include strains having H1, H3, H5, H7, or H9. In embodiments, the viral target antigen is from a pathogenic influenza strain (e.g., a strain having H1, H3, H5, H7, or H9). Exemplary anti-HA antibodies are described in U.S. Publication No. 2016/0176953.

According to certain exemplary embodiments, the bispecific antigen-binding molecules bind to an Influenza target antigen HA and to the complement component C1q, e.g., human C1q; such bispecific antigen-binding molecules are also referred to herein as "anti-HA× anti-C1q bispecific molecules." The anti-HA antigen binding domain of the anti-HA× anti-C1q bispecific molecule is useful for targeting viruses or viral infected cells that express HA (e.g., Influenza virus A/Puerto Rico/08/1934 (H1N1)), and the anti-C1q antigen binding domain of the bispecific molecule is useful for promoting deposition of C1q on the Influenza strains or Influenza infected cells. The anti-HA× anti-C1q bispecific antigen-binding molecules of the disclosure are therefore useful, inter alia, for treating diseases and disorders related to or caused by Influenza.

In some embodiments, the bispecific antigen-binding molecule binds to a target antigen from a eukaryotic host, e.g., a target antigen that is expressed on the surface of a eukaryotic cell such as an immune cell or a cancer cell, or a soluble target antigen within the eukaryotic host. In embodiments, the target antigen is a cancer cell surface antigen. In embodiments, the target antigen is an immune cell surface antigen, e.g., a T cell surface antigen, a B cell surface antigen, a dendritic cell surface antigen, a lymphocyte surface antigen, a monocyte surface antigen, a macrophage surface antigen, or an antigen on another type of immune cell. In some embodiments, the target cell is an antigen receptor-expressing cell (e.g., a B cell with a B-cell receptor or a T cell with a T-cell receptor) and the target antigen is the receptor expressed on the surface of the target immune cell in the context of its receptor.

According to certain exemplary embodiments, the bispecific antigen-binding molecules bind to a cancer cell surface antigen and to the complement component C1q, e.g., human C1q. Cancer cell surface antigens include antigens found on cancer cells that are unique to the cancer cell or more highly expressed on a cancer. In embodiments, a cancer antigen is CD20 antigen, which is expressed in B cell-derived cancers such as lymphoma and leukemia. Such bispecific antigen-binding molecules are also referred to herein as "anti-CD20× anti-C1q bispecific molecules." The anti-CD20 antigen binding domain of the anti-CD20× anti-C1q bispecific molecule is useful for targeting cancer cells that express CD20, and the anti-C1q antigen binding domain of the bispecific molecule is useful for promoting deposition of C1q on the cancer cells. The anti-CD20× anti-C1q bispecific antigen-binding molecules of the disclosure are therefore useful, inter alia, for treating cancer. Exemplary anti-CD20 antibodies are described in U.S. Pat. No. 9,657,102, US Publication No. 2015/0266966, and US Publication No. 2018/0194841.

According to certain exemplary embodiments, the bispecific antigen-binding molecules bind to a T cell surface antigen and to the complement component C1q, e.g., human C1q. T cell surface antigens include antigens found on regulatory T cells. In embodiments, a T cell antigen is a glucocorticoid induced tumor necrosis factor receptor (GITR) antigen found on regulatory T cells. Such bispecific antigen-binding molecules are also referred to herein as "anti-GITR× anti-C1q bispecific molecules." The anti-GITR antigen binding domain of the anti-GITR× anti-C1q bispecific molecule is useful for targeting T cells that express GITR, and the anti-C1q antigen binding domain of the bispecific molecule is useful for promoting deposition of C1q on the T cells. The anti-GITR× anti-C1q bispecific antigen-binding molecules of the disclosure are therefore useful, inter alia, for reducing or depleting immune cells such as regulatory T cells. Exemplary anti-GITR antibodies are described in U.S. Publication No. US2017/0355774.

The bispecific antigen-binding molecules according to this aspect of the present disclosure comprise a. first. antigen-binding domain (D1) that specifically binds a target antigen, and a second antigen-binding domain (D2) that specifically binds human C1q. The present disclosure includes anti-C1q bispecific molecules (e.g., bispecific antibodies) wherein each antigen-binding domain comprises a heavy chain variable region (HCVR) paired with a light chain variable region (LCVR). In certain exemplary embodiments of the disclosure, the anti-C1q antigen-binding domain (D2) and the anti-target (D1) antigen-binding domain each comprise different, distinct HCVRs paired with the same or a different LCVR. In the exemplary molecules disclosed herein, the pairing of an HCVR from an anti-target antibody with an LCVR having the sequences described herein in Table 18 creates an antigen-binding domain that specifically binds the target antigen (but does not bind C1q). In the exemplary molecules disclosed herein, the pairing of an HCVR from an anti-C1q antibody with an LCVR having the sequences described herein in Table 18 creates an antigen-binding domain that specifically binds C1q (but does not bind IsdB).

An antigen-binding molecule, as used in the context of the present disclosure, includes polypeptides that bind a particular antigen (e.g., a target molecule [T] or a portion thereof) with a $K_D$ of less than about 25 nM, less than about 20 nM, less than about 15 nM, less than about 10 nM, less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

An antigen-binding domain includes polypeptides that bind a complement component, such as C1q, with a $K_D$ of less than about 25 nM. less than about 20 nM, less than about 15 nM, less than about 10 nM, less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

In embodiments, the second antigen-binding domain D2 that specifically binds C1q comprises heavy chain variable region (HCVR) CDRs contained within a HCVR comprising an amino acid sequence of SEQ ID NO: 2 or an amino acid sequence of SEQ ID NO: 18; and light chain variable region (LCVR) CDRs contained within a LCVR region comprising an amino acid sequence of SEQ ID NO: 10. In embodiments, the second antigen-binding domain D2 comprises any of the HCVR/HCDR amino acid sequences as set forth in Table 1. The second antigen-binding domain D2 may also comprise any of the LCVR/LCDR amino acid sequences as set forth in Table 1. According to certain embodiments, the second antigen-binding domain D2 comprises a HCVR/LCVR pair comprising amino acid sequences of SEQ ID NOs:2/10, or SEQ TD NOs: 18/10. The present disclosure also provides anti-C1q bispecific molecules, wherein the second antigen-binding domain D2 comprises any of the heavy chain CDR1-CDR2-CDR3 amino acid sequences as set forth in Table 1, and/or any of the light chain CDR1-CDR2-CDR3 amino acid sequences as set forth in Table 1.

According to certain embodiments, the present disclosure provides anti-C1q bispecific molecules, wherein the second antigen-binding domain D2 comprises a heavy chain variable region (HCVR) comprising an amino acid sequence of SEQ ID NO: 2, or SEQ ID NO: 18, or a substantially similar sequence thereof having at least 90%, at least 95%, at least 98% or at least 99% sequence identity.

The present disclosure also provides anti-C1q bispecific molecules, wherein the second antigen-binding domain D2 comprises a light chain variable region (LCVR) comprising an amino acid sequence of SEQ ID NO:10, or a substantially similar sequence thereof having at least 90%, at least 95%, at least 98% or at least 99% sequence identity.

The present disclosure also provides anti-C1q bispecific antigen binding molecules, wherein the second antigen-binding domain D2 specifically binds a human C1q. In embodiments, the bispecific antigen-binding molecule blocks the binding of the human C1q to human IgG1-k with an $IC_{50}$ of about 10 nM or less. In other embodiments, the bispecific antigen-binding molecule blocks the binding of the human C1q to human IgM with an $IC_{50}$ of about 50 nM or less. In embodiments, the bispecific antigen binding molecule provides for deposition of C1q with an $EC_{50}$ of about 10 nM or less.

In embodiments, the first antigen-binding domain D1 specifically binds IsdB. Exemplary first antigen binding domains comprise HCVR CDRs contained within a HCVR comprising an amino acid sequence of SEQ ID NO: 26 or substantially similar sequence thereof having at least 90%, at least 95%, at least 98% or at least 99% sequence identity.

The present disclosure also provides anti-IsdB× anti-C1q bispecific molecules, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-IsdB× anti-C1q bispecific molecules, wherein the first antigen-binding domain D1 comprises a HCVR and LCVR (HCVR/LCVR) pair comprising amino acid sequences of SEQ ID NOs: 26/10.

The present disclosure also provides anti-IsdB× anti-C1q bispecific antigen-binding molecules, wherein the first antigen-binding domain D1 comprises a heavy chain CDR1 (HCDR1) comprising an amino acid sequence of SEQ ID NO: 28, or a substantially similar sequence thereof having at least 90%, at least 95%, at least 98% or at least 99% sequence identity; a heavy chain CDR2 (HCDR2) comprising an amino acid sequence of SEQ ID NO: 30, or a substantially similar sequence thereof having at least 90%, at least 95%, at least 98% or at least 99% sequence identity; and a heavy chain CDR3 (HCDR3) comprising an amino acid sequence of SEQ ID NO:32, or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO:12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In embodiments, the first antigen-binding domain D1 specifically binds Protein A. Exemplary first antigen binding domains comprises HCVR CDRs contained within a HCVR comprising an amino acid sequence of SEQ ID NO: 58 or substantially similar sequence thereof having at least 90%, at least 95%, at least 98% or at least 99% sequence identity.

The present disclosure also provides anti-protein A× anti-C1q bispecific molecules, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-protein A× anti-C1q bispecific molecules, wherein the first antigen-binding domain D1 comprises a HCVR and LCVR (HCVR/LCVR) pair comprising amino acid sequences of SEQ ID NOs: 58/10.

The present disclosure also provides anti-protein A× anti-C1q bispecific antigen-binding molecules, wherein the first antigen-binding domain D1 comprises a heavy chain CDR1 (HCDR1) comprising an amino acid sequence of SEQ ID NO: 60, or a substantially similar sequence thereof having at least 90%, at least 95%, at least 98% or at least 99% sequence identity; a heavy chain CDR2 (HCDR2) comprising an amino acid sequence of SEQ ID NO: 62, or a substantially similar sequence thereof having at least 90%, at least 95%, at least 98% or at least 99% sequence identity; and a heavy chain CDR3 (HCDR3) comprising an amino acid sequence of SEQ ID NO:64 or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO: 12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In embodiments, the present disclosure provides anti-IsdA× anti-C1q bispecific antibodies. In embodiments, the first antigen-binding domain D1 comprises HCVR CDRs contained within a HCVR comprising an amino acid sequence of SEQ ID NO: 66 or substantially similar sequence thereof having at least 90%, at least 95%, at least 98% or at least 99% sequence identity.

The present disclosure also provides anti-IsdA× anti-C1q bispecific molecules, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-IsdA× anti-C1q bispecific molecules, wherein the first antigen-binding domain D1 comprises a HCVR and LCVR (HCVR/LCVR) pair comprises amino acid sequences of SEQ ID NOs: 66/10.

The present disclosure also provides anti-IsdA× anti-C1q bispecific antigen-binding molecules, wherein the first antigen-binding domain D1 comprises a heavy chain CDR1 (HCDR1) comprising an amino acid sequence of SEQ ID NO: 68, or a substantially similar sequence thereof having at least 90%, at least 95%, at least 98% or at least 99% sequence identity; a heavy chain CDR2 (HCDR2) comprising an amino acid sequence of SEQ ID NO: 70, or a substantially similar sequence thereof having at least 90%, at least 95%, at least 98% or at least 99% sequence identity; and a heavy chain CDR3 (HCDR3) comprising an amino acid sequence of SEQ ID NO:72 or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO:12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In embodiments, the present disclosure provides anti-C1fA× anti-C1q bispecific antibodies. In embodiments, the first antigen-binding domain D1 comprises HCVR CDRs contained within a heavy chain (HC) comprising an amino acid sequence of SEQ ID NO: 73 or a substantially similar sequence thereof having at least 90%, at least 95%, at least 98% or at least 99% sequence identity.

The present disclosure also provides anti-C1fA× anti-C1q bispecific molecules, wherein the first antigen-binding domain D1 comprises LCVR CDRs contained within a light chain (LC) comprising an amino acid sequence of SEQ ID NO: 74, or a substantially similar sequence thereof having at least 90%, at least 95%, at least 98% or at least 99% sequence identity.

The present disclosure also provides anti-C1fA× anti-C1q bispecific molecules, wherein the first antigen-binding domain D1 comprises a HCVR and LCVR (HCVR/LCVR) pair comprising amino acid sequences contained within the HC/LC amino acid sequence pair of SEQ ID NOs: 73/74.

In embodiments, the present disclosure provides anti-PNAG× anti-C1q bispecific antibodies. In embodiments, the first antigen-binding domain D1 comprises HCVR CDRs contained within a HC comprising an amino acid sequence of SEQ ID NO: 76 or a substantially similar sequence thereof having at least 90%, at least 95%, at least 98% or at least 99% sequence identity.

The present disclosure also provides anti-PNAG× anti-C1q bispecific molecules, wherein the first antigen-binding domain D1 comprises LCVR CDRs contained within a LC comprising an amino acid sequence of SEQ ID NO: 77, or a substantially similar sequence thereof having at least 90%, at least 95%, at least 98% or at least 99% sequence identity.

The present disclosure also provides anti-PNAG× anti-C1q bispecific molecules, wherein the first antigen-binding domain D1 comprises a HCVR and LCVR (HCVR/LCVR) pair comprising amino acid sequences contained within the HC/LC amino acid sequence pair of SEQ ID NOs: 76/77.

In embodiments, the present disclosure provides anti-Ps1× anti-C1q bispecific antibodies. In embodiments, the first antigen-binding domain D1 comprises HCVR CDRs contained within a HC comprising an amino acid sequence of SEQ ID NO: 78 or a substantially similar sequence thereof having at least 90%, at least 95%, at least 98% or at least 99% sequence identity.

The present disclosure also provides anti-Ps1× anti-C1q bispecific molecules, wherein the first antigen-binding domain D1 comprises LCVR CDRs contained within a LC comprising an amino acid sequence of SEQ ID NO: 79, or a substantially similar sequence thereof having at least 90%, at least 95%, at least 98% or at least 99% sequence identity.

The present disclosure also provides anti-Ps1× anti-C1q bispecific molecules, wherein the first antigen-binding domain D1 comprises a HCVR and LCVR (HCVR/LCVR) pair comprising amino acid sequences contained within the HC/LC amino acid sequence pair of SEQ ID NOs: 78/79.

In embodiments, the present disclosure provides anti-CD20× anti-C1q bispecific antibodies. In embodiments, the first antigen-binding domain D1 comprises HCVR CDRs contained within a HCVR comprising an amino acid sequence of SEQ ID NO: 34 or a substantially similar sequence thereof having at least 90%, at least 95%, at least 98% or at least 99% sequence identity.

The present disclosure also provides anti-CD20× anti-C1q bispecific molecules, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-CD20× anti-C1q bispecific molecules, wherein the first antigen-binding domain D1 comprises a HCVR and LCVR (HCVR/LCVR) pair comprising amino acid sequences of SEQ ID NOs: 34/10.

The present disclosure also provides anti-CD20× anti-C1q bispecific antigen-binding molecules, wherein the first antigen-binding domain D1 comprises a heavy chain CDR1 (HCDR1) comprising an amino acid sequence of SEQ ID NO: 36, or a substantially similar sequence thereof having at least 90%, at least 95%, at least 98% or at least 99% sequence identity; a heavy chain CDR2 (HCDR2) comprising an amino acid sequence of SEQ ID NO: 38, or a substantially similar sequence thereof having at least 90%, at least 95%, at least 98% or at least 99% sequence identity; and a heavy chain CDR3 (HCDR3) comprising an amino acid sequence of SEQ ID NO:40 or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO:12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In embodiments, the present disclosure provides anti-HA× anti-C1q bispecific antibodies. In embodiments, the first antigen-binding domain D1 comprises HCVR CDRs contained within a HCVR comprising an amino acid sequence of SEQ ID NO: 42 or substantially similar sequence thereof having at least 90%, at least 95%, at least 98% or at least 99% sequence identity.

The present disclosure also provides anti-HA× anti-C1q bispecific molecules, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-HA× anti-C1q bispecific molecules, wherein the first antigen-binding domain D1 comprises a HCVR and LCVR (HCVR/LCVR) pair comprising amino acid sequences of SEQ ID NOs: 42/10.

The present disclosure also provides anti-HA× anti-C1q bispecific antigen-binding molecules, wherein the first antigen-binding domain D1 comprises a heavy chain CDR1 (HCDR1) comprising an amino acid sequence of SEQ ID NO: 44, or a substantially similar sequence thereof having at least 90%, at least 95%, at least 98% or at least 99% sequence identity; a heavy chain CDR2 (HCDR2) comprising an amino acid sequence of SEQ ID NO: 46, or a substantially similar sequence thereof having at least 90%, at least 95%, at least 98% or at least 99% sequence identity; and a heavy chain CDR3 (HCDR3) comprising an amino acid sequence of SEQ ID NO:48 or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO:12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In embodiments, the present disclosure provides anti-GITR× anti-C1q bispecific antibodies. In embodiments, the first antigen-binding domain D1 comprises HCVR CDRs contained within a HCVR comprising an amino acid sequence of SEQ ID NO: 50 or substantially similar sequence thereof having at least 90%, at least 95%, at least 98% or at least 99% sequence identity.

The present disclosure also provides anti-GITR× anti-C1q bispecific moleculee, wherein the first antigen-binding domain D1 comprises LCVR CDRs contained within a LCVR comprising an amino acid sequence of SEQ ID NO: 10, or a substantially similar sequence thereof having at least 90%, at least 95%, at least 98% or at least 99% sequence identity.

The present disclosure also provides anti-GITR× anti-C1q bispecific molecules, wherein the first antigen-binding domain D1 comprises a HCVR and LCVR (HCVR/LCVR) pair comprising amino acid sequences of SEQ ID NOs: 50/10.

The present disclosure also provides anti-GITR× anti-C1q bispecific antigen-binding molecules, wherein the first antigen-binding domain D1 comprises a heavy chain CDR1 (HCDR1) comprising an amino acid sequence of SEQ ID NO: 52, or a substantially similar sequence thereof having at least 90%, at least 95%, at least 98% or at least 99% sequence identity; a heavy chain CDR2 (HCDR2) comprising an amino acid sequence of SEQ ID NO:54, or a substantially similar sequence thereof having at least 90%, at least 95%, at least 98% or at least 99% sequence identity; and a heavy chain CDR3 (HCDR3) comprising an amino acid sequence of SEQ ID NO: 56 or a substantially similar sequence thereof having at least 90%, at least 95%, at least 98% or at least 99% sequence identity. In embodiments, the first antigen-binding domain D1 comprises a light chain CDR1 (LCDR1) comprising an amino acid sequence of SEQ ID NO:12 or a substantially similar sequence thereof having at least 90%, at least 95%, at least 98% or at least 99% sequence identity; a light chain CDR2 (LCDR2) comprising an amino acid sequence of SEQ ID NO:14 or a substantially similar sequence thereof having at least 90%, at least 95%, at least 98% or at least 99% sequence identity; and a light chain CDR3 (LCDR3) comprising an amino acid sequence of SEQ ID NO:16 or a substantially similar sequence thereof having at least 90%, at least 95%, at least 98% or at least 99% sequence identity.

In another aspect, the present disclosure provides isolated bispecific antigen binding molecules comprising: (a) a first antigen-binding domain that specifically binds a target antigen; and (b) a second antigen-binding domain that specifically binds human C1q. In some embodiments, the target antigen is (a) expressed on the surface of a cell or organism; or (b) a soluble antigen. In some embodiments, the second antigen-binding domain comprises a HCDR1 comprising an amino acid sequence selected from the group consisting of SEQ ID NO:4 and SEQ ID NO:20, a HCDR2 comprising an amino acid sequence selected from the group consisting of SEQ ID NO:6 and SEQ ID NO:22, and a HCDR3 comprising an amino acid sequence selected from the group consisting of SEQ ID NO:8 and SEQ ID NO:24. In some embodiments, the second antigen-binding domain comprises a HCDR1 comprising the amino acid sequence of SEQ ID NO:4, a HCDR2 comprising the amino acid sequence of SEQ ID NO:6, and a HCDR3 comprising the amino acid sequence of SEQ ID NO:8; or a HCDR1 comprising the amino acid sequence of SEQ ID NO:20, a HCDR2 comprising the amino acid sequence of SEQ ID NO:22, and a HCDR3 comprising the amino acid sequence of SEQ ID NO:24. In some embodiments, the second antigen-binding domain comprises a heavy chain variable region comprising the amino acid sequence of SEQ ID NO:2 or SEQ ID NO:18.

In some embodiments, the first antigen-binding domain comprises a heavy chain comprising:
- a HCDR1 comprising the amino acid sequence of SEQ ID NO:28, a HCDR2 comprising the amino acid sequence of SEQ ID NO:30, and a HCDR3 comprising the amino acid sequence of SEQ ID NO:32; or
- a HCDR1 comprising the amino acid sequence of SEQ ID NO:36, a HCDR2 comprising the amino acid sequence of SEQ ID NO:38, and a HCDR3 comprising the amino acid sequence of SEQ ID NO:40; or
- a HCDR1 comprising the amino acid sequence of SEQ ID NO:44, a HCDR2 comprising the amino acid sequence of SEQ ID NO:46, and a HCDR3 comprising the amino acid sequence of SEQ ID NO:48; or
- a HCDR1 comprising the amino acid sequence of SEQ ID NO:52, a HCDR2 comprising the amino acid sequence of SEQ ID NO:54, and a HCDR3 comprising the amino acid sequence of SEQ ID NO:56; or
- a HCDR1 comprising the amino acid sequence of SEQ ID NO:60, a HCDR2 comprising the amino acid sequence of SEQ ID NO:62, and a HCDR3 comprising the amino acid sequence of SEQ ID NO:64; or
- a HCDR1 comprising the amino acid sequence of SEQ ID NO:68, a HCDR2 comprising the amino acid sequence of SEQ ID NO:70, and a HCDR3 comprising the amino acid sequence of SEQ ID NO:72; or
- a HCDR1 comprising amino acids 26-33 of SEQ ID NO:73, a HCDR2 comprising amino acids 51-58 of SEQ ID NO:73, and a HCDR3 comprising amino acids 96-106 of SEQ ID NO:73; or
- a HCDR1 comprising amino acids 27-32 of SEQ ID NO:76, a HCDR2 comprising amino acids 51-58 of SEQ ID NO:76, and a HCDR3 comprising amino acids 96-106 of SEQ ID NO:76; or
- a HCDR1 comprising amino acids 31-35 of SEQ ID NO:78, a HCDR2 comprising amino acids 50-65 of SEQ ID NO:78, and a HCDR3 comprising amino acids 98-109 of SEQ ID NO:78.

In some embodiments, the bispecific antigen binding molecule further comprises a light chain comprising:
- a LCDR1 comprising the amino acid sequence of SEQ ID NO:12, a LCDR2 comprising the amino acid sequence of SEQ ID NO: 14, and a LCDR3 comprising the amino acid sequence of SEQ ID NO:16; or
- a LCDR1 comprising amino acids 27-32 of SEQ ID NO:74, a LCDR2 comprising amino acids 51-55 of SEQ ID NO:74, and a LCDR3 comprising amino acids 89-98 of SEQ ID NO:74; or
- a LCDR1 comprising amino acids 27-32 of SEQ ID NO:77, a LCDR2 comprising amino acids 50-52 of SEQ ID NO:77, and a LCDR3 comprising amino acids 98-101 of SEQ ID NO:77; or
- a LCDR1 comprising amino acids 23-33 of SEQ ID NO:79, a LCDR2 comprising amino acids 49-55 of SEQ ID NO:79, and a LCDR3 comprising amino acids 88-99 of SEQ ID NO:79.

In some embodiments, the light chain comprises a LCDR1 comprising the amino acid sequence of SEQ ID NO:12, a LCDR2 comprising the amino acid sequence of SEQ ID NO:14, and a LCDR3 comprising the amino acid sequence of SEQ ID NO:16. In some embodiments, the light chain variable region comprises the amino acid sequence of SEQ ID NO:10.

In another aspect, the present disclosure provides nucleic acid molecules encoding any of the HCVR, LCVR or CDR sequences of the anti-C1q bispecific antigen-binding molecules disclosed herein, including nucleic acid molecules coding for the amino acid sequences set forth in Table 18. In other embodiments, molecules comprise one or more of the polynucleotide sequences as set forth in Tables 2, 4, 6, 8, 10, 12, 13 and 15 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure includes anti-C1q bispecific antigen-binding molecules wherein any of the aforementioned antigen-binding domains that specifically bind C1q are combined, connected or otherwise associated with any of the aforementioned target antigen-binding domains to form a bispecific antigen-binding molecule that binds C1q and a target antigen. The antigen-binding domains can be combined in a number of different ways including single chain Fv, VH or VL domain antibodies, VHH, VNAR based nanobodies and other scaffold proteins, dual affinity retargeting proteins, tandem diabodies, knob and hole pairings, charge pairings, cross Mab, double variable domain Ig, s-Fab, Fv-Fc, Tandem Fabs (2+2 and 3+3 Tandem Fabs), 2+1 N-Fab, and 2+1 C-Fabs as described herein.

The present disclosure includes anti-C1q bispecific antigen-binding molecules having a modified glycosylation pattern. In some applications, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC) (eg. adding a terminal galactose enhances ADCC).

In another aspect, the disclosure provides a pharmaceutical composition comprising an anti-C1q bispecific antigen-binding molecule as disclosed herein and a pharmaceutically acceptable carrier. In a related aspect, the disclosure features a composition, which is a combination of an anti-C1q bispecific antigen-binding molecule and a second therapeutic agent. In one embodiment, the second therapeutic agent is any agent that is advantageously combined with an anti-C1q bispecific antigen-binding molecule. Exemplary agents that may be advantageously combined with an anti-C1q bispecific antigen-binding molecule include an antibiotic, an antibody that binds a *Staphylococcus* antigen, an antibody that binds a *Staphylococcus* toxin, an antibody that binds a *Pseudomonas* antigen, an antibody that binds an Influenza antigen, an anti-viral agent, a vaccine for Influenza, anti-tumor cell antibody, anti-T cell antibody, an antibody that binds human or cynomolgus C1q, a vaccine specific for *Staphylococcus* species, a cancer vaccine, and an antibody drug conjugate (e.g. a bispecific antibody combined with an antibiotic).

In another aspect, the disclosure provides methods for activating or enhancing cell killing comprising contacting the cell with an isolated bispecific antigen binding molecule as disclosed herein or a pharmaceutical composition comprising the bispecific antigen binding molecule. In embodiments, the cell is a bacterial cell. In embodiments, the cell is a eukaryotic cell, e.g., a human cell. In embodiments, the cell is a bacterially infected eukaryotic cell (e.g., a cell infected with *Staphylococcus* or *Pseudomonas*). In embodiments, the cell is a virally infected eukaryotic cell (e.g., a cell infected with Influenza virus). In embodiments, the cell is a cancer cell. In embodiments, the cell is a non-diseased cell (e.g., an immune cell, a progenitor cell, a stem cell, or another type of cell disclosed herein). In embodiments, the cell expresses one or more target antigens as disclosed herein. In embodiments, the contacting step is carried out in vitro. In embodiments, the contacting step is carried out in vivo. In embodiments, the contacting step is carried out ex vivo.

In yet another aspect, the disclosure provides therapeutic methods for inhibiting the growth of a bacteria (e.g., *Staphylococcus* species) in a subject comprising administering the isolated bispecific antigen-binding molecule that specifically binds a *Staphylococcus* target antigen as described herein or a pharmaceutical composition comprising the bispecific antigen binding molecule to the subject. In embodiments, the method is a method of treating an infection with a *Staphylococcus* species in a subject. In some embodiments, the method is for treating a subject that has a nosocomial or hospital acquired infection caused by a *Staphylococcus* species. In some embodiments, the method is for treating a subject that has a disease or disorder caused by a *Staphylococcus* species, wherein the disease or disorder is a skin infection, cellulitis, pneumonia, meningitis, urinary tract infection, toxic shock syndrome, endocarditis, pericarditis, osteomyelitis, bacteremia, or sepsis. In some embodiments, the method is for treating a subject who has undergone, or who is planning on undergoing a surgical procedure, wherein the subject is at risk of acquiring a *Staphylococcus* infection. In some embodiments, the surgical procedure involves implantation of a prosthetic, including a prosthetic limb, such as an arm or a leg, or a hip replacement. In some embodiments, the prosthetic is a cosmetic prosthetic, including an ocular prosthetic, silicone hands, fingers, toes, breasts, or a facial implant.

In yet another aspect, the disclosure provides therapeutic methods for inhibiting the growth of a bacteria (e.g., *Pseudomonas* species) in a subject comprising administering the isolated bispecific antigen-binding molecule that specifically binds to a *Pseudomonas* target antigen as described herein or a pharmaceutical composition comprising the bispecific antigen binding molecule to the subject. In embodiments, the method is a method of treating an infection with a *Pseudomonas* species in a subject. In some embodiments, the method is for treating a subject that has a disease or disorder caused by a *Pseudomonas* species. In some embodiments, the method is for treating a subject that has a nosocomial or hospital acquired infection caused by a *Pseudomonas* species. In some embodiments, the method is for treating a subject who has undergone, or who is planning on undergoing a surgical procedure, wherein the subject is at risk of acquiring a *Pseudomonas* infection. In some embodiments, the surgical procedure involves implantation of a prosthetic, including a prosthetic limb, such as an arm or a leg, or a hip replacement. In some embodiments, the prosthetic is a cosmetic prosthetic, including an ocular prosthetic, silicone hands, fingers, toes, breasts, or a facial implant.

In yet another aspect, the disclosure provides therapeutic methods for inhibiting the growth of an Influenza strain in a subject comprising administering the isolated bispecific antigen-binding molecule that specifically binds to an Influenza target antigen as described herein or a pharmaceutical composition comprising the bispecific antigen binding molecule to the subject. In embodiments, the method is a method of treating an infection with Influenza strain in a subject.

In yet another aspect, the disclosure provides therapeutic methods for treating cancer in a subject comprising administering the isolated bispecific antigen-binding molecule that specifically binds to cancer cell specific target antigen as described herein or a pharmaceutical composition comprising the bispecific antigen binding molecule to the subject. In embodiments, the cancer cell specific antigen is a B cell antigen found on leukemia or lymphoma cells. In embodiments, the cancer specific target antigen is CD20.

In yet another aspect, the disclosure provides therapeutic methods for treating cancer in a subject comprising administering the isolated bispecific antigen-binding molecule that specifically binds to a T regulatory cell antigen as described herein or a pharmaceutical composition comprising the bispecific antigen binding molecule to the subject. In embodiments, the T regulatory cell specific antigen is GITR.

The present disclosure also includes the use of an anti-C1q bispecific antigen-binding molecule of the disclosure in the manufacture of a medicament for the treatment of a disease or disorder.

Other embodiments will become apparent from a review of the ensuing detailed description.

BRIEF DESCRIPTION OF THE FIGURES

FIG. 21. Healthy (uninfected) humanized C1q ($C1q^{Hu/Hu}$) mice in a mixed background (MAID1615), males and females, were subcutaneously administered an anti-IsdB× anti-C1q IgG1 bispecific antibody (REGN5066), an anti-IsdB× anti-C1q IgG1uber stealth bispecific antibody (REGN7017), an anti-IsdB× anti-C1q IgG4 bispecific antibody (REGN5331) or a control antibody (REGN1932). Blood was collected 1 hr, 24 h, 48 h, and 72 h post antibody treatment and serum was prepared using gold-capped serum separator tubes (BD). Serum was diluted 1:2000 and analyzed by ELISA to determine C1q levels.

FIG. 22. Humanized C1q ($C1q^{Hu/Hu}$) mice in a mixed background (MAID1615) were infected intraperitoneally with *S. aureus* Newman ($1.5\times10^8$ colony forming units (CFUs) per mouse). All three *S. aureus* strains was grown to log phase, $OD_{600}\leq1$, in TSB at 37° C. and washed 3 times in PBS and adjusted to the desired density for infection. Infected mice were subcutaneously administered an anti-IsdB× anti-C1q IgG1 bispecific antibody (REGN5066), an anti-IsdB× anti-C1q IgG1uber stealth bispecific antibody (REGN7017), an anti-IsdB× anti-C1q IgG4 bispecific antibody (REGN5331) or a control antibody (REGN1932). Blood was collected prior to infection and at 1 hr, 24 h, 48 h, and 72 h post antibody treatment and serum was prepared using gold-capped serum separator tubes (BD). Serum was diluted 1:2000 and analyzed by ELISA to determine C1q levels.

DETAILED DESCRIPTION

Figure 1:
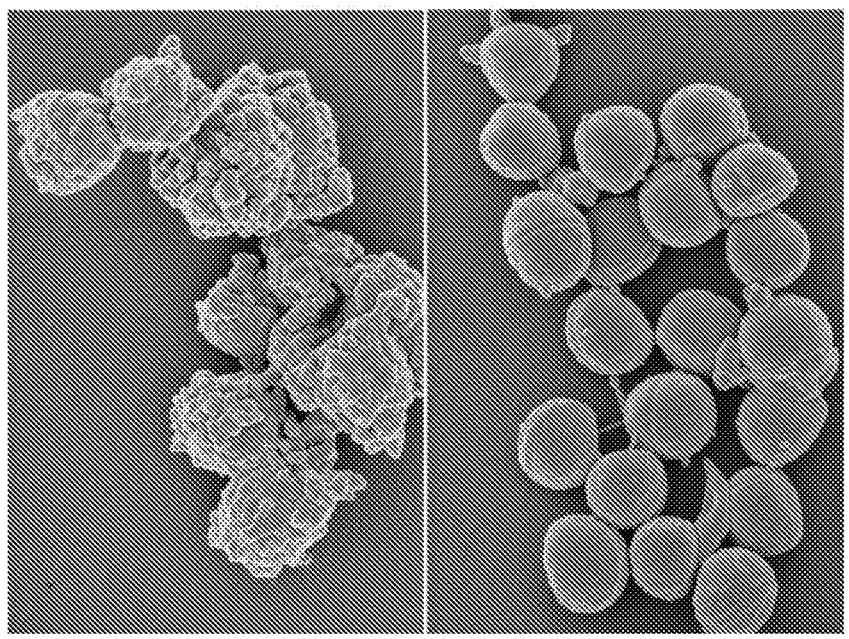
FIG. 1. *S. aureus* incubation with normal human serum (NHS) results in a change to the cell surface. *S. aureus* was incubated with 50% NHS (A, top) or media (B, bottom) for 8 h and then visualized by scanning electron microscopy (SEM).

Before the present disclosure is described, it is to be understood that this disclosure is not limited to particular methods and experimental conditions described, as such methods and conditions may vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. As used herein, the term "about," when used in reference to a particular recited numerical value, means that the value may vary from the recited value by no more than 1%. For example, as used herein, the expression "about 100" includes 99 and 101 and all values in between (e.g., 99.1, 99.2, 99.3, 99.4, etc.).

Although any methods and materials similar or equivalent to those described herein can be used in the practice or testing of the present disclosure, the preferred methods and materials are now described. All patents, applications and non-patent publications mentioned in this specification are incorporated herein by reference in their entireties.

I. Definitions

To provide background for the following definitions, the bispecific antigen-binding molecules of the present disclosure comprise two separate antigen-binding domains (D1 and D2). One antigen-binding domain (D1) specifically binds to a target antigen. In some embodiments, the target antigen is on the surface of a cell or an organism, e.g., an antigen on the surface of a bacterium or an antigen on the surface of a eukaryotic cell. The cell may be any type of cell, e.g., from any tissue or organ, stem cell, progenitor cell, differentiated cell, etc. In some embodiments, the target antigen is a soluble target antigen, i.e., not bound to a cell. The other antigen-binding domain (D2) specifically binds to a component of the complement pathway ("complement component"), e.g., C1q, C1r, C1s, C2, C3, C4, C5, C6, C7, C8, C9, or a subunit or fragment thereof.

In some embodiments, one antigen-binding domain (D1) specifically binds to a target antigen on the surface of a cell or organism, where the target antigen is a marker of a disease state of a subject and the second antigen-binding domain (D2) binds to a complement component, e.g. C1q. For example, one antigen-binding domain (D1) specifically binds to a target antigen on the surface of a bacteria, on the surface of a virus, on the surface of a bacterial or virus infected cell, on the surface of a cancer cell, or on the surface of an immune cell, and the second antigen-binding domain (D2) binds to a complement component, e.g. C1q. For example, one antigen-binding domain (D1) specifically binds to a *Staphylococcus* species target antigen (e.g., IsdB, Protein A, IsdA, PNAG, C1fA), an Influenza virus target antigen (e.g., Influenza HA), a *Pseudomonas* species target antigen (e.g., Ps1), an immune cell surface antigen such as a tumor necrosis factor receptor antigen (e.g., GITR), or a cancer-cell surface antigen (e.g., CD20), and the second antigen-binding domain (D2) binds to a complement component, e.g. C1q.

As used herein, "an antibody that binds a complement component" or an "anti-complement component antibody" includes antibodies and antigen-binding fragments thereof that specifically recognize a complement component. Such antibodies include antibodies and antigen-binding fragments thereof that specifically recognize a subunit of the complement component, such as a single C1q subunit (e.g., component A, B, or C), as well as antibodies and antigen-binding fragments thereof that specifically recognize more than one subunit, for example a multimer such as a trimer or a hexamer. In one embodiment, the antigen binding molecules of the disclosure bind the complement component C1q, or a subunit of C1q, or a multimeric form of C1q. As used herein, "C1q" includes natural C1q proteins as well as recombinant C1q protein, or variants thereof. In some embodiments, the C1q is human C1q. Human complement C1q is a hexamer that comprises three unique subunits: A (29 kDa); B (26 kDa); and C (22 kDa). An exemplary sequence of subunit A is found at amino acids 1-245 of accession number NP_057075. An exemplary sequence of subunit B is found at amino acids 1-253 of accession number NP_000482. An exemplary sequence of subunit C is found at amino acids 1-245 of accession number NP_758957.

As used herein, the expression "an antibody that binds a complement component", an "anti-complement component antibody", or an "anti-C1q antibody" includes both monovalent antibodies with a single specificity, as well as bispecific antibodies comprising an arm that binds a C1q, wherein the anti-C1q arm comprises any of the HCVR/LCVR or CDR sequences as set forth in Table 1. Examples of anti-C1q bispecific antibodies are described elsewhere herein.

As used herein, the expression "antigen-binding molecule" means a protein, polypeptide or molecular complex having binding affinity for a particular antigen. In embodiments, the antigen-binding molecule comprises or consists of at least one complementarity determining region (CDR) that alone, or in combination with one or more additional CDRs and/or framework regions (FRs), specifically binds to a particular antigen. In embodiments, an antigen binding molecule comprises one or more antigen binding domains. In embodiments, an antigen binding molecule is a bispecific antigen binding molecule having a first antigen binding domain with binding affinity for a first antigen and a second antigen binding domain with binding affinity for a second antigen. The term "antigen-binding molecule" includes antibodies and antigen-binding fragments of antibodies, including, e.g., bispecific antibodies.

As used herein, "target antigen" refers to an antigen found on the surface of an organism or cell. In some embodiments, the target antigen is a marker for one or more cell types. In some embodiments, the target antigen is a marker of a disease state in a subject. In embodiments, a target antigen is found on a bacterial pathogen, a viral pathogen, a bacteria- or virus-infected cell, a cancer cell, or an immune cell. For example, bacterial and viral pathogens include *Staphylococcus* species, Influenza virus, or *Pseudomonas* species. In embodiments, the target antigen is unique to a specific cell type, or is abundantly expressed by a specific cell type, or is overexpressed by a specific cell type as compared to other types of cells. In other embodiments, the target antigen is unique to the cancer cell or is more highly expressed on the cancer cell as compared to non-cancer cells. In yet other embodiments, the target antigen is found on an immune cell, such as T regulatory cell.

The expression "*Staphylococcus* species" as used herein, refers to a species of the microbe *Staphylococcus*. In embodiments, the *Staphylococcus* species is a species that is associated with infections in humans including but not limited to *Staphylococcus epidermidis, Staphylococcus aureus, Staphylococcus lugdunensis*, and/or *Staphylococcus saprophiticus*.

The expression "Influenza virus" as used herein, refers to an Influenza A, Influenza B, Influenza C, and/or Influenza D virus. Influenza viruses can be further subtyped based on hemagglutinin (HA) and neuraminidase (NA). In embodiments, the Influenza virus is a strain that is associated with infections in humans and includes, but is not limited to, Influenza A H1, H3, H5, H7 or H9 strains.

The expression "*Pseudomonas* species" as used herein, refers to a species of the gram-negative bacteria *Pseudomonas*. In embodiments, the *Pseudomonas* species is a species that is associated with infections in humans, including but not limited to *Pseudomonas aeruginosa* PAO-1.

The expression "tumor necrosis factor receptor antigen" as used herein, refers to the tumor necrosis factor receptor family and includes antigens like glucocorticoid-induced TNFR-related protein (GITR).

The expression "immune cell surface antigen" refers to an antigen that is expressed on the surface of one or more types of immune cells such as, but not limited to, B cells, dendritic cells, granulocytes, lymphoid cells, monocytes, macrophages, T cells, and thymocytes.

The expression "B-cell surface antigen" refers to an antigen that is expressed on the surface of a B cell (e.g., B lymphocytes). In some embodiments, a B-cell surface antigen includes antigens like CD20, which is expressed on the surface of B-cells.

The expression "T-cell surface antigen" refers to an antigen that is expressed on the surface of a T cell (e.g., a regulatory T cell). In some embodiments, a T-cell surface antigen includes antigens like GITR.

The expression "cancer-cell surface antigen" refers to an antigen found uniquely or more highly expressed on the surface of a cancer cell. Exemplary antigens include antigens like CD20, which is expressed on the surface of leukemia and lymphoma cells.

As used herein, "an antibody that binds a *Staphylococcus* species target antigen" or an "anti-*Staphylococcus* species target antibody" includes antibodies and antigen-binding fragments thereof that specifically recognize a target antigen on the cell surface of a *Staphylococcus* species. In one embodiment, the antigen binding molecules of the disclosure bind the target antigen referred to as "iron regulated surface protein B", or "IsdB". An exemplary IsdB protein has the amino acid sequence of amino acids 3 to 575 of SEQ ID NO: 80. In another embodiment, the antigen binding molecules of the disclosure bind the target antigen referred to as "Protein A." In another embodiment, the antigen binding molecules of the disclosure bind the target antigen referred to as "iron regulated surface protein A", or "IsdA." In another embodiment, the antigen binding molecules of the disclosure bind the target antigen referred to as "anti-Poly-N-acetylglucosarnine", or "PNAG." In another embodiment, the antigen binding molecules of the disclosure bind the target antigen referred to as "anti-Clumping factor A", or "C1fA."

As used herein, the expression "an antibody that binds a *Staphylococcus* species target antigen" or an "anti-*Staphylococcus* species target antibody" includes, but is not limited to, both monovalent antibodies with a single specificity, as well as bispecific antibodies comprising a first arm that binds IsdB, Protein A, IsdA, PNAG, or C1fA and a second arm that binds a C1q, wherein the anti-IsdB arm, anti-Protein A arm, anti-IsdA arm, anti-PNAG arm, or anti-C1fA arm comprises any of the HCVR/LCVR or CDR sequences as set forth in Tables 1, 3, 12, 14, 16, and 17, respectively.

As used herein, "an antibody that binds an Influenza virus target antigen" or an "anti-Influenza virus target antigen" includes antibodies and antigen-binding fragments thereof that specifically recognize a target antigen on the cell surface of an Influenza infected cell, or in an Influenza strain. In one embodiment, the antigen binding molecules of the disclosure bind the target antigen referred to as "Influenza HA." An exemplary Influenza HA protein has the amino acid sequence of amino acids 1 to 519 of SEQ ID NO: 81.

As used herein, the expression "an antibody that binds an Influenza virus target antigen", an "anti-Influenza virus target antibody", or an "anti-Influenza HA antibody" includes, but is not limited to, both monovalent antibodies with a single specificity, as well as bispecific antibodies comprising a first arm that binds Influenza HA and a second arm that binds a C1q, wherein the anti-Influenza HA arm comprises any of the HCVR/LCVR or CDR sequences as set forth in Table 7 herein. Examples of anti-Influenza HA bispecific antibodies are described elsewhere herein.

As used herein, "an antibody that binds a *Pseudomonas* species target antigen" or an "anti-*Pseudomonas* species target antigen" includes antibodies and antigen-binding fragments thereof that specifically recognize a target antigen on the cell surface of, or in a *Pseudomonas* species. In one embodiment, the antigen binding molecules of the disclosure bind the target antigen referred to as "Ps1." As used herein, the expression "an antibody that binds a *Pseudomonas* species target antigen", an "anti-*Pseudomonas* species target antibody", or an "anti-Ps1 antibody" includes, but is not limited to, both monovalent antibodies with a single specificity, as well as bispecific antibodies comprising a first arm that binds Ps1 and a second arm that binds a C1q, wherein the anti-Ps1 arm comprises any of the HCVR/ LCVR or CDR sequences as set forth in Table 11 herein. Examples of anti-Ps1 bispecific antibodies are described elsewhere herein.

As used herein, "an antibody that binds a glucocorticoid induced tumor necrosis factor receptor (GITR) antigen" or an "anti-GITR" includes antibodies and antigen-binding fragments thereof that specifically recognize a glucocorticoid induced tumor necrosis factor receptor. In one embodiment, the antigen binding molecules of the disclosure bind to a glucocorticoid-induced tumor necrosis factor receptor or "GITR.", found on T cells. An exemplary GITR protein has the amino acid sequence of amino acids 1 to 135 of SEQ ID NO: 82.

As used herein, the expression "an antibody that binds a glucocorticoid induced tumor necrosis factor receptor antigen", or an "anti-GITR antibody" includes, but is not limited to, both monovalent antibodies with a single specificity, as well as bispecific antibodies comprising a first arm that binds GITR and a second arm that binds a C1q, wherein the anti-GITR arm comprises any of the HCVR/LCVR or CDR sequences as set forth in Table 9 herein. Examples of anti-GITR bispecific antibodies are described elsewhere herein.

As used herein, "an antibody that binds a cancer-cell surface antigen" or an "anti-cancer-cell surface antigen" includes antibodies and antigen-binding fragments thereof that specifically recognize a target antigen on the cell surface of a cancer cell. In one embodiment, the antigen binding molecules of the disclosure bind the target antigen referred to as "CD20."

As used herein, the expression "an antibody that binds a cancer cell surface antigen", an "anti-cancer cell surface antigen antibody", or an "anti-CD20 antibody" includes, but is not limited to, both monovalent antibodies with a single specificity, as well as bispecific antibodies comprising a first arm that binds CD20 and a second arm that binds a C1q, wherein the anti-CD20 arm comprises any of the HCVR/ LCVR or CDR sequences as set forth in Table 5 herein. Examples of anti-CD20 bispecific antibodies are described elsewhere herein.

The term "antibody", as used herein, means any antigen-binding molecule or molecular complex comprising at least one complementarity determining region (CDR) that specifically binds to or interacts with a particular antigen (e.g., C1q). The term "antibody" includes immunoglobulin molecules comprising four polypeptide chains, two heavy (H) chains and two light (L) chains inter-connected by disulfide bonds, as well as multimers thereof (e.g., IgM). Each heavy chain comprises a heavy chain variable region (abbreviated herein as HCVR or $V_H$) and a heavy chain constant region. The heavy chain constant region comprises three domains, $C_H1$, $C_H2$ and $C_H3$. Each light chain comprises a light chain variable region (abbreviated herein as LCVR or $V_L$) and a light chain constant region. The light chain constant region comprises one domain ($C_L1$). The $V_H$ and $V_L$ regions can be further subdivided into regions of hypervariability, termed complementarity determining regions (CDRs), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. In different embodiments of the disclosure, the FRs of the anti-C1q antibody (or antigen-binding portion thereof) may be identical to the human germline sequences, or may be naturally or artificially modified. In different embodiments of the disclosure, the FRs of the anti-IsdB antibody (or antigen-binding portion thereof) may be identical to the human germline sequences, or may be naturally or artificially modified. An amino acid consensus sequence may be defined based on a side-by-side analysis of two or more CDRs.

The term "antibody", as used herein, also includes antigen-binding fragments of full antibody molecules. The terms "antigen-binding portion" of an antibody, "antigen binding domain" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

As used herein, the expression "antigen-binding domain" means any peptide, polypeptide, nucleic acid molecule, scaffold-type molecule, peptide display molecule, or polypeptide-containing construct that is capable of specifically binding a particular antigen of interest (e.g., a complement component, *Staphylococcus* species target antigen, Influenza virus target antigen, *Pseudomonas* species target antigen tumor necrosis factor receptor antigen, cancer-cell surface antigen).

The term "specifically binds" or the like, as used herein, means that the antigen-binding domain forms a complex with a particular antigen characterized by a dissociation constant ($K_D$) of 25 nM or less. Exemplary categories of antigen-binding domains that can be used in the context of the present disclosure include antibodies, antigen-binding portions of antibodies, peptides that specifically interact with a particular antigen (e.g., peptibodies), receptor molecules that specifically interact with a particular antigen, proteins comprising a ligand-binding portion of a receptor that specifically binds a particular antigen, antigen-binding scaffolds (e.g., DARPins, HEAT repeat proteins, ARM repeat proteins, tetratricopeptide repeat proteins, and other scaffolds based on naturally occurring repeat proteins, etc., [see, e.g., Boersma and Pluckthun, 2011, *Curr. Opin. Biotechnol.* 22:849-857, and references cited therein]), and aptamers or portions thereof.

Methods for determining whether two molecules specifically bind one another are well known in the art and include, for example, equilibrium dialysis, surface plasmon resonance, and the like. For example, an antigen-binding molecule, as used in the context of the present disclosure, includes polypeptides that bind a particular antigen (e.g., a target molecule [T] or a portion thereof) with a $K_D$ of less than about 25 nM, less than about 20 nM, less than about 15 nM, less than about 10 nM, less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

Non-limiting examples of antigen-binding fragments include: (i) Fab fragments; (ii) F(ab')2 fragments; (iii) Fd fragments; (iv) Fv fragments; (v) single-chain Fv (scFv) molecules; (vi) dAb fragments; (vii) an antigen binding domain, and (viii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain-specific antibodies, single domain antibodies, domain-deleted antibodies, chimeric antibodies, CDR-grafted antibodies, diabodies, triabodies, tetrabodies, minibodies, nanobodies (e.g. monovalent nanobodies, bivalent nanobodies, etc.), small modular immunopharmaceuticals (SMIPs), and shark variable IgNAR domains, are also encompassed within the expression "antigen-binding fragment," as used herein.

An antigen-binding fragment of an antibody will typically comprise at least one variable domain. The variable domain may be of any size or amino acid composition and will generally comprise at least one CDR which is adjacent to or in frame with one or more framework sequences. In antigen-binding fragments having a $V_H$ domain associated with a $V_L$ domain, the $V_H$ and $V_L$ domains may be situated relative to one another in any suitable arrangement. For example, the variable region may be dimeric and contain $V_H$-$V_H$, $V_H$-$V_L$ or $V_L$-$V_L$ dimers. Alternatively, the antigen-binding fragment of an antibody may contain a monomeric $V_H$ or $V_L$ domain.

In certain embodiments, an antigen-binding fragment of an antibody may contain at least one variable domain covalently linked to at least one constant domain. Non-limiting, exemplary configurations of variable and constant domains that may be found within an antigen-binding fragment of an antibody of the present disclosure include: (i) $V_H$-$C_H1$; (ii) $V_H$-$C_H2$; (iii) $V_H$-$C_H3$; (iv) $V_H$-$C_H1$-$C_H2$; (v) $V_H$-$C_H1$-$C_H2$-$C_H3$; (vi) $V_H$-$C_H2$-$C_H3$; (vii) $V_H$-$C_L$; (viii) $V_L$-$C_H1$; (ix) $V_L$-$C_H2$; (x) $V_L$-$C_H3$; (xi) $V_L$-$C_H1$-$C_H2$; (xii) $V_L$-$C_H1$-$C_H2$-$C_H3$; (xiii) $V_L$-$C_H2$-$C_H3$; and (xiv) $V_L$-$C_L$. In any configuration of variable and constant domains, including any of the exemplary configurations listed above, the variable and constant domains may be either directly linked to one another or may be linked by a full or partial hinge or linker region. A hinge region may comprise or consist of at least 2 (e.g., 5, 10, 15, 20, 40, 60 or more) amino acids which result in a flexible or semi-flexible linkage between adjacent variable and/or constant domains in a single polypeptide molecule. Moreover, an antigen-binding fragment of an antibody of the present disclosure may comprise a homo-dimer or hetero-dimer (or other multimer) of any of the variable and constant domain configurations listed above in non-covalent association with one another and/or with one or more monomeric $V_H$ or $V_L$ domain (e.g., by disulfide bond(s)).

As with full antibody molecules, antigen-binding fragments may be monospecific or multispecific (e.g., bispecific). A multispecific antigen-binding fragment of an antibody will typically comprise at least two different variable domains, wherein each variable domain is capable of specifically binding to a separate antigen or to a different epitope on the same antigen. Any multispecific antibody format, including the exemplary bispecific antibody formats disclosed herein, may be adapted for use in the context of an antigen-binding fragment of an antibody of the present disclosure using routine techniques available in the art.

The antibodies of the present disclosure may function through complement-dependent cytotoxicity (CDC) or antibody-dependent cell-mediated cytotoxicity (ADCC). "Complement-dependent cytotoxicity" (CDC) refers to lysis of antigen-expressing cells by an antibody of the disclosure in the presence of complement. "Antibody-dependent cell-mediated cytotoxicity" (ADCC) refers to a cell-mediated reaction in which nonspecific cytotoxic cells that express Fc receptors (FcRs) (e.g., Natural Killer (NK) cells, neutrophils, and macrophages) recognize bound antibody on a target cell and thereby lead to lysis of the target cell. CDC and ADCC can be measured using assays that are well known and available in the art. (See, e.g., U.S. Pat. Nos. 5,500,362 and 5,821,337, and Clynes et al. (1998) Proc. Natl. Acad. Sci. (USA) 95:652-656).

In certain embodiments of the disclosure, the anti-C1q, anti-IsdB, anti-Ps1, anti-Influenza HA, anti-CD20, anti-Protein A, anti-IsdA, anti-PNAG, anti-C1fA, and/or anti-GITR antibodies of the disclosure (monospecific or bispecific) are human antibodies. The term "human antibody", as used herein, is intended to include antibodies having variable and constant regions derived from human germline immunoglobulin sequences. The human antibodies of the disclosure may include amino acid residues not encoded by human germline immunoglobulin sequences (e.g., mutations introduced by random or site-specific mutagenesis in vitro or by somatic mutation in vivo), for example in the CDRs and in particular CDR3. However, the term "human antibody", as used herein, is not intended to include antibodies in which CDR sequences derived from the germline of another mammalian species, such as a mouse, have been grafted onto human framework sequences. The term includes antibodies recombinantly produced in a non-human mammal, or in cells of a non-human mammal. The term is not intended to include antibodies isolated from or generated in a human subject.

The antibodies of the disclosure may, in some embodiments, be recombinant human antibodies. The term "recombinant human antibody", as used herein, is intended to include all human antibodies that are prepared, expressed, created or isolated by recombinant means, such as antibodies expressed using a recombinant expression vector transfected into a host cell (described further below), antibodies isolated from a recombinant, combinatorial human antibody library (described further below), antibodies isolated from an animal (e.g., a mouse) that is transgenic for human immunoglobulin genes (see e.g., Taylor et al. (1992) Nucl. Acids Res. 20:6287-6295) or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis) and thus the amino acid sequences of the $V_H$ and $V_L$ regions of the recombinant antibodies are sequences that, while derived from and related to human germline $V_H$ and $V_L$ sequences, may not naturally exist within the human antibody germline repertoire in vivo.

Human antibodies can exist in two forms that are associated with hinge heterogeneity. In one form, an immunoglobulin molecule comprises a stable four chain construct of approximately 150-160 kDa in which the dimers are held together by an interchain heavy chain disulfide bond. In a second form, the dimers are not linked via inter-chain disulfide bonds and a molecule of about 75-80 kDa is formed composed of a covalently coupled light and heavy chain (half-antibody). These forms have been extremely difficult to separate, even after affinity purification.

The frequency of appearance of the second form in various intact IgG isotypes is due to, but not limited to, structural differences associated with the hinge region isotype of the antibody. A single amino acid substitution in the hinge region of the human 1gG4 hinge can significantly reduce the appearance of the second form (Angal et al. (1993) Molecular Immunology 30:105) to levels typically observed using a human IgG1 hinge. The instant disclosure encompasses antibodies having one or more mutations in the hinge, $C_H2$ or $C_H3$ region which may be desirable, for example, in production, to improve the yield of the desired antibody form.

The antibodies of the disclosure may be isolated antibodies. An "isolated antibody," as used herein, means an antibody that has been identified and separated and/or recovered from at least one component of its natural environment. For example, an antibody that has been separated or removed from at least one component of an organism, or from a tissue or cell in which the antibody naturally exists or is naturally produced, is an "isolated antibody" for purposes of the present disclosure. An isolated antibody also includes an antibody in situ within a recombinant cell. Isolated antibodies are antibodies that have been subjected to at least one purification or isolation step. According to certain embodiments, an isolated antibody may be substantially free of other cellular material and/or chemicals.

The anti-C1q, anti-target antigen, or bispecific antigen binding molecules disclosed herein may comprise one or more amino acid substitutions, insertions and/or deletions in the framework and/or CDR regions of the heavy and light chain variable domains as compared to the corresponding germline sequences from which the antibodies were derived. Such mutations can be readily ascertained by comparing the amino acid sequences disclosed herein to germline sequences available from, for example, public antibody sequence databases. The present disclosure includes antigen binding molecules, antibodies, and antigen-binding fragments thereof, which are derived from any of the amino acid sequences disclosed herein, wherein one or more amino acids within one or more framework and/or CDR regions are mutated to the corresponding residue(s) of the germline sequence from which the antibody was derived, or to the corresponding residue(s) of another human germline sequence, or to a conservative amino acid substitution of the corresponding germline residue(s) (such sequence changes are referred to herein collectively as "germline mutations"). A person of ordinary skill in the art, starting with the heavy and light chain variable region sequences disclosed herein, can easily produce numerous antigen binding molecules, antibodies and antigen-binding fragments which comprise one or more individual germline mutations or combinations thereof. In certain embodiments, all of the framework and/or CDR residues within the $V_H$ and/or $V_L$ domains are mutated back to the residues found in the original germline sequence from which the antibody was derived. In other embodiments, only certain residues are mutated back to the original germline sequence, e.g., only the mutated residues found within the first 8 amino acids of FR1 or within the last 8 amino acids of FR4, or only the mutated residues found within CDR1, CDR2 or CDR3. In other embodiments, one or more of the framework and/or CDR residue(s) are mutated to the corresponding residue(s) of a different germline sequence (i.e., a germline sequence that is different from the germline sequence from which the antibody was originally derived). Furthermore, the antigen binding molecules, antibodies and antigen-binding fragments of the present disclosure may contain any combination of two or more germline mutations within the framework and/or CDR regions, e.g., wherein certain individual residues are mutated to the corresponding residue of a particular germline sequence while certain other residues that differ from the original germline sequence are maintained or are mutated to the corresponding residue of a different germline sequence. Once obtained, antigen binding molecules, antibodies and antigen-binding fragments that contain one or more germline mutations can be easily tested for one or more desired properties such as, improved binding specificity, increased binding affinity, improved or enhanced antagonistic or agonistic biological properties (as the case may be), reduced immunogenicity, etc. Antigen binding molecules, antibodies and antigen-binding fragments obtained in this general manner are encompassed within the present disclosure.

The present disclosure also includes one-arm antibodies that bind C1q, IsdB, Ps1, Influenza HA, CD20, Protein A, IsdA, PNAG, C1fA, or GITR. As used herein, a "one-arm antibody" means an antigen-binding molecule comprising a single antibody heavy chain and a single antibody light chain. The one-arm antibodies of the present disclosure may comprise any of the HCVR/LCVR or CDR amino acid sequences as set forth in Tables 1, 3, 5, 7, 9, 11, 12, 14, 16, 17, and 18 herein.

The term "epitope" refers to an antigenic determinant that interacts with a specific antigen binding site in the variable region of an antibody molecule known as a paratope. A single antigen may have more than one epitope. Thus, different antibodies may bind to different areas on an antigen and may have different biological effects. Epitopes may be either conformational or linear. A conformational epitope is produced by spatially juxtaposed amino acids from different segments of the linear polypeptide chain. A linear epitope is one produced by adjacent amino acid residues in a polypeptide chain. In certain circumstance, an epitope may include moieties of saccharides, phosphoryl groups, or sulfonyl groups on the antigen.

The term "substantial identity" or "substantially identical," when referring to a nucleic acid or fragment thereof, indicates that, when optimally aligned with appropriate nucleotide insertions or deletions with another nucleic acid (or its complementary strand), there is nucleotide sequence identity in at least about 90%, e.g., at least about 95%, and more preferably at least about 96%, 97%, 98% or 99% of the nucleotide bases, as measured by any well-known algorithm of sequence identity, such as FASTA, BLAST or Gap, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule.

As applied to polypeptides, the term "substantial similarity" or "substantially similar" means that two peptide sequences, when optimally aligned, such as by the programs GAP or BESTFIT using default gap weights, share at least 90% sequence identity, e.g., at least 95% sequence identity, even more preferably at least 96%, 97%, 98%, or 99% sequence identity. Preferably, residue positions which are not identical differ by conservative amino acid substitutions. In cases where two or more amino acid sequences differ from each other by conservative substitutions, the percent sequence identity or degree of similarity may be adjusted upwards to correct for the conservative nature of the substitution. Means for making this adjustment are well-known to those of skill in the art. See, e.g., Pearson (1994) Methods Mol. Biol. 24: 307-331, herein incorporated by reference. Sequence similarity for polypeptides, which is also referred to as sequence identity, is typically measured using sequence analysis software. Protein analysis software matches similar sequences using measures of similarity assigned to various substitutions, deletions and other modifications, including conservative amino acid substitutions. For instance, GCG software contains programs such as Gap and Bestfit which can be used with default parameters to determine sequence homology or sequence identity between closely related polypeptides, such as homologous polypeptides from different species of organisms or between a wild type protein and a mutant thereof. See, e.g., GCG Version 6.1. Polypeptide sequences also can be compared using FASTA using default or recommended parameters, a program in GCG Version 6.1. FASTA (e.g., FASTA2 and FASTA3) provides alignments and percent sequence identity of the regions of the best overlap between the query and search sequences (Pearson (2000) supra). Another preferred algorithm when comparing a sequence of the disclosure to a database containing a large number of sequences from different organisms is the computer program BLAST, especially BLASTP or TBLASTN, using default parameters. See, e.g., Altschul et al. (1990) J. Mol. Biol. 215:403-410 and Altschul et al. (1997) Nucleic Acids Res. 25:3389-402, each herein incorporated by reference.

II. Complement Component Binding Molecules

According to one aspect of the present disclosure, anti-complement component binding molecules, e.g., antibodies and antigen-binding fragment thereof, are provided. Complement components comprise C1q, C1r, C1s, C2, C3, C4, C5, C6, C7, C8, C9, or any fragments thereof (including proteolytic fragments generated by the complement cascade). In embodiments, antibodies that bind C1q (e.g. monospecific anti-C1q antibodies) are provided. In embodiments, C1q is a human C1q. Human complement C1q is a hexamer that comprises three unique subunits: A (29 kDa); B (26 kDa); and C (22 kDa). An exemplary sequence of subunit A is found at amino acids 1-245 of accession number NP_057075. An exemplary sequence of subunit B is found at amino acids 1-253 of accession number NP_000482. An exemplary sequence of subunit C is found at amino acids 1-245 of accession number NP_758957. The antibodies according to this aspect of the disclosure are useful, inter alia, for targeting C1q and complement activation to specific targets.

Exemplary anti-C1q antibodies are described in U.S. Ser. No. 16/143,901 and PCT/US2018/053064, incorporated by reference herein. The anti-C1q antibodies of the disclosure, or antigen-binding portions thereof, may be included in a bispecific antigen-binding molecule that directs C1q-mediated complement activation to specific target antigens.

In embodiments, the anti-C1q antibodies are selected that inhibit C1q binding to immunoglobulin molecules, inhibit hemolysis, and/or complement dependent cytotoxicity. In embodiments, the bispecific antigen-binding molecule blocks the binding of the human C1q to human IgG1-k with an $IC_{50}$ of about 10 nM or less. In other embodiments, the bispecific antigen binding molecule blocks the binding of the human C1q to human IgM with an $IC_{50}$ of about 50 nM or less. In embodiments, the bispecific antigen binding molecule inhibits complement dependent cytotoxicity with an $IC_{50}$ of about 100 nM or less. In yet other embodiments, the bispecific antigen binding molecule provides for deposition of human C1q with an $EC_{50}$ of about 10 nM or less. In certain embodiments, an antigen binding molecule of the invention may not exhibit one or more of the following: blocking or inhibition of IgG binding, or hemolysis, or complement dependent cytotoxicity, as described herein, but may still be effective for preventing a *Staphylococcus* infection, or for treating an existing infection in a subject.

In specific embodiments, sequences of exemplary anti-C1q are listed in Tables 1 and 2 herein. Table 1 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-C1q antibodies. Table 2 sets forth the sequence identifiers of the nucleic acid molecules encoding the HCVRs, LCVRs, HCDR1, HCDR2, HCDR3, LCDR1, LCDR2 and LCDR3 of the exemplary anti-C1q antibodies.

The present disclosure provides antibodies, or antigen-binding fragments thereof that bind human C1q, comprising heavy chain variable region CDRs contained within a HCVR comprising an amino acid sequence selected from any of the HCVR amino acid sequences listed in Table 1, or a substantially similar sequence thereof having at least 90%, at least 91%, at least 92%, at least 93%, at least 94%, at least 95%, at least 96%, at least 97%, at least 98% or at least 99% sequence identity thereto.

The present disclosure also provides anti-C1q antibodies, or antigen-binding fragments thereof, comprising light chain variable region CDRs contained within a LCVR comprising an amino acid sequence selected from any of the LCVR amino acid sequences listed in Table 1, or a substantially similar sequence thereof having at least 90%, at least 91%, at least 92%, at least 93%, at least 94%, at least 95%, at least 96%, at least 97%, at least 98% or at least 99% sequence identity thereto.

The present disclosure also provides anti-C1q antibodies, or antigen-binding fragments thereof, comprising an HCVR and an LCVR pair (HCVR/LCVR) comprising any of the HCVR amino acid sequences listed in Table 1 paired with any of the LCVR amino acid sequences listed in Table 1. In certain embodiments, an anti-C1q antibody comprises a HCVR/LCVR pair, the HCVR/LCVR pair comprising amino acid sequence of SEQ ID NOs: 2/10 (e.g., mAb17736); SEQ ID NOs: 18/10 (e.g., mAb18395).

The present disclosure also provides antibodies, or antigen-binding fragments thereof, that bind to human C1q comprising a heavy chain CDR1 (HCDR1) comprising an amino acid sequence selected from any of the HCDR1 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising a heavy chain CDR2 (HCDR2) comprising an amino acid sequence selected from any of the HCDR2 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising a heavy chain CDR3 (HCDR3) comprising an amino acid sequence selected from any of the HCDR3 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising a light chain CDR1 (LCDR1) comprising an amino acid sequence selected from any of the LCDR1 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising a light chain CDR2 (LCDR2) comprising an amino acid sequence selected from any of the LCDR2 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising a light chain CDR3 (LCDR3) comprising an amino acid sequence selected from any of the LCDR3 amino acid sequences listed in Table 1 or a substantially similar sequence thereof having at least 90%, at least 95%, at least 98% or at least 99% sequence identity.

The present disclosure also provides antibodies, or antigen-binding fragments thereof, that bind to human C1q comprising an HCDR3 and an LCDR3 pair (HCDR3/LCDR3) comprising any of the HCDR3 amino acid sequences listed in Table 1 paired with any of the LCDR3 amino acid sequences listed in Table 1. According to certain embodiments, the present disclosure provides antibodies, or antigen-binding fragments thereof, comprising an HCDR3/LCDR3 pair contained within any of the exemplary anti-C1q antibodies listed in Table 1. In certain embodiments, the HCDR3/LCDR3 pair comprises amino acid sequences of SEQ ID NOs: 8/16 (e.g., mAb17736), or of SEQ ID NOs: 24/16 (e.g., mAb18395).

The present disclosure also provides antibodies, or antigen-binding fragments thereof, that bind to human C1q comprising a set of six CDRs (i.e., HCDR1-HCDR2-HCDR3-LCDR1-LCDR2-LCDR3) contained within any of the exemplary anti-C1q antibodies listed in Table 1. In certain embodiments, the HCDR1-HCDR2-HCDR3-LCDR1-LCDR2-LCDR3 set comprises the amino acid sequences of SEQ ID NOs: 4, 6, 8, 12, 14, and 16 (e.g., mAb17736); of the amino acid sequences of 20, 22, 24, 12, 14, and 16 (e.g., mAb18395).

In a related embodiment, the present disclosure provides antibodies, or antigen-binding fragments thereof that bind to human C1q, comprising a set of six CDRs (i.e., HCDR1-HCDR2-HCDR3-LCDR1-LCDR2-LCDR3) contained within an HCVR/LCVR pair as defined by any of the exemplary anti-C1q antibodies listed in Table 1. For example, the present disclosure includes antibodies, or antigen-binding fragments thereof, comprising the HCDR1-HCDR2-HCDR3-LCDR1-LCDR2-LCDR3 set contained within an HCVR/LCVR pair comprising amino acid sequences of SEQ ID NOs: 2/10 (e.g., mAb17736); or of SEQ ID NOs: 18/10 (e.g., mAb18395).

Methods and techniques for identifying CDRs within HCVR and LCVR amino acid sequences are well known in the art and can be used to identify CDRs within the specified HCVR and/or LCVR amino acid sequences disclosed herein. Exemplary conventions that can be used to identify the boundaries of CDRs include, e.g., the Kabat definition, the Chothia definition, and the AbM definition. In general terms, the Kabat definition is based on sequence variability, the Chothia definition is based on the location of the structural loop regions, and the AbM definition is a compromise between the Kabat and Chothia approaches. See, e.g., Kabat, "Sequences of Proteins of Immunological Interest," National Institutes of Health, Bethesda, Md. (1991); Al-Lazikani et al., *J. Mol. Biol.* 273:927-948 (1997); and Martin et al., Proc. Nall. Acad. Sci. USA 86:9268-9272 (1989). Public databases are also available for identifying CDR sequences within an antibody.

The present disclosure also provides nucleic acid molecules encoding anti-C1q antibodies or portions thereof. For example, the present disclosure provides nucleic acid molecules encoding any of the HCVR amino acid sequences listed in Table 1; in certain embodiments the nucleic acid molecule comprises a polynucleotide sequence selected from any of the HCVR nucleic acid sequences listed in Table 2, or a substantially similar sequence thereof having at least 90%, at least 91%, at least 92%, at least 93%, at least 94%, at least 95%, at least 96%, at least 97%, at least 98% or at least 99% sequence identity thereto.

The present disclosure also provides nucleic acid molecules encoding any of the LCVR amino acid sequences listed in Table 1; in certain embodiments the nucleic acid molecule comprises a polynucleotide sequence selected from any of the LCVR nucleic acid sequences listed in Table 2, or a substantially similar sequence thereof having at least 90%, at least 91%, at least 92%, at least 93%, at least 94%, at least 95%, at least 96%, at least 97%, at least 98% or at least 99% sequence identity thereto.

The present disclosure also provides nucleic acid molecules encoding any of the HCDR1 amino acid sequences listed in Table 1; in certain embodiments the nucleic acid molecule comprises a polynucleotide sequence selected from any of the HCDR1 nucleic acid sequences listed in Table 2, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 1; in certain embodiments the nucleic acid molecule comprises a polynucleotide sequence selected from any of the HCDR2 nucleic acid sequences listed in Table 2, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 1; in certain embodiments the nucleic acid molecule comprises a polynucleotide sequence selected from any of the HCDR3 nucleic acid sequences listed in Table 2, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 1; in certain embodiments the nucleic acid molecule comprises a polynucleotide sequence selected from any of the LCDR1 nucleic acid sequences listed in Table 2, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 1; in certain embodiments the nucleic acid molecule comprises a polynucleotide sequence selected from any of the LCDR2 nucleic acid sequences listed in Table 2, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 1; in certain embodiments the nucleic acid molecule comprises a polynucleotide sequence selected from any of the LCDR3 nucleic acid sequences listed in Table 2, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-C1q antibodies listed in Table 1.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-C1q antibodies listed in Table 1.

The present disclosure also provides nucleic acid molecules encoding both an HCVR and an LCVR, wherein the HCVR comprises an amino acid sequence of any of the HCVR amino acid sequences listed in Table 1, and wherein the LCVR comprises an amino acid sequence of any of the LCVR amino acid sequences listed in Table 1. In certain embodiments, the nucleic acid molecule comprises a polynucleotide sequence selected from any of the HCVR nucleic acid sequences listed in Table 2, or a substantially similar sequence thereof having at least 90%, at least 95%, at least 98% or at least 99% sequence identity thereto, and a polynucleotide sequence selected from any of the LCVR nucleic acid sequences listed in Table 2, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-C1q antibody listed in Table 1.

The present disclosure also provides recombinant expression vectors capable of expressing a polypeptide comprising a heavy or light chain variable region of an anti-C1q antibody. For example, the present disclosure includes recombinant expression vectors comprising any of the nucleic acid molecules mentioned above, i.e., nucleic acid molecules encoding any of the HCVR, LCVR, and/or CDR sequences as set forth in Table 1. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes anti-C1q antibodies having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

III. Target Antigen Binding Molecules

In another aspect, the present disclosure provides binding molecules, e.g., antibodies and antigen-binding fragments thereof, that bind a target antigen as disclosed herein. In some embodiments, the target antigen is expressed on or bound to the surface of a cell or organism, e.g., a target antigen that is found on the surface of a bacterium, or a target antigen that is expressed on the surface of a cell (e.g., a eukaryotic cell) that is to be targeted for elimination, such as but not limited to a bacterially- or virally-infected cell, an immune cell, or a cancer cell. In some embodiments, the target antigen is soluble, i.e., not bound to the cell or organism surface. For example, in some embodiments, the target antigen is a soluble multimer that the complement component (e.g., C1q) opsonizes for clearance via macrophages or immunogenicity via binding to the complement receptor CR2/CD21 on B cells.

A. *Staphylococcus* Target Antigens

In another aspect, the present disclosure provides binding molecules, e.g., antibodies and antigen-binding fragments thereof, that bind a *Staphylococcus* species target antigen (e.g. a monospecific antibody to a *Staphylococcus* species target antigen). In embodiments, the *Staphylococcus* species is a species that causes an infection in humans. In embodiments, the *Staphylococcus* species comprises *Staphylococcus epidermidis, Staphylococcus aureus, Staphylococcus lugdunensis,* and/or *Staphylococcus saprophiticus*. In embodiments, the *Staphylococcus* species target antigen comprises capsular polysaccharide type 5, capsular polysaccharide type 8, protein A, IsdB, IsdA, IsdH, lipoteichoic acid, wall teichoic acid, clumping factor A (C1fA), poly-N-acetyl glucosamine (PNAG), lipase, V8 lipase, fatty acid modifying enzyme, microbial surface components recognizing adhesive matrix molecules (e.g., adhesins, fibrinogen binding molecules, fibronectin binding protein A, fibronectin binding protein B), or combinations thereof.

In one embodiment, the antibody or antigen binding fragment thereof specifically binds IsdB. Exemplary anti-IsdB antibodies are disclosed in U.S. Ser. No. 16/143,901 and PCT/US2018/053064, incorporated by reference herein. In one embodiment, the antibody or antigen binding fragment thereof that specifically binds IsdB binds to an IsdB comprising an amino acid sequence of amino acids 3 to 575 of SEQ ID NO: 80. The anti-IsdB antibodies of the disclosure, or antigen-binding portions thereof, may be included in a bispecific antigen-binding molecule that binds specific target cell types such as infectious agents. In embodiments, the bispecific antigen-binding molecule binds to the *Staphylococcus* species with an $IC_{50}$ of about 10 nM or less.

Exemplary anti-IsdB antibodies of the present disclosure are listed in Tables 3 and 4. Table 3 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-IsdB antibodies. Table 4 sets forth the sequence identifiers of the nucleic acid molecules encoding the HCVRs, LCVRs, HCDR1, HCDR2, HCDR3, LCDR1, LCDR2 and LCDR3 of the exemplary anti-IsdB antibodies The present disclosure provides antibodies, or antigen-binding fragments thereof that bind IsdB comprising heavy chain variable region (HCVR) CDRs contained within a HCVR comprising an amino acid sequence of SEQ ID NO: 26, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 3 paired with any of the LCVR amino acid sequences listed in Table 3. According to certain embodiments, the present disclosure provides antibodies, or antigen-binding fragments thereof, comprising an HCVR/LCVR pair contained within any of the exemplary anti-IsdB antibodies listed in Table 3. In certain embodiments, the HCVR/LCVR pair comprises amino acid sequences of SEQ ID NOs: 26/10.

The present disclosure also provides antibodies, or antigen-binding fragments thereof, that bind to IsdB comprising a heavy chain CDR1 (HCDR1) comprising an amino acid sequence selected from any of the HCDR1 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to human IsdB comprising a heavy chain CDR2 (HCDR2) comprising an amino acid sequence selected from any of the HCDR2 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to IsdB comprising a heavy chain CDR3 (HCDR3) comprising an amino acid sequence selected from any of the HCDR3 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to IsdB comprising a light chain CDR1 (LCDR1) comprising an amino acid sequence selected from any of the LCDR1 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to IsdB comprising a light chain CDR2 (LCDR2) comprising an amino acid sequence selected from any of the LCDR2 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to IsdB comprising a light chain CDR3 (LCDR3) comprising an amino acid sequence selected from any of the LCDR3 amino acid sequences listed in Table 3, or a substantially similar sequence thereof having at least 90%, at least 95%, at least 98% or at least 99% sequence identity.

The present disclosure also provides antibodies, or antigen-binding fragments thereof, that bind to IsdB comprising an HCDR3 and an LCDR3 pair (HCDR3/LCDR3) comprising any of the HCDR3 amino acid sequences listed in Table 3 paired with any of the LCDR3 amino acid sequences listed in Table 3. According to certain embodiments, the present disclosure provides antibodies, or antigen-binding fragments thereof, comprising an HCDR3/LCDR3 pair contained within any of the exemplary IsdB antibodies listed in Table 3. In certain embodiments, the first antigen-binding domain that specifically binds IsdB comprises a HCDR3/LCDR3 pair comprising amino acid sequences of SEQ ID NOs: 32/16.

The present disclosure also provides antibodies, or antigen-binding fragments thereof, that bind to IsdB comprising a heavy chain CDR1 (HCDR1) comprising an amino acid sequence of SEQ ID NO:28, or a substantially similar sequence thereof having at least 90%, at least 95%, at least 98% or at least 99% sequence identity; a heavy chain CDR2 (HCDR2) comprising an amino acid sequence of SEQ ID NO:30, or a substantially similar sequence thereof having at least 90%, at least 95%, at least 98% or at least 99% sequence identity; and a heavy chain CDR3 (HCDR3) comprising an amino acid sequence of SEQ ID NO:32, or a substantially similar sequence thereof having at least 90%, at least 95%, at least 98% or at least 99% sequence identity. In embodiments, the first antigen-binding domain that specifically binds IsdB comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO:14, or a substantially similar sequence thereof having at least 90%, at least 95%, at least 98% or at least 99% sequence identity; and a light chain CDR3 (LCDR3) comprising an amino acid sequence of SEQ ID NO:16, or a substantially similar sequence thereof having at least 90%, at least 95%, at least 98% or at least 99% sequence identity.

Certain non-limiting, exemplary antibodies, or antigen-binding fragments thereof, that bind to IsdB comprise a set of six CDRs HCDR1-HCDR2-HCDR3-LCDR1-LCDR2-LCDR3, respectively, the set comprising amino acid sequences of SEQ ID NOs: 28, 30, 32, 12, 14, 16.

In another aspect, the present disclosure provides nucleic acid molecules encoding any of the HCVR, LCVR or CDR sequences of the antibodies, or antigen-binding fragments thereof, that bind to IsdB including nucleic acid molecules comprising the polynucleotide sequences as set forth in Table 4 herein, as well as nucleic acid molecules comprising two or more of the polynucleotide sequences as set forth in Tables 2 and 4 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-IsdB antibodies or portions thereof. For example, the present disclosure provides nucleic acid molecules encoding any of the HCVR amino acid sequences listed in Table 3; in certain embodiments the nucleic acid molecule comprises a polynucleotide sequence selected from any of the HCVR nucleic acid sequences listed in Table 4, or a substantially similar sequence thereof having at least 90%, at least 95%, at least 98% or at least 99% sequence identity thereto.

The present disclosure also provides nucleic acid molecules encoding any of the LCVR amino acid sequences listed in Table 3; in certain embodiments the nucleic acid molecule comprises a polynucleotide sequence selected from any of the LCVR nucleic acid sequences listed in Table 4, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 3; in certain embodiments the nucleic acid molecule comprises a polynucleotide sequence selected from any of the HCDR1 nucleic acid sequences listed in Table 4, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 3; in certain embodiments the nucleic acid molecule comprises a polynucleotide sequence selected from any of the HCDR2 nucleic acid sequences listed in Table 4, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 3; in certain embodiments the nucleic acid molecule comprises a polynucleotide sequence selected from any of the HCDR3 nucleic acid sequences listed in Table 4, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 3; in certain embodiments the nucleic acid molecule comprises a polynucleotide sequence selected from any of the LCDR1 nucleic acid sequences listed in Table 4, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 3; in certain embodiments the nucleic acid molecule comprises a polynucleotide sequence selected from any of the LCDR2 nucleic acid sequences listed in Table 4, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 3; in certain embodiments the nucleic acid molecule comprises a polynucleotide sequence selected from any of the LCDR3 nucleic acid sequences listed in Table 4, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-IsdB antibodies listed in Table 3.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-IsdB antibodies listed in Table 3.

The present disclosure also provides nucleic acid molecules encoding both an HCVR and an LCVR, wherein the HCVR comprises an amino acid sequence of any of the HCVR amino acid sequences listed in Table 3, and wherein the LCVR comprises an amino acid sequence of any of the LCVR amino acid sequences listed in Table 3. In certain embodiments, the nucleic acid molecule comprises a polynucleotide sequence selected from any of the HCVR nucleic acid sequences listed in Table 4, or a substantially similar sequence thereof having at least 90%, at least 95%, at least 98% or at least 99% sequence identity thereto, and a polynucleotide sequence selected from any of the LCVR nucleic acid sequences listed in Table 4, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-IsdB antibody listed in Table 3.

In one embodiment, the antibody or antigen binding fragment thereof specifically binds IsdA. An embodiment of the antigen comprises amino acids as shown in Genbank Accession No. AFH 69349. The anti-IsdA antibodies of the disclosure, or antigen-binding portions thereof, may be included in a bispecific antigen-binding molecule that binds specific target cell types such as infectious agents. In embodiments, the bispecific antigen-binding molecule binds to the *Staphylococcus* species with an $IC_{50}$ of about 10 nM or less.

Exemplary anti-IsdA antibodies of the present disclosure are listed in Tables 14 and 15. Table 14 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-IsdA antibodies. Table 15 sets forth the sequence identifiers of the nucleic acid molecules encoding the HCVRs, LCVRs, HCDR1, HCDR2, HCDR3, LCDR1, LCDR2 and LCDR3 of the exemplary anti-IsdA antibodies.

The present disclosure provides antibodies, or antigen-binding fragments thereof that bind IsdA comprising heavy chain variable region (HCVR) CDRs contained within a HCVR comprising an amino acid sequence of SEQ ID NO: 66, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 14 paired with any of the LCVR amino acid sequences listed in Table 14. According to certain embodiments, the present disclosure provides antibodies, or antigen-binding fragments thereof, comprising an HCVR/LCVR pair contained within any of the exemplary anti-IsdA antibodies listed in Table 14. In certain embodiments, the HCVR/LCVR pair comprises amino acid sequences of SEQ ID NOs: 66/10.

The present disclosure also provides antibodies, or antigen-binding fragments thereof, that bind to IsdA comprising a heavy chain CDR1 (HCDR1) comprising an amino acid sequence selected from any of the HCDR1 amino acid sequences listed in Table 14, or a substantially similar sequence thereof having at least 90%, at least 95%, at least 98% or at least 99% sequence identity.

The present disclosure also provides antibodies, or antigen-binding fragments thereof, that bind to human IsdA comprising a heavy chain CDR2 (HCDR2) comprising an amino acid sequence selected from any of the HCDR2 amino acid sequences listed in Table 14, or a substantially similar sequence thereof having at least 90%, at least 95%, at least 98% or at least 99% sequence identity.

The present disclosure also provides antibodies, or antigen-binding fragments thereof, that bind to IsdA comprising a heavy chain CDR3 (HCDR3) comprising an amino acid sequence selected from any of the HCDR3 amino acid sequences listed in Table 14, or a substantially similar sequence thereof having at least 90%, at least 95%, at least 98% or at least 99% sequence identity.

The present disclosure also provides antibodies, or antigen-binding fragments thereof, that bind to IsdA comprising a light chain CDR1 (LCDR1) comprising an amino acid sequence selected from any of the LCDR1 amino acid sequences listed in Table 14, or a substantially similar sequence thereof having at least 90%, at least 95%, at least 98% or at least 99% sequence identity.

The present disclosure also provides antibodies, or antigen-binding fragments thereof, that bind to IsdA comprising a light chain CDR2 (LCDR2) comprising an amino acid sequence selected from any of the LCDR2 amino acid sequences listed in Table 14, or a substantially similar sequence thereof having at least 90%, at least 95%, at least 98% or at least 99% sequence identity.

The present disclosure also provides antibodies, or antigen-binding fragments thereof, that bind to IsdA comprising a light chain CDR3 (LCDR3) comprising an amino acid sequence selected from any of the LCDR3 amino acid sequences listed in Table 14, or a substantially similar sequence thereof having at least 90%, at least 95%, at least 98% or at least 99% sequence identity.

The present disclosure also provides antibodies, or antigen-binding fragments thereof, that hind to IsdA comprising an HCDR3 and an LCDR3 pair (HCDR3/LCDR3) comprising any of the HCDR3 amino acid sequences listed in Table 14 paired with any of the LCDR3 amino acid sequences listed in Table 14. According to certain embodiments, the present disclosure provides antibodies, or antigen-binding fragments thereof, comprising an HCDR3/LCDR3 pair contained within any of the exemplary IsdA antibodies listed in Table 14. In certain embodiments, the first antigen-binding domain that specifically binds IsdA comprises a HCDR3/LCDR3 pair comprising amino acid sequences of SEQ ID NOs: 72/16.

The present disclosure also provides antibodies, or antigen-binding fragments thereof, that bind to IsdA comprising a heavy chain CDR1 (HCDR1) comprising an amino acid sequence of SEQ ID NO:68, or a substantially similar sequence thereof having at least 90%, at least 95%, at least 98% or at least 99% sequence identity; a heavy chain CDR2 (HCDR2) comprising an amino acid sequence of SEQ ID NO:70, or a substantially similar sequence thereof having at least 90%, at least 95%, at least 98% or at least 99% sequence identity; and a heavy chain CDR3 (HCDR3) comprising an amino acid sequence of SEQ ID NO:72, or a substantially similar sequence thereof having at least 90%, at least 95%, at least 98% or at least 99% sequence identity. In embodiments, the first antigen-binding domain that specifically binds IsdA comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO:14, or a substantially similar sequence thereof having at least 90%, at least 95%, at least 98% or at least 99% sequence identity; and a light chain CDR3 (LCDR3) comprising an amino acid sequence of SEQ ID NO: 16, or a substantially similar sequence thereof having at least 90%, at least 95%, at least 98% or at least 99% sequence identity.

Certain non-limiting, exemplary antibodies, or antigen-binding fragments thereof, that bind to IsdA comprise a set of six CDRs HCDR1-HCDR2-HCDR3-LCDR1-LCDR2-LCDR3, respectively, the set comprising amino acid sequences of SEQ ID NOs: 68, 70, 72, 12, 14, 16.

In another aspect, the present disclosure provides nucleic acid molecules encoding any of the HCVR, LCVR or CDR sequences of the antibodies, or antigen-binding fragments thereof, that bind to IsdA including nucleic acid molecules comprising the polynucleotide sequences as set forth in Table 15 herein, as well as nucleic acid molecules comprising two or more of the polynucleotide sequences as set forth in Tables 2 and 15 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-IsdA antibodies or portions thereof. For example, the present disclosure provides nucleic acid molecules encoding any of the HCVR amino acid sequences listed in Table 14; in certain embodiments the nucleic acid molecule comprises a polynucleotide sequence selected from any of the HCVR nucleic acid sequences listed in Table 15, or a substantially similar sequence thereof having at least 90%, at least 95%, at least 98% or at least 99% sequence identity thereto.

The present disclosure also provides nucleic acid molecules encoding any of the LCVR amino acid sequences listed in Table 14; in certain embodiments the nucleic acid molecule comprises a polynucleotide sequence selected from any of the LCVR nucleic acid sequences listed in Table 15, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 14; in certain embodiments the nucleic acid molecule comprises a polynucleotide sequence selected from any of the HCDR1 nucleic acid sequences listed in Table 15, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 14; in certain embodiments the nucleic acid molecule comprises a polynucleotide sequence selected from any of the HCDR2 nucleic acid sequences listed in Table 15, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 14; in certain embodiments the nucleic acid molecule comprises a polynucleotide sequence selected from any of the HCDR3 nucleic acid sequences listed in Table 15, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 14; in certain embodiments the nucleic acid molecule comprises a polynucleotide sequence selected from any of the LCDR1 nucleic acid sequences listed in Table 15, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 14; in certain embodiments the nucleic acid molecule comprises a polynucleotide sequence selected from any of the LCDR2 nucleic acid sequences listed in Table 15, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 14; in certain embodiments the nucleic acid molecule comprises a polynucleotide sequence selected from any of the LCDR3 nucleic acid sequences listed in Table 15, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-IsdA antibodies listed in Table 14.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-IsdA antibodies listed in Table 14.

The present disclosure also provides nucleic acid molecules encoding both an HCVR and an LCVR, wherein the HCVR comprises an amino acid sequence of any of the HCVR amino acid sequences listed in Table 14, and wherein the LCVR comprises an amino acid sequence of any of the LCVR amino acid sequences listed in Table 14. In certain embodiments, the nucleic acid molecule comprises a polynucleotide sequence selected from any of the HCVR nucleic acid sequences listed in Table 15, or a substantially similar sequence thereof having at least 90%, at least 95%, at least 98% or at least 99% sequence identity thereto, and a polynucleotide sequence selected from any of the LCVR nucleic acid sequences listed in Table 15, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-IsdA antibody listed in Table 14.

In one embodiment, the antibody or antigen binding fragment thereof specifically binds Protein A. In one embodiment, Protein A comprises amino acids as shown in Genbank Accession No. AGE10362. The anti-Protein A antibodies of the disclosure, or antigen-binding portions thereof, may be included in a bispecific antigen-binding molecule that binds specific target cell types such as infectious agents. In embodiments, the bispecific antigen-binding molecule binds to the *Staphylococcus* species with an $IC_{50}$ of about 10 nM or less.

Exemplary anti-Protein A antibodies of the present disclosure are listed in Tables 12 and 13. Table 12 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-Protein A antibodies. Table 13 sets forth the sequence identifiers of the nucleic acid molecules encoding the HCVRs, LCVRs, HCDR1, HCDR2, HCDR3, LCDR1, LCDR2 and LCDR3 of the exemplary anti-Protein A antibodies.

The present disclosure provides antibodies, or antigen-binding fragments thereof that bind Protein A comprising heavy chain variable region (HCVR) CDRs contained within a HCVR comprising an amino acid sequence of SEQ ID NO: 58, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 12 paired with any of the LCVR amino acid sequences listed in Table 12. According to certain embodiments, the present disclosure provides antibodies, or antigen-binding fragments thereof, comprising an HCVR/LCVR pair contained within any of the exemplary anti-Protein A antibodies listed in Table 12. In certain embodiments, the HCVR/LCVR pair comprises amino acid sequences of SEQ ID NOs: 58/10.

The present disclosure also provides antibodies, or antigen-binding fragments thereof, that bind to Protein A comprising a heavy chain CDR1 (HCDR1) comprising an amino acid sequence selected from any of the HCDR1 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to human Protein A comprising a heavy chain CDR2 (HCDR2) comprising an amino acid sequence selected from any of the HCDR2 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to Protein A comprising a heavy chain CDR3 (HCDR3) comprising an amino acid sequence selected from any of the HCDR3 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to Protein A comprising a light chain CDR1 (LCDR1) comprising an amino acid sequence selected from any of the LCDR1 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to Protein A comprising a light chain CDR2 (LCDR2) comprising an amino acid sequence selected from any of the LCDR2 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to Protein A comprising a light chain CDR3 (LCDR3) comprising an amino acid sequence selected from any of the LCDR3 amino acid sequences listed in Table 12, or a substantially similar sequence thereof having at least 90%, at least 95%, at least 98% or at least 99% sequence identity.

The present disclosure also provides antibodies, or antigen-binding fragments thereof, that bind to Protein A comprising an HCDR3 and an LCDR3 pair (HCDR3/LCDR3) comprising any of the HCDR3 amino acid sequences listed in Table 12 paired with any of the LCDR3 amino acid sequences listed in Table 12. According to certain embodiments, the present disclosure provides antibodies, or antigen-binding fragments thereof, comprising an HCDR3/LCDR3 pair contained within any of the exemplary Protein A antibodies listed in Table 12. In certain embodiments, the first antigen-binding domain that specifically binds Protein A comprises a HCDR3/LCDR3 pair comprising amino acid sequences of SEQ ID NOs: 64/16.

The present disclosure also provides antibodies, or antigen-binding fragments thereof, that bind to Protein A comprising a heavy chain CDR1 (HCDR1) comprising an amino acid sequence of SEQ ID NO:60, or a substantially similar sequence thereof having at least 90%, at least 95%, at least 98% or at least 99% sequence identity; a heavy chain CDR2 (HCDR2) comprising an amino acid sequence of SEQ ID NO:62, or a substantially similar sequence thereof having at least 90%, at least 95%, at least 98% or at least 99% sequence identity; and a heavy chain CDR3 (HCDR3) comprising an amino acid sequence of SEQ ID NO:64, or a substantially similar sequence thereof having at least 90%, at least 95%, at least 98% or at least 99% sequence identity. In embodiments, the first antigen-binding domain that specifically binds Protein A comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO: 14, or a substantially similar sequence thereof having at least 90%, at least 95%, at least 98% or at least 99% sequence identity; and a light chain CDR3 (LCDR3) comprising an amino acid sequence of SEQ ID NO: 16, or a substantially similar sequence thereof having at least 90%, at least 95%, at least 98% or at least 99% sequence identity.

Certain non-limiting, exemplary antibodies, or antigen-binding fragments thereof, that bind to Protein A comprise a set of six CDRs HCDR1-HCDR2-HCDR3-LCDR1-LCDR2-LCDR3, respectively, the set comprising amino acid sequences of SEQ ID NOs: 60, 62, 64, 12, 14, 16.

In another aspect, the present disclosure provides nucleic acid molecules encoding any of the HCVR, LCVR or CDR sequences of the antibodies, or antigen-binding fragments thereof, that bind to Protein A including nucleic acid molecules comprising the polynucleotide sequences as set forth in Table 13 herein, as well as nucleic acid molecules comprising two or more of the polynucleotide sequences as set forth in Tables 2 and 13 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-Protein A antibodies or portions thereof. For example, the present disclosure provides nucleic acid molecules encoding any of the HCVR amino acid sequences listed in Table 12; in certain embodiments the nucleic acid molecule comprises a polynucleotide sequence selected from any of the HCVR nucleic acid sequences listed in Table 13, or a substantially similar sequence thereof having at least 90%, at least 95%, at least 98% or at least 99% sequence identity thereto.

The present disclosure also provides nucleic acid molecules encoding any of the LCVR amino acid sequences listed in Table 12; in certain embodiments the nucleic acid molecule comprises a polynucleotide sequence selected from any of the LCVR nucleic acid sequences listed in Table 13, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 12; in certain embodiments the nucleic acid molecule comprises a polynucleotide sequence selected from any of the HCDR1 nucleic acid sequences listed in Table 13, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 12; in certain embodiments the nucleic acid molecule comprises a polynucleotide sequence selected from any of the HCDR2 nucleic acid sequences listed in Table 13, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 12; in certain embodiments the nucleic acid molecule comprises a polynucleotide sequence selected from any of the HCDR3 nucleic acid sequences listed in Table 13, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 12; in certain embodiments the nucleic acid molecule comprises a polynucleotide sequence selected from any of the LCDR1 nucleic acid sequences listed in Table 13, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 12; in certain embodiments the nucleic acid molecule comprises a polynucleotide sequence selected from any of the LCDR2 nucleic acid sequences listed in Table 13, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 12; in certain embodiments the nucleic acid molecule comprises a polynucleotide sequence selected from any of the LCDR3 nucleic acid sequences listed in Table 13, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-Protein A antibodies listed in Table 12.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-Protein A antibodies listed in Table 12.

The present disclosure also provides nucleic acid molecules encoding both an HCVR and an LCVR, wherein the HCVR comprises an amino acid sequence of any of the HCVR amino acid sequences listed in Table 12, and wherein the LCVR comprises an amino acid sequence of any of the LCVR amino acid sequences listed in Table 12. In certain embodiments, the nucleic acid molecule comprises a polynucleotide sequence selected from any of the HCVR nucleic acid sequences listed in Table 13, or a substantially similar sequence thereof having at least 90%, at least 95%, at least 98% or at least 99% sequence identity thereto, and a polynucleotide sequence selected from any of the LCVR nucleic acid sequences listed in Table 13, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-Protein A antibody listed in Table 13.

In one embodiment, the antibody or antigen binding fragment thereof specifically binds PNAG. In one embodiment, the PNAG antigen comprises a capsular extract obtained as described by Cramton et. al., Infect. Immun. 2001.69:4079. The anti-PNAG antibodies of the disclosure, or antigen-binding portions thereof, may be included in a bispecific antigen-binding molecule that binds specific target cell types such as infectious agents. In embodiments, the bispecific antigen-binding molecule binds to the *Staphylococcus* species with an $IC_{50}$ of about 10 nM or less.

Exemplary anti-PNAG antibodies of the present disclosure are described in U.S. Pat. No. 7,786,255. Exemplary antibodies are also listed in Table 16. Table 16 sets forth the amino acid sequence identifiers of the heavy chain (HC) and light chain (LC) of the exemplary anti-PNAG antibodies.

The present disclosure provides antibodies, or antigen-binding fragments thereof that bind PNAG comprising heavy chain variable region (HCVR) CDRs contained within a HC comprising an amino acid sequence of SEQ ID NO: 76, or a substantially similar sequence thereof having at least 90%, at least 95%, at least 98%, or at least 99% sequence identity thereto; and light chain variable region (LCVR) CDRs contained within a LC comprising an amino acid sequence of SEQ ID NO: 77, or a substantially similar sequence thereof having at least 90%, at least 95%, at least 98%, or at least 99% sequence identity thereto. In embodiments, the antibody or antigen-binding fragment thereof comprises HCVR CDRs contained within a HCVR comprising an amino acid sequence of amino acids 1-118 of SEQ ID NO:76, or a substantially similar sequence thereof having at least 90%, at least 91%, at least 92%, at least 93%, at least 94%, at least 95%, at least 96%, at least 97%, at least 98%, or at least 99% sequence identity thereto; and LCVR CDRs contained within a LCVR region comprising an amino acid sequence of amino acids 1-108 of SEQ ID NO: 77, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences contained within the HC sequence listed in Table 16 paired with any of the LCVR amino acid sequences contained within the LC sequence listed in Table 16. According to certain embodiments, the present disclosure provides antibodies, or antigen-binding fragments thereof, comprising an HCVR/LCVR pair contained within any of the exemplary anti-PNAG antibodies listed in Table 16. In certain embodiments, the HCVR/LCVR pair comprises amino acid sequences contained within the HC/LC of SEQ ID NOs: 76/77.

In another aspect, the present disclosure provides nucleic acid molecules encoding any of the HCVR or LCVR sequences of the antibodies, or antigen-binding fragments thereof, that bind to PNAG. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-PNAG antibodies or portions thereof. For example, the present disclosure also provides nucleic acid molecules encoding both an HCVR and an LCVR, wherein the HCVR comprises an amino acid sequence contained within the HC amino acid sequence listed in Table 16, and wherein the LCVR comprises an amino acid sequence contained within the LC amino acid sequence listed in Table 16. In certain embodiments according to this aspect of the disclosure, the nucleic acid molecule encodes an HCVR and LCVR, wherein the HCVR and LCVR are both derived from the same anti-PNAG antibody listed in Table 16.

In one embodiment, the antibody or antigen binding fragment thereof specifically binds C1fA. An embodiment of the antigen comprises amino acids as shown in Genbank Accession No. RUQ 57133. The anti-C1fA antibodies of the disclosure, or antigen-binding portions thereof, may be included in a bispecific antigen-binding molecule that binds specific target cell types such as infectious agents. In embodiments, the bispecific antigen-binding molecule binds to the *Staphylococcus* species with an $IC_{50}$ of about 10 nM or less.

Exemplary antibodies are described in U.S. Publication No. US2003/0099656. Exemplary anti-C1fA antibodies of the present disclosure are listed in Table 17. Table 17 sets forth the amino acid sequence identifiers of the heavy chain (HC) and light chain (LC) of the exemplary anti-C1fA antibodies.

The present disclosure provides antibodies, or antigen-binding fragments thereof that bind C1fA comprising heavy chain variable region (HCVR) CDRs contained within a HC amino acid sequence of SEQ ID NO: 73, or a substantially similar sequence thereof having at least 90%, at least 95%, at least 98%, or at least 99% sequence identity thereto; and light chain variable region (LCVR) CDRs contained within a LC amino acid sequence of SEQ ID NO: 74, or a substantially similar sequence thereof having at least 90%, at least 95%, at least 98%, or at least 99% sequence identity thereto. In embodiments, the antibody or antigen-binding fragment thereof comprises HCVR CDRs contained within a HCVR comprising an amino acid sequence of amino acids 1-118 of SEQ ID NO:73, or a substantially similar sequence thereof having at least 90%, at least 91%, at least 92%, at least 93%, at least 94%, at least 95%, at least 96%, at least 97%, at least 98%, or at least 99% sequence identity thereto; and LCVR CDRs contained within a LCVR region comprising an amino acid sequence of amino acids 1-108 of SEQ ID NO: 74, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences contained within the HC listed in Table 17 paired with any of the LCVR amino acid sequences contained within the LC listed in Table 17. According to certain embodiments, the present disclosure provides antibodies, or antigen-binding fragments thereof, comprising an HCVR/LCVR pair contained within any of the exemplary anti-C1fA antibodies listed in Table 17. In certain embodiments, the HCVR/LCVR pair comprises amino acid sequences contained within the HC/LC of SEQ ID NOs: 73/74.

In another aspect, the present disclosure provides nucleic acid molecules encoding any of the HCVR or LCVR sequences of the antibodies, or antigen-binding fragments thereof that bind to C1fA. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-C1fA antibodies or portions thereof. For example, the present disclosure also provides nucleic acid molecules encoding both an HCVR and an LCVR, wherein the HCVR comprises an amino acid sequence contained within the HC of the amino acid sequence listed in Table 17, and wherein the LCVR comprises an amino acid sequence contained within the LC amino acid sequence listed in Table 17. In certain embodiments according to this aspect of the disclosure, the nucleic acid molecule encodes an HCVR and LCVR, wherein the HCVR and LCVR are both derived from the same anti-C1fA antibody listed in Table 17.

The present disclosure also provides recombinant expression vectors capable of expressing a polypeptide comprising a heavy or light chain variable region of any of the antibodies described herein. For example, the present disclosure includes recombinant expression vectors comprising any of the nucleic acid molecules mentioned above, i.e., nucleic acid molecules encoding any of the HCVR or LCVR sequences as set forth in Tables 3, 12, 14, 16, or 17. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes antibodies as described herein having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

B. *Pseudomonas* Target Antigens

In another aspect, the present disclosure provides binding molecules, e.g., antibodies and antigen-binding fragments thereof, that bind a *Pseudomonas* species target antigen (e.g. a monospecific antibody to a *Pseudomonas* species target antigen). In embodiments, the *Pseudomonas* species is a species that causes an infection in humans, such as but not limited to *Pseudomonas aeruginosa* PAO-1. In embodiments, the *Pseudomonas* species target antigen comprises an extracellular polysaccharide such as but not limited to Ps1. In embodiments, the *Pseudomonas* species target antigen comprises Ps1. other *Pseudomonas* target antigens, or combinations thereof. An embodiment of the Ps1 antigen comprises a polysaccharide as described by Byrd et. al. Mol. Microb. 2009. 73:622. In one embodiment, the antibody or antigen binding fragment thereof specifically binds Ps1.

Exemplary anti-Ps1 antibodies are described in WO2012/170807, incorporated by reference herein. The anti-Ps1 antibodies of the disclosure, or antigen-binding portions thereof, may be included in a bispecific antigen-binding molecule that binds specific target cell types such as infectious agents. In embodiments, the bispecific antigen-binding molecule binds to the *Pseudomonas* species with an IC$_{50}$ of about 10 nM or less.

Exemplary anti-Ps1 antibodies of the present disclosure are listed in Table 11. Table 11 sets forth the amino acid sequence identifiers of the heavy chain (HC) and light chain (LC) of an exemplary anti-Ps1 antibody. The present disclosure provides antibodies, or antigen-binding fragments thereof that bind Ps1 comprising heavy chain variable region (HCVR) CDRs contained within a HCVR comprising an amino acid sequence of amino acids 1-118 of SEQ TD NO:78, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of amino acids 1-108 of SEQ ID NO: 79, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences contained within the HC listed in Table 11 paired with any of the LCVR amino acid sequences contained within the LC listed in Table 11. According to certain embodiments, the present disclosure provides antibodies, or antigen-binding fragments thereof, comprising an HCVR/LCVR pair contained within the HC/LC of the exemplary anti-Ps1 antibodies listed in Table 11. In certain embodiments, the HCVR/LCVR pair comprises amino acid sequences contained within the HC/LC pair of SEQ ID NOs: 78 (amino acids 1-118)/79 (amino acids 1-108).

The present disclosure also provides antibodies, or antigen-binding fragments thereof, that bind to Ps1 comprising a heavy chain CDR1 (HCDR1) comprising an amino acid sequence selected from any of the HCDR1 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to human Ps1 comprising a heavy chain CDR2 (HCDR2) comprising an amino acid sequence selected from any of the HCDR2 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to Ps1 comprising a heavy chain CDR3 (HCDR3) comprising an amino acid sequence selected from any of the HCDR3 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to Ps1 comprising a light chain CDR1 (LCDR1) comprising an amino acid sequence selected from any of the LCDR1 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to Ps1 comprising a light chain CDR2 (LCDR2) comprising an amino acid sequence selected from any of the LCDR2 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to Ps1 comprising a light chain CDR3 (LCDR3) comprising an amino acid sequence selected from any of the LCDR3 amino acid sequences listed in Table 11, or a substantially similar sequence thereof having at least 90%, at least 95%, at least 98% or at least 99% sequence identity.

The present disclosure also provides antibodies, or antigen-binding fragments thereof, that bind to Ps1 comprising an HCDR3 and an LCDR3 pair (HCDR3/LCDR3) comprising any of the HCDR3 amino acid sequences listed in Table 11 paired with any of the LCDR3 amino acid sequences listed in Table 11. According to certain embodiments, the present disclosure provides antibodies, or antigen-binding fragments thereof, comprising an HCDR3/LCDR3 pair contained within any of the exemplary Ps1 antibodies listed in Table 11. In certain embodiments, the first antigen-binding domain that specifically binds Ps1 comprises a HCDR3/LCDR3 pair comprising amino acid sequences of SEQ ID NOs:78 (amino acids 98-109)/79 (amino acids 88-99).

The present disclosure also provides antibodies, or antigen-binding fragments thereof, that bind to Ps1 comprising a heavy chain CDR1 (HCDR1) comprising an amino acid sequence of amino acids 31-35 of SEQ ID NO:78, or a substantially similar sequence thereof having at least 90%, at least 95%, at least 98% or at least 99% sequence identity; a heavy chain CDR2 (HCDR2) comprising an amino acid sequence of amino acids 50-65 of SEQ ID NO:78 or a substantially similar sequence thereof having at least 90%, at least 95%, at least 98% or at least 99% sequence identity; and a heavy chain CDR3 (HCDR3) comprising an amino acid sequence of amino acids 98-109 of SEQ ID NO:78, or a substantially similar sequence thereof having at least 90%, at least 95%, at least 98% or at least 99% sequence identity. In embodiments, the first antigen-binding domain that specifically binds Ps1 comprises a light chain CDR1 (LCDR1) comprising an amino acid sequence of amino acids 23-33 of SEQ ID NO:79, or a substantially similar sequence thereof having at least 90%, at least 95%, at least 98% or at least 99% sequence identity; a light chain CDR2 (LCDR2) comprising an amino acid sequence of amino acids 49-55 of SEQ ID NO:79 or a substantially similar sequence thereof having at least 90%, at least 95%, at least 98% or at least 99% sequence identity; and a light chain CDR3 (LCDR3) comprising an amino acid sequence of amino acids 88-99 of SEQ ID NO:79 or a substantially similar sequence thereof having at least 90%, at least 95%, at least 98% or at least 99% sequence identity.

Certain non-limiting, exemplary antibodies, or antigen-binding fragments thereof, that bind to Ps1 comprise a set of six CDRs HCDR1-HCDR2-HCDR3-LCDR1-LCDR2-LCDR3, respectively, the set comprising amino acid sequences of SEQ ID NOs:78 (amino acids 31-35)/78 (amino acids 50-65)/78 (amino acids 98-109)/79 (amino acids 23-33)/79 (amino acids 49-55)/79 (amino acids 88-99).

In another aspect, the present disclosure provides nucleic acid molecules encoding any of the HCVR, LCVR or CDR sequences of the antibodies, or antigen-binding fragments thereof, that bind to Ps1. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-Ps1 antibodies or portions thereof. For example, the present disclosure provides nucleic acid molecules encoding any of the HCVR amino acid sequences listed in Table 11.

The present disclosure also provides nucleic acid molecules encoding both an HCVR and an LCVR, wherein the HCVR comprises an amino acid sequence contained within the HC amino acid sequences listed in Table 11, and wherein the LCVR comprises an amino acid sequence contained within the LC amino acid sequences listed in Table 11. In certain embodiments according to this aspect of the disclosure, the nucleic acid molecule encodes an HCVR and LCVR, wherein the HCVR and LCVR are both derived from the same anti-Ps1 antibody listed in Table 11.

The present disclosure also provides recombinant expression vectors capable of expressing a polypeptide comprising a heavy or light chain variable region of an anti-Ps1 antibody. For example, the present disclosure includes recombinant expression vectors comprising any of the nucleic acid molecules mentioned above, i.e., nucleic acid molecules encoding any of the HCVR, LCVR, and/or CDR sequences contained within the HC and LC as set forth in Table 11. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes anti-Ps1 antibodies having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

C. Virus Target Antigens

In another aspect, the present disclosure provides binding molecules, e.g., antibodies and antigen-binding fragments thereof, that bind a virus target antigen. Exemplary viruses that can be targeted include, but are not limited to, influenza virus, smallpox virus, hepatitis virus (e.g., hepatitis A, hepatitis B, or hepatitis C virus), human papillomavirus, human immunodeficiency virus (HIV), respiratory syncytial virus (RSV), herpesvirus, coronavirus, cowpox virus, coxsackievirus, Ebola virus, Epstein-Barr virus, measles virus, mumps virus, rubella virus, rotavirus, rabies virus, yellow fever virus, meningitis, poliovirus, rotavirus, vaccinia virus, varicella-zoster virus, variola virus, and Zika virus. In some embodiments, the target antigen is a viral glycoprotein.

In some embodiments the present disclosure provides antibodies and antigen-binding fragments thereof that bind an Influenza virus target antigen (e.g. a monospecific antibody to an Influenza virus target antigen). In embodiments, the Influenza virus antigen is a species that causes an infection in humans, including but not limited to Influenza A, Influenza B, Influenza C, and Influenza D. In embodiments, the Influenza virus target antigen comprises Influenza HA, other Influenza virus target antigens, or combinations thereof. An embodiment of the antigen comprises amino acids as shown in Genbank AAP34324. An example of the amino acid sequence of an Influenza HA antigen, identified as H1N1 Ecto foldon-foldon-Bir-His6, is amino acids 1 to 519 of Genbank AAP34324 with an amino acid substitution at position 108 of a Phe (F) for a Tyr (Y) having the amino acid sequence of SEQ ID NO: 81. Exemplary anti-HA antibodies are described in U.S. Ser. No. 14/974,361 having Publication No. 2016/0176953.

The anti-Influenza HA antibodies of the disclosure, or antigen-binding portions thereof, may be included in a bispecific antigen-binding molecule that binds specific target cell types such as infectious agents. In embodiments, the bispecific antigen-binding molecule binds to the Influenza HA with an $IC_{50}$ of about 10 nM or less.

Exemplary anti-Influenza HA antibodies of the present disclosure are listed in Tables 7 and 8. Table 7 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-Influenza HA antibodies. Table 8 sets forth the sequence identifiers of the nucleic acid molecules encoding the HCVRs, LCVRs, HCDR1, HCDR2, HCDR3, LCDR1, LCDR2 and LCDR3 of the exemplary anti-Influenza HA antibodies.

The present disclosure provides antibodies, or antigen-binding fragments thereof that bind Influenza HA comprising heavy chain variable region (HCVR) CDRs contained within a HCVR comprising an amino acid sequence of SEQ ID NO: 42, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 7 paired with any of the LCVR amino acid sequences listed in Table 7. According to certain embodiments, the present disclosure provides antibodies, or antigen-binding fragments thereof, comprising an HCVR/LCVR pair contained within any of the exemplary anti-Influenza HA antibodies listed in Table 7. In certain embodiments, the HCVR/LCVR pair comprises amino acid sequences of SEQ ID NOs: 42/10.

The present disclosure also provides antibodies, or antigen-binding fragments thereof, that bind to Influenza HA comprising a heavy chain CDR1 (HCDR1) comprising an amino acid sequence selected from any of the HCDR1 amino acid sequences listed in Table 7, or a substantially similar sequence thereof having at least 90%, at least 95%, at least 98% or at least 99% sequence identity.

The present disclosure also provides antibodies, or antigen-binding fragments thereof, that bind to human Influenza HA comprising a heavy chain CDR2 (HCDR2) comprising an amino acid sequence selected from any of the HCDR2 amino acid sequences listed in Table 7, or a substantially similar sequence thereof having at least 90%, at least 95%, at least 98% or at least 99% sequence identity.

The present disclosure also provides antibodies, or antigen-binding fragments thereof, that bind to Influenza HA comprising a heavy chain CDR3 (HCDR3) comprising an amino acid sequence selected from any of the HCDR3 amino acid sequences listed in Table 7, or a substantially similar sequence thereof having at least 90%, at least 95%, at least 98% or at least 99% sequence identity.

The present disclosure also provides antibodies, or antigen-binding fragments thereof, that bind to Influenza HA comprising a light chain CDR1 (LCDR1) comprising an amino acid sequence selected from any of the LCDR1 amino acid sequences listed in Table 7, or a substantially similar sequence thereof having at least 90%, at least 95%, at least 98% or at least 99% sequence identity.

The present disclosure also provides antibodies, or antigen-binding fragments thereof, that bind to Influenza HA comprising a light chain CDR3 (LCDR3) comprising an amino acid sequence selected from any of the LCDR3 amino acid sequences listed in Table 7, or a substantially similar sequence thereof having at least 90%, at least 95%, at least 98% or at least 99% sequence identity.

The present disclosure also provides antibodies, or antigen-binding fragments thereof, that bind to Influenza HA comprising an HCDR3 and an LCDR3 pair (HCDR3/LCDR3) comprising any of the HCDR3 amino acid sequences listed in Table 7 paired with any of the LCDR3 amino acid sequences listed in Table 7. According to certain embodiments, the present disclosure provides antibodies, or antigen-binding fragments thereof, comprising an HCDR3/LCDR3 pair contained within any of the exemplary Influenza HA antibodies listed in Table 7. In certain embodiments, the first antigen-binding domain that specifically binds Influenza HA comprises a HCDR3/LCDR3 pair comprising amino acid sequences of SEQ ID NOs: 48/16.

The present disclosure also provides antibodies, or antigen-binding fragments thereof, that bind to Influenza HA comprising a heavy chain CDR1 (HCDR1) comprising an amino acid sequence of SEQ ID NO:44, or a substantially similar sequence thereof having at least 90%, at least 95%, at least 98% or at least 99% sequence identity; a heavy chain CDR2 (HCDR2) comprising an amino acid sequence of SEQ ID NO:46 or a substantially similar sequence thereof having at least 90%, at least 95%, at least 98% or at least 99% sequence identity; and a heavy chain CDR3 (HCDR3) comprising an amino acid sequence of SEQ ID NO:48, or a substantially similar sequence thereof having at least 90%, at least 95%, at least 98% or at least 99% sequence identity. In embodiments, the first antigen-binding domain that specifically binds Influenza HA comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO: 14, or a substantially similar sequence thereof having at least 90%, at least 95%, at least 98% or at least 99% sequence identity; and a light chain CDR3 (LCDR3) comprising an amino acid sequence of SEQ ID NO: 16, or a substantially similar sequence thereof having at least 90%, at least 95%, at least 98% or at least 99% sequence identity.

Certain non-limiting, exemplary antibodies, or antigen-binding fragments thereof, that bind to Influenza HA comprise a set of six CDRs HCDR1-HCDR2-HCDR3-LCDR1-LCDR2-LCDR3, respectively, the set comprising amino acid sequences of SEQ ID NOs:44/46/48/12/14/16.

In another aspect, the present disclosure provides nucleic acid molecules encoding any of the HCVR, LCVR or CDR sequences of the antibodies, or antigen-binding fragments thereof, that bind to Influenza HA including nucleic acid molecules comprising the polynucleotide sequences as set forth in Table 8 herein, as well as nucleic acid molecules comprising two or more of the polynucleotide sequences as set forth in Tables 2 and 8 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-Influenza HA antibodies or portions thereof. For example, the present disclosure provides nucleic acid molecules encoding any of the HCVR amino acid sequences listed in Table 7; in certain embodiments the nucleic acid molecule comprises a polynucleotide sequence selected from any of the HCVR nucleic acid sequences listed in Table 8, or a substantially similar sequence thereof having at least 90%, at least 95%, at least 98% or at least 99% sequence identity thereto.

The present disclosure also provides nucleic acid molecules encoding any of the LCVR amino acid sequences listed in Table 7; in certain embodiments the nucleic acid molecule comprises a polynucleotide sequence selected from any of the LCVR nucleic acid sequences listed in Table 8, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 7; in certain embodiments the nucleic acid molecule comprises a polynucleotide sequence selected from any of the HCDR1 nucleic acid sequences listed in Table 8, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 7; in certain embodiments the nucleic acid molecule comprises a polynucleotide sequence selected from any of the HCDR2 nucleic acid sequences listed in Table 8, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 7; in certain embodiments the nucleic acid molecule comprises a polynucleotide sequence selected from any of the HCDR3 nucleic acid sequences listed in Table 8, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 7; in certain embodiments the nucleic acid molecule comprises a polynucleotide sequence selected from any of the LCDR1 nucleic acid sequences listed in Table 8, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 7; in certain embodiments the nucleic acid molecule comprises a polynucleotide sequence selected from any of the LCDR2 nucleic acid sequences listed in Table 8, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 7; in certain embodiments the nucleic acid molecule comprises a polynucleotide sequence selected from any of the LCDR3 nucleic acid sequences listed in Table 8, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-Influenza HA antibodies listed in Table 7.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-Influenza HA antibodies listed in Table 7.

The present disclosure also provides nucleic acid molecules encoding both an HCVR and an LCVR, wherein the HCVR comprises an amino acid sequence of any of the HCVR amino acid sequences listed in Table 7, and wherein the LCVR comprises an amino acid sequence of any of the LCVR amino acid sequences listed in Table 7. In certain embodiments, the nucleic acid molecule comprises a polynucleotide sequence selected from any of the HCVR nucleic acid sequences listed in Table 8, or a substantially similar sequence thereof having at least 90%, at least 95%, at least 98% or at least 99% sequence identity thereto, and a polynucleotide sequence selected from any of the LCVR nucleic acid sequences listed in Table 8, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-Influenza HA antibody listed in Table 7.

The present disclosure also provides recombinant expression vectors capable of expressing a polypeptide comprising a heavy or light chain variable region of an anti-Influenza HA antibody. For example, the present disclosure includes recombinant expression vectors comprising any of the nucleic acid molecules mentioned above, i.e., nucleic acid molecules encoding any of the HCVR, LCVR, and/or CDR sequences as set forth in Table 7. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes anti-Influenza HA antibodies having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

D. Cancer Cell Target Antigens

In another aspect, the present disclosure provides binding molecules, e.g., antibodies and antigen-binding fragments thereof, that bind a cancer cell surface antigen (e.g. a monospecific antibody to a cancer-cell surface target antigen). In embodiments, the cancer cell surface target antigen comprises CD20, other cancer cell surface target antigens such as tumor-specific antigens, or combinations thereof. An embodiment of the antigen comprises amino acids as shown in Genbank NP_690605.

Exemplary anti-CD20 antibodies are described in U.S. Pat. No. 9,657,102, US Publication No. 2015/0266966, and US Publication No. 2018/0194841, incorporated by reference herein. In one embodiment, the antibody or antigen binding fragment thereof specifically binds CD20. The anti-CD20 antibodies of the disclosure, or antigen-binding portions thereof, may be included in a bispecific antigen-binding molecule that binds specific target cell types such as infectious agents. In embodiments, the bispecific antigen-binding molecule binds to the CD20 with an $IC_{50}$ of about 10 nM or less.

Exemplary anti-CD20 antibodies of the present disclosure are listed in Tables 5 and 6. Table 5 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-CD20 antibodies. Table 6 sets forth the sequence identifiers of the nucleic acid molecules encoding the HCVRs, LCVRs, HCDR1, HCDR2, HCDR3, LCDR1, LCDR2 and LCDR3 of the exemplary anti-CD20 antibodies.

The present disclosure provides antibodies, or antigen-binding fragments thereof that bind CD20 comprising heavy chain variable region (HCVR) CDRs contained within a HCVR comprising an amino acid sequence of SEQ ID NO: 34, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 5 paired with any of the LCVR amino acid sequences listed in Table 5. According to certain embodiments, the present disclosure provides antibodies, or antigen-binding fragments thereof, comprising an HCVR/LCVR pair contained within any of the exemplary anti-CD20 antibodies listed in Table 5. In certain embodiments, the HCVR/LCVR pair comprises amino acid sequences of SEQ ID Nos: 34/10.

The present disclosure also provides antibodies, or antigen-binding fragments thereof, that bind to CD20 comprising a heavy chain CDR1 (HCDR1) comprising an amino acid sequence selected from any of the HCDR1 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to human CD20 comprising a heavy chain CDR2 (HCOR2) comprising an amino acid sequence selected from any of the HCDR2 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to CD20 comprising a heavy chain CDR3 (HCDR3) comprising an amino acid sequence selected from any of the HCDR3 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to CD20 comprising a light chain CDR1 (LCDR1) comprising an amino acid sequence selected from any of the LCDR1 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to CD20 comprising a light chain CDR2 (LCDR2) comprising an amino acid sequence selected from any of the LCDR2 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to CD20 comprising a light chain CDR3 (LCDR3) comprising an amino acid sequence selected from any of the LCDR3 amino acid sequences listed in Table 5, or a substantially similar sequence thereof having at least 90%, at least 95%, at least 98% or at least 99% sequence identity.

The present disclosure also provides antibodies, or antigen-binding fragments thereof, that bind to CD20 comprising an HCDR3 and an LCDR3 pair (HCDR3/LCDR3) comprising any of the HCDR3 amino acid sequences listed in Table 5 paired with any of the LCDR3 amino acid sequences listed in Table 5. According to certain embodiments, the present disclosure provides antibodies, or antigen-binding fragments thereof, comprising an HCDR3/LCDR3 pair contained within any of the exemplary CD20 antibodies listed in Table 5. In certain embodiments, the first antigen-binding domain that specifically binds CD20 comprises a HCDR3/LCDR3 pair comprising amino acid sequences of SEQ ID NOs: 40/16.

The present disclosure also provides antibodies, or antigen-binding fragments thereof, that bind to CD20 comprising a heavy chain CDR1 (HCDR1) comprising an amino acid sequence of SEQ ID NO:36, or a substantially similar sequence thereof having at least 90%, at least 95%, at least 98% or at least 99% sequence identity; a heavy chain CDR2 (HCDR2) comprising an amino acid sequence of SEQ ID NO:38, or a substantially similar sequence thereof having at least 90%, at least 95%, at least 98% or at least 99% sequence identity; and a heavy chain CDR3 (HCDR3) comprising an amino acid sequence of SEQ ID NO:40, or a substantially similar sequence thereof having at least 90%, at least 95%, at least 98% or at least 99% sequence identity. In embodiments, the first antigen-binding domain that specifically binds CD20 comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO:14, or a substantially similar sequence thereof having at least 90%, at least 95%, at least 98% or at least 99% sequence identity; and a light chain CDR3 (LCDR3) comprising an amino acid sequence of SEQ ID NO: 16, or a substantially similar sequence thereof having at least 90%, at least 95%, at least 98% or at least 99% sequence identity.

Certain non-limiting, exemplary antibodies, or antigen-binding fragments thereof, that bind to CD20 comprise a set of six CDRs HCDR1-HCDR2-HCDR3-LCDR1-LCDR2-LCDR3, respectively, the set comprising amino acid sequences of SEQ ID NOs:36/38/40/12/14/16.

In another aspect, the present disclosure provides nucleic acid molecules encoding any of the HCVR, LCVR or CDR sequences of the antibodies, or antigen-binding fragments thereof, that bind to CD20 including nucleic acid molecules comprising the polynucleotide sequences as set forth in Table 6 herein, as well as nucleic acid molecules comprising two or more of the polynucleotide sequences as set forth in Tables 2 and 6 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-CD20 antibodies or portions thereof. For example, the present disclosure provides nucleic acid molecules encoding any of the HCVR amino acid sequences listed in Table 5; in certain embodiments the nucleic acid molecule comprises a polynucleotide sequence selected from any of the HCVR nucleic acid sequences listed in Table 6, or a substantially similar sequence thereof having at least 90%, at least 95%, at least 98% or at least 99% sequence identity thereto.

The present disclosure also provides nucleic acid molecules encoding any of the LCVR amino acid sequences listed in Table 5; in certain embodiments the nucleic acid molecule comprises a polynucleotide sequence selected from any of the LCVR nucleic acid sequences listed in Table 6, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 5; in certain embodiments the nucleic acid molecule comprises a polynucleotide sequence selected from any of the HCDR1 nucleic acid sequences listed in Table 6, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 5; in certain embodiments the nucleic acid molecule comprises a polynucleotide sequence selected from any of the HCDR2 nucleic acid sequences listed in Table 6, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 5; in certain embodiments the nucleic acid molecule comprises a polynucleotide sequence selected from any of the HCDR3 nucleic acid sequences listed in Table 6, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 5; in certain embodiments the nucleic acid molecule comprises a polynucleotide sequence selected from any of the LCDR1 nucleic acid sequences listed in Table 6, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 5; in certain embodiments the nucleic acid molecule comprises a polynucleotide sequence selected from any of the LCDR2 nucleic acid sequences listed in Table 6, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 5; in certain embodiments the nucleic acid molecule comprises a polynucleotide sequence selected from any of the LCDR3 nucleic acid sequences listed in Table 6, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-CD20 antibodies listed in Table 5.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-CD20 antibodies listed in Table 5.

The present disclosure also provides nucleic acid molecules encoding both an HCVR and an LCVR, wherein the HCVR comprises an amino acid sequence of any of the HCVR amino acid sequences listed in Table 5, and wherein the LCVR comprises an amino acid sequence of any of the LCVR amino acid sequences listed in Table 5. In certain embodiments, the nucleic acid molecule comprises a polynucleotide sequence selected from any of the HCVR nucleic acid sequences listed in Table 6, or a substantially similar sequence thereof having at least 90%, at least 95%, at least 98% or at least 99% sequence identity thereto, and a polynucleotide sequence selected from any of the LCVR nucleic acid sequences listed in Table 6, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-CD20 antibody listed in Table 5.

The present disclosure also provides recombinant expression vectors capable of expressing a polypeptide comprising a heavy or light chain variable region of an anti-CD20 antibody. For example, the present disclosure includes recombinant expression vectors comprising any of the nucleic acid molecules mentioned above, i.e., nucleic acid molecules encoding any of the HCVR, LCVR, and/or CDR sequences as set forth in Table 5. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes anti-CD20 antibodies having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

E. Immune Cell Target Antigens

In another aspect, the present disclosure provides binding molecules, e.g., antibodies and antigen-binding fragments thereof, that target an antigen that is expressed on an immune cell (e.g., a target antigen expressed on B cells, dendritic cells, granulocytes, lymphoid cells, monocytes, macrophages, T cells, or thymocytes). For example, in some embodiments, the binding molecule, e.g., antibody or antigen-binding fragment thereof, binds to a target antigen that is expressed on the surface of T cells or a subset of T cells, such as glucocorticoid induced tumor necrosis factor receptor (GITR).

In embodiments, the present disclosure provides antibodies and antigen-binding fragments thereof that bind a glucocorticoid induced tumor necrosis factor receptor (e.g. a monospecific antibody to a tumor necrosis factor receptor antigen). An embodiment of the antigen comprises amino acids as shown in Genbank NP_683700. Another embodiment of GITR, identified as hGITR.mmm, has amino acids Gln (Q) at position 26 to Pro (P) at position 162 of the sequence of Accession No. NP_683700 shown in SEQ ID NO: 82 and mmh domain of amino acids 136-165 of SEQ ID NO: 82. In embodiments, the tumor necrosis factor receptor antigen comprises glucocorticoid-induced TNFR-related gene ("GITR"), other tumor necrosis factor receptor target antigens or antigens on the surface of T cells, or combinations thereof.

Exemplary anti-GITR antibodies are described in U.S. Ser. No. 15/619,068 having publication number US2017/0355774, incorporated by reference herein. The anti-G1TR antibodies of the disclosure, or antigen-binding portions thereof, may be included in a bispecific antigen-binding molecule that binds specific target cell types such as infectious agents. In embodiments, the bispecific antigen-binding molecule binds to the GITR with an $IC_{50}$ of about 10 nM or less.

Exemplary anti-GITR antibodies of the present disclosure are listed in Tables 9 and 10. Table 9 sets forth the amino acid sequence identifiers of the heavy chain variable regions (HCVRs) and light chain variable regions (LCVRs), as well as heavy chain complementarity determining regions (HCDR1, HCDR2 and HCDR3), and light chain complementarity determining regions (LCDR1, LCDR2 and LCDR3) of the exemplary anti-GITR antibodies. Table 10 sets forth the sequence identifiers of the nucleic acid molecules encoding the HCVRs, LCVRs, HCDR1, HCDR2, HCDR3, LCDR1, LCDR2 and LCDR3 of the exemplary anti-GITR antibodies.

The present disclosure provides antibodies, or antigen-binding fragments thereof that bind GITR comprising heavy chain variable region (HCVR) CDRs contained within a HCVR comprising an amino acid sequence of SEQ ID NO: 50, or a substantially similar sequence thereof having at least 90%, at least 91%, at least 92%, at least 93%, at least 94%, at least 95%, at least 96%, at least 97%, at least 98%, or at least 99% sequence identity thereto; and light chain variable region (LCVR) CDRs contained within a LCVR region comprising an amino acid sequence of SEQ ID NO: 10, or a substantially similar sequence thereof having at least 90%, at least 91%, at least 92%, at least 93%, at least 94%, at least 95%, at least 96%, at least 97%, at least 98%, or at least 99% sequence identity thereto.

The present disclosure also provides antibodies, or antigen-binding fragments thereof, comprising an HCVR and an LCVR pair (HCVR/LCVR) comprising any of the HCVR amino acid sequences listed in Table 9 paired with any of the LCVR amino acid sequences listed in Table 9. According to certain embodiments, the present disclosure provides antibodies, or antigen-binding fragments thereof, comprising an HCVR/LCVR pair contained within any of the exemplary anti-GITR antibodies listed in Table 9. In certain embodiments, the HCVR/LCVR pair comprises amino acid sequences of SEQ ID Nos: 50/10.

The present disclosure also provides antibodies, or antigen-binding fragments thereof, that bind to GITR comprising a heavy chain CDR1 (HCDR1) comprising an amino acid sequence selected from any of the HCDR1 aminn acid sequences listed in Table 9, or a substantially similar sequence thereof having at least 90%, at least 95%, at least 98% or at least 99% sequence identity.

The present disclosure also provides antibodies, or antigen-binding fragments thereof, that bind to human GITR comprising a heavy chain CDR2 (HCDR2) comprising an amino acid sequence selected from any of the HCDR2 amino acid sequences listed in Table 9, or a substantially similar sequence thereof having at least 90%, at least 95%, at least 98% or at least 99% sequence identity.

The present disclosure also provides antibodies, or antigen-binding fragments thereof, that bind to GITR comprising a heavy chain CDR3 (HCDR3) comprising an amino acid sequence selected from any of the HCDR3 amino acid sequences listed in Table 9, or a substantially similar sequence thereof having at least 90%, at least 95%, at least 98% or at least 99% sequence identity.

The present disclosure also provides antibodies, or antigen-binding fragments thereof, that bind to GITR comprising a light chain CDR1 (LCDR1) comprising an amino acid sequence selected from any of the LCDR1 amino acid sequences listed in Table 9, or a substantially similar sequence thereof having at least 90%, at least 95%, at least 98% or at least 99% sequence identity.

The present disclosure also provides antibodies, or antigen-binding fragments thereof, that bind to GITR comprising a light chain CDR2 (LCDR2) comprising an amino acid sequence selected from any of the LCDR2 amino acid sequences listed in Table 9, or a substantially similar sequence thereof having at least 90%, at least 95%, at least 98% or at least 99% sequence identity.

The present disclosure also provides antibodies, or antigen-binding fragments thereof, that bind to GITR comprising a light chain CDR3 (LCDR3) comprising an amino acid sequence selected from any of the LCDR3 amino acid sequences listed in Table 9, or a substantially similar sequence thereof having at least 90%, at least 95%, at least 98% or at least 99% sequence identity.

The present disclosure also provides antibodies, or antigen-binding fragments thereof, that bind to GITR comprising an HCDR3 and an LCDR3 pair (HCDR3/LCDR3) comprising any of the HCDR3 amino acid sequences listed in Table 9 paired with any of the LCDR3 amino acid sequences listed in Table 9. According to certain embodiments, the present disclosure provides antibodies, or antigen-binding fragments thereof, comprising an HCDR3/LCDR3 pair contained within any of the exemplary GITR antibodies listed in Table 9. In certain embodiments, the first antigen-binding domain that specifically binds GITR comprises a HCDR3/LCDR3 pair comprising amino acid sequences of SEQ ID NOs: 56/16.

The present disclosure also provides antibodies, or antigen-binding fragments thereof, that bind to GITR comprising a heavy chain CDR1 (HCDR1) comprising an amino acid sequence of SEQ ID NO:52, or a substantially similar sequence thereof having at least 90%, at least 95%, at least 98% or at least 99% sequence identity; a heavy chain CDR2 (HCDR2) comprising an amino acid sequence of SEQ ID NO:54, or a substantially similar sequence thereof having at least 90%, at least 95%, at least 98% or at least 99% sequence identity; and a heavy chain CDR3 (HCDR3) comprising an amino acid sequence of SEQ ID NO:56, or a substantially similar sequence thereof having at least 90%, at least 95%, at least 98% or at least 99% sequence identity. In embodiments, the first antigen-binding domain that specifically binds GITR comprises a light chain CDR1 (LCDR1) comprising an amino acid sequence of SEQ ID NO:12, or a substantially similar sequence thereof having at least 90%, at least 95%, at least 98% or at least 99% sequence identity; a light chain CDR2 (LCDR2) comprising an amino acid sequence of SEQ ID NO:14, or a substantially similar sequence thereof having at least 90%, at least 95%, at least 98% or at least 99% sequence identity; and a light chain CDR3 (LCDR3) comprising an amino acid sequence of SEQ ID NO:16, or a substantially similar sequence thereof having at least 90%, at least 95%, at least 98% or at least 99% sequence identity.

Certain non-limiting, exemplary antibodies, or antigen-binding fragments thereof, that bind to GITR comprise a set of six CDRs HCDR1-HCDR2-HCDR3-LCDR1-LCDR2-LCDR3, respectively, the set comprising amino acid sequences of SEQ ID NOs: 52/54/56/12/14/16.

In another aspect, the present disclosure provides nucleic acid molecules encoding any of the HCVR, LCVR or CDR sequences of the antibodies, or antigen-binding fragments thereof, that bind to GITR including nucleic acid molecules comprising the polynucleotide sequences as set forth in Table 10 herein, as well as nucleic acid molecules comprising two or more of the polynucleotide sequences as set forth in Tables 2 and 10 in any functional combination or arrangement thereof. Recombinant expression vectors carrying the nucleic acids of the disclosure, and host cells into which such vectors have been introduced, are also encompassed by the disclosure, as are methods of producing the antibodies by culturing the host cells under conditions permitting production of the antibodies, and recovering the antibodies produced.

The present disclosure also provides nucleic acid molecules encoding anti-G1TR antibodies or portions thereof. For example, the present disclosure provides nucleic acid molecules encoding any of the HCVR amino acid sequences listed in Table 9; in certain embodiments the nucleic acid molecule comprises a polynucleotide sequence selected from any of the HCVR nucleic acid sequences listed in Table 10, or a substantially similar sequence thereof having at least 90%, at least 95%, at least 98% or at least 99% sequence identity thereto.

The present disclosure also provides nucleic acid molecules encoding any of the LCVR amino acid sequences listed in Table 9; in certain embodiments the nucleic acid molecule comprises a polynucleotide sequence selected from any of the LCVR nucleic acid sequences listed in Table 10, or a substantially similar sequence thereof having at least 90%, at least 95%, at least 98% or at least 99% sequence identity thereto.

The present disclosure also provides nucleic acid molecules encoding any of the HCDR1 amino acid sequences listed in Table 9; in certain embodiments the nucleic acid molecule comprises a polynucleotide sequence selected from any of the HCDR1 nucleic acid sequences listed in Table 10, or a substantially similar sequence thereof having at least 90%, at least 95%, at least 98% or at least 99% sequence identity thereto.

The present disclosure also provides nucleic acid molecules encoding any of the HCDR2 amino acid sequences listed in Table 9; in certain embodiments the nucleic acid molecule comprises a polynucleotide sequence selected from any of the HCDR2 nucleic acid sequences listed in Table 10, or a substantially similar sequence thereof having at least 90%, at least 95%, at least 98% or at least 99% sequence identity thereto.

The present disclosure also provides nucleic acid molecules encoding any of the HCDR3 amino acid sequences listed in Table 9; in certain embodiments the nucleic acid molecule comprises a polynucleotide sequence selected from any of the HCDR3 nucleic acid sequences listed in Table 10, or a substantially similar sequence thereof having at least 90%, at least 95%, at least 98% or at least 99% sequence identity thereto.

The present disclosure also provides nucleic acid molecules encoding any of the LCDR1 amino acid sequences listed in Table 9; in certain embodiments the nucleic acid molecule comprises a polynucleotide sequence selected from any of the LCDR1 nucleic acid sequences listed in Table 10, or a substantially similar sequence thereof having at least 90%, at least 95%, at least 98% or at least 99% sequence identity thereto.

The present disclosure also provides nucleic acid molecules encoding any of the LCDR2 amino acid sequences listed in Table 9; in certain embodiments the nucleic acid molecule comprises a polynucleotide sequence selected from any of the LCDR2 nucleic acid sequences listed in Table 10, or a substantially similar sequence thereof having at least 90%, at least 95%, at least 98% or at least 99% sequence identity thereto.

The present disclosure also provides nucleic acid molecules encoding any of the LCDR3 amino acid sequences listed in Table 9; in certain embodiments the nucleic acid molecule comprises a polynucleotide sequence selected from any of the LCDR3 nucleic acid sequences listed in Table 10, or a substantially similar sequence thereof having at least 90%, at least 95%, at least 98% or at least 99% sequence identity thereto.

The present disclosure also provides nucleic acid molecules encoding an HCVR, wherein the HCVR comprises a set of three CDRs (i.e., HCDR1-HCDR2-HCDR3), wherein the HCDR1-HCDR2-HCDR3 set is as defined by any of the exemplary anti-GITR antibodies listed in Table 9.

The present disclosure also provides nucleic acid molecules encoding an LCVR, wherein the LCVR comprises a set of three CDRs (i.e., LCDR1-LCDR2-LCDR3), wherein the LCDR1-LCDR2-LCDR3 set is as defined by any of the exemplary anti-GITR antibodies listed in Table 9.

The present disclosure also provides nucleic acid molecules encoding both an HCVR and an LCVR, wherein the HCVR comprises an amino acid sequence of any of the HCVR amino acid sequences listed in Table 9, and wherein the LCVR comprises an amino acid sequence of any of the LCVR amino acid sequences listed in Table 9. In certain embodiments, the nucleic acid molecule comprises a polynucleotide sequence selected from any of the HCVR nucleic acid sequences listed in Table 10, or a substantially similar sequence thereof having at least 90%, at least 95%, at least 98% or at least 99% sequence identity thereto, and a polynucleotide sequence selected from any of the LCVR nucleic acid sequences listed in Table 10, or a substantially similar sequence thereof having at least 90%, at least 95%, at least 98% or at least 99% sequence identity thereto. In certain embodiments according to this aspect of the disclosure, the nucleic acid molecule encodes an HCVR and LCVR, wherein the HCVR and LCVR are both derived from the same anti-GITR antibody listed in Table 9.

The present disclosure also provides recombinant expression vectors capable of expressing a polypeptide comprising a heavy or light chain variable region of an anti-GITR antibody. For example, the present disclosure includes recombinant expression vectors comprising any of the nucleic acid molecules mentioned above, i.e., nucleic acid molecules encoding any of the HCVR, LCVR, and/or CDR sequences as set forth in Table 9. Also included within the scope of the present disclosure are host cells into which such vectors have been introduced, as well as methods of producing the antibodies or portions thereof by culturing the host cells under conditions permitting production of the antibodies or antibody fragments, and recovering the antibodies and antibody fragments so produced.

The present disclosure includes anti-GITR antibodies having a modified glycosylation pattern. In some embodiments, modification to remove undesirable glycosylation sites may be useful, or an antibody lacking a fucose moiety present on the oligosaccharide chain, for example, to increase antibody dependent cellular cytotoxicity (ADCC) function (see Shield et al. (2002) JBC 277:26733). In other applications, modification of galactosylation can be made in order to modify complement dependent cytotoxicity (CDC).

In another aspect, the present disclosure provides binding molecules that bind to antigen receptor-expressing cells, e.g., B-cell or T-cells. In some embodiments, the target antigen is a B-cell receptor (BCR) on a B-cell, and the antigen binding domain comprises a binding molecule that is recognized by or has affinity for the BCR (e.g., a ligand that binds to the B-cell receptor or an antibody or antigen binding fragment thereof that binds to the B-cell receptor). In embodiments, the target antigen is a T-cell receptor on a T-cell, and the antigen binding domain comprises a binding molecule having a specific peptide-MHC that is recognized by or has affinity for the TCR (such as, but not limited to, single-chain peptide-β2M-MHC-I trimers; single-chain peptide-MHC-IIα/MHC-IIβ multimers heterodimerized by domains including but not limited to fos:jun leucine zippers; or single-chain peptide-MHC-IIβ/MHC-IIα multimers heterodimerized by domains including but not limited to fos:jun leucine zippers). Single-chain peptide-MHC molecules and methods of generating them are described, for example, in Kotsiou et al., *Antiox Redox Signal.*, 2011, 15(3):645-66, and Wen et al., *Methods Mol Biol.* 2013; 1061:245-264.

IV. Bispecific Antigen-Binding Molecules

The bispecific antigen-binding molecules of the present disclosure comprise two separate antigen-binding domains (D1 and D2). In some embodiments, the first antigen-binding domain (D1) specifically binds to a target antigen, e.g., a target antigen that is expressed on or bound to the surface of a cell or organism or a target antigen or a soluble target antigen, and the second antigen-binding domain (D2) binds to a complement component, e.g., C1q. In some embodiments, the target antigen is expressed on the surface of a cell that is to be targeted for elimination. In some embodiments, the target antigen is a soluble antigen that is to be targeted for elimination.

In some embodiments, one antigen-binding domain (D1) specifically binds to a target antigen on the surface of a cell or organism, where the target antigen is a marker of a disease state of a subject and the second antigen-binding domain (D2) binds to a complement component, e.g. C1q. For example, one antigen-binding domain (D1) specifically binds to a target antigen on the surface of a bacteria, on the surface of a virus, on the surface of a virus infected cell, on the surface of a cancer cell, or on the surface of an immune cell, and the second antigen-binding domain (D2) binds to a complement component, e.g. C1q. For example, one antigen-binding domain (D1) specifically binds to a *Staphylococcus* species target antigen (e.g. IsdB, IsdA, Protein A, PNAG, C1fA), an Influenza virus target antigen (e.g., Influenza HA), a *Pseudomonas* species target antigen (e.g., Ps1), a tumor necrosis factor receptor antigen (e.g., GITR), or a cancer-cell surface antigen (e.g., CD20), and the second antigen-binding domain (D2) binds to a complement component, e.g. C1q. In some embodiments, the bispecific antigen-binding molecule comprises a target antigen-binding antibody as disclosed in Section III above and an anti-complement antibody as disclosed in Section II above.

In some embodiments, the first antigen binding domain specifically binds to a bacterial target antigen. In embodiments, the bacterial target antigen is from a *Staphylococcus* species. In embodiments, the bacterial target antigen is from a species of bacteria other than a *Staphylococcus* species. In embodiments, the bacterial target antigen is a Gram-positive bacterial target antigen. In embodiments, the bacterial target antigen is a Gram-positive bacterial target antigen from a species of bacteria other than a *Staphylococcus* species. In embodiments, the bacterial target antigen is a Gram-negative bacterial target antigen.

In embodiments, the first antigen binding domain binds a *Staphylococcus* species target antigen (e.g. the first antigen binding domain comprises a monospecific antibody that binds to a *Staphylococcus* species target antigen, or an antigen-binding fragment thereof). In embodiments, the *Staphylococcus* species is a species that causes an infection in humans. In embodiments, the *Staphylococcus* species comprises *Staphylococcus epidermidis, Staphylococcus aureus, Staphylococcus lugdunensis,* and/or *Staphylococcus saprophiticus.* In embodiments, the *Staphylococcus* species target antigen comprises capsular polysaccharide type 5, capsular polysaccharide type 8, IsdB, IsdA, IsdH, lipoteichoic acid, wall teichoic acid, clumping factor A (clfA), poly-N-acetyl glucosamine (PNAG), lipase, V8 lipase, fatty acid modifying enzyme, microbial surface components recognizing adhesive matrix molecules (e.g., adhesins, fibrinogen binding molecules, fibronectin binding protein A, fibronectin binding protein B), protein A, or combinations thereof. In certain embodiments, the *Staphylococcus* species target antigen is IsdB, IsdA, Protein A, PNAG, or C1fA.

In some embodiments, the first antigen binding domain binds to a target antigen of a bacteria other than *Staphylococcus.* In embodiments, the target antigen comprises capsular polysaccharide type 5, capsular polysaccharide type 8, IsdB, IsdA, IsdH, lipoteichoic acid, wall teichoic acid, clumping factor A (clfA), poly-N-acetyl glucosamine (PNAG), lipase, V8 lipase, fatty acid modifying enzyme, microbial surface components recognizing adhesive matrix molecules (eg. adhesins, fibrinogen binding molecules, fibronectin binding protein A, fibronectin binding protein B), protein A, or combinations thereof, wherein the target antigen is not from a species of *Staphylococcus.*

In embodiments, the first antigen binding domain binds a target antigen from a Gram-negative species of bacteria. In embodiments, the first antigen binding domain binds a *Pseudomonas* species target antigen (e.g. the first antigen binding domain comprises a monospecific antibody that binds to a *Pseudomonas* species target antigen, or an antigen-binding fragment thereof). In embodiments, the *Staphylococcus* species is a species that causes an infection in humans. In certain embodiments, the *Pseudomonas* species target antigen is Ps1.

In embodiments, the first antigen binding domain binds a viral target antigen, e.g., a viral glycoprotein. In embodiments, the first antigen binding domain binds a viral target antigen from a virus selected from the group consisting of influenza virus, smallpox virus, hepatitis virus (e.g., hepatitis A, hepatitis B, or hepatitis C virus), human papillomavirus, human immunodeficiency virus (HIV), respiratory syncytial virus (RSV), herpesvirus, coronavirus, cowpox virus, coxsackievirus, Ebola virus, Epstein-Barr virus, measles virus, mumps virus, rubella virus, rotavirus, rabies virus, yellow fever virus, meningitis, poliovirus, rotavirus, vaccinia virus, varicella-zoster virus, variola virus, and Zika virus.

In embodiments, the first antigen binding domain binds an Influenza virus target antigen (e.g. the first antigen binding domain comprises a monospecific antibody that binds to an Influenza virus target antigen, or an antigen-binding fragment thereof). In embodiments, the Influenza virus is a virus that causes an infection in humans. In certain embodiments, the Influenza virus target antigen is Influenza HA.

In embodiments, the first antigen binding domain binds a target antigen that is present in or on a eukaryotic cell or organism, e.g., a target antigen on the surface of a eukaryotic cell or a soluble target antigen. In embodiments, the first antigen binding domain binds a target antigen on an immune cell that is targeted for elimination, e.g., a B cell, dendritic cell, granulocyte, lymphoid cell, monocyte, macrophage, T cell, or thymocyte. In embodiments, the target antigen is a B-cell receptor on a B-cell, and the first antigen binding domain binds to the B-cell receptor (e.g., a ligand that binds to the B-cell receptor or an antibody that binds to the B-cell receptor). In embodiments, the target antigen is a T-cell receptor on a T-cell, and the first antigen binding domain binds to the T-cell receptor (e.g., a peptide-MHC fusion protein or complex that binds to the T-cell receptor, such as a single-chain peptide-β2M-MHC-I trimer; a peptide-MHC-IIα/MHC-IIβ heterodimerized by domains including but not limited to fos:jun leucine zippers; or a peptide-MHC-IIβ/MHC-IIα heterodimerized by domains including but not limited to fos:jun leucine zippers).

In embodiments, the first antigen binding domain binds a glucocorticoid induced tumor necrosis factor receptor target antigen (e.g. the first antigen binding domain comprises a monospecific antibody that binds to a tumor necrosis factor receptor target antigen, or an antigen-binding fragment thereof). In certain embodiments, the tumor necrosis factor receptor target antigen is GITR.

In embodiments, the first antigen binding domain binds a cancer-cell surface target antigen (e.g. the first antigen binding domain comprises a monospecific antibody that binds to a B-cell surface target antigen, or an antigen-binding fragment thereof). In certain embodiments, the B-cell surface target antigen is CD20.

In embodiments, the second antigen-binding domain (D2) binds to any one of the complement components. Complement components include C1q, C1r, C1s, C2, C3, C4, C5, C6, C7, C8, C9, or any fragments thereof (including proteolytic fragments generated by the complement cascade). In certain embodiments, the complement component is C1q, e.g., human C1q. Complement is activated through a series of proteolytic steps which are activated by three major pathways: the Classical Pathway (CP), which is typically activated by immune-complexes, the Alternative Pathway (AP) that can be induced by unprotected cell surfaces, and the Mannose Binding Lectin (MBL) pathway. The Classical Pathway is initiated by C1q/r$_2$/s$_2$ binding to the Fc region of IgM and IgG or directly to a pathogen surface, leading to autoactivation of serine protease C1r which activates serine protease C1s, which in turns cleaves/activates C2 and C4, which then leads to cleavage of C3 and C5, C5b combines with C6, C7, C8, and C9 to form the membrane attack complex (MAC) resulting in cell lysis.

An antigen-binding domain includes polypeptides that bind a *Staphylococcus* species target antigen (e.g., IsdB, IsdA, Protein A, PNAG, C1fA), an Influenza virus target antigen (e.g., Influenza HA), a *Pseudomonas* species target antigen (e.g., Ps1), a tumor necrosis factor receptor antigen (e.g., GITR), or a B-cell surface antigen (e.g., CD20) (e.g., a target molecule [T] or a portion thereof) with a $K_D$ of less than about 25 nM, less than about 20 nM, less than about 15 nM, less than about 10 nM, less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay. In embodiments, an antigen-binding domain includes polypeptides that bind IsdB with a $K_D$ of less than about less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

An antigen-binding domain includes polypeptides that bind a complement component, such as C1q, with a $K_D$ of less than about 25 nM, less than about 20 nM, less than about 15 nM, less than about 10 nM, less than about 5 nM, less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay. In embodiments, an antigen-binding domain includes polypeptides that bind a C1q with a $K_D$ of less than about less than about 1 nM, less than about 500 pM, less than about 400 pM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

While the present disclosure includes bispecific antigen binding molecules wherein one arm of an immunoglobulin binds a *Staphylococcus* species target antigen, an Influenza virus target antigen, a *Pseudomonas* species target antigen, a tumor necrosis factor receptor antigen, or a B-cell surface antigen (e.g. a first antigen-binding domain, D1) and the other arm of the immunoglobulin is specific for a complement component, such as C1q (e.g. the second antigen-binding domain, D2), the target antigen can be any antigen expressed on the surface of a cell or organism, e.g., an antigen on the surface of a bacteria, an antigen on the surface of a virus, an antigen on the surface of a virus infected cell, an antigen on the surface of a eukaryotic cell, an antigen on the surface of a human cell, an antigen on the surface of a cancer cell, or an antigen on the surface of an immune cell against which a targeted immune response is desired. In embodiments, the complement component can comprise C1q, C1r, C1s, C2, C3, C4, C5, C6, C7, C8, C9, or any fragments thereof (including proteolytic fragments generated by the complement cascade). In certain embodiments, the complement component is C1q. In some embodiments, the D1 and/or D2 components of the bispecific antigen-binding molecules of the present disclosure may comprise or consist of antigen-binding fragments of full antibody molecules.

In the context of bispecific antigen binding molecules of the present disclosure wherein one arm of the antibody binds C1q and the other arm binds a *Staphylococcus* species target antigen, the target antigen can be a cell surface antigen.

Non-limiting examples of specific target antigens include capsular polysaccharide type 5, capsular polysaccharide type 8, IsdB, IsdA, IsdH, lipoteichoic acid, wall teichoic acid, clumping factor A (c1fA), poly-N-acetyl glucosamine (PNAG), lipase, V8 lipase, fatty acid modifying enzyme, microbial surface components recognizing adhesive matrix molecules (eg. adhesins, fibrinogen binding molecules, fibronectin binding protein A, fibronectin binding protein B), protein A, or combinations thereof.

In the context of the bispecific antigen binding molecules of the present disclosure, wherein one arm of the antibody binds C1q and the other arm binds a *Staphylococcus* species target antigen, the bispecific antigen binding molecules bind to the *Staphylococcus* species target antigen with an $EC_{50}$ of about 10 nM or less. In embodiments, the *Staphylococcus* species comprises *Staphylococcus epidermidis*, *Staphylococcus aureus*, *Staphylococcus lugdunensis*, or *Staphylococcus saprophiticus*. In the context of bispecific antigen binding molecule of the present disclosure wherein one arm of the antibody binds C1q and the other arm binds a *Staphylococcus* species target antigen, the bispecific antigen binding molecule promotes human C1q deposition on the *Staphylococcus* species with an $EC_{50}$ of about 10 nM or less.

According to certain exemplary embodiments, the present disclosure includes bispecific antigen-binding molecules that specifically bind C1q and IsdB. According to certain exemplary embodiments, the present disclosure includes bispecific antigen-binding molecules that specifically bind C1q and IsdA. According to certain exemplary embodiments, the present disclosure includes bispecific antigen-binding molecules that specifically bind C1q and Protein A. According to certain exemplary embodiments, the present disclosure includes bispecific antigen-binding molecules that specifically bind C1q and PNAG. According to certain exemplary embodiments, the present disclosure includes bispecific antigen-binding molecules that specifically bind C1q and ClfA.

In the context of bispecific antigen binding molecules of the present disclosure wherein one arm of the antibody binds C1q and the other arm binds a *Pseudomonas* species target antigen, the target antigen can be a cell surface antigen. Non-limiting examples of specific target antigens include any cell surface antigen associated with the *Pseudomonas* species, including Ps1, or combinations thereof. According to certain exemplary embodiments, the present disclosure includes bispecific antigen-binding molecules that specifically bind C1q and Ps1.

In the context of the bispecific antigen binding molecules of the present disclosure, wherein one arm of the antibody binds C1q and the other arm binds a *Pseudomonas* species target antigen, the bispecific antigen binding molecules bind to the *Pseudomonas* species target antigen with an $EC_{50}$ of about 10 nM or less. In the context of bispecific antigen binding molecule of the present disclosure wherein one arm of the antibody binds C1q and the other arm binds a *Pseudomonas* species target antigen, the bispecific antigen binding molecule promotes human C1q deposition on the *Pseudomonas* species with an $EC_{50}$ of about 10 nM or less.

In the context of bispecific antigen binding molecules of the present disclosure wherein one arm of the antibody binds C1q and the other arm binds an Influenza virus target antigen, the target antigen can be a cell surface antigen. Non-limiting examples of specific target antigens include any cell surface antigen associated with the Influenza virus, including Influenza HA, or combinations thereof. According to certain exemplary embodiments, the present disclosure includes bispecific antigen-binding molecules that specifically bind C1q and Influenza HA.

In the context of the bispecific antigen binding molecules of the present disclosure, wherein one arm of the antibody binds C1q and the other arm binds an Influenza virus target antigen, the bispecific antigen binding molecules bind to an Influenza virus target antigen with an $EC_{50}$ of about 10 nM or less. In the context of bispecific antigen binding molecule of the present disclosure wherein one arm of the antibody binds C1q and the other arm binds an Influenza virus target antigen, the bispecific antigen binding molecule promotes human C1q deposition on the Influenza strains or influenza infected cells with an $EC_{50}$ of about 10 nM or less.

In the context of bispecific antigen binding molecules of the present disclosure wherein one arm of the antibody binds C1q and the other arm binds a glucocorticoid induced tumor necrosis factor receptor target antigen, the target antigen can be a cell surface antigen. Non-limiting examples of specific target antigens include any cell surface antigen associated with the tumor necrosis factor receptor, including GITR, or combinations thereof. According to certain exemplary embodiments, the present disclosure includes bispecific antigen-binding molecules that specifically bind C1q and GITR.

In the context of the bispecific antigen binding molecules of the present disclosure, wherein one arm of the antibody binds C1q and the other arm binds a glucocorticoid induced tumor necrosis factor receptor target antigen, the bispecific antigen binding molecules bind to the glucocorticoid induced tumor necrosis factor receptor target antigen with an $EC_{50}$ of about 10 nM or less.

In the context of bispecific antigen binding molecules of the present disclosure wherein one arm of the antibody binds C1q and the other arm binds a glucocorticoid induced tumor necrosis factor receptor target antigen, the bispecific antigen binding molecule promotes human C1q deposition on the T cell with an $EC_{50}$ of about 10 nM or less.

In the context of bispecific antigen binding molecules of the present disclosure wherein one arm of the antibody binds C1q and the other arm binds a cancer-cell surface target antigen, the target antigen can be a cell surface antigen. Non-limiting examples of specific target antigens include any cell surface antigen associated with a cancer cell, including CD20, or combinations thereof. According to certain exemplary embodiments, the present disclosure includes bispecific antigen-binding molecules that specifically bind C1q and CD20.

In the context of the bispecific antigen binding molecules of the present disclosure, wherein one arm of the antibody binds C1q and the other arm binds a cancer-cell surface target antigen, the bispecific antigen binding molecules bind to the B-cell surface target antigen with an $EC_{50}$ of about 10 nM or less. In the context of bispecific antigen binding molecule of the present disclosure wherein one arm of the antibody binds C1q and the other arm binds a cancer-cell surface target antigen, the bispecific antigen binding molecule promotes human C1q deposition on CD20 bearing cancer cell with an $EC_{50}$ of about 10 nM or less.

In some embodiments, a bispecific antigen binding molecule comprises a first antigen-binding domain that specifically binds a target antigen as disclosed herein and comprises a second antigen-binding domain that specifically binds to human C1q. In some embodiments, the bispecific antigen binding molecule comprises a first antigen-binding domain that specifically binds a target antigen as disclosed herein and comprises a second antigen-binding domain that comprises a HCDR1 comprising an amino acid sequence selected from the group consisting of SEQ ID NO:4 and SEQ ID NO:20, a HCDR2 comprising an amino acid sequence selected from the group consisting of SEQ ID NO:6 and SEQ ID NO:22, a HCDR3 comprising an amino acid sequence selected from the group consisting of SEQ ID NO:8 and SEQ ID NO:24, a LCDR1 comprising an amino acid sequence of SEQ ID NO:12, a LCDR2 comprising an amino acid sequence of SEQ ID NO: 14, and a LCDR3 comprising an amino acid sequence of SEQ ID NO: 16. In some embodiments, the bispecific antigen binding molecule comprises a first antigen-binding domain that specifically binds a target antigen as disclosed herein and comprises a second antigen-binding domain that comprises a HCVR comprising the amino acid sequence of SEQ ID NO:2 or SEQ ID NO:18 and a LCVR comprising the amino acid sequence of SEQ ID NO:10.

In some embodiments, a bispecific antigen binding molecule comprises:
(a) a first antigen-binding domain that specifically binds a target antigen, wherein the first antigen-binding domain comprises a heavy chain comprising:
  (1) a HCDR1 comprising SEQ ID NO:28, a HCDR2 comprising SEQ ID NO:30, and a HCDR3 comprising SEQ ID NO:32; or
  (2) a HCDR1 comprising SEQ ID NO:36, a HCDR2 comprising SEQ ID NO:38, and a HCDR3 comprising SEQ ID NO:40; or
  (3) a HCDR1 comprising SEQ ID NO:44, a HCDR2 comprising SEQ ID NO:46, and a HCDR3 comprising SEQ ID NO:48; or
  (4) a HCDR1 comprising SEQ ID NO:52, a HCDR2 comprising SEQ LID NO:54, and a HCDR3 comprising SEQ ID NO:56; or
  (5) a HCDR1 comprising SEQ ID NO:60, a HCDR2 comprising SEQ ID NO:62, and a HCDR3 comprising SEQ ID NO:64; or
  (6) a HCDR1 comprising SEQ ID NO:68, a HCDR2 comprising SEQ ID NO:70, and a HCDR3 comprising SEQ ID NO:72; or
  (7) a HCDR1 comprising amino acids 26-33 of SEQ ID NO:73, a HCDR2 comprising amino acids 51-58 of SEQ ID NO:73, and a HCDR3 comprising amino acids 96-106 of SEQ ID NO:73; or
  (8) a HCDR1 comprising amino acids 27-32 of SEQ ID NO:76, a HCDR2 comprising amino acids 51-58 of SEQ ID NO:76, and a HCDR3 comprising amino acids 96-106 of SEQ ID NO:76; or
  (9) a HCDR1 comprising amino acids 31-35 of SEQ ID NO:78, a HCDR2 comprising amino acids 50-65 of SEQ ID NO:78, and a HCDR3 comprising amino acids 98-109 of SEQ ID NO:78;
(b) a second antigen-binding domain that specifically binds to human C1q, wherein the second antigen-binding domain comprises a heavy chain comprising:
  (1) a HCDR1 comprising SEQ ID NO:4, a HCDR2 comprising SEQ ID NO:6, and a HCDR3 comprising SEQ ID NO:8; or
  (2) a HCDR1 comprising SEQ ID NO:20, a HCDR2 comprising SEQ ID NO:22, and a HCDR3 comprising SEQ ID NO:24; and
(c) a light chain comprising:
  (1) a LCDR1 comprising SEQ ID NO:12, a LCDR2 comprising SEQ ID NO:14, and a LCDR3 comprising SEQ ID NO:16; or
  (2) a LCDR1 comprising amino acids 27-32 of SEQ ID NO:74, a LCDR2 comprising amino acids 51-55 of SEQ ID NO:74, and a LCDR3 comprising amino acids 89-98 of SEQ ID NO:74; or
  (3) a LCDR1 comprising amino acids 27-32 of SEQ ID NO:77, a LCDR2 comprising amino acids 50-52 of SEQ ID NO:77, and a LCDR3 comprising amino acids 98-101 of SEQ ID NO:77; or
  (4) a LCDR1 comprising amino acids 23-33 of SEQ ID NO:79, a LCDR2 comprising amino acids 49-55 of SEQ ID NO:79, and a LCDR3 comprising amino acids 88-99 of SEQ ID NO:79.

In some embodiments, a bispecific antigen binding molecule comprises:
(a) a first antigen-binding domain that specifically binds a target antigen, wherein the first antigen-binding domain comprises a heavy chain comprising a HCVR selected from the group consisting of SEQ ID NO:26, SEQ ID NO:34, SEQ ID NO:42, SEQ ID NO:50, SEQ ID NO:58, SEQ ID NO:66, amino acids 1-118 of SEQ ID NO:73, amino acids 1-118 of SEQ ID NO:76, and amino acids 1-118 of SEQ ID NO:78;
(b) a second antigen-binding domain that specifically binds to human C1q, wherein the second antigen-binding domain comprises a heavy chain comprising a HCVR selected from the group consisting of SEQ ID NO:2, SEQ ID NO:18, and SEQ ID NO:75; and
(c) a light chain comprising a LCVR selected from the group consisting of SEQ ID NO:10, amino acids 1-108 of SEQ ID NO:74, amino acids 1-108 of SEQ ID NO:77, and amino acids 1-108 of SEQ ID NO:79.

In some embodiments, a bispecific antigen-binding domain comprises a second antigen-binding domain that comprises a heavy chain comprising a HCDR1 comprising SEQ ID NO:4, a HCDR2 comprising SEQ ID NO:6, and a HCDR3 comprising SEQ ID NO:8, and a light chain comprising a LCDR1 comprising SEQ ID NO:12, a LCDR2 comprising SEQ ID NO:14, and a LCDR3 comprising SEQ ID NO:16.

In some embodiments, a bispecific antigen-binding domain comprises a second antigen-binding domain that comprises a heavy chain comprising a HCVR comprising SEQ ID NO:2 and a LCVR comprising SEQ ID NO:10.

In some embodiments, a bispecific antigen-binding domain comprises a second antigen-binding domain that comprises a heavy chain comprising a HCDR1 comprising SEQ ID NO:20, a HCDR2 comprising SEQ ID NO:22, and a HCDR3 comprising SEQ ID NO:24, and a light chain comprising a LCDR1 comprising SEQ ID NO:12, a LCDR2 comprising SEQ ID NO:14, and a LCDR3 comprising SEQ ID NO:16.

In some embodiments, a bispecific antigen-binding domain comprises a second antigen-binding domain that comprises a heavy chain comprising a HCVR comprising SEQ ID NO:18 and a LCVR comprising SEQ ID NO:10.

In certain exemplary embodiments of the present disclosure, the bispecific antigen-binding molecule comprises a first antigen-binding domain (D1) and a second antigen-binding domain (D2). The first antigen-binding domain and the second antigen-binding domain may be directly or indirectly connected to one another to form a bispecific antigen-binding molecule of the present disclosure. Alternatively, the first antigen-binding domain and the second antigen-binding domain may each be connected to a separate multimerizing domain. The association of one multimerizing domain with another multimerizing domain facilitates the association between the two antigen-binding domains, thereby forming a bispecific antigen-binding molecule. As used herein, a "multimerizing domain" is any macromolecule, protein, polypeptide, peptide, or amino acid that has the ability to associate with a second multimerizing domain of the same or similar structure or constitution. For example, a multimerizing domain may be a polypeptide comprising an immunoglobulin $C_H^3$ domain. A non-limiting example of a multimerizing component is an Fc portion of an immunoglobulin (comprising a $C_H2$-$C_H3$ domain), e.g., an Fc domain of an IgG selected from the isotypes IgG1, IgG2, IgG3, and IgG4, as well as any allotype within each isotype group.

In some embodiments, the bispecific antigen-binding molecules of the present disclosure comprise two multimerizing domains, e.g., two Fc domains that are each individually part of a separate antibody heavy chain. The first and second multimerizing domains may be of the same IgG isotype such as, e.g., IgG1/IgG1, IgG2/IgG2, IgG4/IgG4. Alternatively, the first and second multimerizing domains may be of different IgG isotypes such as, e.g., IgG1/IgG2, IgG1/IgG4, IgG2/IgG4, etc.

In certain embodiments, the multimerizing domain is an Fc fragment or an amino acid sequence of 1 to about 200 amino acids in length containing at least one cysteine residues. In other embodiments, the multimerizing domain is a cysteine residue, or a short cysteine-containing peptide. Other multimerizing domains include peptides or polypeptides comprising or consisting of a leucine zipper, a helix-loop motif, or a coiled-coil motif. In embodiments, a multimerizing domain can include an amino acid alteration in the $C_H3$ region that cause a knob to be formed on one multimerization domain and an amino acid alteration in the $C_H3$ region that cause a corresponding hole on another multimerization domain that provides for pairing of the multimerization domains. In embodiments, amino acid alterations can provide for charge pairing of the two multimerization domains.

In some embodiments, a bispecific antigen-binding molecule of the present disclosure comprises a heavy chain constant region comprising one or more amino acid alterations in a hinge region. In some embodiments, the amino acid alteration(s) in the hinge region reduces binding to an Fcγ receptor. Exemplary modifications are disclosed in US 2018/0282411, incorporated by reference herein. In some embodiments, a bispecific antigen-binding molecule comprises a modification within positions 233-236 by EU numbering by replacing naturally occurring residues with glycine(s) and/or deletion(s). In some embodiments, each of positions 233-236 by EU number is occupied by G or is unoccupied, for example, GGG- (233-236), GG-- (233-236), G--- (233-236), or ---- (233-236), with "-" representing an unoccupied position. In some embodiments, the heavy chain constant region comprising the modification(s) is of a human IgG1 isotype. In some embodiments, the heavy chain constant region comprising the modification(s) is of a human IgG4 isotype. In some embodiments, the heavy chain constant region comprising the modification(s) is a hybrid in which domains are of different isotypes, e.g., a hybrid of IgG1 and IgG4 isotypes in which one or more domains (e.g., CH1, CH2, or CH3 domain) and/or a hinge region is of one isotype while the remaining domains are of a different isotype.

Any bispecific antigen binding molecule format or technology may be used to make the bispecific antigen-binding molecules of the present disclosure. For example, an antibody or fragment thereof having a first antigen binding specificity can be functionally linked (e.g., by chemical coupling, genetic fusion, noncovalent association or otherwise) to one or more other molecular entities, such as another antibody or antibody fragment having a second antigen-binding specificity to produce a bispecific antigen-binding molecule. Specific exemplary bispecific formats that can be used in the context of the present disclosure include, without limitation, e.g., scFv-based or diabody bispecific formats, VH or VL domain antibodies, VHH, IgG-scFv fusions, Tandem Fabs (e.g., 2+2 and 3+3 Tandem Fabs), trivalent or tetravalent formats (e.g., 2+1 N-Fabs or 2+1 C-Fabs), dual variable domain (DVD)-Ig, Quadroma, knobs-into-holes, common light chain (e.g., common light chain with knobs-into-holes, etc.), CrossMab, CrossFab, (SEED) body, leucine zipper, Duobody, IgG1/IgG2, dual acting Fab (DAF)-IgG, VNAR based nanobody, and Mab$^2$ bispecific formats (see, e.g., Klein et al. 2012, *MAbs* 4(6): 1-11; Klein et al., 2016, *MAbs* 8(96):1010-20; Brinkmann et al., 2017, *Mabs* 9(2):182-212; and references cited therein, for a review of the foregoing formats).

For purposes of clarity, exemplary bispecific antibodies of the disclosure are summarized in Table 18, which shows the particular amino acid sequence identifiers for the HCVR and HCDRs assigned to the first antigen-binding domain (D1, anti-IsdB), the amino acid sequence identifiers for the HCVR and HCDRs assigned to the second antigen-binding domain (D2, anti-C1q) and the amino acid sequence identifiers assigned to the LCVR and LCDRs. Each anti-IsdB× anti-C1q bispecific antibody was assigned a new antibody identification number (PID) shown in the first column on the left.

As a non-limiting illustrative example, the present disclosure includes anti-IsdB× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs:26/10, or a set of heavy and light chain CDRs (HCDR1-HCDR2-HCDR3-LCDR1-LCDR2-LCDR3), the set comprising amino acid sequences of SEQ ID NOs: 28-30-32-12-14-16, and wherein the D2 antigen-binding domain comprises an HCVR/LCVR pair comprising amino acid sequences of SEQ ID NOs: 2/10 or a set of heavy and light chain CDRs (HCDR1-HCDR2-HCDR3-LCDR1-LCDR2-LCDR3), the set comprising amino acid sequences of SEQ ID NOs: 4-6-8-12-14-16. An exemplary anti-IsdB× anti-C1q bispecific antibody having these sequence characteristics is the bispecific antibody designated REGN5066, which comprises a D1 derived from mAb20295 and a D2 derived from mAb17736. Another exemplary anti-IsdB× anti-C1q bispecific antibody having these sequence characteristics is the bispecific antibody designated REGN5067, which comprises a D1 derived from mAb20295 and a D2 derived from mAb18395 (see Table 18 herein).

As a non-limiting illustrative example, the present disclosure includes anti-IsdA× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs: 66/10, or a set of heavy and light chain CDRs (HCDR1-HCDR2-HCDR3-LCDR1-LCDR2-LCDR3), the set comprising amino acid sequences of SEQ ID NOs: 68-70-72-12-14-16, and wherein the D2 antigen-binding domain comprises an HCVR/LCVR pair comprising amino acid sequences of SEQ ID NOs: 2/10, or a set of heavy and light chain CDRs (HCDR1-HCDR2-HCDR3-LCDR1-LCDR2-LCDR3), the set comprising amino acid sequences of SEQ ID NOs: 4-6-8-12-14-16. An exemplary anti-IsdA× anti-C1q bispecific antibody having these sequence characteristics is the bispecific antibody designated REGN5553, which comprises a D1 derived from mAb20334 and a D2 derived from mAb17736 (see Table 18 herein).

As a non-limiting illustrative example, the present disclosure includes anti-Protein A× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs: 58/10, or a set of heavy and light chain CDRs (HCDR1-HCDR2-HCDR3-LCDR1-LCDR2-LCDR3), the set comprising amino acid sequences of SEQ ID NOs: 60-62-64-12-14-16, and wherein the D2 antigen-binding domain comprises an HCVR/LCVR pair comprising amino acid sequences of SEQ ID NOs: 2/10, or a set of heavy and light chain CDRs (HCDR1-HCDR2-HCDR3-LCDR1-LCDR2-LCDR3), the set comprising amino acid sequences of SEQ ID NOs: 4-6-8-12-14-16. An exemplary anti-Protein A× anti-C1q bispecific antibody having these sequence characteristics is the bispecific antibody designated REGN5551, which comprises a D1 derived from mAb15144 and a D2 derived from mAb17736 (see Table 18 herein).

As a non-limiting illustrative example, the present disclosure includes anti-PNAG× anti-C1q bispecific antigen binding molecules comprising a D1. antigen-binding domain and a D2 antigen-binding domain, wherein the D1 antigen binding domain comprises an HCVR/LCVR pair comprising amino acid sequences contained within the HC/LC pair of SEQ ID NOs: 76/77, and wherein the D2 antigen-binding domain comprises an scFv comprising the amino acid sequence of SEQ ID NO: 75. An exemplary anti-PNAG× anti-C1q bispecific antibody having these sequence characteristics is the bispecific antibody designated REGN5536 which comprises a D1 derived from REGN1335 and a D2 derived from mAb17736 (see Table 18 herein).

As a non-limiting illustrative example, the present disclosure includes anti-C1fA×anti-C1q bispecific antigen binding molecules comprising a D1 antigen-binding domain and a D2 antigen-binding domain, wherein the D1 antigen binding domain comprises an HCVR/LCVR pair comprising amino acid sequences contained within the HC/LC pair of SEQ ID NOs:73/74, and wherein the D2 antigen-binding domain comprises an scFv comprising the amino acid sequence of SEQ ID NO:75. An exemplary anti-C1fA× anti-C1q bispecific antibody having these sequence characteristics is the bispecific antibody designated REGN5738 having HCVR/LCVR pairs contained within the HC/LC pair of SEQ ID NO: 73/74 and a D2 derived from mAb17736 (see Table 18 herein).

As a non-limiting illustrative example, the present disclosure includes anti-Ps1× anti-C1q bispecific antigen binding molecules comprising a D1 antigen-binding domain and a D2 antigen-binding domain, wherein the D1 antigen binding domain comprises an HCVR/LCVR pair comprising amino acid sequences contained within the HC/LC pair of SEQ ID NOs:78/79, and wherein the D2 antigen-binding domain comprises an scFv comprising the amino acid sequence of SEQ ID NO:75. An exemplary anti-Ps1× anti-C1q bispecific antibody having these sequence characteristics is the bispecific antibody designated REGN5409 which comprises a D1 having an HCVR/LCVR contained within the HC/LC pair of SEQ ID NOs: 78/79 and a D2 derived from mAb17736 (see Table 18 herein).

As a non-limiting illustrative example, the present disclosure includes anti-Influenza HA× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs: 42/10, or a set of heavy and light chain CDRs (HCDR1-HCDR2-HCDR3-LCDR1-LCDR2-LCDR3) comprising a set of amino acid sequences SEQ ID NOs: 44-46-48-12-14-16. The D2 antigen-binding domain comprises an HCVR/LCVR pair comprising amino acid sequences of SEQ ID NOs:2/10, or a set of heavy and light chain CDRs (HCDR1-HCDR2-HCDR3-LCDR1-LCDR2-LCDR3), the set comprising amino acid sequences of SEQ ID NOs:4-6-8-12-14-16. An exemplary anti-Influenza HA× anti-C1q bispecific antibody having these sequence characteristics is the bispecific antibody designated REGN 6093, which comprises a D1 derived from mAb111829 and a D2 derived from mAb17736 (see Table 18 herein).

As a non-limiting illustrative example, the present disclosure includes anti-CD20× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs: 34/10, or a set of heavy and light chain CDRs (HCDR1-HCDR2-HCDR3-LCDR1-LCDR2-LCDR3), the set comprising amino acid sequences of SEQ ID NOs: 36-38-40-12-14-16 and wherein the D2 antigen-binding domain comprises an HCVR/LCVR pair comprising amino acid sequences of SEQ ID NOs:2/10, or a set of heavy and light chain CDRs (HCDR1-HCDR2-HCDR3-LCDR1-LCDR2-LCDR3), the set comprising amino acid sequences of SEQ ID NOs:4-6-8-12-14-16. An exemplary anti-CD20× anti-C1q bispecific antibody having these sequence characteristics is the bispecific antibody designated REGN 5177, which comprises a D1 derived from mAb14303 and a D2 derived from mAb17736 (see Table 18 herein).

As a non-limiting illustrative example, the present disclosure includes anti-G1TR× anti-C1q bispecific antigen binding molecules comprising a D1 antigen-binding domain and a D2 antigen-binding domain, wherein the D1 antigen binding domain comprises an HCVR/LCVR pair comprising amino acid sequences of SEQ ID NOs: 50/10, or a set of heavy and light chain CDRs (HCDR1-HCDR2-HCDR3-LCDR1-LCDR2-LCDR3), the set comprising amino acid sequences of SEQ ID NOs: 52-54-56-12-14-16 and wherein the D2 antigen-binding domain comprises an HCVR/LCVR pair comprising amino acid sequences of SEQ ID NOs:2/10 or a set of heavy and light chain CDRs (HCDR1-HCDR2-HCDR3-LCDR1-LCDR2-LCDR3), the set comprising amino acid sequences of SEQ ID NOs:4-6-8-12-14-16. An exemplary anti-GITR× anti-C1q bispecific antibody having these sequence characteristics is the bispecific antibody designated REGN 6545, which comprises a D1 derived from mAb14536 and a D2 derived from mAb17736 (see Table 18 herein). Another exemplary anti-GITR× anti-C1q bispecific antibody having these sequence characteristics is the bispecific antibody designated REGN 6546, which comprises a D1 derived from mAb14536 and a D2 derived from mAb18395 (see Table 18 herein).

Sequence Variants

The antibodies and bispecific antigen-binding molecules of the present disclosure may comprise one or more amino acid substitutions, insertions and/or deletions in the framework and/or CDR regions of the heavy and light chain variable domains as compared to the corresponding germline sequences from which the individual antigen-binding domains were derived as described herein. The present disclosure also includes antigen-binding molecules wherein one or both antigen-binding domains comprise variants of any of the HCVR, LCVR, and/or CDR amino acid sequences disclosed herein having one or more conservative substitutions. For example, the present disclosure includes antigen-binding molecules comprising an antigen-binding domain having HCVR, LCVR, and/or CDR amino acid sequences with, e.g., 10 or fewer, 8 or fewer, 6 or fewer, 4 or fewer, etc. conservative amino acid substitutions relative to any of the HCVR, LCVR, and/or CDR amino acid sequences disclosed herein. Conservative amino acid substitutions are described elsewhere herein.

The present disclosure also includes antigen-binding molecules comprising an antigen-binding domain with an HCVR, LCVR, and/or CDR amino acid sequence that is substantially identical to any of the HCVR, LCVR, and/or CDR amino acid sequences disclosed herein.

Bioequivalents

The present disclosure encompasses antigen-binding molecules having amino acid sequences that vary from those of the exemplary molecules disclosed herein but that retain the ability to bind a complement component (e.g., C1q) and/or a target antigen (e.g., IsdB, IsdA, Protein A, PNAG, CflA, Ps1, Influenza HA, CD20, or GITR). Such variant molecules may comprise one or more additions, deletions, or substitutions of amino acids when compared to parent sequence, but exhibit biological activity that is essentially equivalent to that of the described bispecific antigen-binding molecules.

The present disclosure includes antigen-binding molecules that are bioequivalent to any of the exemplary antigen-binding molecules set forth herein. Two antigen-binding proteins, or antibodies, are considered bioequivalent if, for example, they are pharmaceutical equivalents or pharmaceutical alternatives whose rate and extent of absorption do not show a significant difference when administered at the same molar dose under similar experimental conditions, either single does or multiple dose. Some antigen-binding proteins will be considered equivalents or pharmaceutical alternatives if they are equivalent in the extent of their absorption but not in their rate of absorption and yet may be considered bioequivalent because such differences in the rate of absorption are intentional and are reflected in the labeling, are not essential to the attainment of effective body drug concentrations on, e.g., chronic use, and are considered medically insignificant for the particular drug product studied.

In one embodiment, two antigen-binding proteins are bioequivalent if there are no clinically meaningful differences in their safety, purity, and potency.

In one embodiment, two antigen-binding proteins are bioequivalent if a patient can be switched one or more times between the reference product and the biological product without an expected increase in the risk of adverse effects, including a clinically significant change in immunogenicity, or diminished effectiveness, as compared to continued therapy without such switching.

In one embodiment, two antigen-binding proteins are bioequivalent if they both act by a common mechanism or mechanisms of action for the condition or conditions of use, to the extent that such mechanisms are known.

Bioequivalence may be demonstrated by in vivo and in vitro methods. Bioequivalence measures include, e.g., (a) an in vivo test in humans or other mammals, in which the concentration of the antibody or its metabolites is measured in blood, plasma, serum, or other biological fluid as a function of time; (b) an in vitro test that has been correlated with and is reasonably predictive of human in vivo bioavailability data; (c) an in vivo test in humans or other mammals in which the appropriate acute pharmacological effect of the antibody (or its target) is measured as a function of time; and (d) in a well-controlled clinical trial that establishes safety, efficacy, or bioavailability or bioequivalence of an antigen-binding protein.

Bioequivalent variants of the exemplary bispecific antigen-binding molecules set forth herein may be constructed by, for example, making various substitutions of residues or sequences or deleting terminal or internal residues or sequences not needed for biological activity. For example, cysteine residues not essential for biological activity can be deleted or replaced with other amino acids to prevent formation of unnecessary or incorrect intramolecular disulfide bridges upon renaturation. In other contexts, bioequivalent antigen-binding proteins may include variants of the exemplary bispecific antigen-binding molecules set forth herein comprising amino acid changes which modify the glycosylation characteristics of the molecules, e.g., mutations which eliminate or remove glycosylation.

V. Therapeutic Formulation and Administration

The present disclosure provides pharmaceutical compositions comprising the antigen-binding molecules of the present disclosure. The pharmaceutical compositions of the disclosure are formulated with suitable carriers, excipients, and other agents that provide improved transfer, delivery, tolerance, and the like. A multitude of appropriate formulations can be found in the formulary known to all pharmaceutical chemists: Remington's Pharmaceutical Sciences, Mack Publishing Company, Easton, PA. These formulations include, for example, powders, pastes, ointments, jellies, waxes, oils, lipids, lipid (cationic or anionic) containing vesicles (such as LIPOFECTIN™, Life Technologies, Carlsbad, CA), DNA conjugates, anhydrous absorption pastes, oil-in-water and water-in-oil emulsions, emulsions carbowax (polyethylene glycols of various molecular weights), semi-solid gels, and semi-solid mixtures containing carbowax. See also Powell et al. "Compendium of excipients for parenteral formulations" PDA (1998) J Pharm Sci Technol 52:238-311.

The dose of antigen-binding molecule administered to a patient may vary depending upon the age and the size of the patient, target disease, conditions, route of administration, and the like. The preferred dose is typically calculated according to body weight or body surface area. When a bispecific antigen-binding molecule of the present disclosure is used for therapeutic purposes in an adult patient, it may be advantageous to administer (e.g., intravenously administer or subcutaneously administer) the bispecific antigen-binding molecule of the present disclosure normally at a single dose of about 0.01 to about 20 mg/kg body weight, more preferably about 0.02 to about 7, about 0.03 to about 5, or about 0.05 to about 3 mg/kg body weight. Depending on the severity of the condition, the frequency and the duration of the treatment can be adjusted. Effective dosages and schedules for administering a bispecific antigen-binding molecule may be determined empirically; for example, patient progress can be monitored by periodic assessment, and the dose adjusted accordingly. Moreover, interspecies scaling of dosages can be performed using well-known methods in the art (e.g., Mordenti et al., 1991, *Pharmaceut. Res.* 8:1351).

Various delivery systems are known and can be used to administer the pharmaceutical composition of the disclosure, e.g., encapsulation in liposomes, microparticles, microcapsules, recombinant cells capable of expressing the mutant viruses, receptor mediated endocytosis (see, e.g., Wu et al., 1987, J. Biol. Chem. 262:4429-4432). Methods of administration include, but are not limited to, intradermal, intramuscular, intraperitoneal, intravenous, subcutaneous, intranasal, epidural, and oral routes. The composition may be administered by any convenient route, for example by infusion or bolus injection, by absorption through epithelial or mucocutaneous linings (e.g., oral mucosa, rectal and intestinal mucosa, etc.) and may be administered together with other biologically active agents. Administration can be systemic or local.

In some embodiments, a pharmaceutical composition comprising an antigen-binding molecule of the present disclosure is contained in a container, including but not limited to a syringe, pen delivery device, autoinjector, glass vial, or microinfuser. In some embodiments, a pharmaceutical composition of the present disclosure can be delivered subcutaneously or intravenously with a standard needle and syringe. In addition, with respect to subcutaneous delivery, a pen delivery device readily has applications in delivering a pharmaceutical composition of the present disclosure. Such a pen delivery device can be reusable or disposable. A reusable pen delivery device generally utilizes a replaceable cartridge that contains a pharmaceutical composition. Once all of the pharmaceutical composition within the cartridge has been administered and the cartridge is empty, the empty cartridge can readily be discarded and replaced with a new cartridge that contains the pharmaceutical composition. The pen delivery device can then be reused. In a disposable pen delivery device, there is no replaceable cartridge. Rather, the disposable pen delivery device comes prefilled with the pharmaceutical composition held in a reservoir within the device. Once the reservoir is emptied of the pharmaceutical composition, the entire device is discarded.

In certain situations, the pharmaceutical composition can be delivered in a controlled release system. In one embodiment, a pump may be used (see Langer, supra; Sefton, 1987, CRC Crit. Ref. Biomed. Eng. 14:201). In another embodiment, polymeric materials can be used; see, Medical Applications of Controlled Release, Langer and Wise (eds.), 1974, CRC Pres., Boca Raton, Florida. In yet another embodiment, a controlled release system can be placed in proximity of the composition's target, thus requiring only a fraction of the systemic dose (see, e.g., Goodson, 1984, in Medical Applications of Controlled Release, supra, vol. 2, pp. 115-138). Other controlled release systems are discussed in the review by Langer, 1990, Science 249:1527-1533.

The injectable preparations may include dosage forms for intravenous, subcutaneous, intracutaneous and intramuscular injections, drip infusions, etc. These injectable preparations may be prepared by methods publicly known. For example, the injectable preparations may be prepared, e.g., by dissolving, suspending or emulsifying the antibody or its salt described above in a sterile aqueous medium or an oily medium conventionally used for injections. As the aqueous medium for injections, there are, for example, physiological saline, an isotonic solution containing glucose and other auxiliary agents, etc., which may be used in combination with an appropriate solubilizing agent such as an alcohol (e.g., ethanol), a polyalcohol (e.g., propylene glycol, polyethylene glycol), a nonionic surfactant [e.g., polysorbate 80, HCO-50 (polyoxyethylene (50 mol) adduct of hydrogenated castor oil)], etc. As the oily medium, there are employed, e.g., sesame oil, soybean oil, etc., which may be used in combination with a solubilizing agent such as benzyl benzoate, benzyl alcohol, etc. The injection thus prepared is preferably filled in an appropriate ampoule.

Advantageously, the pharmaceutical compositions for oral or parenteral use described above are prepared into dosage forms in a unit dose suited to fit a dose of the active ingredients. Such dosage forms in a unit dose include, for example, tablets, pills, capsules, injections (ampoules), suppositories, etc. The amount of the aforesaid antibody contained is generally about 5 to about 500 mg per dosage form in a unit dose; especially in the form of injection, it is preferred that the aforesaid antibody is contained in about 5 to about 100 mg and in about 10 to about 250 mg for the other dosage forms.

VI. Therapeutic Uses of the Antigen-Binding Molecules

In another aspect, the present disclosure provides for methods of using the bispecific antigen-binding molecules disclosed herein. In some embodiments, the present disclosure provides methods of activating or enhancing cell killing by contacting the cell with a bispecific antigen-binding molecule that specifically binds a complement component (e.g., C1q) and a target antigen as disclosed herein. In some embodiments, the cell is a bacterial cell. In some embodiments, the cell is a eukaryotic cell. In some embodiments, the cell is a virally infected cell, an immune cell, or a cancer cell. In some embodiments, the cell is a non-diseased cell. In some embodiments, the method is performed in vitro. In some embodiments, the method is performed in vivo. In some embodiments, the method is performed ex vivo.

In some embodiments, the bispecific antigen-binding molecules disclosed herein can be used for reducing or depleting a population of cells that express a target antigen of interest. The population of cells that is targeted for reduction or depletion can comprise diseased cells, or the population of cells can comprise non-diseased cells that are nonetheless desirable to target for reduction or depletion.

The present disclosure includes methods of inhibiting the growth of a bacteria (e.g., *Staphylococcus* species) in a subject comprising administering a therapeutic composition comprising a bispecific antigen-binding molecule that specifically binds a complement component (e.g., C1q) and a *Staphylococcus* species target antigen (e.g., IsdB) to a subject in need thereof. The therapeutic composition can comprise any of the antibodies or fragments thereof or bispecific antigen-binding molecules as disclosed herein and a pharmaceutically acceptable carrier or diluent.

The present disclosure includes methods of inhibiting the growth of a bacteria (e.g., *Pseudomonas* species) in a subject comprising administering a therapeutic composition comprising a bispecific antigen-binding molecule that specifically binds a complement component (e.g., C1q) and *Pseudomonas* species target antigen (e.g., Ps1) to a subject in need thereof. The therapeutic composition can comprise any of the antibodies or fragments thereof or bispecific antigen-binding molecules as disclosed herein and a pharmaceutically acceptable carrier or diluent.

The antigen-binding molecules of the present disclosure may be used to treat diseases or disorders associated with infection with bacterial species, especially antibiotic resistant species, including a skin infection, cellulitis, pneumonia, meningitis, urinary tract infection, toxic shock syndrome, endocarditis, pericarditis, osteomyelitis, bacteremia, or sepsis. The antigen-binding molecules of the present disclosure may also be used to prevent infections with a bacterial species that may arise as a result of a long hospital stay (i.e. a nosocomial or hospital acquired infection). The antigen-binding molecules of the present disclosure may also be used to prevent infections with a bacterial species that may arise during or following a surgical procedure, such as surgery that involves implantation of a prosthetic. In certain embodiments, the prosthetic may be a prosthetic limb, such as an arm or a leg. In certain embodiments, the prosthetic may be a hip replacement. In certain embodiments, the prosthetic may be a cosmetic prosthetic, such as, but not limited to an ocular prosthetic, silicone hands, fingers, breasts, feet, toes, or a facial implant.

The antigen-binding molecules of the present disclosure may be used to treat diseases or disorders associated with infection with a virus, e.g., influenza virus, smallpox virus, hepatitis virus (e.g., hepatitis A, hepatitis B, or hepatitis C virus), human papillomavirus, human immunodeficiency virus (HIV), respiratory syncytial virus (RSV), herpesvirus, coronavirus, cowpox virus, coxsackievirus, Ebola virus, Epstein-Barr virus, measles virus, mumps virus, rubella virus, rotavirus, rabies virus, yellow fever virus, meningitis, poliovirus, rotavirus, vaccinia virus, varicella-zoster virus, variola virus, or Zika virus. The present disclosure includes methods of inhibiting the growth of a virus (e.g., Influenza virus) in a subject comprising administering a therapeutic composition comprising a bispecific antigen-binding molecule that specifically binds a complement component (e.g., C1q) and a virus target antigen (e.g., Influenza HA) to a subject in need thereof. The therapeutic composition can comprise any of the antibodies or fragments thereof or bispecific antigen-binding molecules as disclosed herein and a pharmaceutically acceptable carrier or diluent.

The present disclosure includes methods of killing or inhibiting the growth of a cell, e.g., a diseased cell, in a subject, by administering a bispecific antigen-binding molecule that specifically binds a complement component (e.g., C1q) and a target antigen expressed on the surface of the cell (e.g., a target antigen expressed by the diseased cell).

In embodiments, the antigen-binding molecules of the present disclosure may be used to treat diseases or disorders associated with cancer, e.g., a CD20-expressing or CD20-overexpressing cancer. The present disclosure includes methods of inhibiting the growth of cancer in a subject comprising administering a therapeutic composition comprising a bispecific antigen-binding molecule that specifically binds a complement component (e.g., C1q) and a cancer-cell specific antigen (e.g., CD20) to a subject in need thereof. The therapeutic composition can comprise any of the antibodies or fragments thereof or bispecific antigen-binding molecules as disclosed herein and a pharmaceutically acceptable carrier or diluent.

The antigen-binding molecules of the present disclosure may be used to treat diseases or disorders associated with an immune cell, e.g., a glucocorticoid induced tumor necrosis factor receptor (GITR) antigen-expressing cell. The antigen-binding molecules of the present disclosure may also be used to treat disease states associated with regulatory T cells. In embodiments, inhibition of regulatory T cells can be useful in the treatment of cancer.

Combination Therapy

The present disclosure provides methods, which comprise administering a pharmaceutical composition comprising any of the exemplary antibodies and bispecific antigen-binding molecules described herein in combination with one or more additional therapeutic agents. Exemplary additional therapeutic agents that may be combined with or administered in combination with a bispecific antigen-binding molecule of the present disclosure comprise, but are not limited to, an antibiotic, an antibody that binds a *Staphylococcus* antigen, an antibody that binds an Influenza virus antigen, anti-viral agent, an antibody that binds a *Pseudomonas* antigen, an antibody that binds to a cancer target cell antigen, an antibody that binds a glucocorticoid induced tumor necrosis factor receptor antigen, an antibody that binds human or cynomolgus C1q, a vaccine specific for a bacterial infection, a vaccine for a viral infection, a vaccine for cancer, *Staphylococcus* species, an Influenza virus, *Pseudomonas* species, a B-cell, or a tumor necrosis factor receptor, an antibody drug conjugate (e.g. a bispecific antibody conjugated to an antibiotic), or combinations thereof.

In various embodiments, bispecific antigen-binding molecule of the present disclosure may be used in combination with an antibody to PD-L1, an antibody to PD-1 (e.g., nivolumab), a LAG-3 inhibitor, a CTLA-4 inhibitor (e.g., ipilimumab), a TIM3 inhibitor, a BTLA inhibitor, a MET inhibitor, a TIGIT inhibitor, a CD47 inhibitor, an antagonist of a T-cell co-inhibitor or ligand (e.g., an antibody to CD-28, 2B4, LY108, LAIR1, ICOS, CD160 or VISTA), an indoleamine-2,3-dioxygenase (IDO) inhibitor, a VEGF antagonist [e.g., a "VEGF-Trap" such as aflibercept or other VEGF-inhibiting fusion protein as set forth in U.S. Pat. No. 7,087,411, or an anti-VEGF antibody or antigen binding fragment thereof (e.g., bevacizumab, or ranibizumab) or a small molecule kinase inhibitor of VEGF receptor (e.g., sunitinib, sorafenib, or pazopanib)], an Ang2 inhibitor (e.g., nesvacumab), a TGFP inhibitor, an EGFR inhibitor (e.g., erlotinib or cetuximab), an agonist to a co-stimulatory receptor (e.g., an agonist to glucocorticoid-induced TNFR-related protein), an antibody to a tumor-specific antigen (e.g., CA9, CA125, MAGEA3, carcinoembryonic antigen (CEA), vimentin, tumor-M2-PK, prostate-specific antigen (PSA), mucin-1, MART-1, or CA19-9), a vaccine (e.g., *Bacillus* Calmette-Guerin, influenza virus, smallpox, hepatitis virus (e.g., hepatitis A, hepatitis B, or hepatitis C virus), human papillomavirus, human immunodeficiency virus (HIV), respiratory syncytial virus (RSV), zoster, chickenpox, herpesvirus, coronavirus, Ebola virus, measles, mumps, rubella, rabies, yellow fever, meningitis, poliovirus, rotavirus, vaccinia virus, pertussis, diphtheria, tetanus, tuberculosis, typhoid, cholera, malaria, anthrax, Lyme disease, and/or a cancer vaccine), an anti-viral agent (e.g., anti-viral antibodies, neuraminidase inhibitors, nucleoside analogs, interferons, an antiretroviral agent, rimantadine, oseltamivir (e.g., TAMIFLU®), zananivir (RELENZA®), peramivir (RAPIVAB®), or baloxavir marboxil (XOFLUZA®), an adjuvant to increase antigen presentation (e.g., granulocyte-macrophage colony-stimulating factor), a bispecific antibody (e.g., CD3×CD20, PSMA×CD3, MUC16×CD3, BCMA×CD3, CD3×CD28, bispecific antibody), a cytotoxin, a chemotherapeutic agent (e.g., dacarbazine, temozolomide, cyclophosphamide, docetaxel, doxorubicin, daunorubicin, cisplatin, carboplatin, gemcitabine, methotrexate, mitoxantrone, oxaliplatin, paclitaxel, or vincristine), cyclophosphamide, radiotherapy, an IL-6R inhibitor (e.g., sarilumab), an IL-4R inhibitor (e.g., dupilumab), an IL-10 inhibitor, an IL-33 inhibitor, a cytokine such as IL-2, IL-7, IL-21, and IL-15, an antibody-drug conjugate (ADC), an antibiotic (e.g., amoxicillin, cefazolin, cefuroxime, cephalexin, ciprofloaxicin, clindamycin, daptomycin, dicloxacillin, doxycycline, fosfomycin, flucloxacillin, lincomycin, linezolid, methicillin, nafcillin, oxacillin, penicillin, rifampin, telavancin, vancomycin, an aminoglyside, a carbapenem, a cephalosporin, a fluoroquinolone, a monobactam, or a polymyxin), an anti-inflammatory drug (e.g., corticosteroids or non-steroidal anti-inflammatory drugs), a dietary supplement such as anti-oxidants, or palliative care.

In some embodiments, the additional therapeutic agent is an anti-cancer agent. The anti-cancer agent may target the same or a different antigen as the antigen-binding molecule of the disclosure. As a non-limiting example, an antigen-binding molecule that specifically binds CD20 can be administered in combination with a second therapeutic agent (e.g., anti-cancer agent) that also targets CD20, or can be administered in combination with a therapeutic agent (e.g., anti-cancer agent) that targets a different antigen, such as CD3, PD-1, PD-L1, or other antigens. In some embodiments, the additional therapeutic agent is an antibody (e.g., a monospecific, bispecific, or multispecific antibody). In some embodiments, the additional therapeutic agent is a bispecific or multispecific antibody in which one arm targets the same antigen as the antigen-binding molecule of the disclosure. For example, an antigen-binding molecule that specifically binds CD20 can be administered in combination with a bispecific antibody having an anti-CD20 arm (e.g., an anti-CD3× anti-CD20 arm). In some embodiments, the additional therapeutic agent is a bispecific or multispecific antibody that does not target the same antigen as the antigen-binding molecule of the disclosure.

The additional therapeutically active component(s) may be administered prior to, concurrent with, or shortly after the administration of an antigen-binding molecule of the present disclosure. For the purposes of the present disclosure, such administration regimens are considered the administration of an antigen-binding molecule "in combination with" an additional therapeutically active component.

The present disclosure includes pharmaceutical compositions in which an antigen-binding molecule of the present disclosure is co-formulated with one or more of the additional therapeutically active component(s) as described elsewhere herein.

EXAMPLES

The following examples are put forth so as to provide those of ordinary skill in the art with a complete disclosure and description of how to make and use the methods and compositions of the disclosure, and are not intended to limit the scope of what the inventors regard as their disclosure. Efforts have been made to ensure accuracy with respect to numbers used (e.g., amounts, temperature, etc.) but some experimental errors and deviations should be accounted for. Unless indicated otherwise, parts are parts by weight, molecular weight is average molecular weight, temperature is in degrees Centigrade, and pressure is at or near atmospheric.

Example 1. Preparation of Anti-C1q Antibodies

Anti-C1q antibodies were obtained by immunizing a VELOCIMMUNE® mouse (i.e., an engineered mouse comprising DNA encoding human Immunoglobulin heavy and kappa light chain variable regions; see U.S. Pat. No. 6,596,541) with a human complement component 1q (C1q). Exemplary anti-C1q antibodies are described in U.S. Ser. No. 16/143,901 and PCT/US2018/053064.

Human complement C1q is a hexamer that comprises three unique subunits: A (29 kDa); B (26 kDa); and C (22 kDa). An exemplary sequence of subunit A is found at amino acids 1-245 of accession number NP_057075. An exemplary sequence of subunit B is found at amino acids 1-253 of accession number NP_000482. An exemplary sequence of subunit C is found at amino acids 1-245 of accession number NP_758957. Human C1q is also commercially available from a source such as Quidel. In embodiments, the commercially available human C1q from Quidel was used as the immunogen. The antibody immune response was monitored by a C1q-specific immunoassay.

Several fully human anti-C1q antibodies were isolated directly from antigen-positive B cells from the VELOCIMMUNE® mouse without fusion to myeloma cells, as described in U.S. Pat. No. 7,582,298, which is incorporated by reference herein. As will be appreciated by a person of ordinary skill in the art, an antibody having a particular Fc isotype can be converted to an antibody with a different Fc isotype (e.g., an antibody with a mouse IgG1 Fc can be converted to an antibody with a human IgG4, etc.), but in any event, the variable domains (including the CDRs)—which are indicated by the numerical identifiers shown in Table 1—will remain the same, and the binding properties are expected to be identical or substantially similar regardless of the nature of the Fc domain.

Once the antibodies were isolated, the nucleic acid and amino acid sequences were obtained. The amino acid sequence identifiers of the exemplary anti-C1q antibodies mAb17736 and mAb18395, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC) are shown in Table 1 below. The nucleic acid sequence identifiers are shown in Table 2.

TABLE 1

Amino Acid Sequence Identifiers for anti-hC1q antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb17736 | 2 | 4 | 6 | 8 | 10 | 12 | 14 | 16 | 83 | 85 |
| mAb18395 | 18 | 20 | 22 | 24 | 10 | 12 | 14 | 16 | 89 | 85 |

TABLE 2

Nucleic Acid Sequence Identifiers for anti-hC1q antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb17736 | 1 | 3 | 5 | 7 | 9 | 11 | 13 | 15 |
| mAb18395 | 17 | 19 | 21 | 23 | 9 | 11 | 13 | 15 |

Example 2. Preparation of Anti-IsdB Antibodies

Anti-IsdB antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from a heme uptake protein IsdB from *Staphylococcus aureus* (IsdB). Exemplary anti-IsdB antibodies are described in U.S. Ser. No. 16/143,901 and PCT/US2018/053064.

An embodiment of the antigen comprises amino acids Alanine 41 to threonine 613 of Accession No. WP_099560907. Another embodiment of the antigen, identified as IsdB.6× (His), is used in assays. IsdB.6× (His) includes linkers and 6 histidines and has the sequence of SEQ ID NO: 80. The antibody immune response was monitored by an IsdB-specific immunoassay.

Several fully human anti-IsdB antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of the anti-C1q antibodies exemplary anti-IsdB antibody mAb20295, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 3 below. The nucleic acid sequence identifiers are shown in Table 4.

Example 3. Preparation of Anti-CD20 Antibodies

Anti-CD20 antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from human B lymphocyte restricted antigen found on mature B cells. Exemplary anti-CD20 antibodies are described in U.S. Pat. No. 9,657,102, US Publication No. 2015/0266966, and US Publication No. 2018/0194841.

An embodiment of the antigen comprises amino acids as shown in Genbank NP_690605. Mice can also be immunized with CD20 expressing Raji cells. The antibody immune response was monitored by a CD20-specific immunoassay.

Several fully human anti-CD20 antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of an exemplary anti-CD20 antibody mAb14303, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 5 below. The nucleic acid sequence identifiers are shown in Table 6.

TABLE 3

Amino Acid Sequence Identifiers for anti-IsdB antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb20295 | 26 | 28 | 30 | 32 | 10 | 12 | 14 | 16 | 84 | 85 |

TABLE 4

Nucleic Acid Sequence identifiers for anti-IsdB antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb20295 | 25 | 27 | 29 | 31 | 9 | 11 | 13 | 15 |

TABLE 5

Amino Acid Sequence Identifiers for Anti-CD20 Antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb14303 | 34 | 36 | 38 | 40 | 10 | 12 | 14 | 16 | 86 | 85 |

TABLE 6

Nucleic Acid Sequence Identifiers for Anti-CD20 Antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb14303 | 33 | 35 | 37 | 39 | 9 | 11 | 13 | 15 |

Example 4. Preparation of Anti-Influenza HA Antibodies

Anti-Influenza HA antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from an H1N1 strain of Influenza. Exemplary anti-HA antibodies are described in U.S. Ser. No. 14/974,361 having Publication No. 2016/0176953.

An embodiment of the antigen comprises amino acids as shown in Genbank AAP34324. An example of the amino acid sequence of an Influenza HA antigen, identified as H1N1 Ecto foldon-foldon-Bir-His6, is amino acids 1 to 519 of Genbank AAP34324 with an amino acid substitution at position 108 of a Phe (F) for a Tyr (Y) having the amino acid sequence of SEQ ID NO: 81. The foldon domain provides for trimerization of the H1N1 ectodomain of HA. The antibody immune response was monitored by an Influenza HA-specific immunoassay.

Several fully human anti-Influenza HA antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of an exemplary anti-Influenza HA antibody mAb11829, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 7 below. The nucleic acid sequence identifiers are shown in Table 8.

TABLE 7

Amino Acid Sequence Identifiers for Anti-Influenza HA Antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb11829 | 42 | 44 | 46 | 48 | 10 | 12 | 14 | 16 | 87 | 85 |

TABLE 8

Nucleic Acid Sequence Identifiers for Anti- Influenza HA Antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb11829 | 41 | 43 | 45 | 47 | 9 | 11 | 13 | 15 |

Example 5. Preparation of Anti-GITR Antibodies

Anti-GITR antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from human tumor necrosis factor receptor superfamily member 18. Exemplary anti-GITR antibodies are described in U.S. Ser. No. 15/619,068 having publication number US2017/0355774.

An embodiment of the antigen comprises amino acids as shown in Genbank NP_683700. Another embodiments of GITR, identified as hGITR.mmm, has amino acids Gln (Q) at position 26 to Pro (P) at position 162 of the sequence of Accession No. NP_683700 and mmh domain of amino acids 136-165 of SEQ ID NO: 82. Mice can be immunized with HEK293 cells expressing GITR or CHO-K1 cells expressing GITR. The antibody immune response was monitored by a GITR-specific immunoassay.

Several fully human anti-GITR antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of an exemplary anti-G1TR antibody mAb14536, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 9 below. The nucleic acid sequence identifiers are shown in Table 10.

TABLE 9

Amino Acid Sequence Identifiers for Anti-GITR Antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb14536 | 50 | 52 | 54 | 56 | 10 | 12 | 14 | 16 | 88 | 85 |

TABLE 10

Nucleic Acid Sequence Identifiers for Anti-GITR Antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb14536 | 49 | 51 | 53 | 55 | 9 | 11 | 13 | 15 |

Example 6. Preparation of Anti-Ps1 Antibodies

Recombinant C1q bispecific REGN 5409 was produced in CHO cells after transfection with two expression plasmids. One of the expression plasmids encodes the heavy chain (hIgG1) and light chain of an antibody that binds Ps1 and the second expression plasmid encodes a C1q binding scFv-Fc (hIgG1), whose Fc contains the "Fc*" mutation. Specifically, the C1q binding scFv-Fc* was constructed as follows: (1-39 ULC VK_(G4S) 3 Linker_17736PVH.hIgG1 (amino acids D104-K330; H318R, Y319F (UniProtKB/Swiss-Prot: P01857.1). The scFv containing bispecific molecules were purified as described previously (Sci Rep. 2015 Dec. 11; 5:17943).

The amino acid sequence identifiers of an exemplary anti-Ps1 antibody, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 11 below.

TABLE 11

Amino Acid Sequence Identifiers for exemplary anti-Ps1 antibody

| Antibody Designation | HC | HCVR | HCDR1 | HCDR2 | HCDR3 | LC | LCVR | LCDR1 | LCDR2 | LCDR3 |
|---|---|---|---|---|---|---|---|---|---|---|
| REGN 5409 | 78 | residues 1-118 of SEQ ID NO: 78 | 31-35 of SEQ ID NO: 78 | 50-65 of SEQ ID NO: 78 | 98-109 of SEQ ID NO: 78 | 79 | residues 1-108 of SEQ ID NO: 79 | 23-33 of SEQ ID NO: 79 | 49-55 of SEQ ID NO: 79 | 88-99 of SEQ ID NO: 79 |

Example 7: Preparation of Anti-Protein A Antibodies

Anti-protein A antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from protein A of *Staphylococcus aureus*. An embodiment of the protein A antigen comprises amino acids as shown in Genbank Accession No. AGE10362. The antibody immune response was monitored by a protein A-specific immunoassay.

Several fully human anti-Protein A antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of an exemplary anti-protein A antibody mAb15144, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 12 below. The nucleic acid sequence identifiers are shown in Table 13.

TABLE 12

Amino Acid Sequence Identifiers for Anti-Protein A Antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb15144 | 58 | 60 | 62 | 64 | 10 | 12 | 14 | 16 | 90 | 85 |

TABLE 13

Nucleic Acid Sequence Identifiers for Anti-Protein A Antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb15144 | 57 | 59 | 61 | 63 | 9 | 11 | 13 | 15 |

Example 8: Preparation of Anti-IsdA Antibodies

Anti-IsdA antibodies were obtained by immunizing a VELOCIMMUNE® mouse (i.e., an engineered mouse comprising DNA encoding human Immunoglobulin heavy and kappa light chain variable regions, see U.S. Pat. No. 6,596,541) with an antigen derived from heme uptake protein IsdA from *Staphylococcus aureus* (IsdA). An embodiment of the antigen comprises amino acids as shown in Genbank Accession No. AFH 69349. The antibody immune response was monitored by an IsdA-specific immunoassay.

Several fully human anti-IsdA antibodies were isolated directly from antigen-positive B cells VELOCIMMUNE® mouse without fusion to myeloma cells, as described in U.S. Pat. No. 7,582,298. Once the antibodies were isolated, the nucleic acid and amino acid sequences were obtained. The amino acid sequence identifiers of an exemplary anti-IsdA antibody mAb20334, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 14 below. The nucleic acid sequence identifiers are shown in Table 15.

TABLE 14

Amino Acid Sequence Identifiers for Anti-IsdA Antibodies
SEQ ID NOs:

| Antibody designation | HCVR | HCDR1 | HCDR2 | HCDR3 | LCVR | LCDR1 | LCDR2 | LCDR3 | HC | LC |
|---|---|---|---|---|---|---|---|---|---|---|
| mAb20334 | 66 | 68 | 70 | 72 | 10 | 12 | 14 | 16 | 91 | 85 |

TABLE 15

Nucleic Acid Sequence Identifiers for Anti-IsdA Antibodies
SEQ ID NOs:

| Antibody designation | HCVR | HCDR1 | HCDR2 | HCDR3 | LCVR | LCDR1 | LCDR2 | LCDR3 |
|---|---|---|---|---|---|---|---|---|
| mAb20334 | 65 | 67 | 69 | 71 | 9 | 11 | 13 | 15 |

Example 9. Preparation of Anti-Poly-N-acetylglucosamine (PNAG)

Recombinant C1q bispecific antibody REGN5536 was produced in CHO cells after transfection with two expression plasmids. One of the expression plasmids encodes the heavy chain (hIgG1) and light chain of an antibody that binds PNAG and the second expression plasmid encodes a C1q binding scFv-Fc (hIgG1), whose Fc contains the "Fc*" mutation. Specifically, the C1q binding scFv-Fc* was constructed as follows: (1-39 ULC VK_(G4S) 3 Linker_17736PVH.hIgG1 (amino acids D104-K330; H318R, Y319F (UniProtKB/Swiss-Prot: P01857.1). The scFv containing bispecific molecules were purified as described previously (Sci Rep. 2015 Dec. 11; 5:17943).

The amino acid sequence identifiers of an exemplary anti-PNAG antibody, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 16 below.

TABLE 16

Amino Acid Sequence Identifiers for exemplary anti-PNAG antibody

| Antibody Designation | HC | HCVR | HCDR1 | HCDR2 | HCDR3 | LC | LCVR | LCDR1 | LCDR2 | LCDR3 |
|---|---|---|---|---|---|---|---|---|---|---|
| REGN 5536 | 76 | residues 1-118 of SEQ ID NO: 76 | 26-33 of SEQ ID NO: 76 | 51-58 of SEQ ID NO: 76 | 96-106 of SEQ ID NO: 76 | 77 | residues 1-108 of SEQ ID NO: 77 | 27-32 of SEQ ID NO: 77 | 50-52 of SEQ ID NO: 77 | 93-101 of SEQ ID NO: 77 |

Example 10. Preparation of Anti-Clumping Factor A (ClfA)

Recombinant C1q bispecific antibody REGN5738 was produced in CHO cells after transfection with two expression plasmids. One of the expression plasmids encodes the heavy chain (hIgG1) and light chain of an antibody that binds ClfA and the second expression plasmid encodes a C1q binding scFv-Fc (hIgG1), whose Fc contains the "Fc*" mutation. Specifically, the C1q binding scFv-Fc* was constructed as follows: (1-39 ULC VK_(G4S) 3 Linker_17736PVH.hIgG1 (amino acids D104-K330; H318R, Y319F (UniProtKB/Swiss-Prot: P01857.1). The scFv containing bispecific molecules were purified as described previously (Sci Rep. 2015 Dec. 11; 5:17943).

Once the antibodies were isolated, the nucleic acid and amino acid sequences were obtained. The amino acid sequence identifiers of an exemplary anti-ClfA antibody, including heavy chain variable region (HCVR), heavy chain complementarity determining region 1 (HCDR1), heavy chain complementarity determining region 2 (HCDR2), heavy chain complementarity determining region 3 (HCDR3), light chain variable region (LCVR), light chain complementarity determining region 1 (LCDR1), light chain complementarity determining region 2 (HCDR2), light chain complementarity determining region 3 (HCDR3), heavy chain (HC), and light chain (LC), are shown in Table 17 below.

TABLE 17

Amino Acid Sequence Identifiers for exemplary anti-ClfA antibody

| Antibody Designation | HC | HCVR | HCDR1 | HCDR2 | HCDR3 | LC | LCVR | LCDR1 | LCDR2 | LCDR3 |
|---|---|---|---|---|---|---|---|---|---|---|
| REGN 5738 | 73 | residues 1-118 of SEQ ID NO: 73 | 26-33 of SEQ ID NO: 73 | 51-58 of SEQ ID NO: 73 | 96-106 of SEQ ID NO: 73 | 74 | residues 1-108 of SEQ ID NO: 74 | 27-32 of SEQ ID NO: 74 | 51-55 of SEQ ID NO: 74 | 89-98 of SEQ ID NO: 74 |

Example 11. Preparation of Bispecific Anti-C1q Bispecific Antibodies

Bispecific antibodies comprising an anti-C1q-specific binding domain and an target antigen-specific binding domain were constructed using standard methodologies wherein a heavy chain and light chain variable domain from an anti-C1q antibody were combined a target antigen-specific antigen binding domain comprising a heavy chain and light chain variable domain from an anti-IsdB antibody; a heavy chain and light chain variable domain from an anti-CD20 antibody; a heavy chain and light chain variable domain from an anti-GITR antibody; a heavy chain and light chain variable domain from an anti-Psl antibody; a heavy chain and light chain variable domain from an anti-protein A antibody; a heavy chain and light chain variable domain from an anti-IsdA antibody; a heavy chain and light chain variable domain from an anti-PNAG antibody; or a heavy chain and light chain variable domain from an anti-ClfA antibody. The antibodies used to construct the bispecific antibodies (bsAb) of this example were obtained as described in Examples 1-10. The sequence identification numbers for the bispecific antibodies described herein are presented in Table 18.

TABLE 18

Amino Acid Sequences of Bispecific Antibodies

SEQ ID NOs:

| bsAb | Anti-IsdB | | | | Anti-C1q | | | | ULC1-39 | | | |
|---|---|---|---|---|---|---|---|---|---|---|---|---|
| | HCVR | HCDR1 | HCDR2 | HCDR3 | HCVR | HCDR1 | HCDR2 | HCDR3 | LCVR | LCDR1 | LCDR2 | LCDR3 |
| REGN5066 | 26 | 28 | 30 | 32 | 2 | 4 | 6 | 8 | 10 | 12 | 14 | 16 |
| REGN5067 | 26 | 28 | 30 | 32 | 18 | 20 | 22 | 24 | 10 | 12 | 14 | 16 |

| | Anti-CD20 | | | | Anti-C1q | | | | ULC1-39 | | | |
|---|---|---|---|---|---|---|---|---|---|---|---|---|
| REGN5177 | 34 | 36 | 38 | 40 | 2 | 4 | 6 | 8 | 10 | 12 | 14 | 16 |

Example 12. Human Serum Complement Dependent Killing of S. Aureus

| | Anti-Influenza HA | | | | Anti-C1q | | | | ULC1-39 | | | |
|---|---|---|---|---|---|---|---|---|---|---|---|---|
| REGN 6093 | 42 | 44 | 46 | 48 | 2 | 4 | 6 | 8 | 10 | 12 | 14 | 16 |

| | Anti-GITR | | | | Anti-C1q | | | | ULC1-39 | | | |
|---|---|---|---|---|---|---|---|---|---|---|---|---|
| REGN 6545 | 50 | 52 | 54 | 56 | 2 | 4 | 6 | 8 | 10 | 12 | 14 | 16 |
| REGN 6546 | 50 | 52 | 54 | 56 | 18 | 20 | 22 | 24 | 10 | 12 | 14 | 16 |

| | Anti-Protein A | | | | Anti-C1q | | | | ULC1-39 | | | |
|---|---|---|---|---|---|---|---|---|---|---|---|---|
| REGN 5551 | 58 | 60 | 62 | 64 | 2 | 4 | 6 | 8 | 10 | 12 | 14 | 16 |

| | Anti-IsdA | | | | Anti-C1q | | | | UCL-39 | | | |
|---|---|---|---|---|---|---|---|---|---|---|---|---|
| REGN 5553 | 66 | 68 | 70 | 72 | 2 | 4 | 6 | 8 | 10 | 12 | 14 | 16 |

| | Anti-Psl | | | | Anti-C1q | | | | Anti-Psl LC | | | |
|---|---|---|---|---|---|---|---|---|---|---|---|---|
| REGN 5409 | Aa 1-118 of SEQ ID NO: 78 | Aa 31-35 of SEQ ID NO: 78 | Aa 50-65 of SEQ ID NO: 78 | Aa 98-109 of SEQ ID NO: 78 | 75 | 4 | 6 | 8 | Aa 1-108 of SEQ ID NO: 79 | Aa 23-33 of SEQ ID NO: 79 | Aa 49-55 of SEQ ID NO: 79 | Aa 88-99 of SEQ ID NO: 79 |

| | Anti-PNAG | | | | Anti-C1q | | | | Anti-PNAG LC | | | |
|---|---|---|---|---|---|---|---|---|---|---|---|---|
| REGN 5536 | Aa 1-118 of SEQ ID NO: 76 | Aa 27-32 of SEQ ID NO: 76 | Aa 51-58 of SEQ ID NO: 76 | Aa 96-106 of SEQ ID NO: 76 | 75 | 4 | 6 | 8 | Aa 1-108 of SEQ ID NO: 77 | Aa 27-32 of SEQ ID NO: 77 | Aa 50-52 of SEQ ID NO: 77 | Aa 93-101 of SEQ ID NO: 77 |

| | Anti-CflA | | | | Anti-C1q | | | | Anti-ClfA LC | | | |
|---|---|---|---|---|---|---|---|---|---|---|---|---|
| REGN 5738 | Aa 1-118 of SEQ ID NO: 73 | Aa 26-33 of SEQ ID NO: 73 | Aa 51-58 of SEQ ID NO: 73 | Aa 96-106 of SEQ ID NO: 73 | 75 | 4 | 6 | 8 | Aa 1-108 of SEQ ID NO: 74 | Aa 27-32 of SEQ ID NO: 74 | Aa 51-55 of SEQ ID NO: 74 | Aa 89-98 of SEQ ID NO: 74 |

Materials and Methods
Bacterial Strains and Growth Conditions.

*S. aureus* Newman wild-type (wt) and *S. aureus* Newman Δspa were grown in phenol-free RPMI (Gibco) at 37° C. unless otherwise noted.

Scanning Electron Microscopy (SEM) Visualization of *S. aureus*.

*S. aureus* Newman Δspa was grown in phenol-free RPMI medium (Gibco) at 37° C. overnight. The bacteria were washed two times with PBS and resuspended in phenol-free RPMI, 0.05% BSA to an $OD_{600}$~1.500 μl of bacteria was mixed with 500 μl of NHS (Bioreclamation) or 500 ul phenol-free RPMI, 0.05% BSA. The samples were incubated at 37° C. for 8 h with shaking. The bacteria were then washed three times with PBS. For EM analyses, samples were fixed 1:1 with a 2× fixative of 5% glutaraldehyde, 4% paraformaldehyde in 0.2M Sodium Cacodylate buffer, and dehydrated through a graded series of ethanol. Samples were critical point dried using liquid carbon dioxide in a Tousimis Samdri 795 Critical Point Drier (Rockville MD), coated with carbon in a Quorum EMS 150T ES (Quorum Technologies Ltd, United Kingdom) and examined in a Zeiss Supra Field Emission Scanning Electron Microscope (Carl Zeiss Microscopy, LLC North America), using an accelerating voltage of 8 KV.

Determination of Complement Deposition by Fluorescent Microscopy.

*S. aureus* Newman Δspa was grown in phenol-free RPMI medium (Gibco) at 37° C. overnight. The bacteria were washed one time with PBS and resuspended in 3% bovine serum albumin (BSA) in PBS. They were blocked for 30 min at room temperature and then washed two times with PBS and resuspended in phenol-free RPMI, 0.05% BSA to an $OD_{600}$~1. 500 μl of bacteria was mixed with 500 μl of 20% normal human serum (NHS, Bioreclamation), 500 μl 20% C6-depleted serum (Quidel), or 500 μl phenol-free RPMI, 0.05% BSA. The samples were incubated for 1 h at 37° C. with shaking. After 1 h, the bacteria were washed three times with PBS and resuspended in 1 ml of 1% BSA in PBS. Samples were aliquoted and then probed with goat anti-human C1q (Genway), mouse anti-human C3 (Biolegend), and mouse anti-human C5b9 (Abcam) as primary antibodies at a final concentration of 1 g/ml. As controls non-specific mouse IgG1 and mouse IgG2a antibodies were used. Samples were incubated with primary antibodies for 1 h at room temperature and then washed three times with PBS. They were resuspended in 100 μl of 1% BSA in PBS and then probed with donkey anti-goat IgG conjugated to Alexa Fluor 488 (1:4000, ThermoFisher) or goat anti-mouse IgG conjugated to Alexa Fluor 488 (1:4000, ThermoFisher) secondary antibody. DAPI (4',6-diamidino-2-phenylindole, dihydrochloride, Biolegend) was added to samples at 5 μg/ml and they were incubated for 45 min at room temperature. The samples were then visualized on a Zeiss LSM780 confocal microscope.

Serum Killing Assay.

*S. aureus* Newman was grown in phenol-free RPMI medium (Gibco) at 37° C. overnight. The bacteria were washed one time with PBS and resuspended in RPMI, 0.05% bovine serum albumin to an $OD_{600}$~0.5. They were then diluted to a final concentration of ~$1.0 \times 10^5$ cfu/ml (a 1,000-fold dilution). Bacteria were subsequently mixed with an equal volume of normal human serum (Quidel) or human serum depleted of a terminal complement protein (Quidel) such that the final concentration of serum was 50%. The samples were incubated at 37° C. for 24 h with shaking. Bacterial survival was measured using BacTiter-Glo™ (Promega) according to the manufacturer's instructions. Briefly BacTiter-Glo™ buffer was added to BacTiter-Glo™ substrate and then 100 μl of this reagent was added to 100 μl of bacterial sample in a 96-well plate. The plate was mixed for 30 s on an orbital plate shaker (Eppendort) and then incubated for 5 min at room temperature. Luminescence was then measured on a SpectraMax i3× plate reader.

Visualizing MAC Mediated Killing by Viability Dye Uptake.

*S. aureus* Newman Δspa was grown in phenol-free RPMI medium (Gibco) until it reached an $OD_{600}$~1.0. The bacteria were washed one time with PBS and resuspended in 3% bovine serum albumin (BSA) in PBS. They were blocked for 30 min at room temperature and then washed two times with PBS and resuspended in phenol-free RPMI, 0.05% BSA to an $OD_{600}$~1.200 μl of bacteria was mixed with 200 μl of NHS (Quidel) or 200 μl C1-depleted serum (Quidel). Separate samples were prepared in triplicate for 0, 10 h, and 24 h analysis. Samples were incubated for the indicated time at 37° C. with shaking. After incubation propidium iodide (PI) was added to each sample to a final concentration of 1 μg/ml and incubated at room temperature for 5 min. Fluorescence was measured on a SpectraMax i3× plate reader (Excitation 533 nm, emission 617 nm). A separate aliquot of sample was analyzed using the BacTiter-Glo™ kit as described above.

Results and Conclusion

Previous work has shown complement proteins, including C5b9 complexes, deposit on the surface of Gram-positive organisms after short incubations (1-2 h) in 10% normal human serum (NHS), however no functional consequence of deposition was observed. To better understand how complement affects Gram-positive organisms, *S. aureus* incubated with either 50% NHS (FIG. 1*a*), which is closer to physiological levels than previously tested, or media (FIG. 1*b*) was visualized. Scanning electron microscopy (SEM) showed striking differences to the surface of *S. aureus* after 8 h of incubation with NHS (FIG. 1*a*). Complement deposition on *S. aureus* in the presence of NHS but not media was confirmed (data not shown).

Bacteria were incubated with 50% NHS, 50% C5-depleted serum, or media for 1 h at 37° C. Complement deposition was visualized using a primary antibody specific for C1q, C3, or a neo-epitope that forms upon C5b9 complex formation. In the presence of 50% NHS, surface-bound C1q, C3, and C5b9 proteins were observed (data not shown) with similar distribution. Depletion of C5 resulted in C1q and C3 deposition, but not C5b9, indicating the need for a complete terminal pathway for C5b9 formation.

Figure 2:
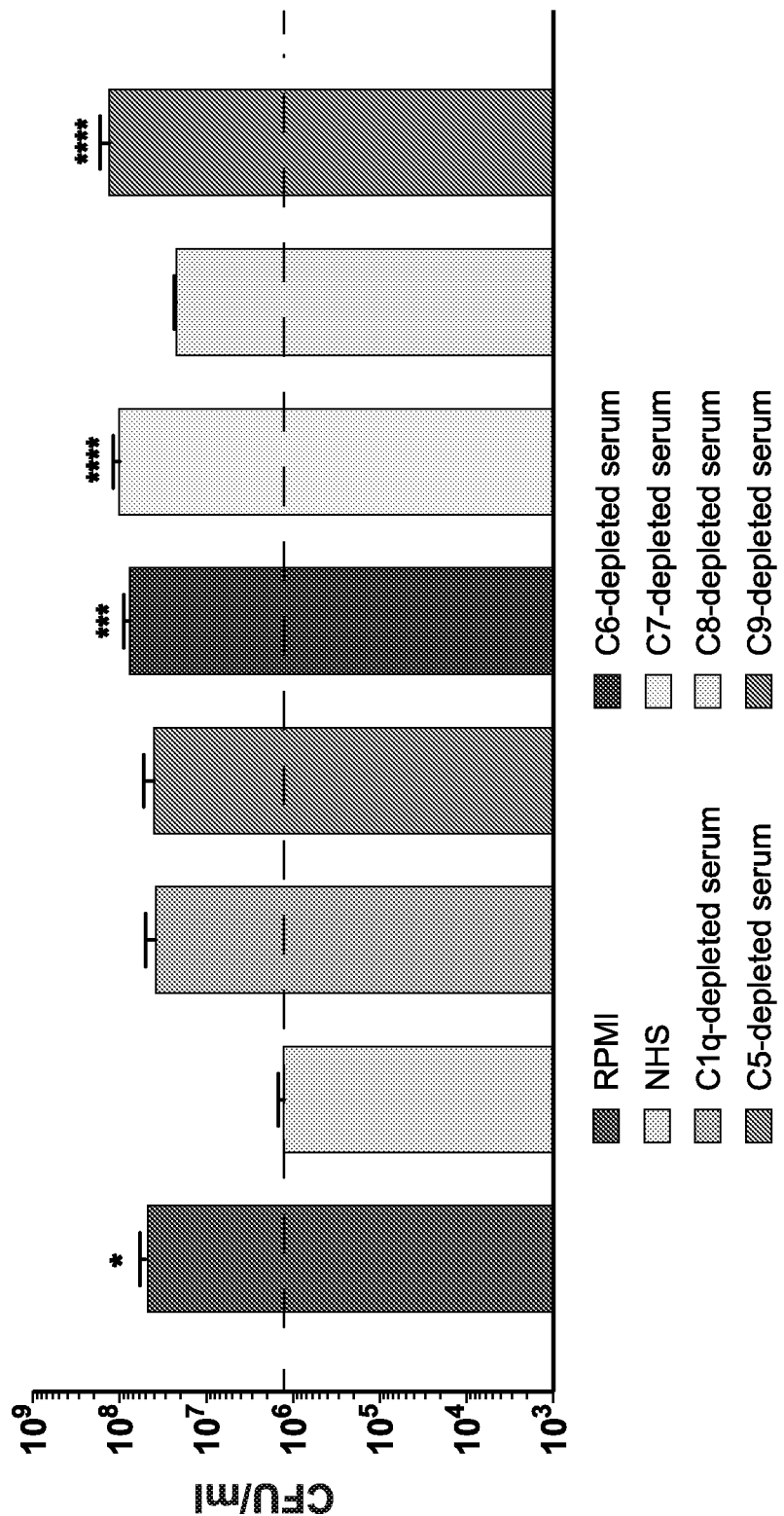
FIG. 2. A complete terminal complement pathway is necessary for C5b9 formation and NHS mediated reduction in the growth of *S. aureus*. The effect of human serum on growth of *S. aureus* was measured using serum killing assays. *S. aureus* was incubated with 50% of the indicated sera or medium for 24 h. After incubation bacteria were enumerated by serial dilution and plating. Results are plotted as mean with standard deviation. *$P<0.05$, *$P<0.001$, **$P<0.0001$, one-way ANOVA with Dunnett's test showing significance compared to the NHS sample.

Incubation with NHS resulted in killing of *S. aureus* and is dependent on an intact terminal complement pathway (FIG. 2). For this experiment, bacteria were incubated for 24 h at 37° C. with a more physiological concentration of serum, 50% NHS, or 50% NHS depleted of individual terminal complement components (C1q, C5, C6, C7, C8, or C9). In 50% NHS viable bacteria were reduced 100-fold compared to media alone, as measured by serial dilution and plating (FIG. 2). Similar results were observed when ATP release was used to quantify viable bacteria (FIG. 4). When serum was depleted of C1q or any terminal complement component (C5, C6, C7, C8, C9; FIG. 2), growth was restored comparable to levels seen in media, confirming that *S. aureus* killing is dependent on formation of the MAC. Furthermore, incubation of *S. aureus* with NHS, but not serum depleted of C1q or C5, resulted in uptake of a viability dye, propidium iodide (PI) (FIG. 3). *S. aureus* was incubated with 50% NHS, 50% C1q-depleted serum, or 50% C5-depleted serum for 0, 10, or 24 h followed by addition of PI.

Figure 3:
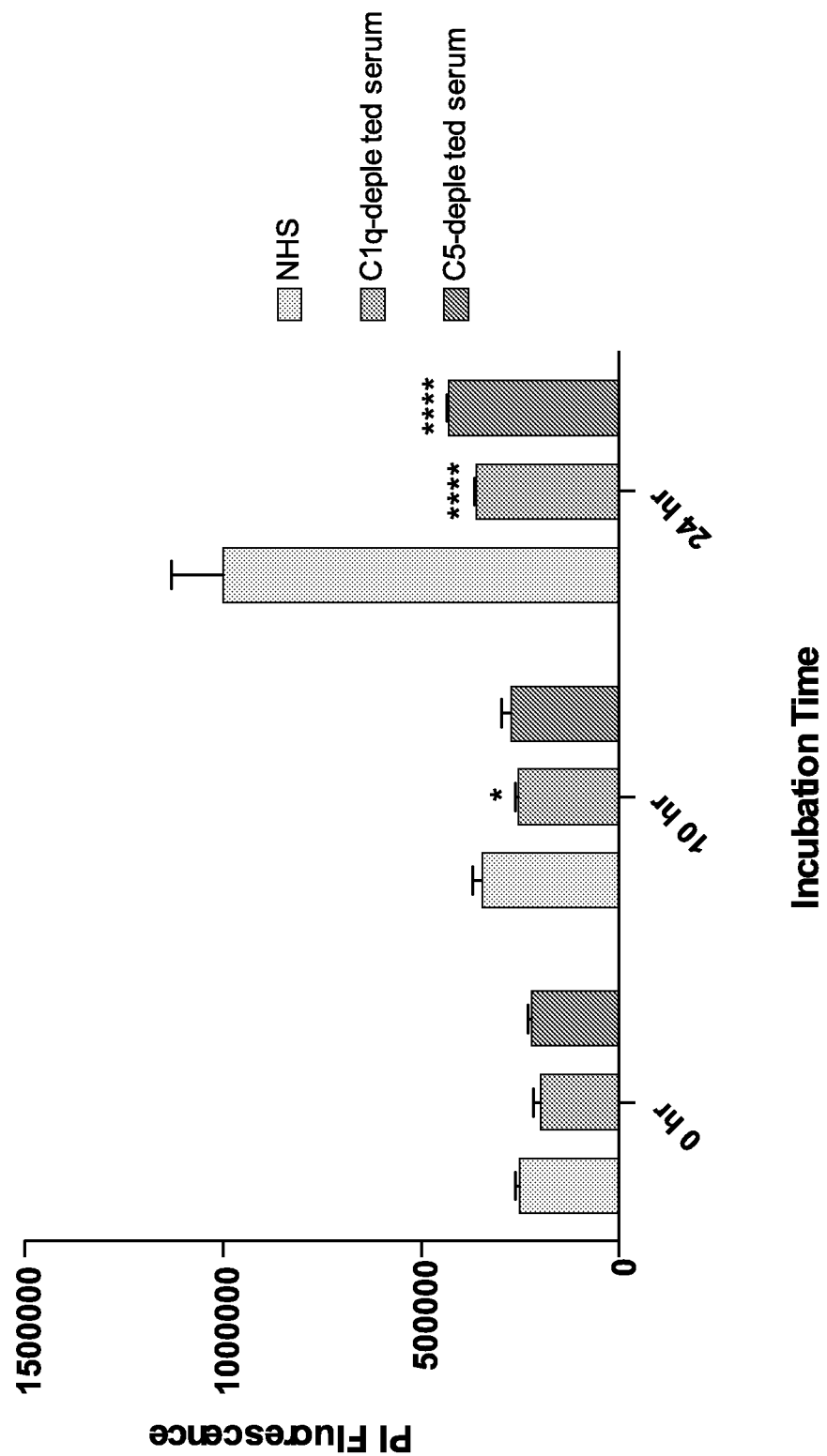
FIG. 3. *S. aureus* treatment with NHS leads to reduced cell viability. *S. aureus* was incubated with 50% NHS, 50% C1q-depleted serum, or 50% C5-depleted serum for 0, 10, and 24 h at 37° C. Uptake of the viability dye propidium iodide (PI) was assessed using by measuring fluorescence (excitation 533 nm, emission 617 nm) on a 96-well plate reader. Results are plotted as mean with standard deviation. *$P<0.05$, ****$P<0.001$, two-way ANOVA showing values significantly different than NHS.
Figure 4:
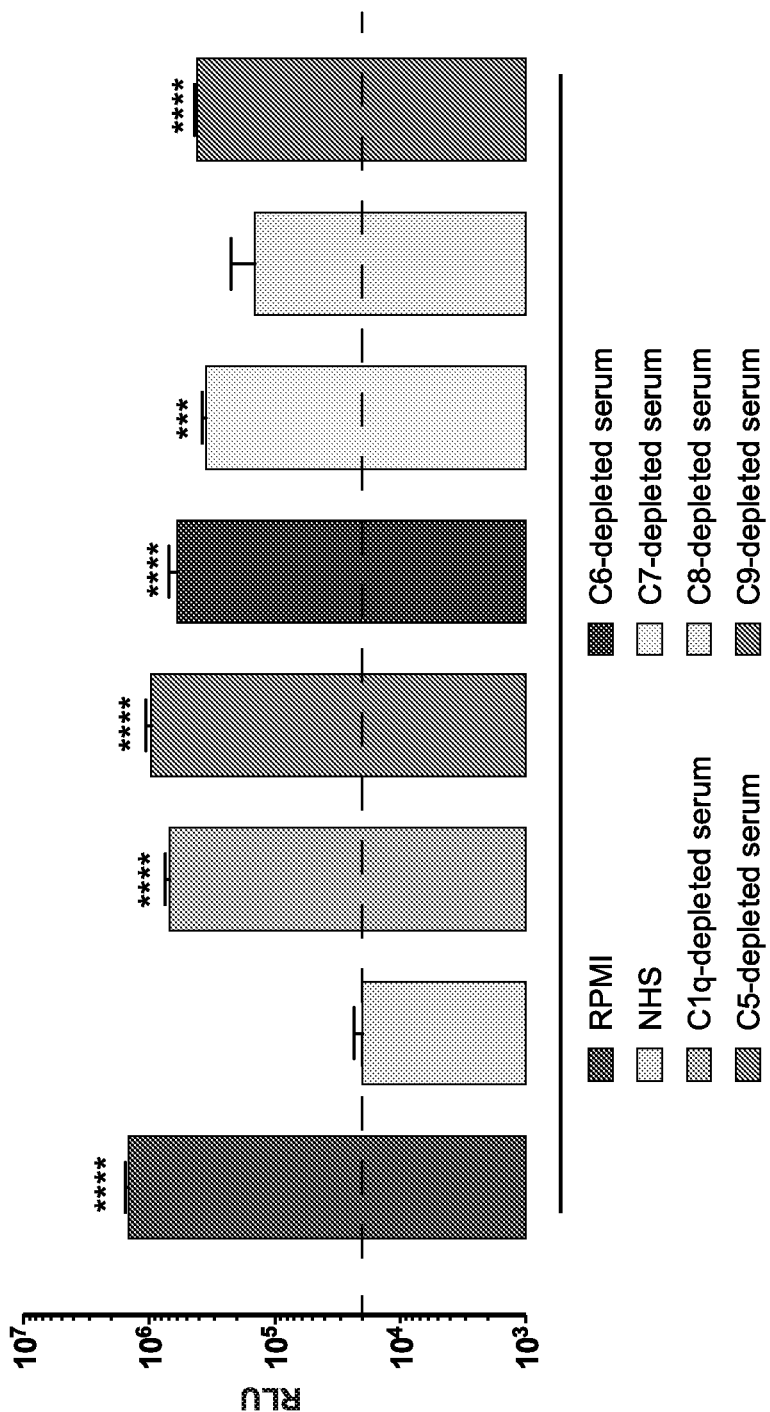
FIG. 4. A complete terminal complement pathway is necessary for NHS mediated reduction in the growth of *S. aureus* as measured using BacTiter-Glo™ assay. The effect of human serum on growth of *S. aureus* was measured using serum killing assays. *S. aureus* was incubated with 50% of the indicated sera or medium for 24 h. After incubation bacterial concentration was measured using the BacTiter-Glo™ assay, a luminescent assay which measures the number of viable cells in a culture via ATP release. Increased luminescence corresponds to higher concentrations of bacteria. Results are plotted as mean with standard deviation. *$P<0.001$, **$P<0.0001$, one-way ANOVA with Dunnett's test showing significance compared to the NHS sample.

While the level of PI staining was similar at 0 h, at 24 h there was a significant increase in the amount of PI taken up in the NHS treated samples indicating loss of viability which was not observed in complement depleted sera (FIG. 3). This indicates that complement activation can directly reduce the viability of S. aureus.

Example 13. Bispecific Antibodies Anti-IsdB× Anti-C1q, Anti-Protein A× Anti-C1q, Anti-IsdA× Anti C1q, Anti-PNAG× Anti-C1q, and Anti-CflA× Anti-C1q Bind to S. aureus and Facilitate Complement Deposition and Killing of S. Aureus This example shows that bispecific antibodies directing C1q to S. aureus enhanced complement deposition and resulted in cytotoxicity.
Materials and Methods
Bispecific Antibodies
Bispecific antibodies (bsAb) binding to C1q and S. aureus target antigens IsdB, IsdA, protein A, PNAG, or C1fA were prepared as described in Example 11.
Surface Plasmon Resonance—Biacore
Equilibrium dissociation constants ($K_D$ values) for binding of bispecific antibodies to target antigens were determined in various configurations. All Biacore binding studies were performed in a buffer composed of 0.01M HEPES pH 7.4, 0.15M NaCl, 3 mM EDTA, 0.05% v/v Surfactant P20 (running buffer). Binding parameters are shown in Table 19.
In one configuration, binding of human C1q (Quidel), and IsdB.6× (His) to respective anti-hC1q, and anti-IsdB-6×His arms of anti-C1q bispecific antibodies (bsC1q×IdsB) or bivalent anti-IsdB antibodies were determined using a real-time surface plasmon resonance biosensor (Biacore T200). The CM5 Biacore sensor surface was derivatized by amine coupling of anti-human IgG F(ab')$_2$ fragment specific antibody (Jackson, Cat nr. 109-005-006, Lot nr. 98960) or anti-Fc receptor antibody to capture purified anti-IsdB×anti-C1q bispecific antibody, and bivalent anti-IsdB. IsdB.6× (His) was injected across anti-C1q× anti-IsdB surface.
In another configuration, binding of anti-C1q× anti-IsdB to surface captured IsdB.6× (His) or biotinylated human C1q (Bt hC1q) was measured.
In another configuration, binding of anti-IsdA× anti-C1q (bsC1q× IsdA) to surface captured IsdA-6×His was measured.
In yet another configuration, binding of human C1q (Quidel) and anti-C1q× anti-IsdB to surface captured IsdB.6× (His) was determined using a real-time surface plasmon resonance biosensor (Biacore T200).
Antibody Dependent C1q Complement Deposition on S. aureus.
Antibodies were tested for complement deposition on S. aureus Newman in an ELISA based assay format. Briefly, S. aureus was grown in RPMI overnight, washed in PBS and adjusted to an $OD_{600}$ of 0.25. MaxiSorp 96 well microtiter plates (ThermoFisher) were coated overnight with 100 µl of S. aureus culture per well. Plates were fixed with 2% paraformaldehyde and blocked with 3% BSA prior to addition of a 1:3 titration of antibody ranging from 0.14 nM-33.3 nM with 1:3 dilutions of antibodies for 1 h at 25° C. After washing, 5% protein A/G adsorbed NHS (Bioreclamation) was added for 1.5 h at 37° C. Goat anti-C1q antibody (Genway Biotech, Inc.) was added to detect C1q deposition, followed by donkey anti-goat HRP secondary antibody (Jackson Immunoresearch). Plates were washed in a plate washer in between each step. SuperSignal Pico luminescence reagent (ThermoFisher) was then added to the wells and signal was detected in a plate reader (SpectraMax i3). Luminescence values were analyzed by a four-parameter logistic equation over a 7-point response curve (GraphPad Prism) to calculate the binding EC50 of the antibodies.
S. aureus Whole Blood Survival Assays.
Antibodies were assessed for bactericidal activity against S. aureus Newman in a whole blood survival assay. Briefly, S. aureus Newman was grown in phenol-free RPMI overnight, washed in PBS, and resuspended to a concentration of $1.25 \times 10^8$ colony forming units (CFU)/ml in PBS. In triplicate, 10 µL of the S. aureus suspension was mixed with 68 nM or 680 nM test and control antibodies along with 100 µl of whole human blood (in sodium citrate as anti-coagulant with additional 500 nM dabigatran to prevent clot formation). Where indicated, the blood was preincubated with C5-blocking Fab and Cytochaslasin D for 10 min at room temperature. The samples were incubated in 96 well plates at 37° C. with shaking (100 rpm) for 24 h. After incubation, 100 µl of agglutination lysis buffer (PBS supplemented with 200 U Streptokinase, 2 µg/ml RNase, 10 µg/ml DNase, 0.5% saponin, 100 µg trypsin per ml of PBS) was added to the samples and they were vigorously vortexed until the pellet dissolved. 50 µl from each sample was serially diluted in PBS and plated onto LB agar plates for enumeration of CFUs.
Copy Number Determination of S. aureus Surface Antigens.
Standard curves for quantum MESF (molecules of equivalent soluble fluorochrome) beads (Bangs Laboratories, Inc.) were generated according to the manufacturer's procedure. Briefly one drop of the reference microspheres was added to 400 µl FACS buffer, 2% FBS (Gibco) in PBS. The microspheres were analyzed on a FACSCantoII flow cytometer and values were used to generate a standard curve using the Bangs Laboratories, Inc. quantitative analysis template, QuickCal. The flow cytometer settings used for this analysis were used for the entire experiment. Next an antibody binding-bead standard curve was generated using Quantum™ Simply Cellular anti-IgG kit (Bangs Laboratories, Inc.). 1 drop of microspheres was added to 100 µl of buffer. Fluorochrome-conjugated antibodies specific for each surface antigen were serially diluted in buffer starting at a concentration of 450 nM. 50 µl of beads was mixed with 50 µl of each antibody dilution and incubated on ice for 30 min. 1 µl of ice cold buffer was then added to the samples, and they were washed twice with buffer. They were resuspended in 400 µl of fresh buffer and analyzed on a FACSCantoII using the same settings as utilized for the previous standard curve. To determine copy number of each surface antigen, S. aureus Newman Δspa was grown in phenol-free RPMI medium (Gibco) overnight.
The bacteria were washed twice with PBS and resuspended in 2% FBS (Gibco) in PBS. PI was added to each sample to a final concentration of 2.5 ug/ml and allowed to incubate with the bacteria for 2 min at room temperature. Bacterial viability was then determined by flow cytometry. 50 µl of bacteria was mixed with 50 µl of the serially diluted antibodies previously prepared. Samples were incubated on ice for 30 min and then 1 ml of ice cold buffer was added. The samples were washed twice and resuspended in 200 µl of buffer. They were analyzed on a FACSCantoII using the same settings as utilized previously. The MESF values for the saturating doses of the antibody were calculated from the MFI values, using the Bead Standard Curve generated above. The antibody-bead standard curve was used to determine the F/P ratio (fluorochrome/protein) by dividing MESF by the known antibody binding capacity of the beads. Copy number was then calculated using the following formula: MESF/FP Ratio=Copy number.

Results and Conclusions

After demonstrating that complement can kill *S. aureus*, a strategy was developed to increase both complement deposition and bacterial killing. A C1q-targeting bsAb was tested to determine if it could recruit C1q, enhance complement deposition, and activate complement independent of antigen density and the geometry of antibody binding. Engagement of multiple C1q globular heads to target antigens is required for complement activation and MAC deposition. Furthermore, multiple MAC pores are required to efficiently kill target cells. To circumvent this, a fully human IgG1 bsAb was designed to recruit C1q directly to the *S. aureus* surface. The well-characterized, highly conserved, and abundant bacterial surface protein iron-regulated surface determinant protein B (IsdB) was selected as the target. VelocImmune™ mice were immunized with purified human C1q and recombinant *S. aureus* IsdB as described in Example 11 to generate fully human antibodies against these two antigens. IsdB binding arms were paired with multiple C1q effector arms and the bsAbs with maximal *S. aureus* killing activity in serum killing assays were selected.

The unique binding properties of the anti-IsdB× anti-C1q bsAb were characterized by surface plasmon resonance (SPR)-Biacore, as shown in Table 19.

TABLE 19

Binding parameters for bispecific antibodies
Biacore kinetic parameters for anti-C1q bispecific
antibody binding to IsdB, IsdA, and C1q at 37° C.

| Capture Surface | Test ligand | Ka (M$^{-1}$s$^{-1}$) | $k_d$ ($^{-1}$) | $K_D$ (M) | $T_{1/2}$ (min) |
|---|---|---|---|---|---|
| bsC1q × IsdB | IsdB 6 × His | $1.63 \times 10^5$ | $5.57 \times 10^{-4}$ | $3.43 \times 10^{-9}$ | 21 |
| anti-IsdB bival | IsdB 6 × His | $3.65 \times 10^5$ | $6.4 \times 10^{-4}$ | $1.75 \times 10^{-9}$ | 18 |
| Bt hC1q | bsC1q × IsdB | $2.62 \times 10^4$ | $9.64 \times 10^{-2}$ | $3.67 \times 10^{-4}$ | .12 |
| IsdB.6 × (His) | hC1q + bsC1q × IsdB | $1.03 \times 10^6$ | $3.34 \times 10^{-3}$ | $3.23 \times 10^{-9}$ | 3.5 |
| IsdB.6 × (His) | bsC1q × IsdB | $8.74 \times 10^5$ | $6.57 \times 10^{-3}$ | $7.52 \times 10^{-9}$ | 1.8 |
| IsdA.6 × (His) | bsC1q × IsdA | $2.7 \times 10^5$ | $9.77 \times 10^{-4}$ | $3.62 \times 10^{-9}$ | 11.8 |

The bsC1q×IsdB and the parental bivalent anti-IsdB antibody were captured on the sensor chip surface and IsdB.6× (His) was injected over the surfaces at 37° C. Both bsC1q× IsdB and bivalent antibodies had nanomolar affinity for IsdB. When IsdB.6×(His) or IsdA.6×(His) were captured on the chip surface and bsC1q×IsdB and bsC1q×IsdA were injected over the surface of the chip, both bispecific antibodies had nanomolar affinity for their respective antigens. Human C1q was biotinylated and captured on the chip at low density, and the bsC1q×IsdB was injected, resulting in a Kd of 3.67 µM, reflecting the interaction in solution. To mimic the surface of *S. aureus*, IsdB.6× (His) was first captured on the chip surface, followed by injection of the bsC1q×IsdB, and finally C1q, and the dissociation of C1q was measured. In this format, the affinity to C1q increased to 3.23 nM. The 1000-fold tighter binding results from avidity-driven interactions between the anti-C1q arm and multiple C1q heads.

Figure 5:
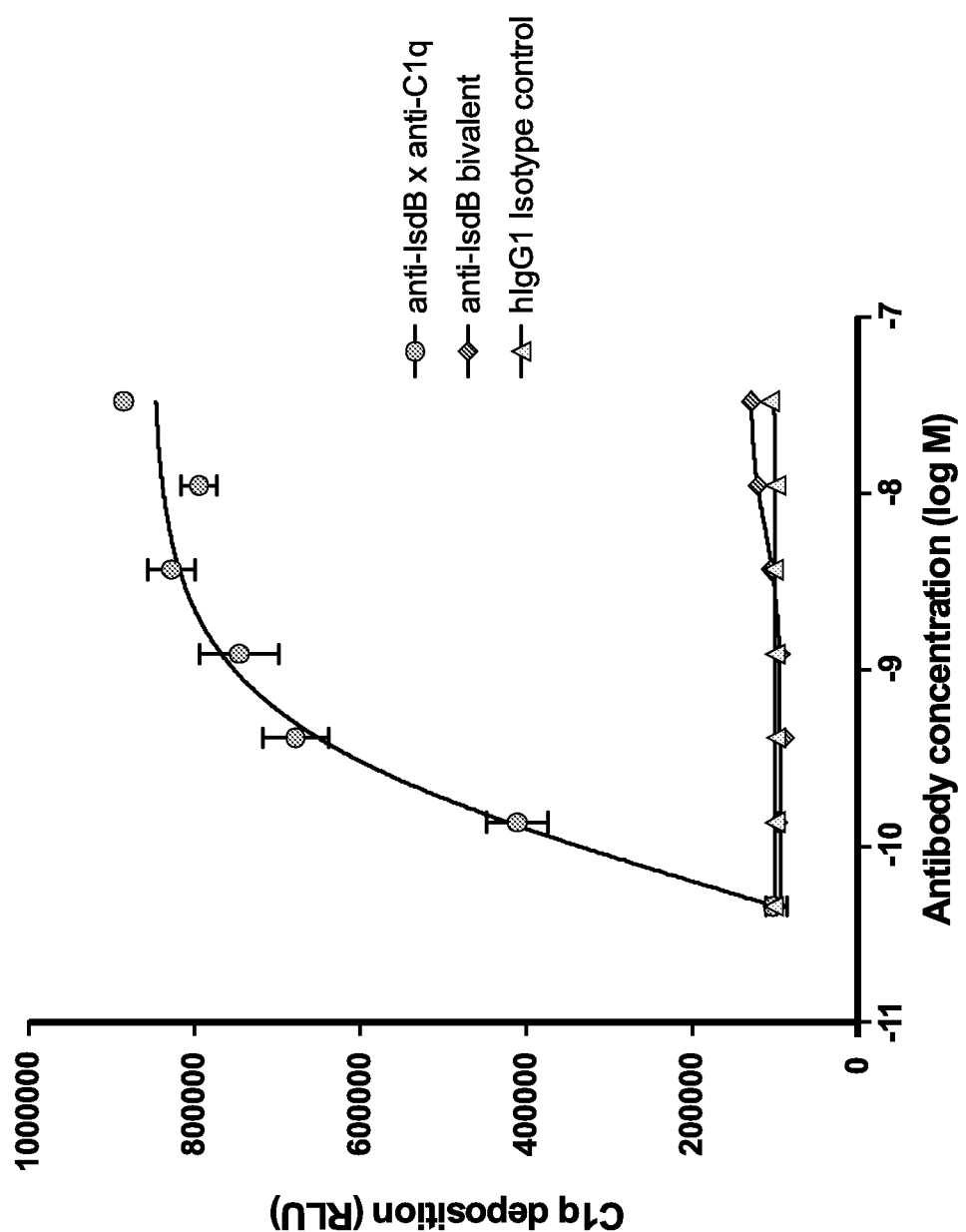
FIG. 5. C1q deposition on *S. aureus* was measured using a plate-based format. *S. aureus* Newman was coated onto plates and then incubated with normal human serum in the presence of anti-IsdB× anti-C1q bsAb, an anti-IsdB bivalent antibody, or an isotype control antibody. C1q deposition was measured with a primary antibody specific for C1q and a horse-radish peroxidase (HRP)-conjugated secondary antibody. Results are plotted as mean±standard deviation.

Anti-IsdB× anti-C1q also dramatically increased recruitment of C1q to *S. aureus*. C1q deposition was measured on the surface of *S. aureus* Newman Δspa (a methicillin-sensitive strain, MSSA) resulting from binding of anti-IsdB× anti-C1q bsAb, the bivalent IsdB antibody, or an isotype control antibody. While minimal C1q deposition was observed with the bivalent or isotype control antibody, incubation with anti-IsdB×anti-C1q bsAb resulted in robust, dose-dependent increase in C1q deposited on *S. aureus* ($EC_{50}$=127 µM; FIG. 5).

As shown in Table 20, multiple anti-C1q bispecific antibodies bound to *S. aureus* using ELISA. *S. aureus* Newman Δspa was coated onto ELISA plates; incubated with a titration of the anti-IsdB× anti-C1q bsAb, the bivalent IsdB antibody, anti-IsdA×anti-C1q bsAb, anti-PNAG× anti-C1q bsAb, anti-C1fA× anti-C1q bsAb, anti-protein A×anti-C1q bsAb, or an isotype control antibody; washed; and then binding measurements were made by luminescence (Table 20).

TABLE 20

ELISA binding to *S. aureus* Δspa

| Test Ligand | Max RLU | $EC_{50}$ (M) |
|---|---|---|
| bsC1q × IsdB | $7.93 \times 10^5$ | $1.9 \times 10^{-10}$ |
| bsC1q × IsdA | $1.33 \times 10^6$ | $8.36 \times 10^{-10}$ |
| bsC1q × PNAG | $1.62 \times 10^5$ | $2.01 \times 10^{-9}$ |
| bsC1q × ClfA | $3.04 \times 10^5$ | $5.69 \times 10^{-10}$ |
| bsC1q × Protein A | $1.91 \times 10^5$ | $1.48 \times 10^{-10}$ |

Figure 6:
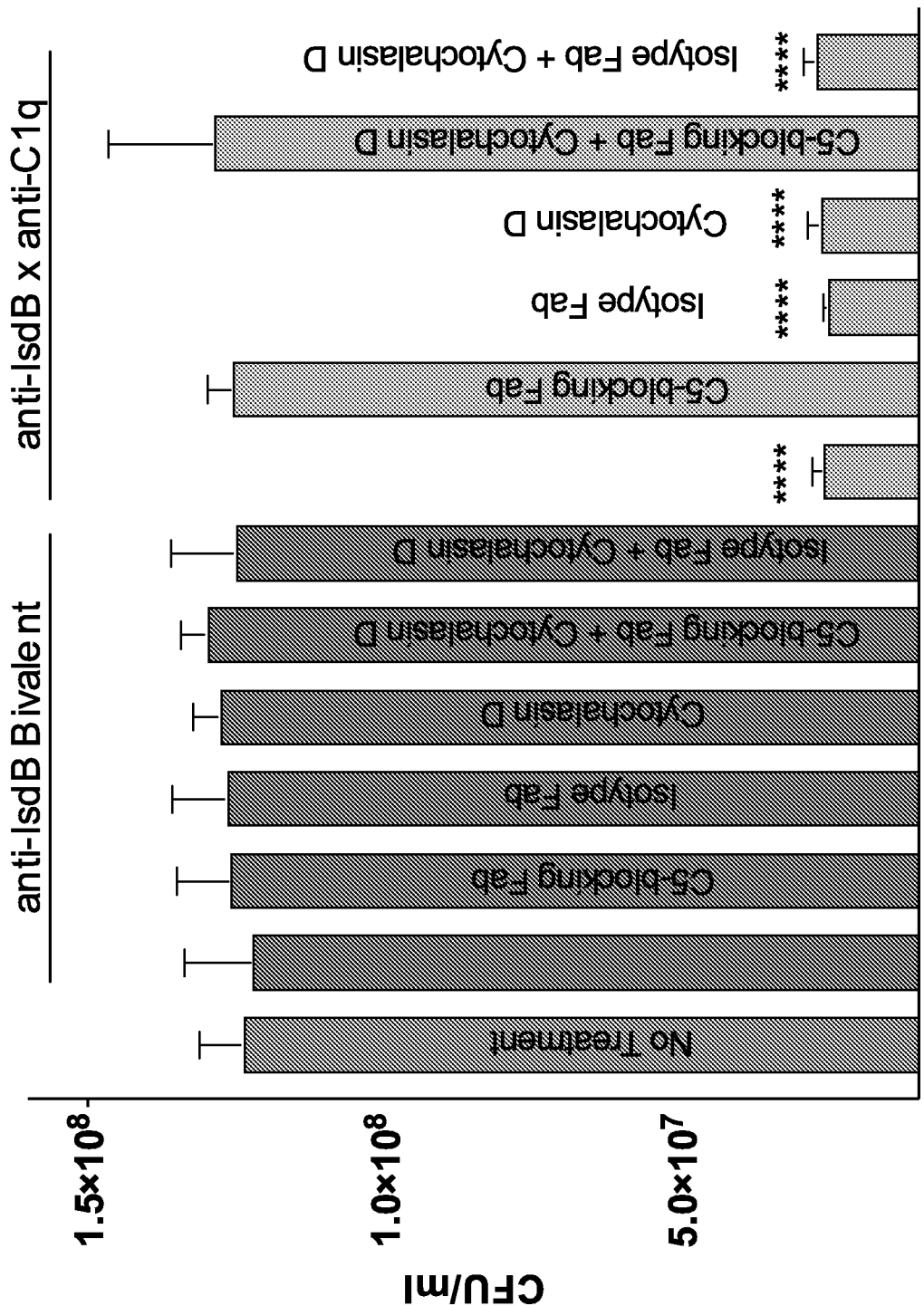
FIG. 6. Whole blood assays were performed by incubating *S. aureus* Newman with blood alone (far left red column), blood with an anti-IsdB bivalent antibody (columns 2-7; purple) or blood with anti-IsdB× anti-C1q bsAb (columns 8-13; orange). The antibodies were combined with either a C5 blocking Fab (columns 3 and 9), an isotype control Fab (columns 4 and 10), or cytochalasin D (columns 5 and 11), both the C5-blocking antibody and cytochalasin D (columns 6 and 12) or both the isotype control Fab and cytochalasin D (columns 7 and 13). Bacterial growth was enumerated by plating and is represented as a percent increase in colony forming units (CFUs) present after 24 h compared to the initial number of CFUs. Results are plotted as mean with standard deviation. ****P<0.0001, one-way ANOVA with Dunnett's test showing samples significantly different from no treatment sample.

The functional consequence of bsAb-mediated enhancement of MAC deposition was shown using a whole blood assay, in which anti-IsdB× anti-C1q significantly inhibited *S. aureus* growth (FIG. 6). While the bivalent IsdB antibody incubated with *S. aureus* Newman in human blood for 24 h had no effect on bacterial growth, incubation with anti-IsdB× anti-C1q bsAb reduced bacterial growth nearly 10-fold (FIG. 6). This activity was dependent on complement activity: blocking phagocytosis with cytochalasin D had no effect on anti-IsdB× anti-C1q activity, whereas C5 blockade completely abrogated bsAb cytotoxicity (FIG. 6).

To assess the role of antigen density on the C1q-recruiting bsAb activity, the same C1q-targeting arm was paired with antibody arms targeting Protein A, clumping factor A (C1fA), poly-N-acetylglucosamine (PNAG), and IsdA. These *S. aureus* target antigens are present at different densities on the surface of *S. aureus* Newman Δspa (Table 21), as determined using flow cytometry

TABLE 21

Relative levels of *S. aureus* surface antigens

| Surface Antigen | Copy number related to Isotype Control |
|---|---|
| IsdB | 7.26 |
| ClfA | 0.90 |

TABLE 21-continued

Relative levels of S. aureus surface antigens

| Surface Antigen | Copy number related to Isotype Control |
|---|---|
| PNAG | 0.71 |
| IsdA | 13.10 |

Figure 7:
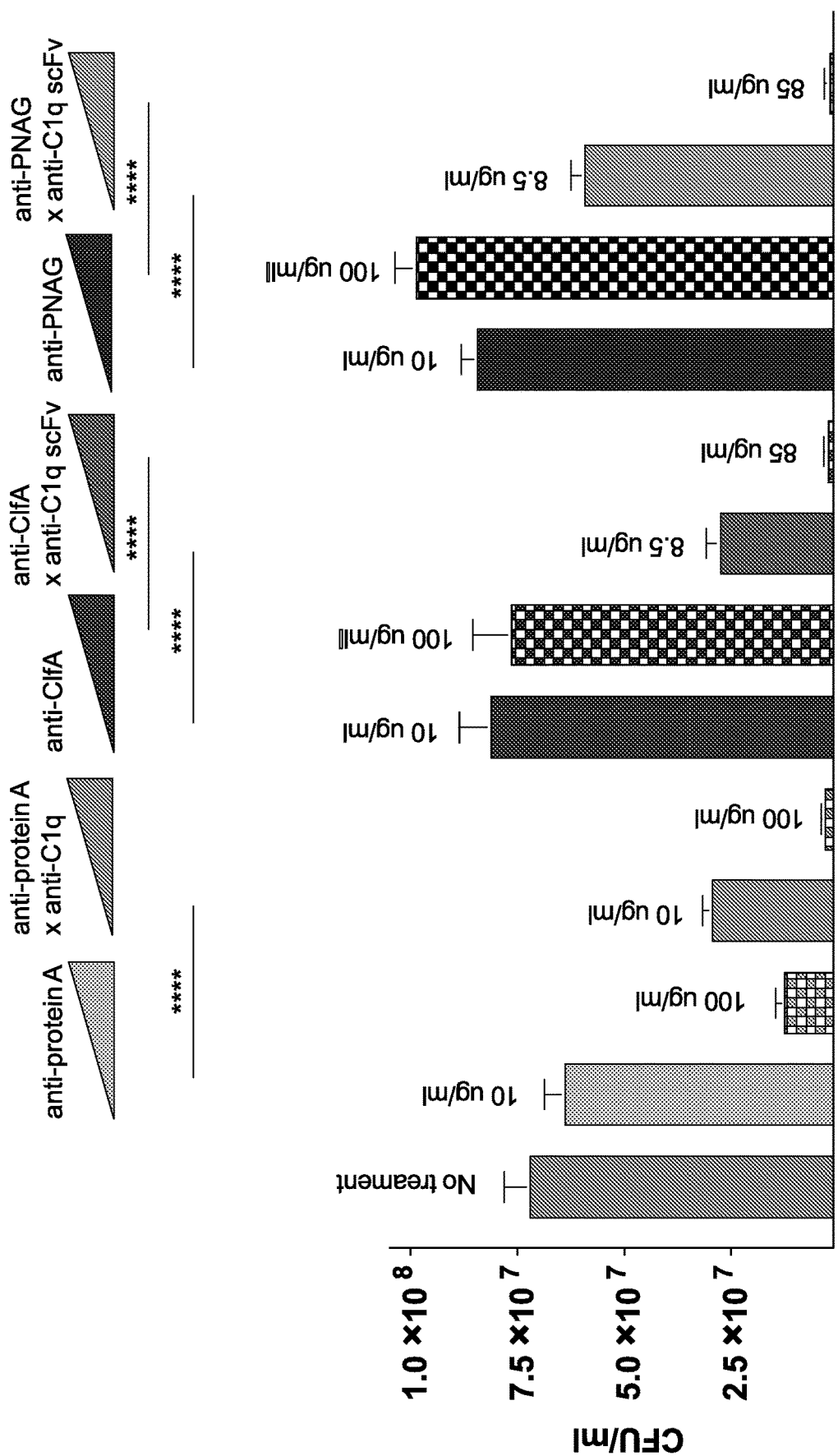
FIG. 7. Bispecific antibodies targeting IsdB and C1q can increase complement deposition on the surface of *S. aureus* leading to cell death. bsAbs were produced where each recognized C1q and a different protein on the surface of *S. aureus* (left to right): protein A, C1fA, PNAG, IsdA, and IsdB. Blood assays were performed as described above with two concentrations of antibody. Full length-antibodies were tested at 10 and 100 g/ml, and antibodies with a scFv arm were tested at 8.5 and 85 μg/ml (the molar equivalent of the full-length antibodies). Results are plotted as mean with standard deviation. *P<0.05, P<0.01, P<0.001, **P<0.0001, one-way ANOVA showing bsAb samples significantly different from the corresponding bivalent antibody.
Figure 7:
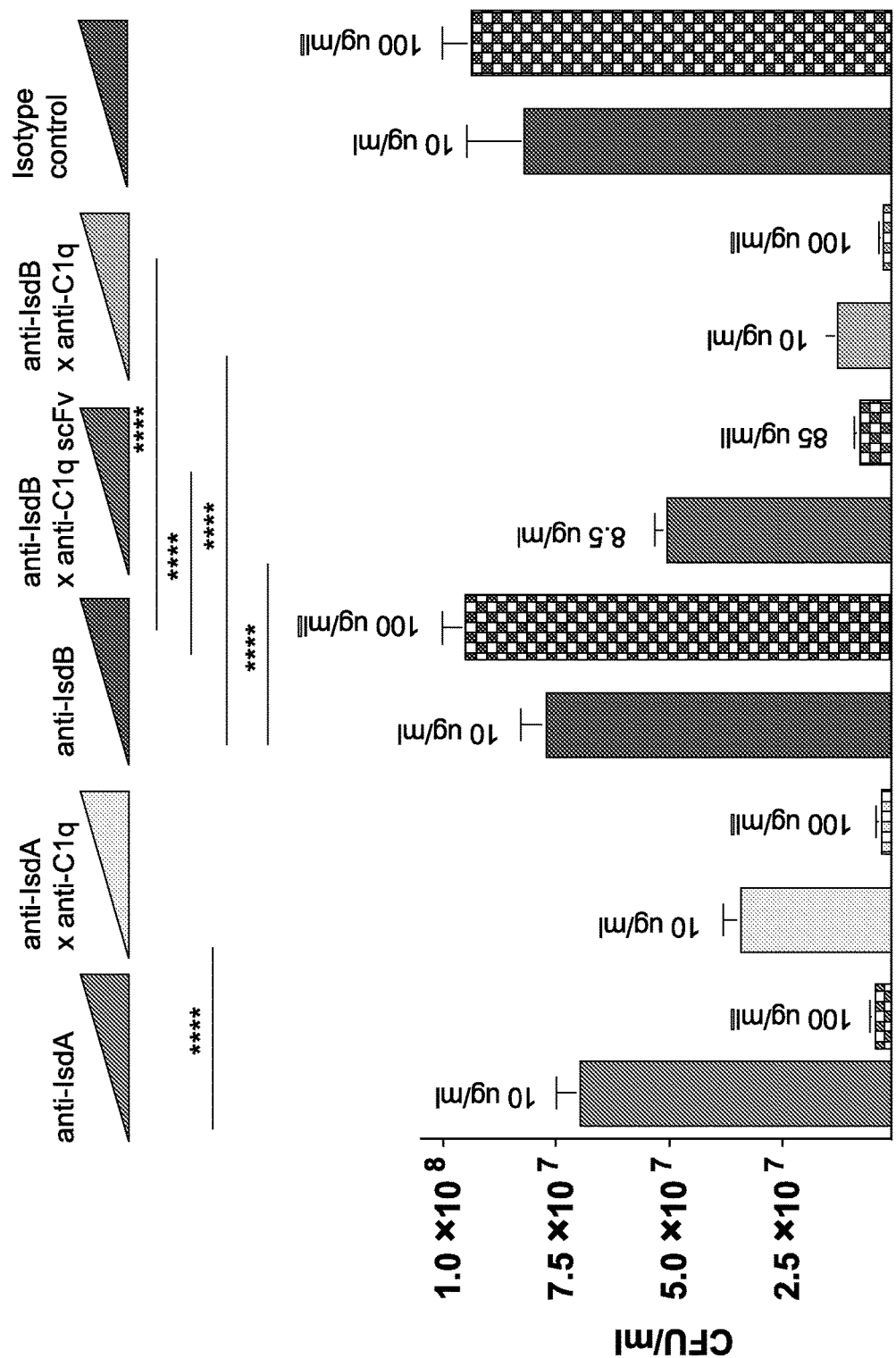

Each of the tested C1q-targeting bispecific antibodies bound C1q and *S. aureus* with high affinity (Table 22), and increased *S. aureus* killing compared to the corresponding bivalent antibody (FIG. 7 and Table 23).

TABLE 22

Binding parameters for 5 nM C1q binding as the test ligand to antibody captured chip surfaces
Biacore kinetic parameters for binding at 37° C.

| Capture surface | $K_a$ ($M^{-1}s^{-1}$) | $k_d$ ($^{-1}$) | $K_d$ (M) | $T_{1/2}$ (min) |
|---|---|---|---|---|
| bs hC1q × IsdB | $3.22 \times 10^6$ | $5.02 \times 10^{-3}$ | $1.56 \times 10^{-9}$ | 2.3 |
| bs hC1q × IsdB scFv | $1.23 \times 10^7$ | $9.2 \times 10^{-3}$ | $7.48 \times 10^{-10}$ | 1.3 |
| bs hC1q × IsdA | $3.62 \times 10^6$ | $4.69 \times 10^{-3}$ | $1.3 \times 10^{-9}$ | 2.5 |
| bs hC1q × PNAG | $1.61 \times 10^7$ | $1.02 \times 10^{-2}$ | $6.32 \times 10^{-10}$ | 1.1 |
| bs hC1q × ClfA | $4.35 \times 10^6$ | $9.2 \times 10^{-3}$ | $7.4810^{-10}$ | 1.3 |
| bs hC1q × protein A | $3.06 \times 10^6$ | $4.88 \times 10^{-3}$ | $1.3610^{-9}$ | 2.3 |

As shown in Table 23, the overall growth in whole human blood in the absence of test antibody is normalized to 100%. Survival of *S. aureus* in both 68 nM and 680 nM negative isotype control antibodies ranged from 114-146%. *S. aureus* survival was reduced at least by 50% when treated with 68 nM anti-*S. aureus*× anti-C1q bispecific antibody compared to its equivalent bivalent anti-*S. aureus* antibody. When treated with 680 nM anti-*S. aureus*× anti-C1q bispecific antibody, survival ranged from 4-14%, which was also at least 50% lower than its equivalent bivalent anti-*S. aureus* antibody, except in the case of IsdA. For IsdA, in one experiment of two, the anti-IsdA× anti-C1q antibody activity was ~40% more than the anti-IsdA bivalent antibody. Thus, with each anti-*S. aureus*× anti-C1q antibody, there was increased anti-Staphylococcal activity with increased antibody concentration.

The similar potency of these bsAbs, despite the variability in surface densities (Table 21) of the *S. aureus* target antigens, indicates that enhancing local concentrations of C1q on the cell surface overcomes the low efficiency of complement-mediated cytotoxicity. These results demonstrate that anti- *Staphylococcus*× anti-C1q antibodies enhance killing of *S. aureus* and supports a C1q-recruiting bsAb approach to augment complement activity.

TABLE 23

*S. aureus* Newman survival in whole human blood after treatment with anti-*S. aureus* × anti-C1q bispecific antibodies

| | % survival of *S. aureus* compared to whole blood ± standard deviation (no treatment, normalized to 100%) | | | |
|---|---|---|---|---|
| Antibody | Expt 1 68 nM | Expt 2 68 nM | Expt 1 680 nM | Expt 2 680 nM |
| Blood + *S. aureus* (no treatment) | 100 | 100 | 100 | 100 |
| Anti-Protein A × anti-C1q | 25 ± 1 | 42 ± 2 | 7 ± 0.4 | 5 ± 0.2 |
| Anti-ClfA × anti-C1q | 30 ± 1 | 39 ± 3 | 14 ± 1 | 4 ± 0.4 |
| Anti-PNAG × anti-C1q | 26 ± 1 | 82 ± 3 | 13 ± 1 | 4 ± 1 |
| Anti-IsdA × anti-C1q | 10 ± 1 | 48 ± 4 | 7 ± 1 | 5 ± 0.5 |
| Anti-IsdB × anti-C1q | 26 ± 1 | 19 ± 2 | 11 ± 1 | 5 ± 0.2 |
| Anti-IsdB × anti-C1q_scFv | 68 ± 6 | 71 ± 2 | 23 ± 1 | 12 ± 0.4 |
| Anti-Protein A | 106 ± 9 | 89 ± 5 | 15 ± 2 | 18 ± 2 |
| Anti-ClfA | 105 ± 6 | 113 ± 9 | 119 ± 7 | 106 ± 11 |
| Anti-PNAG | 127 ± 14 | 117 ± 4 | 198 ± 11 | 137 ± 6 |
| Anti-IsdA | 47 ± 8 | 97 ± 6 | 29 ± 1 | 8 ± 0.2 |
| Anti-IsdB | 121 ± 14 | 107 ± 6 | 135 ± 12 | 132 ± 6 |
| Isotype control (REGN1932) | 138 ± 11 | 114 ± 16 | 146 ± 26 | 130 ± 8 |

Example 14. Anti-IsdB× Anti-C1q Improves Clearance of *S. Aureus* in C1q-Humanized Mice Materials and Methods
Quantification of C1q Concentration in Mouse Serum Using LC-MS/MS.

Protein from humanized mouse serum samples were denatured, reduced, and subsequently alkylated and digested with trypsin. The digested peptide mixture was then separated by reversed-phase liquid chromatography using an Agilent 1290 Infinity II LC Systems with an ACQUITY UPLC BEH130 C18 column (2.1×50 mm, 1.7 μm; Waters). 0.1% formic acid in water and 0.1% formic acid in acetonitrile were used as mobile phase A and mobile phase B, respectively. Signature peptides unique to human C1q protein sequences were selected from each of the individual C1q subunits (A, B, and C) as surrogate peptides for C1q quantification. Calibration curves for the surrogate peptide from each C1q subunit were generated using a series of concentrations of C1q protein standard (Quidel), which allows the quantitation of total C1q by any of the three subunits based on the assay response of the respective surrogate peptides. Data acquisition by LC-MS/MS under selected reaction monitoring (SRM) mode was performed using an Agilent 6495 TripleQuad mass spectrometer with Agilent Jet Stream electrospray ionization source. Pre-selected mass to charge ratio (m/z) of precursor and product ion pair of each surrogate peptide were fragmented with optimized collision energy and detected in the mass spectrometer. Agilent LC/MS Data Acquisition for 6400 Series Triple Quadrupole, version B.08.00, was used to run the LC/MS system. Agilent MassHunter Quantitative Analysis, version B.06.00, was used for data analysis. In this assay all standards, controls, and test samples were prepared in parallel.

Disseminated *S. aureus* Infection Model

Humanized C1q (C1$^{Hu/Hu}$) mice in a mixed background (MAID1615) were randomized by weight on day 0 and then infected intraperitoneally with 200 μl volume of *S. aureus* Newman (1.5×10$^8$ CFUs/mouse), *S. aureus* CA-127 (1.5×10$^8$ CFU/ml), or *S. aureus* MW2 (1.3×10$^8$ CFUs/mouse). The *S. aureus* strains were grown overnight in TSB. The culture was then diluted 1:100 in fresh TSB, grown to log phase (OD$_{600}$~1) in TSB at 37° C., washed 3 times in PBS and adjusted to the desired density for infection. Where indicated antibiotics were administered starting 18 h following infection. Mice were treated with 11.0 mg/kg of vancomycin twice daily administered subcutaneously, 50 mg/kg daptomycin once daily administered subcutaneously, or 80 mg/kg linezolid twice daily administered orally (100 μl volume) on Days 1, 2 and 3. 24 h post infection, mice were administered with a single dose of the indicated antibody or PBS in a 100 μl volume, intraperitoneally. Mice were weighed daily until day 4 post infection and change in weight was recorded. Mice were euthanized on day 4 and kidneys, heart, liver, lungs and spleen were collected to determine organ burden. Briefly, the organs were homogenized in 5 mL PBS using program "Multi-C" on a gentleMACS Octo Dissociator (Miltenyi Biotec). Homogenate was then diluted in PBS and 10-fold serial dilutions were plated on LB agar plates. Plates were incubated at 37° C. overnight. Resultant colonies were counted, and results were reported as CFUs/gram tissue.

Results and Conclusions

Figure 8:
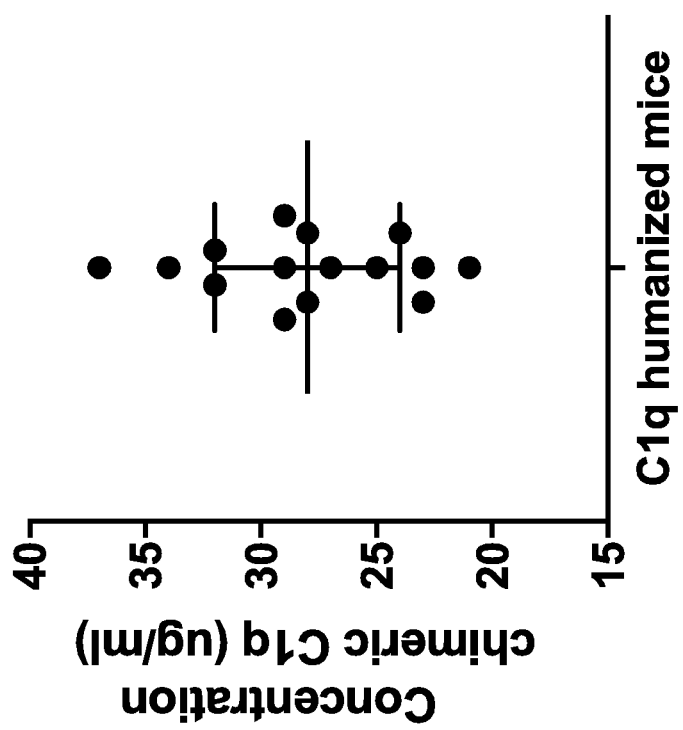
FIG. 8. The IsdB×C1q bispecific antibody increases clearance of *S. aureus* in mice with humanized C1q heads. Quantitative measurement of the expression of chimeric C1q peptides was assessed via LC-MS/MS. Serum was isolated from individual C1q humanized mice and the concentration of humanized mouse C1q specific peptides was determined. Results are plotted as median and interquartile range.

After showing in vitro efficacy of anti-IsdB× anti-C1q bsAb, it was evaluated whether enhanced cytotoxicity could be observed in vivo. Because the anti-C1q arm of the bsAb is specific for human C1q heads, and does not bind mouse C1q, mice were generated that encode the human sequences of the globular head of C1q to enable in vivo efficacy models. Mouse C1qA, C1qB, and C1qC genes were replaced with chimeric versions, in which the N-terminus of the gene encoding the collagen-like tail was mouse sequence, and the C-terminus of the gene encoding the globular head was human. This resulted in a C1q protein that could bind the bsAb while still interacting with the rest of the mouse complement pathway. The genes remained under the control of the native mouse C1q promoter and expression of the chimeric proteins in serum was confirmed by mass spectrometry. On average the mice expressed 28 pg/ML of chimeric C1q with values ranging from 21 to 37 g/mL (FIG. 8).

Figure 9:
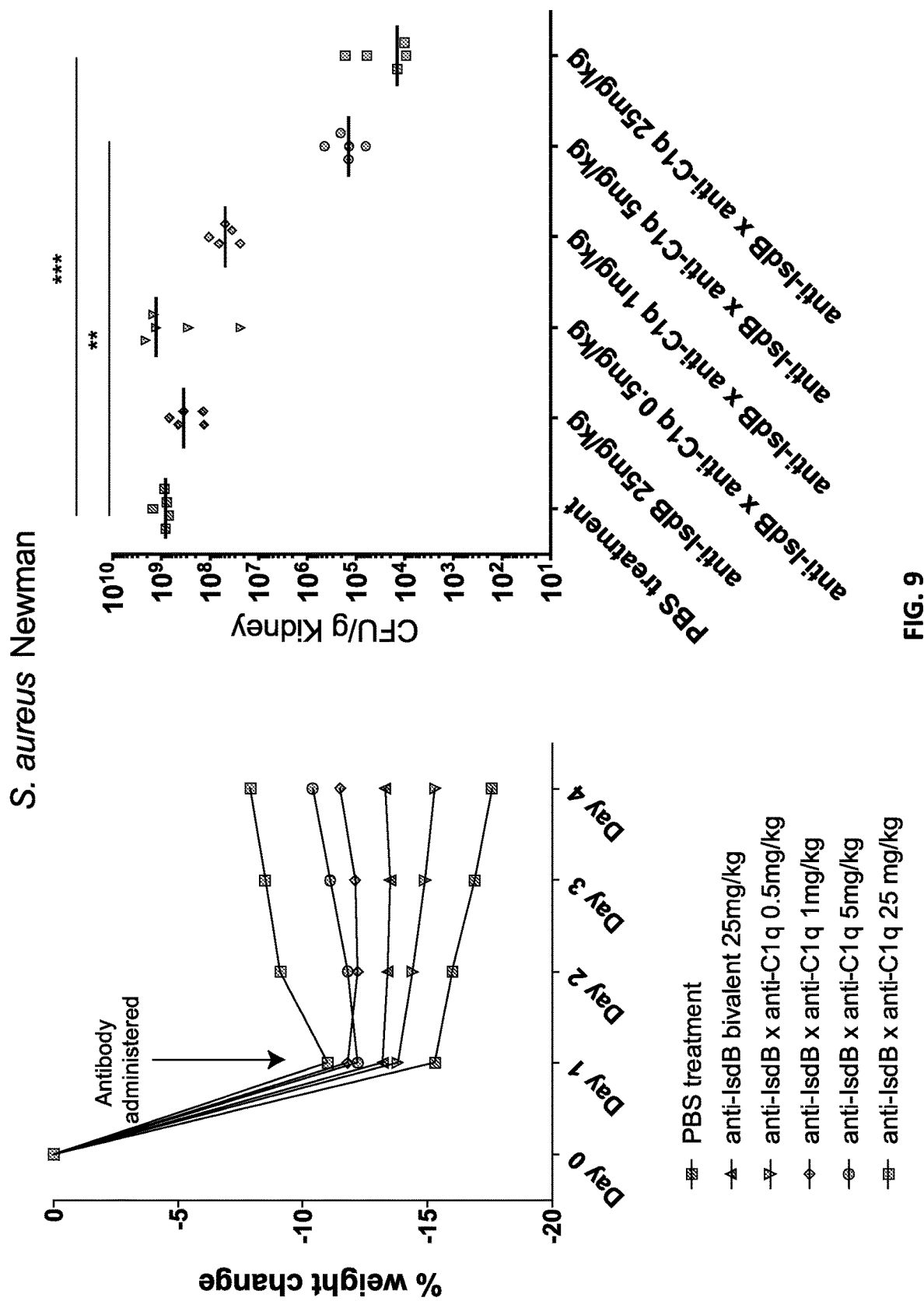
FIG. 9. The IsdB×C1q bispecific antibody increases clearance of *S. aureus* in mice with humanized C1q heads. C1q humanized mice were infected with $1.5 \times 10^8$ CFU *S. aureus* Newman (an MSSA strain). One day after infection they were treated with the indicated antibody. Weights were recorded each day for four days and percent weight change compared to day 0 is shown (left). Mean weight change for each group of mice is plotted. On day 4, kidneys were harvested, dissociated, and serially diluted. Organ burden was determined by plating (right). The organ burden of each mouse is indicated along with the median value for each group. P<0.01, *P<0.001, nonparametric Kruskal-Wallis ANOVA with Dunn's test showing values significantly different from the no treatment samples.

Using the C1q humanized mice, it was demonstrated that a single dose of anti-IsdB× anti-C1q bsAb significantly improved clearance of *S. aureus* in vivo. Prior to infection mice were randomized to have similar average group body weight, then infected intraperitoneally with *S. aureus* Newman one day later. The day after infection, mice were intraperitoneally dosed with PBS, the bivalent anti-IsdB antibody (25 mg/kg), or varying concentrations of anti-IsdB× anti-C1q (0.5-25 mg/kg). Mice were weighed daily and on Day 4 organs were collected and bacterial burdens determined. One day after infection, the mice in each group lost 10-15% of their body weight. In PBS treated animals, weight loss continued after day 1 (FIG. 9, left panel, red squares), whereas weights of 25 mg/kg anti-IsdB treated mice stabilized after day 1 (FIG. 9, left panel, plum triangles). Remarkably, treatment with as little as 1 mg/kg anti-IsdB× anti-C1q stabilized weight after Day 1, and doses of 5 and 25 mg/kg resulted in weight gains suggesting rapid reduction in bacterial load (FIG. 9, left panel, orange diamonds, circles, and squares).

Figure 11:
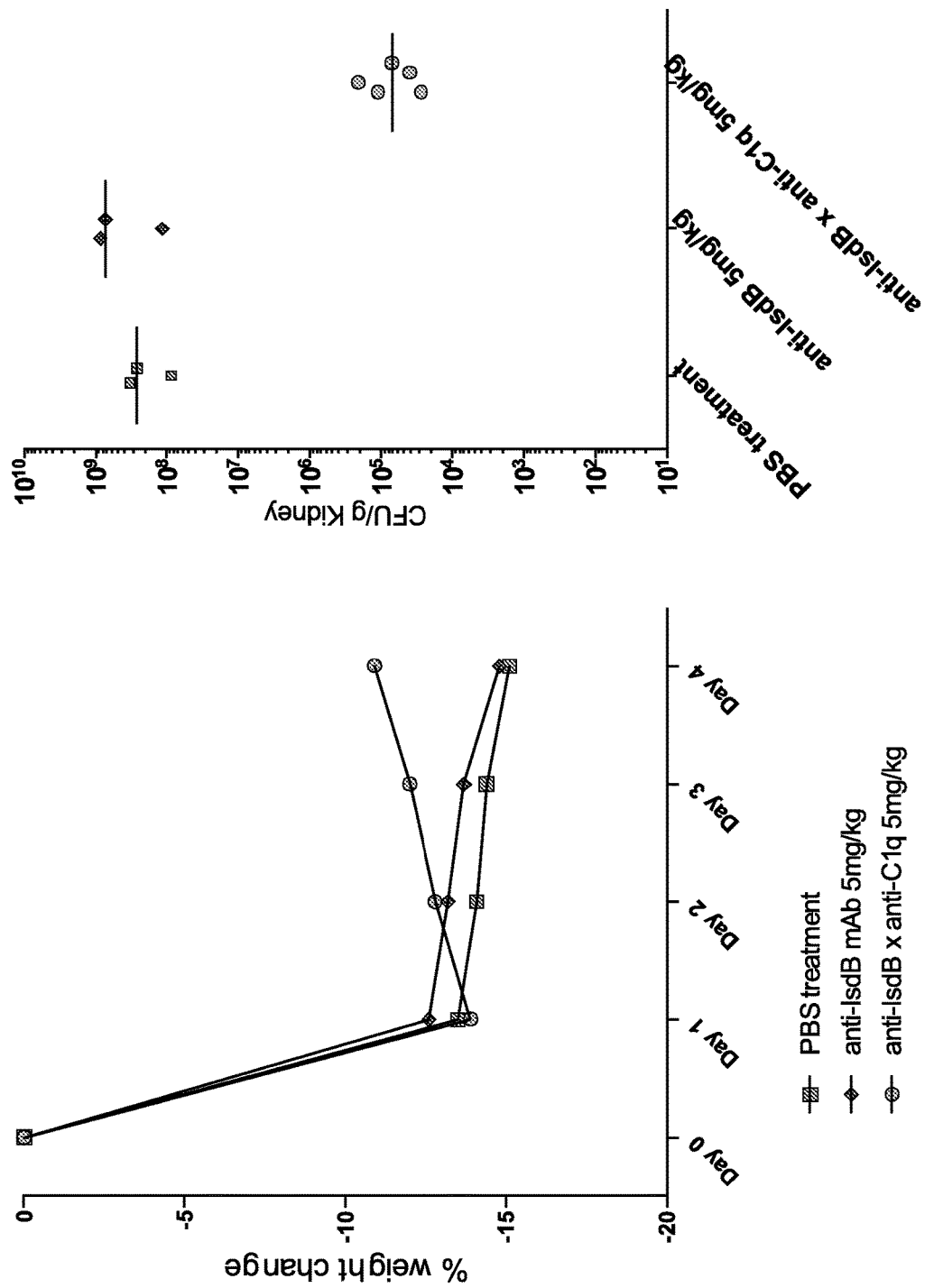
FIG. 11. Anti-IsdB× anti-C1q bsAb reduces the bacterial burden of *S. aureus* in kidneys of C1q humanized mice. C1q humanized mice were infected with $1.4 \times 10^8$ CFU *S. aureus* CA-127 (an MRSA strain). One day after infection they were treated with the indicated antibody. Weights were recorded each day for four days and percent weight change compared to day 0 is shown (left). Mean weight change for each group of mice is plotted. On day 4, kidneys were harvested, dissociated, and serially diluted. Organ burden was determined by plating (right).
Figure 12:
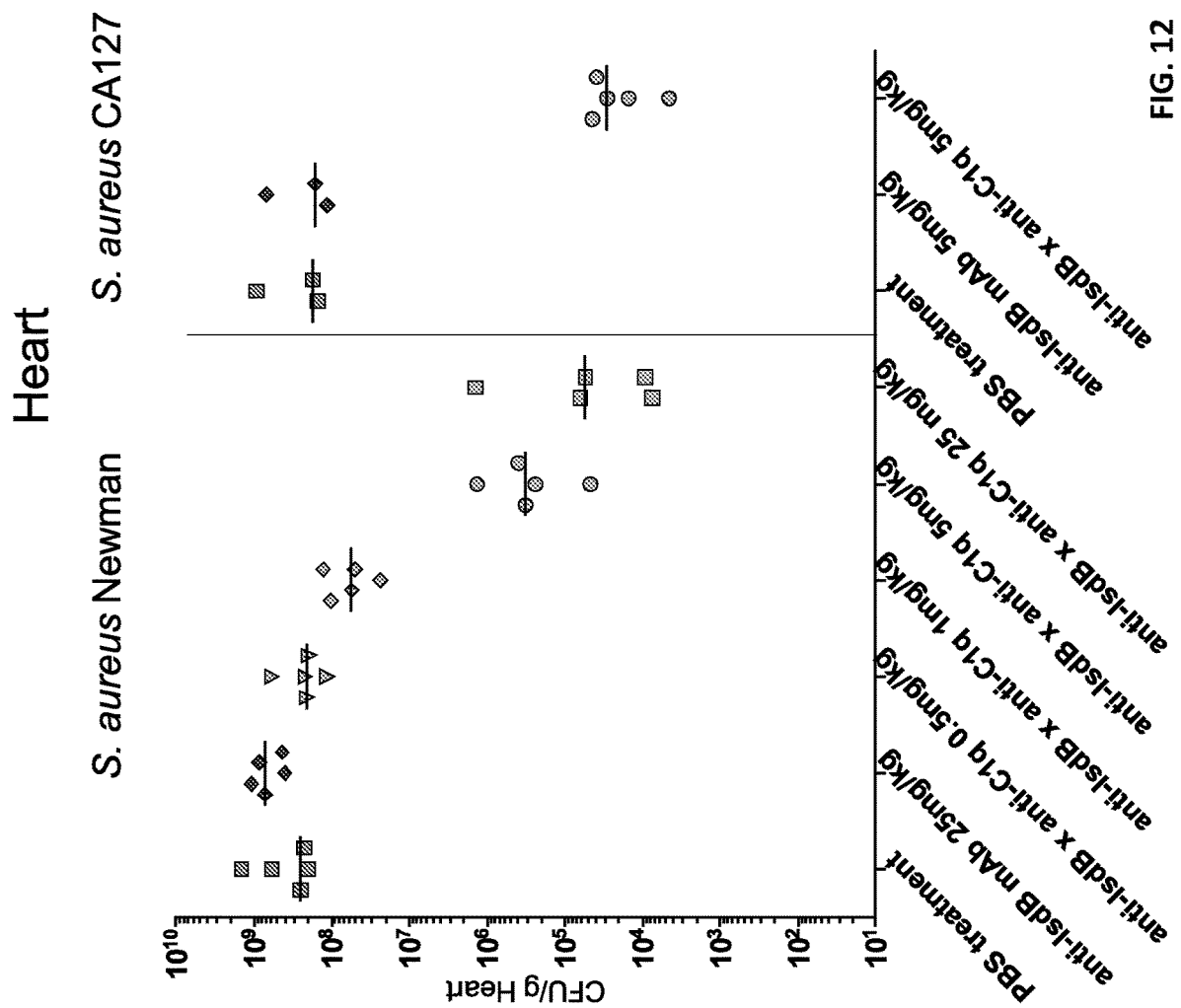
FIG. 12. Anti-IsdB× anti-C1q bsAb reduces the bacterial burden of several strains of *S. aureus* in hearts of C1q humanized mice. C1q humanized mice were infected with either $1.5 \times 10^8$ CFU *S. aureus* Newman (an MSSA strain) or $1.4 \times 10^8$ CFU *S. aureus* CA-127 (an MRSA strain) on day 0. One day after infection they were treated with the indicated antibody intraperitoneally. On day 4, hearts were harvested, dissociated, and serially diluted to enumerate bacterial load. The organ burden of each mouse is indicated along with the median value for each group. *P<0.05, P<0.01, *P<0.001, **** P<0.0001, nonparametric Kruskal-Wallis ANOVA with Dunn's test.
Figure 13:
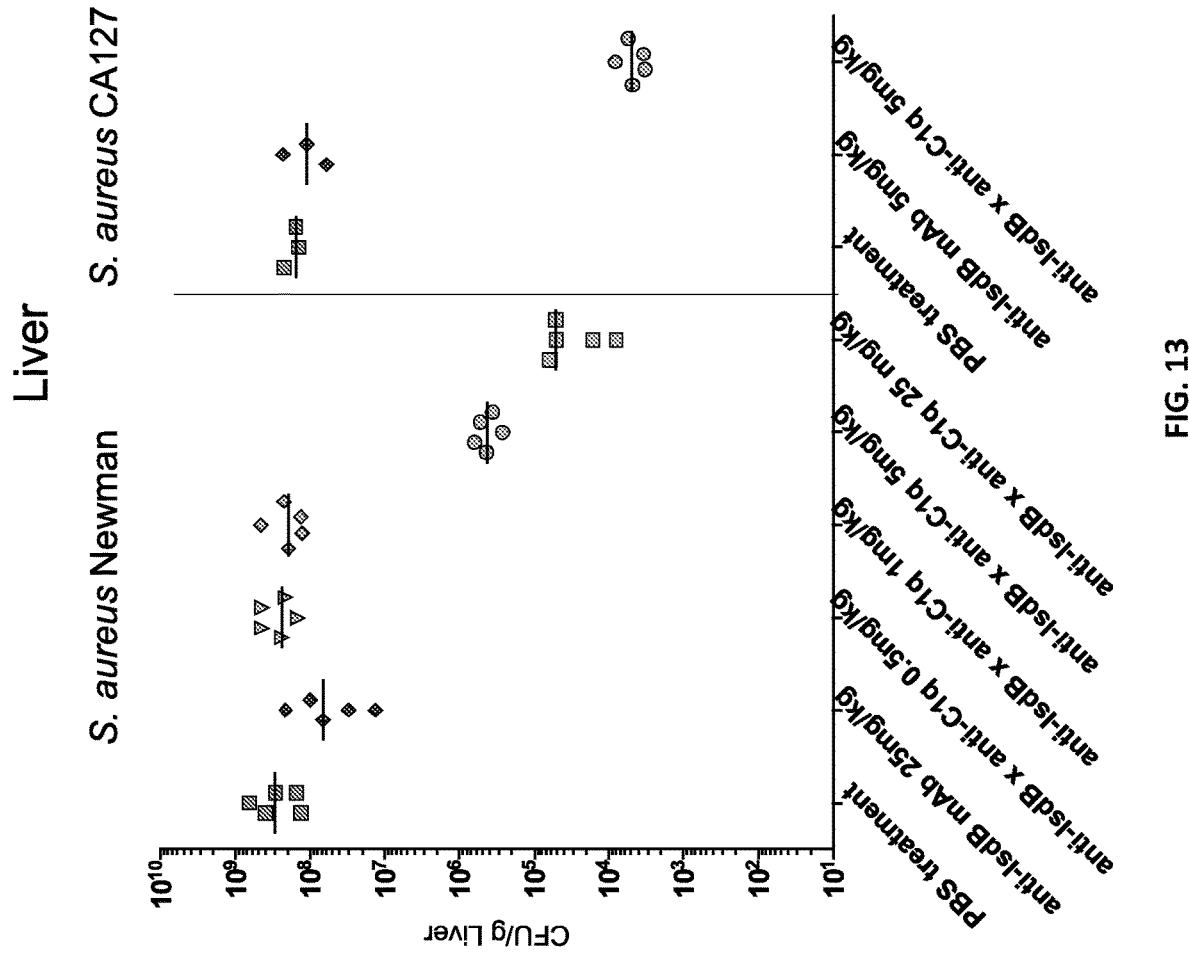
FIG. 13. Anti-IsdB× anti-C1q bsAb reduces the bacterial burden of several strains of *S. aureus* in livers of C1q humanized mice. C1q humanized mice were infected with either $1.5 \times 10^8$ CFU *S. aureus* Newman (an MSSA strain) or $1.4 \times 10^8$ CFU *S. aureus* CA-127 (an MRSA strain) on day 0. One day after infection they were treated with the indicated antibody intraperitoneally. On day 4, livers were harvested, dissociated, and serially diluted to enumerate bacterial load. The organ burden of each mouse is indicated along with the median value for each group.*P<0.05, P<0.01, *P<0.001, **** P<0.0001, nonparametric Kruskal-Wallis ANOVA with Dunn's test.
Figure 14:
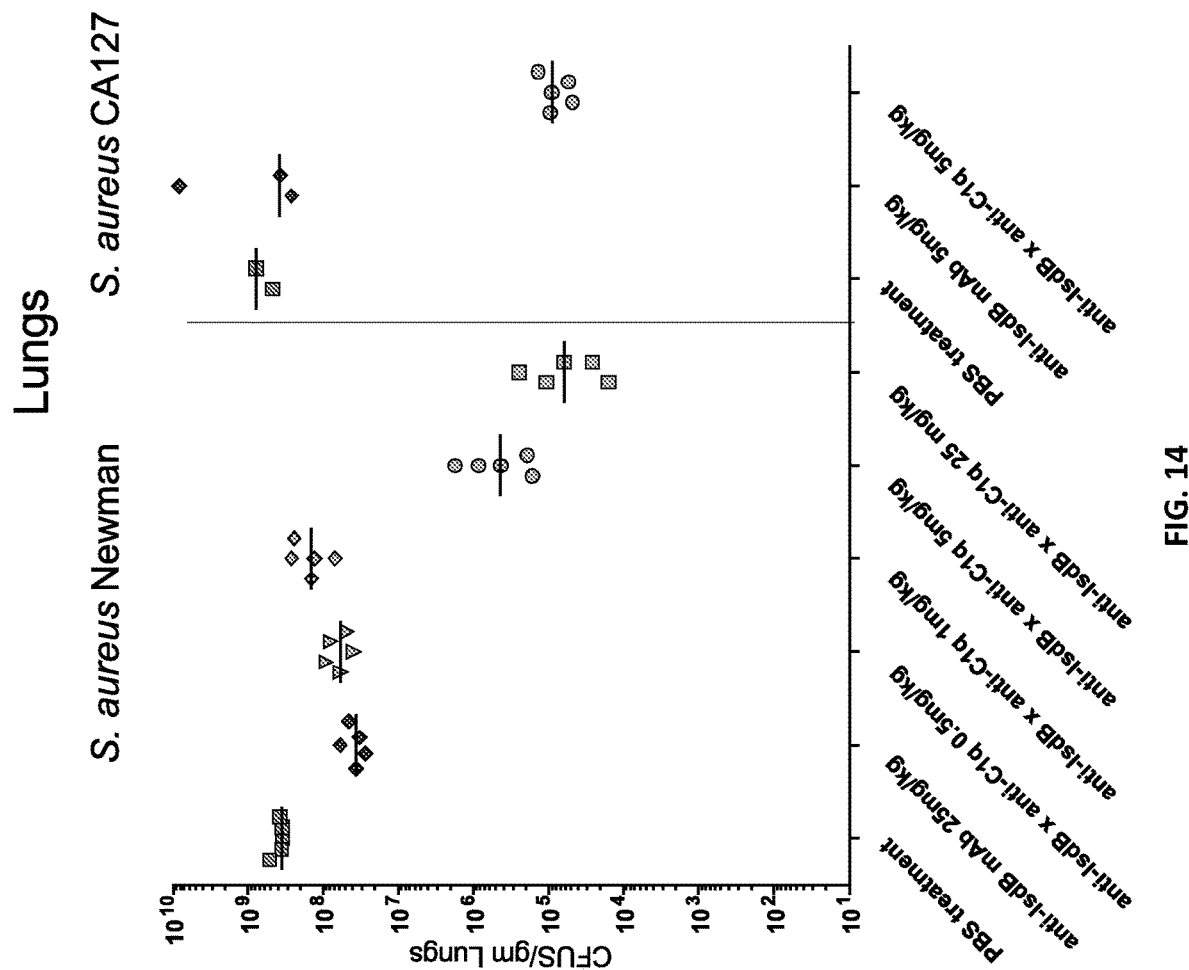
FIG. 14. Anti-IsdB× anti-C1q bsAb reduces the bacterial burden of several strains of *S. aureus* in lungs of C1q humanized mice. C1q humanized mice were infected with either $1.5 \times 10^8$ CFU *S. aureus* Newman (an MSSA strain) or $1.4 \times 10^8$ CFU *S. aureus* CA-127 (an MRSA strain) on day 0. One day after infection they were treated with the indicated antibody intraperitoneally. On day 4, lungs were harvested, dissociated, and serially diluted to enumerate bacterial load. The organ burden of each mouse is indicated along with the median value for each group.*P<0.05, P<0.01, *P<0.001, **** P<0.0001, nonparametric Kruskal-Wallis ANOVA with Dunn's test.
Figure 15:
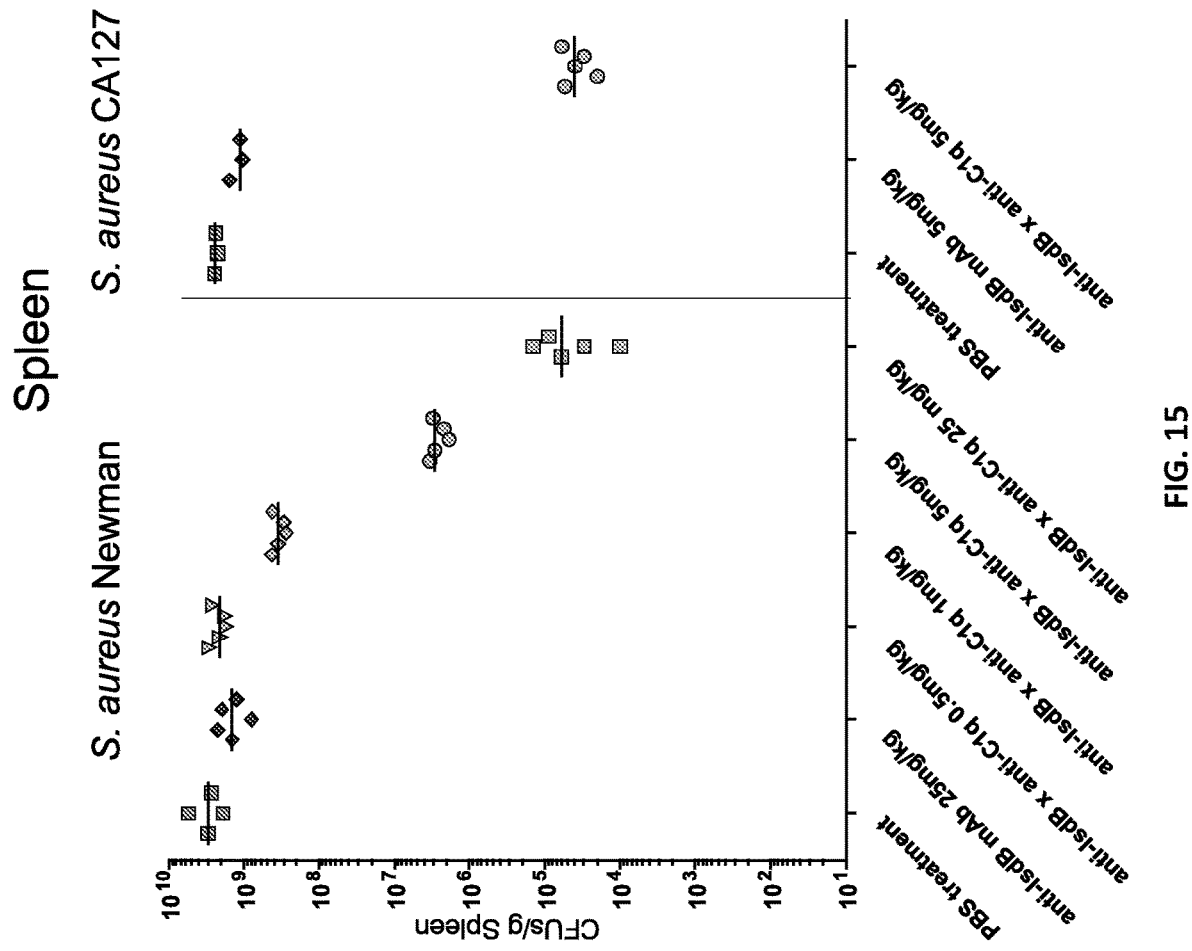
FIG. 15. Anti-IsdB× anti-C1q bsAb reduces the bacterial burden of several strains of *S. aureus* in spleen of C1q humanized mice. C1q humanized mice were infected with either $1.5 \times 10^8$ CPU *S. aureus* Newman (an MSSA strain) or $1.4 \times 10^8$ CFU *S. aureus* CA-127 (an MRSA strain) on day 0. One day after infection they were treated with the indicated antibody intraperitoneally. On day 4, spleens were harvested, dissociated, and serially diluted to enumerate bacterial load. The organ burden of each mouse is indicated along with the median value for each group.*P<0.05, P<0.01, *P<0.001, ****P<0.0001, nonparametric Kruskal-Wallis ANOVA with Dunn's test.

At day 4, bacterial burden in the organs was quantified: mice treated with PBS and 25 mg/kg of anti-IsdB bivalent antibody had 108 bacteria per gram in their kidneys (FIG. 9, right panel). Conversely, treatment with as little as 1 mg/kg anti-IsdB×anti-C1q reduced kidney bacterial burden by at least 1-log, with a 4-log reduction observed at the 5 mg/kg dose (FIG. 9, right panel). Furthermore, similar trends in body weight and bacterial organ burdens were observed with a methicillin resistant (MRSA) strain, *S. aureus* CA127 (FIG. 11). Comparable reductions in bacterial burdens were observed in the hearts, liver, lungs and spleen (FIG. 12-15, respectively). These results demonstrate that a bivalent anti-IsdB IgG1 antibody is not sufficient to clear *S. aureus* in vivo, while the anti-IsdB× anti-C1q bsAb enhances C1q-dependent complement recruitment and killing.

Figure 10:
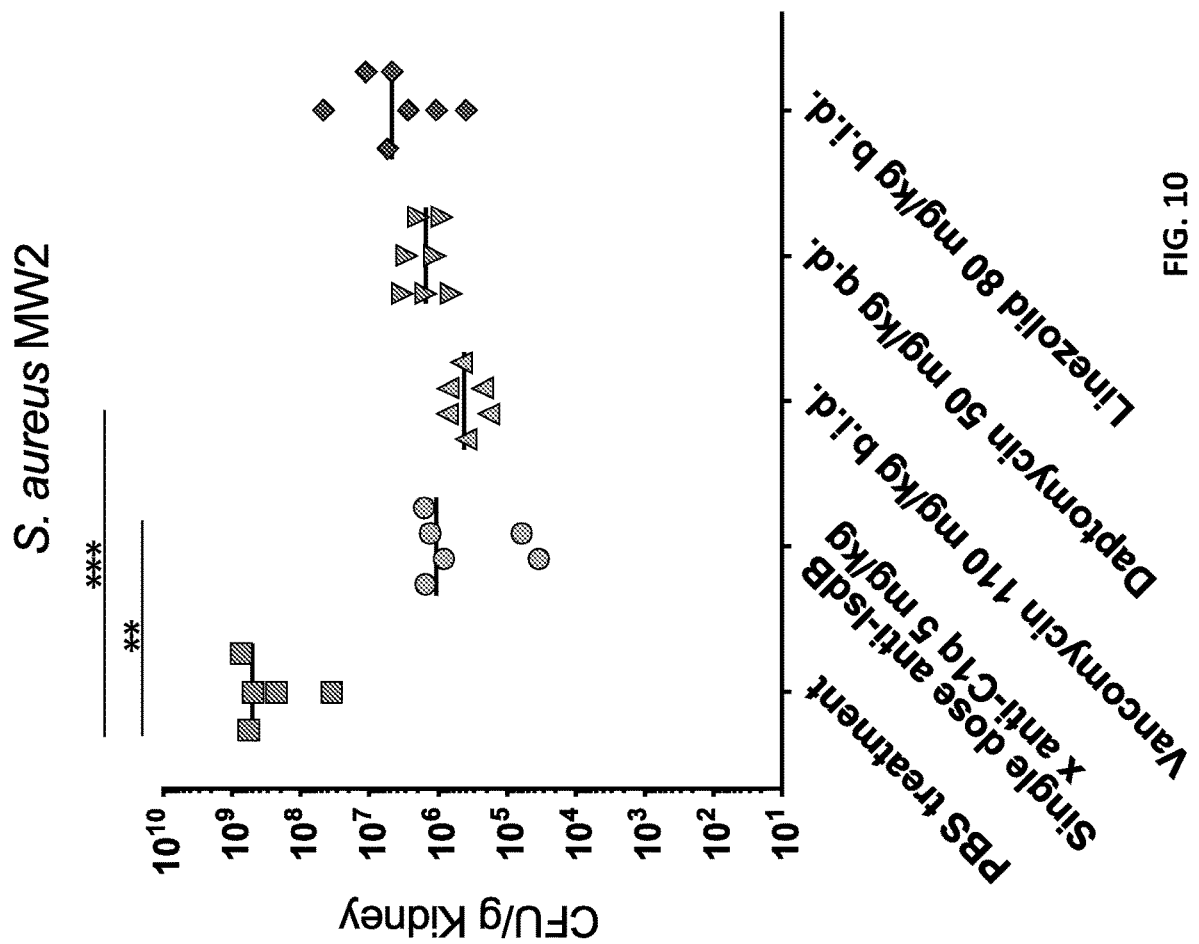
FIG. 10. The IsdB×C1q bispecific antibody increases clearance of *S. aureus* in mice with humanized C1q heads. C1q humanized mice were infected with $1.3 \times 10^8$ CFU *S. aureus* MW2 (a MRSA strain) on day 1. One day after infection they were treated with either PBS (no treatment), a single dose of anti-IsdB× anti-C1q antibody, 110 mg/kg vancomycin twice daily, 50 mg/kg daptomycin once daily, or 80 mg/kg linezolid twice daily. On day 4 kidneys were harvested, dissociated, and serially diluted. Organ burden was determined by plating. P<0.01, *P<0.001, nonparametric Kruskal-Wallis ANOVA with Dunn's test showing values significantly different from the no treatment samples.

A single dose of anti-IsdB× anti-C1q is as effective at reducing *S. aureus* burden as daily dosing of the standard of care antibiotics vancomycin, linezolid, and daptomycin. Mice were infected intraperitoneally with *S. aureus* MW2, a MRSA strain. One day after infection mice were intraperitoneally administered either PBS, 5 mg/kg anti-IsdB× anti-C1q bsAb, or standard of care antibiotics: either 110 mg/kg vancomycin twice daily (b.i.d.) administered subcutaneously, 50 mg/kg daptomycin once daily (q.d.) administered subcutaneously, or 80 mg/kg linezolid twice daily (b.i.d.) administered orally. Mice were weighed daily for 4 days, kidneys were collected, and bacterial burdens determined. While all antibiotics resulted in lower bacterial burdens compared to untreated mice (daptomycin ~330-fold reduction; linezolid ~100-fold reduction), mice treated with either anti-IsdB× anti-C1q bsAb or vancomycin had significantly lower burden of *S. aureus* in their kidneys, with greater than 500-fold reduction (FIG. 10). A single dose of the bsAb was as effective in clearing bacteria as daily doses of the antibiotics tested.

To harness the potent killing activity of the complement system for therapeutic potential, we have developed a bispecific antibody platform that recruits C1q to lyse pathogenic cells. To demonstrate the utility of this platform we initially chose S. aureus, an organism thought to be resistant to the cytotoxic effect of MAC. Using the C1q-directed bispecific approach, we enhanced complement deposition and killing in vitro and in vivo. Depletion of C5, a terminal complement component, abrogated the effect, demonstrating a dependence on MAC-mediated lysis. We further showed that this approach works using other S. aureus targets with different densities.

Gram-positive bacteria are susceptible to direct complement-mediated lysis. MAC was not thought to play a role in control of Gram-positive infections in humans since direct killing had not been observed and both terminal complement deficiencies and blockade of C5 with eculizumab result only in increased susceptibility to the Gram-negative bacteria Neisseria. However, S. aureus do possess terminal complement inhibitors such as SSL7 indicating a role for blocking MAC activity and humans with deficiencies in early complement components (e.g. C1q, C2, C3, C4) are susceptible to multiple bacterial infections including S. aureus. Therefore, the efficacy of our bsAb suggests that increasing localized complement can be harnessed to kill Gram-positive bacteria through the activity of MAC.

Example 15. Kinetics of Human C1q, IsdB-6×his, Influenza HA Foldon-6×his and hGITR.Mmh Binding to Anti-IsdB× Anti-C1q, Anti-Influenza HA× Anti-C1q, Anti-G1TR× Anti-C1q, Anti-Ps1× Anti-C1q scFv and Anti-CD20× Anti-C1q Bispecific mAbs at 25° C. And 37° C.

Having demonstrated efficacy of a C1q-recruiting bsAb against S. aureus, we investigated whether C1q-mediated activity could be used to effectively lyse Gram-negative bacteria and malignant mammalian cells with vastly different cell surfaces. The C1q-recruiting effector arm was paired with surface antigen targeting arms on diverse cell types: Ps1 on Gram-negative Pseudomonas aeruginosa, CD20 on B-cells, glucocorticoid-induced TNFR-related protein (GITR) on T-cells, and hemagglutinin (HA) on influenza-infected cells. The bsAbs were prepared as described in Example 11 and were tested for binding kinetics.

Materials and Methods

Equilibrium dissociation constants (Kn values) for human C1q (Quidel), TsdR-6×His (SEQ ID NO: 80), HA Foldon-6×His (SEQ ID NO: 81) and hGITR.mmh (SEQ ID NO: 82) binding to respective anti-hC1q, anti-IsdB-6×His, anti-HA Foldon-6×.His and anti-GITR.mmh arms of anti-C1q bispecific antibodies were determined using a real-time surface plasmon resonance biosensor (Biacore T200). The CM5 Biacore sensor surface was derivatized by amine coupling of anti-human IgG F(ab')$_2$ fragment specific antibody (Jackson, Cat nr. 109-005-006, Lot nr. 98960) to capture purified anti-IsdB×anti-C1q, anti-Influenza HA× anti-C1q, anti-GITR× anti-C1q, anti-Ps1× anti-C1q scFv and anti-CD20× anti-C1q bispecific antibodies. All Biacore binding studies were performed in a buffer composed of 0.01M HEPES pH 7.4, 0.15M NaCl, 3 mM EDTA, 0.05% v/v Surfactant P20 (running buffer).

Human C1q in concentrations ranging from 0.625 nM to 5 nM, recombinant bacterial IsdB expressed with a hexa-histidine tag (IsdB-6×His; SEQ ID NO: 80) and hGITR expressed with a myc-myc-His tag (hGITR-mmh; SEQ ID NO:82) in concentrations ranging from 1.11 nM-90 nM, and Influenza A group I HA foldon expressed with a hexahistidine tag (HA-6×His; SEQ ID NO: 81) in concentrations ranging from 50 nM to 0.78 nM were injected over the relevant anti-antigen (Ag)×C1q bispecific antibody-captured surface at a flow rate of 50 μL/minute. Antibody-reagent association was monitored for 2 minutes, while dissociation was monitored for 5 minutes. All kinetic binding experiments were performed at 25° C. or 37° C. Kinetic association ($k_a$) and dissociation ($k_d$) rate constants were determined by fitting the real-time sensorgrams to a 1:1 binding model using Scrubber 2.0 c curve fitting software. Binding dissociation equilibrium constants ($K_D$) and dissociative half-lives (t½) were calculated from the kinetic rate constants as:

$$K_D(M) = \frac{kd}{ka}, \text{ and } t1/2 \text{ (min)} = \frac{\ln(2)}{60 * kd}$$

Results and Conclusions

As shown in Table 24, at 25° C., all of the 7 anti-C1q antibodies of the disclosure bound to human C1q (Quidel) with $K_D$ values ranging from 451 μM to 842 μM. As shown in Table 25, at 37° C., all of the 7 anti-C1q bispecific antibodies of the disclosure tested bound to hC1q with $K_D$ values ranging from 481 μM-4.63 nM.

As shown in Table 26, at 25° C., the 2 anti-IsdB× anti-C1q antibodies of the disclosure tested (REGN5066 and REGN5067) bound to IsdB.6×His with $K_D$ values of 2.36 nM and 1.7 nM, respectively. At 37° C., the 2 anti-IsdB×C1q antibodies of the disclosure bound to IsdB-6×His with $K_D$ values of 3.43 nM and 3.33 nM.

As shown in Table 27, at 25° C., the 2 anti-GITR× anti-C1q antibodies of the disclosure tested (REGN6545 and REGN6546) bound to hGITR.6×His with $K_D$ values of 9.86 nM and 7.52 nM, respectively. At 37° C., the 2 anti-GITR× anti-C1q antibodies of the disclosure tested bound to hGITR.6×His with $K_D$ values of 49.2 nM and 20.9 nM.

As shown in Table 28, at 25° C., binding of the anti-HA× anti-C1q antibody of the disclosure (REGN6093) to Influenza HA Foldon.6×His was inconclusive. At 37° C., binding of the anti-HA× anti-C1q antibody of the disclosure to Influenza A group 1 HA Foldon.6×His was not observed under the conditions tested.

Binding of human C1q, IsdB-6×His, HA.6×His and hGITR.mmh to isotype control antibody (REGN1932) was not observed under any of the experimental conditions described above.

TABLE 24

Biacore kinetics of hC1q binding to anti-HA × anti-C1q (REGN6093), anti-GITR × anti-C1q (REGN6545, REGN6546), anti-IsdB × anti-C1q (REGN5066, REGN5067), anti-Psl × anti-C1q scFv (REGN5409) and anti-CD20 × anti-C1q (REGN5177) bispecifc mAbs at 25° C.

| REGN #/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| | | | hC1q binding at 25° C. | | | | | |
| REGN6093 | mAb17736 | m Ab11829- | Influenza HA × C1q | Influenza HA | 4.80E+06 | 2.16E−03 | 4.51E−10 | 5.3 |
| REGN6545 | mAb17736P | mAb14536 | anti-GITR × C1q | GITR | 3.07E+06 | 1.62E−03 | 5.28E−10 | 7.1 |
| REGN5177 | mAb17736 | mAb14303 | anti-CD20 × anti-C1q mAb | CD20 | 3.26E+06 | 2.24E−03 | 6.88E−10 | 5.2 |
| REGN5409 | 17736 ScFv (VK-VH) | COMP2882 (anti-Psl) | anti-Psl × C1q ScFv | Psl | 3.51E+06 | 2.62E−03 | 7.47E−10 | 4.4 |
| REGN6546 | mAb18395 | mAb14536 | anti-GITR × C1q | GITR | 5.43E+06 | 4.09E−03 | 7.53E−10 | 2.8 |
| REGN5066 | mAb17736 | mAb20295 | IsdB × C1q | IsdB | 2.51E+06 | 2.11E−03 | 8.42E−10 | 5.5 |
| REGN5067 | mAb18395 | mAb20295 | IsdB × C1q | IsdB | 5.78E+06 | 4.35E−3 | 7.54E−10 | 2.7 |
| REGN1932 | | | Anti-FelD1 | isotype control | NB | NB | NB | NB |

TABLE 25

Biacore kinetics of hC1q binding to anti-HA × anti-C1q (REGN6093), anti-GITR × anti-C1q (REGN6545, REGN6546), anti-IsdB × anti-C1q (REGN5066, REGN5067), anti-Psl × anti-C1q scFv (REGN5409) and anti-CD20 × anti-C1q (REGN5177) bispecifc mAbs at 37° C.

| REGN #/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| | | | hC1q binding at 37° C. | | | | | |
| REGN6093 | mAb17736 | mAb11829 | Influenza HA × C1q | Influenza HA | 3.61E+06 | 4.01E−03 | 1.11E−09 | 2.9 |
| REGN5066 | mAb17736 | mAb20295 | IsdB × C1q | IsdB | 3.22E+06 | 5.02E−03 | 1.56E−09 | 2.3 |
| REGN6545 | mAb17736 | mAb14536 | anti-GITR × C1q | GITR | 3.34E+06 | 5.82E−03 | 1.74E−09 | 2 |
| REGN5067 | mAb18395 | mAb20295 | IsdB × C1q | IsdB | 6.52E+06 | 1.34E−02 | 2.05E−09 | 0.9 |
| REGN5409 | 17736 ScFv (VK-VH) | COMP2882 (anti-Psl) | anti-Psl × C1q ScFv | Psl | 4.80E+06 | 1.16E−02 | 2.41E−09 | 1 |
| REGN5177 | mAb17736 | mAb14303 | anti-CD20 × anti-C1q mAb | CD20 | 1.04E+07 | 4.99E−03 | 4.81E−10 | 2.3 |
| REGN6546 | mAb18395 | mAb14536 | anti-GITR × C1q | GITR | 4.90E+06 | 2.27E−02 | 4.63E−09 | 0.5 |
| REGN1932 | | | Anti-FelD1 | isotype control | NB | NB | NB | NB |

TABLE 26

Biacore kinetics of IsdB-6 × His binding to IsdB arm of anti-IsdB × C1q bispecific antibodies

| Antibody ID | Ag Pair | Temp. °C. | $k_a$ (Ms$^{-1}$) | $k_d$ (s$^{-1}$) | $K_D$ (Molar) | $t_{1/2}$ (min) |
|---|---|---|---|---|---|---|
| REGN5066 | IsdB | 25 | 1.15E+05 | 2.70E−04 | 2.36E−09 | 42.8 |
| REGN5067 | IsdB | 25 | 1.20E+05 | 2.04E−04 | 1.70E−09 | 56.6 |
| REGN1932 | FelD1 | 25 | NB | NB | NB | NB |
| REGN5066 | IsdB | 37 | 1.63E+05 | 5.57E−04 | 3.43E−09 | 20.7 |
| REGN5067 | IsdB | 37 | 1.56E+05 | 5.20E−04 | 3.33E−09 | 22.2 |
| REGN1932 | FelD1 | 37 | NB | NB | NB | NB |

NB—No binding observed under test conditions described above

TABLE 27

Biacore kinetics of hGITR binding to GITR arm of anti-GITR × anti-C1q bispecific antibodies

| Antibody ID | Ag Pair | Temp °C. | $k_a$ (Ms$^{-1}$) | $k_d$ (s$^{-1}$) | $K_D$ (Molar) | $t_{1/2}$ (min) |
|---|---|---|---|---|---|---|
| REGN6545 | GITR | 25 | 3.30E+05 | 3.26E−03 | 9.86E−09 | 3.5 |
| REGN6546 | GITR | 25 | 4.53E+05 | 3.40E−03 | 7.52E−09 | 3.4 |
| REGN1932 | FelD1 | 25 | NB | NB | NB | NB |
| REGN6545 | GITR | 37 | 2.74E+05 | 1.35E−02 | 4.92E−08 | 0.9 |
| REGN6546 | GITR | 37 | 5.43E+05 | 1.14E−02 | 2.09E−08 | 1 |
| REGN1932 | FelD1 | 37 | NB | NB | NB | NB |

TABLE 28

Biacore kinetics of Influenza A group 1 HA Foldon.6 × His binding to HA arm of anti-HA × anti-C1q bispecific antibodies

| Antibody ID | Ag Pair | TEMP °C. | $k_a$ (Ms$^{-1}$) | $k_d$ (s$^{-1}$) | $K_D$ (Molar) | $t_{1/2}$ (min) |
|---|---|---|---|---|---|---|
| REGN6093 | HA | 25 | IC | IC | IC | IC |
| REGN1932 | FelD1 | 25 | NB | NB | NB | NB |
| REGN6093 | HA | 37 | NB | NB | NB | NB |
| REGN1932 | FelD1 | 25 | NB | NB | NB | NB |

NB—No binding observed under test conditions described above;
IC—Binding was inconclusive Example 16. Kinetics of Human C1q (Quidel) and Paired Ag-6×his or Mmh Binding to Anti-IsdB× Anti-C1q, Anti-Influenza HA× Anti-C1q (1), Anti-GITR× Anti-C1q (2), Anti-CD20× Anti-C1q and Anti-Ps1× Anti-C1q Bispecific mAbs at 25° C. And 37° C.

Equilibrium dissociation constants ($K_D$ values) for the C1q arm of purified anti-IsdB× anti-C1q (2), anti-Influenza HA× anti-C1q (1), anti-GITR× anti-C1q (2), anti-CD20× anti-C1q (1), and anti-Ps1× anti-C1q (1) bispecific antibodies binding to neutravidin captured biotinylated (bt) human C1q (purchased from Quidel biotinylated in-house) were determined using a real-time surface plasmon resonance biosensor (Biacore 8 k). $K_D$ values were also obtained for the respective paired arm of purified anti-IsdB×anti-C1q, anti-Influenza HA× anti-C1q and anti-GITR× anti-C1q bispecific antibodies binding to anti-His antibody (GE Healthcare, Lot 10266715) captured IsdB-6×His, Influenza A group HA Foldon-6×His and hGITR-mmh using a real-time surface plasmon resonance biosensor (Biacore 8 k).

The CM5 Biacore sensor surface was derivatized by amine coupling with Neutravidin (Thermo Fisher catalog nr 31000) to bind biotinylated hC1q (bt-hC1q). All Biacore binding studies were performed in a buffer composed of 0.01M HEPES pH 7.4, 0.15M NaCl, 3 mM EDTA, 0.05% v/v Surfactant P20 (running buffer). Bispecific mAbs were prepared in concentrations ranging from 7.8 nM to 500 nM for bt-hC1q binding and 12.5 nM and 50 nM concentrations for His-captured paired Ag binding. Solutions were injected over the bispecific antibody-captured surface at a flow rate of 30 µL/minute. Antibody-reagent association was monitored for 2.5 minutes while dissociation was monitored for 8-10 minutes. All binding kinetic experiments were performed at 25° C. or 37° C. Kinetic association ($k_a$) and dissociation ($k_d$) rate constants were determined by fitting the real-time sensorgrams to a 1:1 binding model using GE Healthcare Insight curve fitting software. Binding dissociation equilibrium constants ($K_D$) and dissociative half-lives (t ½) were calculated from the kinetic rate constants as:

$$K_D(M) = \frac{kd}{ka}, \text{ and } t1/2 \text{ (min)} = \frac{\ln(2)}{60 * kd}$$

Results and Conclusions

As shown in Table 29, at 25° C., all of the 7 anti-C1q bispecific antibodies of the disclosure bound to Neutravidin captured biotinylated human C1q (Quidel) with $K_D$ values ranging from 327 nM-2.18 uM. As shown in Table 30 at 37° C., 6 of the anti-C1q antibodies of the disclosure tested bound to human bt-C1q with $K_D$ values ranging from 343 nM to 8.54 uM. As shown in Table 31, at 25° C., the IsdB arm of the two anti-IsdB×anti-C1q bispecific antibodies of the disclosure bound to IsdB-6×His with $K_D$ values of 2.3 nM and 3.01 nM, the HA arm of the one anti-HA× anti-C1q bispecific antibody of the disclosure bound to HA Foldon-6×His with a $K_D$ value of 1.11 nM and the hGITR arm of the two anti-GITR× anti-C1q bispecific antibodies of the disclosure bound to hGITR.mmh with $K_D$ values of 3.3 nM and 4.61 nM. As shown in Table 32, at 37° C., the IsdB arm of the anti-IsdB× anti-C1q bispecific antibody of the disclosure tested bound to IsdB-6×His with a $K_D$ value of 7.52 nM, the HA arm of the one anti-HA× anti-C1q bispecific antibody of the disclosure bound to HA Foldon.6×His with a $K_D$ value of 519 µM and the hGITR arm of the two anti-GITR× anti-C1q bispecific antibodies of the disclosure tested had $K_D$ values of 7.38 nM and 16 nM. Binding of isotype control antibody (REGN1932) to human bt-C1q, IsdB-6×His, HA Foldon.6×His and hGITR.mmh was not observed under the experimental conditions described above.

TABLE 29

Bispecific Abs binding to Biotinylated hC1q at 25° C.

| REGN nr/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| REGN5066 | mab17736 | mAb20295 | IsdB × C1q | IsdB | 9.11E+04 | 3.66E−02 | 4.02E−07 | 0.32 |
| REGN5067 | mAb18395 | mAb20295 | IsdB × C1q | IsdB | 1.68E+05 | 3.65E−01 | 2.18E−06 | 0.03 |
| REGN6093 | mAb17736 | MAb11829 | Influenza HA × C1q | Influenza HA | 9.46E+04 | 3.09E−02 | 3.27E−07 | 0.37 |
| REGN6545 | mAb17736 | mAb14536P | anti-GITR × C1q | GITR | 2.41E+05 | 4.49E−01 | 1.86E−06 | 0.03 |
| REGN6546 | H1 × H18395P | H1H14536P2 | anti-GITR × C1q | GITR | 2.20E+05 | 4.13E−01 | 1.88E−06 | 0.03 |
| REGN5409 | 17736P ScFv (VK-VH) | COMP2882 (anti-Psl) | anti-Psl × C1q ScFv | Psl | 6.40E+04 | 2.76E−02 | 4.31E−07 | 0.42 |
| REGN5177 | mAb17736 | mAb28698 | anti-CD20 × anti-C1q | CD20 | 1.01E+05 | 4.42E−02 | 4.36E−07 | 0.3 |
| REGN1932 |  |  | isotype control | Feld1 | NB | NB | NB | NB |

TABLE 30

Biacore kinetics for anti-IsdB × anti-C1q (REGN5066 and REGN5067), anti-influenza HA × anti-C1q (REGN6093), anti-GITR × anti-C1q (REGN6545/REGN6546) and anti- × anti-C1q (REGN5409) bispecific mAbs binding to bt-hC1q

| REGN nr/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| REGN5066 | mAb17736 | mAb20295 | IsdB × C1q | IsdB | 1.17E+05 | 7.82E−02 | 6.66E−07 | 0.15 |
| REGN5067 | mAb18395 | mAb20295 | IsdB × C1q | IsdB | 2.24E+05 | 8.44E−01 | 3.77E−06 | 0.01 |
| REGN6093 | mAb17736 | mAb11829 | Influenza HA × C1q | Influenza HA | 1.82E+05 | 9.37E−02 | 5.16E−07 | 0.12 |
| REGN6545 | mAb17736 | mAb14536 | anti-GITR × C1q | GITR | 1.98E+05 | 6.58E−01 | 3.33E−06 | 0.02 |
| REGN6546 | mAb18395 | mAb14536 | anti-GITR × C1q | GITR | 8.05E+04 | 6.87E−01 | 8.54E−06 | 0.02 |
| REGN5409 | mAb17736 ScFv (VK-VH) | COMP2882 (anti-Psl) | anti-Psl × C1q ScFv | Psl | 4.35E+04 | 1.49E−02 | 3.43E−07 | 0.78 |
| REGN1932 |  |  | isotype control | Feld1 | NB | NB | NB | NB |

TABLE 31

Bispecific mAbs binding to IsdB.6 × His, HA foldon.6 × His and hGITR · mmh at 25° C.

| REGN nr/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| REGN5066 | mAb17736 | mAb20295 | IsdB × C1q | IsdB | 4.57E+05 | 1.05E−03 | 2.30E−09 | 11.0 |
| REGN5067 | mAb118395 | mAb20295 | IsdB × C1q | IsdB | 3.28E+05 | 9.89E−04 | 3.01E−09 | 11.7 |
| REGN6093 | mAb17736 | mAb11829 | Influenza HA × C1q | Influenza HA | 1.58E+05 | 1.75E−04 | 1.11E−09 | 66.0 |
| REGN6545 | mAb17736 | mAb14536 | anti-GITR × C1q | GITR | 6.93E+05 | 2.29E−03 | 3.30E−09 | 5.04 |
| REGN6546 | mAb18395 | mA14536 | anti-GITR × C1q | GITR | 6.73E+05 | 3.10E−03 | 4.61E−09 | 3.73 |

TABLE 31-continued

Bispecific mAbs binding to IsdB.6 × His, HA foldon.6 × His and hGITR · mmh at 25° C.

| REGN nr/Ab PID | C1q Clone | Pairing Clone | Ab type | Ag pair | $k_a$ (l/mol * s) | $k_d$ (1/s) | $K_D$ (mol/l) | $t_{1/2}$ (min) |
|---|---|---|---|---|---|---|---|---|
| REGN1932 | | | MAB isotype control | Feld1 | NB | NB | NB | NB |

TABLE 32

Bispecific mAbs binding to IsdB.6 × His, HA foldon.6 × His and hGITR · mmh at 37° C.

| REGN nr/Ab PID | C1q Clone | Pairing Clone | Ab type | Ag pair | Ka (l/mol * s) | Kd (1/s) | KD (mol/l) | $t^{1/2}$ (min) |
|---|---|---|---|---|---|---|---|---|
| REGN5066 | mAb17736 | mAb20295 | IsdB × C1q | IsdB | 8.74E+05 | 6.57E−03 | 7.52E−09 | 1.8 |
| REGN6093 | mAb17736 | mAb11829 | Influenza HA × C1q | Influenza HA | 9.94E+04 | 5.15E−05 | 5.19E−10 | 224.3 |
| REGN6545 | mAb17736 | mAb14536 | anti-GITR × C1q | GITR | 1.08E+06 | 7.95E−03 | 7.38E−09 | 1.5 |
| REGN6546 | mAb18395 | mAb14536 | anti-GITR × C1q | GITR | 1.19E+06 | 1.90E−02 | 1.60E−08 | 0.6 |
| REGN1932 | | | isotype control | Feld1 | NB | NB | NB | NB |

Example 17. Determination of Membrane Complement Inhibitor Levels by Flow Cytometry Flow cytometric analysis was used to characterize the CD55 and CD59 expression levels on Jurkat T-cells and Raji B-cells. Briefly, cells were incubated at 4° C. for 60 min with BD APC anti-CD55, BD FITC anti-CD59, or isotype matched control antibodies according to the manufacturer's instructions. After incubation, the cells were washed with cold PBS containing 2% FBS, re-suspended in PBS, and analyzed by flow cytometry on an Accuri C6 flow cytometer. Unstained controls were also tested for both cell lines. The results were analyzed using FlowJo (TreeStar Inc.) software and geometric mean fluorescence for viable cells were determined. As shown in Table 33, Raji and Jurkat cells express different levels of the complement inhibitors CD55 and CD59.

TABLE 33

Relative levels of Complement Inhibitors on tested cell types

| Cell type | CD55 fold change | CD59 fold change |
|---|---|---|
| Raji | 7.7 | 6.2 |
| Jurkat | 23.4 | 53.1 |

Example 18. Demonstrating the Ability of Anti-Ps1× Anti-C1q Bispecific Antibodies to Bind Pseudomonas aeruginosa Via ELISA Pseudomonas aeruginosa, an opportunistic human pathogen, is a significant source of disease in hospitals and among immunocompromised individuals due to antibiotic resistance and biofilm formation mediated by its surface exopolysaccharides. We investigated whether the C1q-recruiting bsAb platform was effective against this pathogen. Binding of the anti-Ps1× anti-C1q bispecific antibodies of the present disclosure to Ps1 expressed on the surface of Pseudomonas aeruginosa was determined in an ELISA based format. Most Pseudomonas aeruginosa clinical isolates (~85%) express the exopolysaccharide Ps1 protein and a bivalent monoclonal antibody (mAb) to this exopolysaccharide has shown efficacy in mouse models of infection (DiGiandomenico A., et al. J. Exp. Med. 209, 1273-1287 (2012)). Because the exopolysaccharide coats the surface of the bacterium, it can be used as a targeting arm for bispecific antibodies. A bispecific antibody using anti-Ps1 as one arm and anti-C1q as the second arm of the antibody has been generated. Comparison of the binding of the bivalent parent anti-Ps1 mAb versus the anti-Ps1×C1q bispecific antibody to P. aeruginosa was tested.

Experimental Procedure

An anti-Ps1× anti-C1q bispecific antibody (REGN 5409) of this disclosure was assessed for binding to wild-type P. aeruginosa strain PAO1 (American Type Culture Collection) compared to its anti-Ps1 bivalent parent monoclonal antibody (mAb) (REGN2882). An overnight P. aeruginosa culture was grown in LB (Teknova), diluted 1:50 in fresh LB and grown to OD600=~1 at 37° C. with shaking. The culture was washed once with PBS (Gibco) and diluted to OD600=0.25. MicroSorp 96-well plates (ThermoFisher) were coated with 100 µl per well of the P. aeruginosa suspension and incubated overnight at 4° C. The following morning, plates were washed once with wash buffer (Imidazole buffered saline with Tween-20) and blocked for two hours at 25° C. with 200 µl of blocking buffer (3% BSA in PBS). After blocking, plates were washed once, and titrations of the bispecific, bivalent and isotype-matched control antibodies (ranging from 333 nM-5.64 µM with 1:3 serial dilutions in 0.5% BSA/0.05% Tween-20/PBS) were added to the bacteria-containing wells and incubated for one hour at 25° C. Wells were washed three times and then incubated with 100 ng/ml anti-human HRP secondary antibody (Donkey anti-human IgG HRP from Jackson ImmunoResearch) per well for one hour at 25° C. Then 100 µl of SuperSignal ELISA Pico Chemiluminescent Substrate was added to each well and signal was detected using a SpectraMax i3x plate reader (Molecular Devices). Luminescence values were analyzed by a four-parameter logistic equation over an 11-point response curve (GraphPad Prism).

A bispecific antibody using anti-Ps1 as one arm and anti-C1q as the second arm of the antibody was generated as described in Example 11 above and assessed for its ability to deposit complement component C1q onto the surface of wild-type *P. aeruginosa* strain PAO1 (American Type Culture Collection) compared to its anti-Ps1 bivalent parent monoclonal antibody (mAb) (see REGN2882).

An overnight *P. aeruginosa* culture was grown in TSB (Tryptic soy broth from Teknova), diluted 1:50 in fresh TSB and grown to $OD_{600}$=~1 at 37° C. with shaking. The culture was washed once with PBS and diluted to $OD_{600}$=0.25. MicroSorp 96-well plates (ThermoFisher) were coated with 100 µl per well of the *P. aeruginosa* suspension and incubated overnight at 4° C. The following morning, plates were washed three times with wash buffer (Imidazole buffered saline with Tween-20) and blocked for two hours at 25° C. with 200 µl of blocking buffer (3% BSA in PBS). Following blocking, plates were washed six times and titrations of the bispecific (REGN5409), bivalent (REGN2882), and isotype-matched control antibodies (ranging from 333 nM-5.64 µM with 1:3 serial dilutions in 0.5% BSA/10 mM HEPES/RPMI) were added to the bacteria-containing wells and incubated for one hour at 25° C. Wells were washed six times and then incubated for 1.5 hours at 37° C. with 5% complement preserved human serum (diluted in 0.5% BSA/10 mM HEPES/RPMI) that had been adsorbed with Protein A/G agarose to remove any anti-*P. aeruginosa* antibodies present in the serum. Wells were washed six times and C1q deposition was detected by adding 1 µg/ml goat anti-human C1q antibody (Genway) followed by 100 ng/ml anti-goat HRP secondary antibody (Jackson ImmunoResearch) (in 0.5% BSA/0.05% Tween-20/PBS) per well for one hour at 25° C. Then 100 µl of SuperSignal ELISA Pico Chemiluminescent Substrate was added to each well and signal was detected using a SpectraMax i3x plate reader (Molecular Devices). Luminescence values were analyzed by a four-parameter logistic equation over a 10-point response curve (GraphPad Prism).

Anti-Ps1× anti-C1q bispecific (REGN5409) and the anti-Ps1 bivalent (REGN2882) hIgG1 antibodies were assessed for bactericidal activity against *P. aeruginosa* H103 in a whole blood survival assay. A culture of *P. aeruginosa* was grown in TSB overnight, washed in PBS, and resuspended to a concentration of $1\times10^5$ colony forming units (CFU)/mL in PBS. In duplicates, 103 CFU *P. aeruginosa* suspension in 10 µl was mixed with 80, 800 and 4000 uM antibodies in 10 µl volume and was added to 100 µL of whole human blood (in sodium citrate as anti-coagulant with additional 500 nM dabigatran to reduce clot formation). The samples were incubated in 96 well plates at 37° C. with shaking (100 rpm) for twenty-four hours. After incubation, 100 µl of agglutination lysis buffer (PBS supplemented with 200 U Streptokinase, 2 µg/mL RNase, 10 µg/mL DNase, 0.5% saponin, 100 ug trypsin per ml of PBS) was added to the samples and vigorously vortexed until the pellet disappeared. A total of 50 uL from each sample was serially diluted in PBS and plated onto LB agar plates for enumeration of CFUs.

Results and Conclusion

As shown in Table 34, bivalent anti-Ps1 mAb (REGN2882) demonstrated higher binding ($EC_{50}$ binding of 2.699E-10) to *P. aeruginosa* PAO1 than the anti-Ps1× anti-C1q bispecific antibody (REGN5409) that contains only one Ps1-binding arm (ECs5 binding of 4.326E-09). Notably, however, the anti-Ps1× anti-C1q bispecific antibody (REGN5409) demonstrated the ability to bind *P. aeruginosa*. The isotype-matched control antibodies did not bind to the bacteria. Table 35 shows the $EC_{50}$ binding concentration for a bivalent anti-Ps1 mAb (REGN2882) and anti-Ps1× anti-C1q bispecific antibody (REGN5409) along with two isotope-matched control antibodies.

TABLE 34

| Antibody binding to *P. aeruginosa* PAO1 | | |
|---|---|---|
| Antibody | Maximum binding RLUs | $EC_{50}$ Binding (M) |
| Bs anti-Psl × anti-C1q | $3.9 \times 10^5$ | 4.326E-09 |
| Bivalent anti-Psl | $4.77 \times 10^5$ | 3.45E-10 |
| Control I | | no binding |
| Control II | | no binding |

As shown in Table 35, increased levels of C1q deposition was detected on the surface of *P. aeruginosa* PAO1 in the presence of the anti-Ps1× anti-C1q bispecific antibody (REGN5409) compared to the bivalent anti-Ps1 mAb (REGN2882). Isotyped-matched control antibodies did not bind to the bacteria. Table 36 shows the ability of an anti-Ps1× anti-C1q bispecific antibody (REGN5409) to increase the component C1q deposition ($EC_{50}$ binding=3.167E-09) on the surface of *P. aeruginosa* PAO1 compared to bivalent anti-Ps1 mAb (REGN2882; $EC_{50}$ binding=2.529E-08).

TABLE 35

| Complement component C1q deposition on surface of live *P. aeruginosa* PAO1 using anti-Psl and anti-Psl × anti-C1q antibodies | |
|---|---|
| Antibody | $EC_{50}$ Binding (M) |
| REGN5409 | 3.167E-09 |
| REGN2882 | 2.529E-08 |
| Control I | no binding |
| Control II | no binding |

*P. aeruginosa* survival in human whole blood can be assessed in an ex vivo assay to explore the role of complement and immune effector cells to modulate bacterial growth similar to that described with *S. aureus* (J Exp Med. 2009 Oct. 26; 206(11):2417-27). The activity of an anti-Ps1× anti-C1q bispecific antibodies in modulating *P. aeruginosa* survival is measured in this assay where the bispecific antibodies or bivalent parental antibodies are added into whole blood and survival is assessed after twenty-four hours.

Results are presented as percent survival of *P. aeruginosa* after treatment with the anti-Ps1× anti-C1q bispecific (REGN5409) or the anti-Ps1 bivalent (REGN2882) hIgG1 antibodies as summarized in Table 36. The overall growth in whole human blood in the absence of test antibody is normalized to 100%.

Table 36 shows the ability of anti-Ps1× anti-C1q bispecific antibody (REGN5409) to effectively prevent *P. aeruginosa* survival in human whole blood at three different concentrations (80 uM, 800 uM, and 4000 uM) compared to no treatment and treatment with an anti-Ps1 bivalent antibody (REGN2882). Survival of *P. aeruginosa* when treated with the anti-Ps1 bivalent antibody was unaffected with low antibody concentrations of 80 uM. At higher anti-Ps1 bivalent antibody concentrations of 800 and 4000 uM, increase in growth of P. aeruginosa was observed, ranging from 116-1560%. In contrast, the treatment with anti-Ps1× anti-C1q bispecific antibody reduced growth by 96-99%. Addition of anti-Ps1× anti-C1q bsAb to P. aeruginosa in human blood resulted in over a 1-log reduction in bacteria after 24 h compared to control or anti-Ps1 bivalent antibody. This result demonstrated that the C1q-recruiting bsAb platform is effective against both Gram-positive and Gram-negative bacteria and further showed that adding a C1q-recruiting arm to an antibody that lacks intrinsic CDC activity can result in a molecule that leads to significant complement activation.

TABLE 36

P. aeruginosa H103 survival in human whole blood after treatment with anti-Psl × anti-C1q bispecific antibody

| Antibody | 80 uM | 800 uM | 4000 uM |
|---|---|---|---|
| | % survival of P. aeruginosa compared to whole blood (no treatment, normalized to 100%) | | |
| Blood + P. aeruginosa (no treatment) | 100 | 100 | 100 |
| REGN2882 (anti-Psl bivalent) | 99 | 116 | 1560 |
| REGN5409 (anti-Psl × anti-C1q) | 4.1 | 3.24 | 1.1 |

Example 19: Demonstrating the Ability of Anti-Influenza HA× Anti-C1q Bispecific Antibodies to Bind Influenza HA Via ELISA and Mediate CDC of MDCK Infected Cells Influenza infection is initiated by the surface glycoprotein hemagglutinin (HA) through binding to sialic acid residues at the surface of the host cell and fusion of viral and endosomal membranes. Current vaccine strategies rely on the production of influenza HA-specific antibodies to protect against viral infection (YQ Chen, et al., Cell. 173, 417-429 (2018)). However, influenza infections can also lead to the production of antibodies that bind to infected cells and induce the lysis of infected cells through activation of complement (M. Terajima et al., Journal of Virology. 85, 13463-13467 (2011); J P. Jayasekera et al., Journal of Virology. 81, 3487-3494 (2007); JPM. Melis et al., Molecular Immunology. 67, 117-130 (2015).

Bispecific antibodies represent an emerging strategy to direct the complement system against cells infected with an infectious agent in a targeted manner. IgG antibodies have been shown to activate the classical pathway of the complement system through binding to C1q via their Fc region (M. Terajima et al., Journal of Virology. 85, 13463-13467 (2011); J P. Jayasekera et al., Journal of Virology. 81, 3487-3494 (2007); JPM. Melis et al., Molecular Immunology. 67, 117-130 (2015). Targeting the C1q component of complement in conjunction with the HA protein on the surface of influenza-infected cells and maybe even virions could further enhance the protective effect of antibodies specific for HA.

In this example, broadly neutralizing anti-HA× anti-C1q bispecific antibodies were tested for their binding to influenza A (group 1) infected cells.

Experimental Procedure

Madin-Darby Canine Kidney (MDCK) cells were infected with Influenza A virus A/Puerto Rico/08/1934 (H1N1) at a Multiplicity Of Infection (MOI) of 0.05 for 24 hours. Infected cells were washed and fixed with 4% paraformaldehyde. Fixed cells were then blocked with a 3% Bovine Serum Albumin (BSA) solution before adding broadly-neutralizing anti-Influenza A group 1 HA× anti-C1q bispecific antibody (REGN6093), parental anti-HA specific bivalent antibody (mAb11829), parental anti-HA specific antibody with only a single arm (mAb27250), and anti-Influenza A group 1 HA× anti-FcγRIII bispecific antibody (mAb20067) or control antibodies, which consisted of an anti-IsdB× anti-C1q bispecific antibody (REGN5066), negative control #2 (a bispecific antibody comprising an anti-C1q arm and an arm targeting a target antigen other than HA), an anti-IsdB× anti C1q ScFv bispecific antibody (REGN5408), negative control #3 (a bispecific antibody comprising an anti-C1q arm and an arm targeting a target antigen other than HA), and an anti-IgG1 isotype control (REGN1932). All the antibodies were added at starting concentration of 166.67 nM and 1/4 serial dilution for each antibody. Bound antibodies to fixed cells were detected with an α-human IgG (H+L) HRP conjugated antibody (Jackson Immunoresearch, 1/5000) and chemiluminescent substrate (Life Technologies). Relative Fluorescent Units (RLUs) were measured with a Spectramax i3 plate reader (Molecular Devices).

MDCK cells were infected with Influenza A virus A/Puerto Rico/08/1934 (H1N1) at MOI 5 for 24 hours. Infected cells were harvested and combined with antibodies (0.89 µM starting concentration and 1/2 serial dilution for each antibody) and normal human serum complement (5% final concentration). After 2 hours of incubation, complement dependent cell lysis was evaluated with the CytoTox-Glo reagent (Promega). Relative Fluorescent Units (RLUs) were measured with a Spectramax i3 plate reader (Molecular Devices). The percent specific lysis is expressed relative to minimum and maximum lysis controls.

Results and Conclusion

Figure 16:
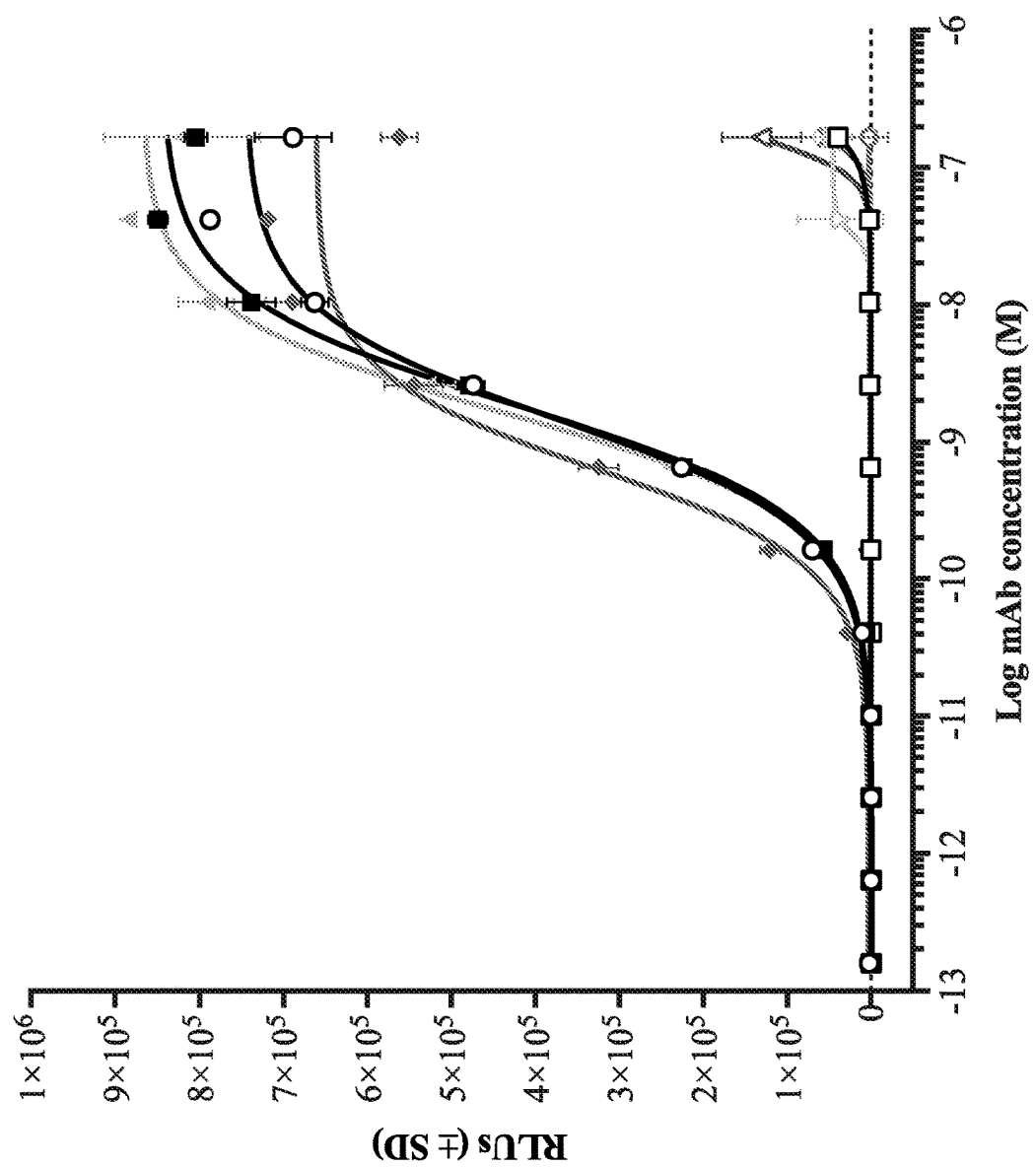
FIG. 16. Dose response curves of REGN6093 (FluA group 1×C1q bispecific), parental or control antibodies in an ELISA assay with A/Puerto Rico/08/1934 (H1N1)-infected MDCK cells. MDCK cells were infected with the virus for 24 h before their fixation with 4% paraformaldehyde. The antibodies were added onto the fixed cells and bound antibodies were detected with an a-human IgG (H+L) specific secondary antibody. All values are reported in Relative Fluorescent Units (RLUs). Shown are REGN6093 (anti- HA× anti-C1q bispecific, black squares), mAb11829 (parental HA bivalent antibody, clear circles), mAb27250 (one-arm parental HA antibody; gray diamonds), mAb20067 (FluA group 1×PcγRIII bispecific; gray triangles) along with controls REGN5066 (IsdB×C1q bispecific; clear squares), negative control #2 (clear inverted triangles), REGN5408 (IsdB×C1q scFv; clear triangles), negative control #3 (gray crosses), and REGN1932 (IgG1 isotype control; clear hexagon).
Figure 17:
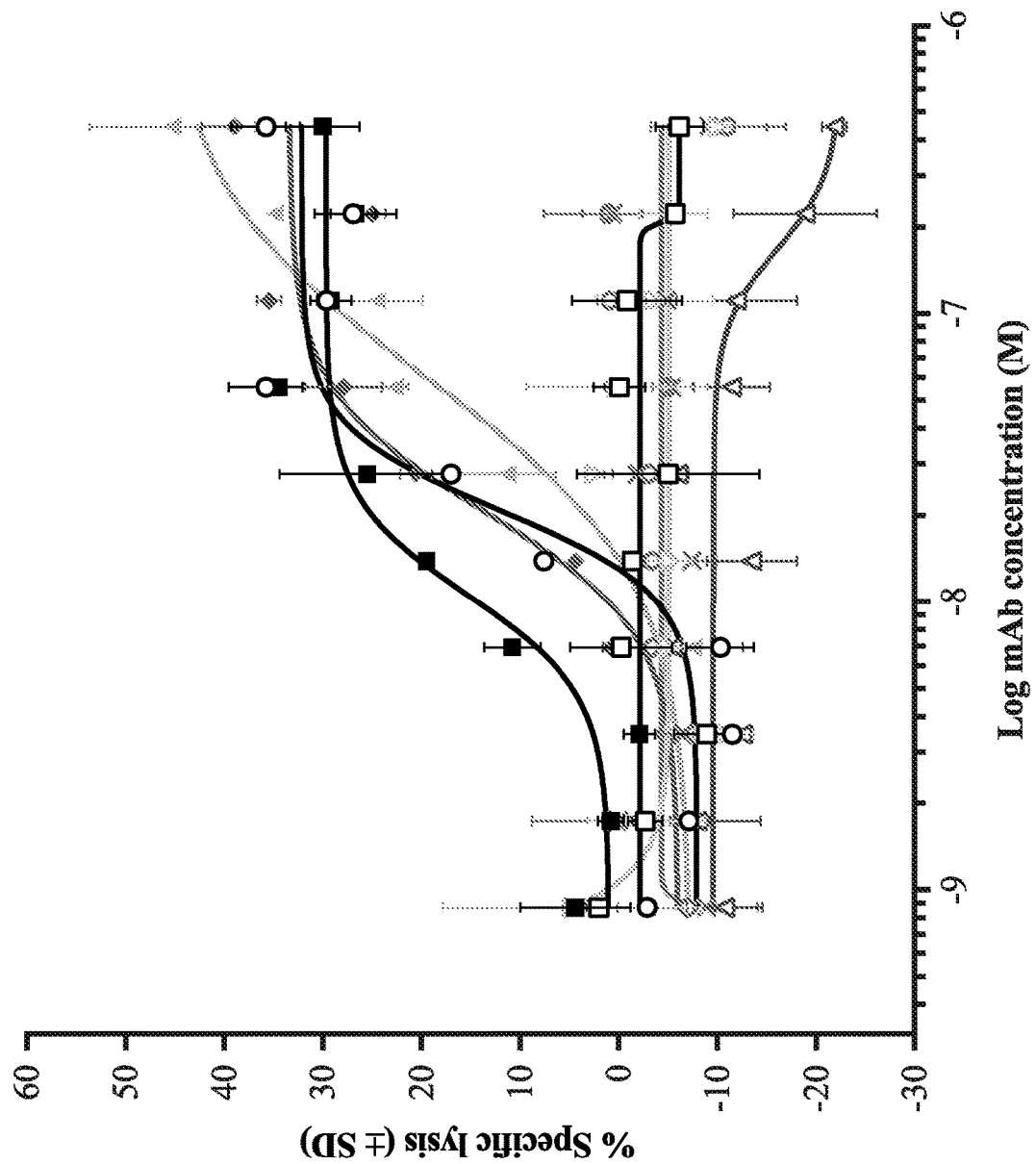
FIG. 17. Dose response curves of REGN6093 (FluA group 1×C1q bispecific), parental or control antibodies in a CDC assay with A/Puerto Rico/08/1934 (H1N1)-infected MDCK cells and normal human serum complement. MDCK cells were infected with the virus for 24 h. Infected cells were collected and mixed with the antibodies and 5% normal human serum complement for 2 hours at room temperature. Complement dependent cell lysis was measured with the CytoTox-Glo kit (Promega). Percent specific lysis is expressed relative to minimum and maximum lysis controls. Shown are REGN6093 (anti-HA× anti-C1q bispecific, black squares), mAb11829 (parental HA bivalent antibody, clear circles), mAb27250 (one-arm parental HA antibody; gray diamonds), mAb20067 (FluA group 1×FcγRIII bispecific; gray triangles) along with controls REGN5066 (IsdB×C1q bispecific; clear squares), negative control #2 (clear inverted triangles), REGN5408 (IsdB×C1q scFv; clear triangles), negative control #3 (gray crosses), and REGN1932 (IgG1 isotype control; clear hexagon).

The broadly-neutralizing anti-influenza A group 1 HA× anti-C1q bispecific antibody (REGN6093) bound to HA with a similar EC50 as the parental anti-HA specific bivalent antibody (mAb11829) and parental anti-HA specific antibody with only a single arm (mAb27250; 1.85E-09 M and L.46E-09 respectively) as shown in Table 37 and FIG. 16. All bispecific and bivalent control antibodies did not show significant binding.

As shown in Table 37 the broadly-neutralizing anti-influenza A group 1 HA× anti-C1q bispecific antibody (REGN6093) and parental control antibodies (mAb11829; nAb27250) show similar EC50s and maximum binding while control antibodies show no significant binding to A/Puerto Rico/08/1934 (H1N1)-infected cells.

TABLE 37

| | AbPID or REGN number (common name) | Maximum binding (RLUs) | EC$_{50}$ (M) |
|---|---|---|---|
| Influenza HA | mAb11829 (Flu A, group 1 HA) | 7.88 × 10$^5$ | 1.46E−09 |
| | mAb27250 (Flu A, group 1, one arm) | 7.19 × 10$^5$ | 6.48E−10 |
| Influenza HA × C1q | REGN6093 (Flu A, group 1 HA × C1q) | 8.49 × 10$^5$ | 1.84E−09 |
| HA × FcγRIIIa | mAb20067 (Flu A, group 1 HA × FcγRIII) | 8.84 × 10$^5$ | 1.62E−09 |
| Control bispecific mAbs | REGN5066 (IsdB × C1q) | 2505 | 1.67E−07 |
| | Negative control # 2 | 3.67 × 10$^4$ | 1.67E−07 |
| | REGN5408 (IsdB × C1q scFv) | 2849 | 1.67E−07 |
| | Negative control #3 | 205 | 1.67E−07 |
| Isotype control mAb | REGN1932 (hIgG1 control) | 2586 | 1.67E−07 |

Broadly neutralizing anti-FluA group 1 HA× anti-C1q bispecific antibodies were tested for their ability to induce complement-dependent lysis of H1N1-infected cells. Bispecific antibodies targeting Influenza and the complement system may direct the complement system to the influenza-infected cells in a targeted manner. The broadly-neutralizing anti-Influenza A group 1 HA× anti-C1q bispecific antibody (REGN6093) showed increased specific lysis of A/Puerto Rico/08/134 (H1N1)-infected MDCK cells with 5% normal human serum complement compared to the parental mono-specific antibody (mAb11829), 1.05E-08 M and 2.08E-08 M, respectively, as shown in Table 38. However, the anti-Influenza A group 1 HA×C1q bispecific antibody had slightly lower maximum percent lysis (30.0%) compared to the parental control (mAb11829) (35.8%) as shown in Table 38 and FIG. 17.

As shown in Table 38, anti-Influenza A group 1 HA× anti-C1q bispecific antibody (REGN6093) shows increased specific lysis of A/Puerto Rico/08/1934 (H1N1)-infected cells and slightly lower maximum specific lysis compared to the parental control antibody.

TABLE 38

| | AbPID or REGN number (common name) | Maximum percent specific lysis | $EC_{50}$ (nM) |
|---|---|---|---|
| Influenza HA | mAb11829 (Flu A, group 1 HA) | 35.82 | 2.08E−08 |
| | mAb27250 (Flu A, group 1, one arm) | 38.97 | 2.07E−08 |
| Influenza HA × C1q | REGN6093 (Flu A, group 1 HA × C1q) | 29.99 | 1.05E−08 |
| Influenza HA × FcγRIIIa | mAb20067 (Flu A, group 1 HA × FcγRIII) | 45.29 | 6.02E−08 |
| Control bispecific mAbs | REGN5066 (IsdB × C1q) | −6.15 | >8.89E−07 |
| | Negative control #2 | −10.10 | >8.89E−07 |
| | REGN5408 (IsdB × C1q scFv) | −21.85 | >8.89E−07 |
| | Negative control #3 | −9.08 | >8.89E−07 |
| Isotype control mAb | REGN1932 (hIgG1 control) | −10.96 | >8.89E−07 |

Example 20: Anti-CD20× Anti-C1q Bispecific Antibody Binds Raji Cells Expressing CD20

Anti-CD20 antibodies (e.g., rituximab, ofatumumab) are known to activate complement and induce complement dependent lysis of lymphoma cells. In this Example, a CD20 antibody was selected (mAb14303) that has no inherent CDC activity on its own. We tested if recruiting C1q directly in a bispecific format using the mAb14303 CD20 targeting arm in an anti-CD20× anti-C1q bispecific antibody (REGN5177) can lead to robust C1q deposition and complement mediated lysis of Raji cells.

Experimental Procedure

To determine the binding of the anti-CD20× anti-C1q bispecific antibody (REGN5177) to CD20 expressed on Raji cells, cells at a density of $1\times10^7$/mL were fixed in 2% PFA. The fixed cells were blocked with 3% BSA for 1 hour at room temperature. After washing the cells with wash buffer, 100 ul of the cells were aliquoted into NUNC untreated plates. A first anti-CD20 bivalent antibody (mAb14303N2), a second anti-CD20 bivalent antibody (Rituximab), an anti-CD20× anti-C1q bispecific antibody ((REGN5177), and a parental anti-C1q bivalent antibody (REGN5201) were serially diluted 1:2 in assay dilution buffer (ADB: 0.5% BSA, 0.05% Tween-20 in 1×PBS), starting from 250 nM to 0.015 nM and added to the Raji cells in a 100 μl volume and incubated for 1 hour at room temperature. After washing the cells three times, 100 μl of 1:4000 diluted anti-human IgG HRP conjugated detection antibody in ADB was added to the cells and incubated at room temperature for 1 hour. The cells were washed three times, transferred to a NUNC maxisorp black plate, and incubated for a further 10-15 minutes with the chemiluminescent substrate before reading the plate using the Spectramax 13 plate reader (Molecular Devices).

For the complement deposition, Raji cells were resuspended in PBS at a density of $1\times10^7$ cell/mL and fixed with 2% PFA for 30 minutes at room temperature. Cells were washed three times with 1× wash buffer and centrifuged between this and the below subsequent steps. The fixed cells were blocked with 3% BSA for 2 hrs at room temperature and then incubated with the antibodies from Example 21 in 0.5% BSA, 10 mM HEPES in RPMI for 1 hour at room temperature. The same antibodies from Example 21 were used and included REGN5177 (anti-CD20× anti-C1q hIgG1 antibody), Rituximab (commercially available anti-CD20 hIgG1 antibody), mAb14303 (the parental bivalent anti-CD20 hIgG1 antibody) and REGN5201 (the parental bivalent anti-C1q hIgG1 antibody). Each antibody was serially diluted 1:8 from 100 nM to 0.004 nM. After antibody binding, 5% protein A/G depleted pooled normal human serum was added for 1.5 hours at room temperature. Cells were washed 6× with wash buffer and incubated with 1 ug/mL anti-C1q antibody for 1 hour at room temperature. After washing, a 1:4000 dilution of an anti-goat HRP detection antibody was added to the cells and incubated for an additional hour at room temperature. Finally, after washing, the chemiluminescent substrate was added to quantify the HRP conjugated secondary antibody associated with the cells. Nunc black maxisorp plates were read for luminescence by a Victor X instrument (Perkin Elmer) 10 minutes following the addition of the chemiluminescent substrate.

For the CDC bioassay, Raji cells were seeded onto a 96-well assay plates with clear bottom at 10,000 cells/well in 1% BSA containing RPMI 1640. Anti-CD20×anti-C1q bispecific antibody, anti-CD20 parental bivalent hIgG1 antibody, Rituximab, and the anti-C1q parental bivalent hIgG1 antibody were serially diluted 1:8 from 100 nM to 0.004 nM and added to the cells, along with human serum at a final concentration of 5%. Cytotoxicity was measured after 1 hour of incubation at 37° C. and in 5% C02, followed by a 30-minute incubation at 25° C., and addition of CytoTox-Glo™ reagent (Promega, #G9291). CytoTox-Glo™ is a luminescence-based reagent that measures cell killing such that increased luminescence is observed with increased cytotoxicity (measured in relative light units, RLUs). Untreated cells in control wells were lysed by treatment with digitonin immediately after addition of CytoTox-Glo™ reagent to determine maximal killing of cells. Plates were read for luminescence using a Spectramax 13 (Molecular Devices) 10-15 minutes following the addition of CytoTox-Glo™. Where calculated, the percentage of cytotoxicity was calculated with the RLU values by using the following equation.

$$\% \text{ Cytotoxicity} = 100 \times \frac{(\text{Experimental Cell Lysis} - \text{Background Cell Lysis})}{(\text{Maximum Cell Lysis} - \text{Background Cell Lysis})}$$

In this equation "background cell lysis" is the luminescence from the cells treated with media and serum alone without any anti-CD20 antibody and the "maximum cell lysis" is the luminescence from the cells treated with digitonin. The results, expressed as % cytotoxicity or RLUs, were analyzed using nonlinear regression (4-parameter logistics) with Prism 7 software (GraphPad).
Results Summary and Conclusion The results were plotted as RLUs of binding on the y axis vs. log (M) antibody concentration on the x axis and were analyzed using nonlinear regression (4-parameter logistics) with Prism 7 software (GraphPad) to determine an $EC_{50}$ value of antibody binding. In two independent experiments, the first anti-CD20 bivalent antibody (mAb14303, the second anti-CD20 bivalent antibody (Rituximab), and the anti-CD20×anti-C1q bispecific antibody (REGN5177) bound Raji cells while no binding was observed with the parental anti-C1q bivalent antibody (REGN5201). Rituximab and mAb14303 bound with similar $EC_5$ values, $3.14 \times 10^{-09}$ and $6.031 \times 10^{-09}$, respectively. The $EC_{50}$ of anti-CD20× anti-C1q bispecific antibody binding to Raji cells was slightly lower, $3.566 \times 10^{-08}$ M. See Table 39. In summary, anti-CD20× anti-C1q bispecific antibody (REGN5177) bound Raji cells with similar $EC_{50}$ values as both the first anti-CD20 bivalent antibody (mAb14303) the second anti-CD20 bivalent antibody (Rituximab).

TABLE 39

| AbPID or REGN number (common name) | $EC_{50}$ (M) |
|---|---|
| mAb14303 (anti-CD20 bivalent) | $6.03 \times 10^{-9}$ M |
| Rituximab (anti-CD20 bivalent) | $3.14 \times 10^{-9}$ |
| REGN5177 (anti-CD20 × anti-C1q bispecific antibody) | $3.56 \times 10^{-8}$ M |
| REGN5201 (parental anti-C1q bivalent; control) | No binding |

A bioassay to test the deposition of C1q using an anti-CD20× anti-C1q bispecific antibody on the target cell surface was developed. The assay used Raji cells, a human B cell line expressing CD20, complement preserved serum, and the test or control antibodies to assess the how much C1q is deposited on the cells.

The results, plotted as RLUs of binding on the y axis vs. log(M) antibody concentration on the x axis, were analyzed using nonlinear regression (4-parameter logistics) with Prism 7 software (GraphPad) to determine an EC50 value of C1q deposition. In two independent experiments, at the concentrations tested, C1q deposition was not detectable using this method with both Rituximab and the anti-CD20 hIgG1 parental antibody. With the anti-CD20× anti-C1q antibody bound to Raji cells, robust C1q deposition was observed, and had an average $EC_{50}$ value of $2.605 \times 10^{-8}$ M. See Table 40.

TABLE 40

| AbPID or REGN number (common name) | C1q deposition ($EC_{50}$ (M)) |
|---|---|
| mAb14303 (anti-CD20 bivalent) | No deposition |
| Rituximab (anti-CD20 bivalent) | No deposition |
| REGN5177 (anti-CD20 × anti-C1q bispecific antibody) | $2.605 \times 10^{-08}$ M |

A complement dependent cytotoxicity bioassay to test the efficacy of anti-CD20× anti-C1q antibody in eliciting complement mediated killing of target cells was used. Table 41 shows the compiled results, including the $EC_{50}$ values of binding, C1q deposition of CDC on Raji cells, the $EC_{50}$ values of CDC on Raji cells, and % maximum complement dependent lysis for each antibody tested. The binding and deposition values are the average of two independent experiments and the CDC data is the average of 3 independent experiments.

Figure 18:
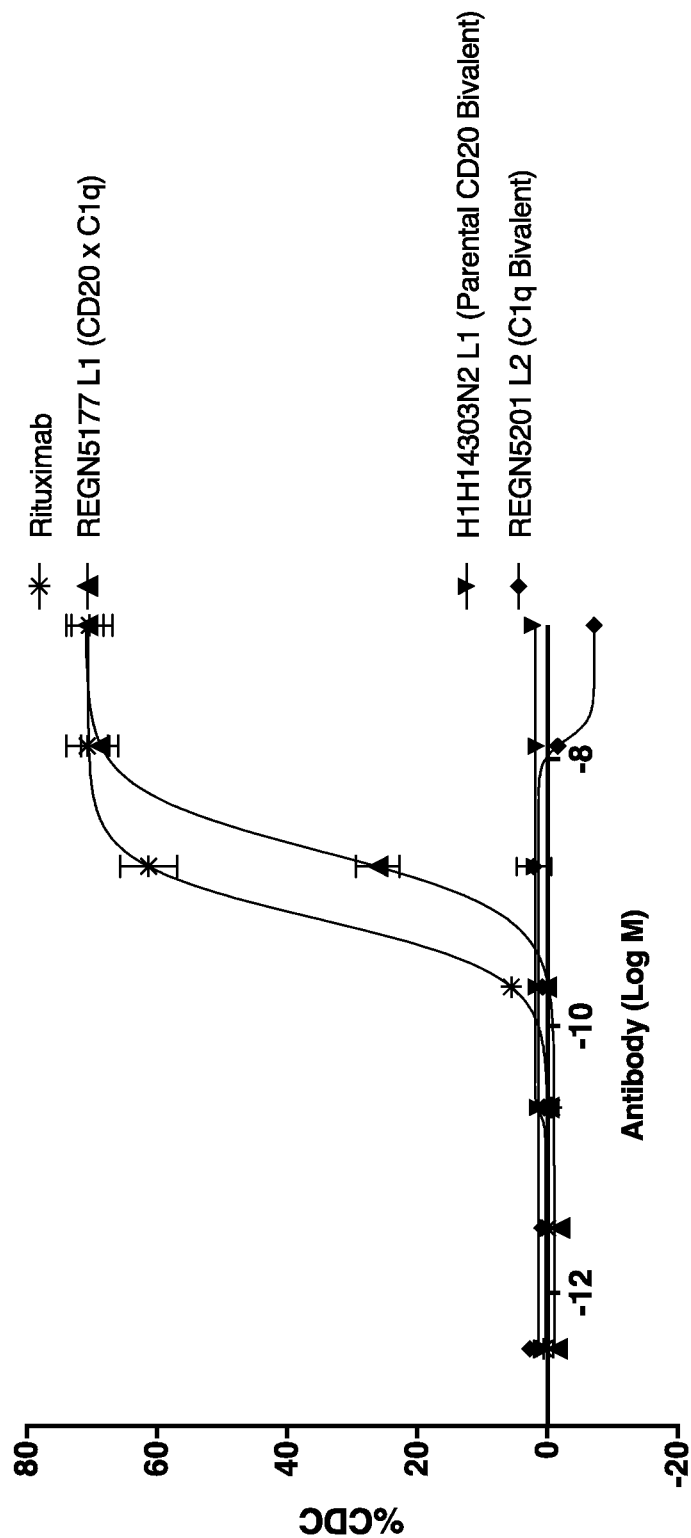
FIG. 18. Raji cells were seeded onto a 96-well while assay plates with clear bottom at 10,000 cells/well in 1% BSA containing RPMI 1640. The test antibodies (anti-CD20× anti-C1q bispecific antibody REGN5177 [triangles], anti-CD20 parental bivalent hIgG1 antibody mAb14303 [inverted triangles], Rituximab [asterisks], and the anti-C1q parental bivalent hIgG1 antibody REGN5201 [diamonds]) were serially diluted 1:8 from 100 nM to 0.004 nM and added to the cells, along with human serum at a final concentration of 5%. Cytotoxicity was measured after 1 hour of incubation at 37° C. and in 5% $CO_2$, followed by a 30-minute incubation at 25° C., and addition of CytoTox-Glo™ reagent (Promega, #G9291). CytoTox-Glo™ is a luminescence-based reagent that measures cell killing such that increased luminescence is observed with increased cytotoxicity (measured in relative light units, RLUs). Untreated cells in control wells were lysed by treatment with digitonin immediately after addition of CytoTox-Glo™ reagent to determine maximal killing of cells. Plates were read for luminescence using a Spectramax 13.

As shown in Table 41 and FIG. 18, the maximum lysis of Raji cells measured with 100 nM for the anti-CD20× anti-C1q bispecific antibody (REGN5177) was 71% compared to 62% with Rituximab. No complement mediated lysis was observed with either the anti-CD20 (mAb14303) or the anti-C1q (REGN5201) parental antibodies. The $EC_{50}$ values of CDC induced by Rixutimab on Raji cells, $7.885 \times 10^{-10}$ M, was higher than the $EC_{50}$ of CDC induced by the anti-CD20× anti-C1q bispecific antibody, $2.378 \times 10^{-9}$ M. By recruiting C1q with the bispecific arm, the mAb14303 targeting arm was able to induce similar maximum lysis of Raji cells as Rituximab with a lower $EC_{50}$.

TABLE 41

| Antibody ID | Description | Binding to Raji cells $EC_{50}$ (M) | C1q deposition on Raji cells $EC_{50}$ (M) | CDC on Raji cells $EC_{50}$ (M) | % maximum complement dependent lysis |
|---|---|---|---|---|---|
| REGN5177 | anti-CD20 × anti-C1q bispecific hIgG1 | $3.566 \times 10^{-08}$ | $2.605 \times 10^{-8}$ | $2.378 \times 10^{-9}$ | 71 |
| mAb14303 | anti-CD20 bivalent hIgG1 | $6.031 \times 10^{-09}$ | No deposition | No CDC | No CDC |
| Rituximab | anti-CD20 bivalent hIgG1 | $3.14 \times 10^{-09}$ | No deposition | $7.885 \times 10^{-10}$ | 62 |
| REGN5201 | anti-C1q bivalent hIgG1 | No binding | No deposition | No CDC | No CDC |

Example 21: Anti-GITR× Anti-C1q Bispecific Antibodies Target Cells Expressing Human GITR Flow cytometric analysis was used to investigate binding of anti-GITR×anti-C1q bispecific antibodies (REGN6545; REGN6546) and the anti-GITR bivalent antibody (REGN5372) to target cells expressing human GITR. Binding was investigated using an engineered cell line, Jurkat/GITR/CD20.

Experimental Procedure

Cells (300,000 cells/well) were incubated for 30 minutes at 4° C. with LIVE/DEAD Fixable Green Dead Cell Stain according to manufacturer's instructions to discriminate between live and dead cells. The cells were then washed twice with cold PBS containing 2% FBS, and incubated for 30 minutes at 4° C. with serial dilutions (1 pM to 1 µM) of and first and second anti-GITR× anti-C1q bispecific antibody (REGN6545, REGN6546), anti-GITR bivalent antibody (REGN5372), or anti-IgG1 isotype control antibody (REGN1932). After incubation, the cells were washed twice with cold PBS containing 2% FBS, and then fixed in BD Cytofix Buffer according to manufacturer's instructions, washed, re-suspended in PBS, and analyzed by flow cytometry on an iQue Screener flow cytometer. Unstained and secondary antibody alone controls were also tested for both cell lines. The results were analyzed using FlowJo (TreeStar Inc.) software and geometric mean fluorescence for viable cells were determined. The results were analyzed using nonlinear regression (4-parameter logistics) with Prism 5 software (GraphPad) to obtain $EC_{50}$ values for binding to cells.

NHS was added at a final serum concentration of 5% to target cells seeded at $5 \times 10^3$ cells/well in triplicate rows of a 96-well plate. Serial dilutions of anti-GITR×anti-C1q antibodies (REGN6545; REGN6546), anti-GITR bivalent antibody (REGN5372), and control antibody (REGN1932) were then added to target cells. Final concentrations of each antibody in the assay ranged from 0.5 µM to 500 nM. To assess spontaneously generated signal (background), a buffer control sample containing all assay components except antibodies was evaluated. The cells were incubated for 3.5 hours at 37° C. and 5% $CO_2$. The plates were then equilibrated to room temperature for 30 minutes and CytoTox-Glo reagent was added to the wells. To determine the maximal target cell lysis signal, untreated target cells alone were lysed with digitonin prior to addition of CytoTox-Glo reagent. The plates were incubated briefly at room temperature and luminescence was measured from each well. The cytotoxic response was calculated as follows:

$$\text{Cytotoxicity (\%)} = \frac{\text{Experimental Signal} - \text{Spontaneous Background Signal}_{(target\ cells+effector\ cells)}}{\text{Max Signal}_{(target\ cells\ w/digitonin)} - \text{Spontaneous Background Signal}_{(target\ cells)}} \times 100$$

Data was analyzed using a 4-parameter logistic equation over an 11-point dose-response curve (GraphPad Prism Version 7.0). For test articles with curves that cannot be fitted, the maximum cytotoxicity observed at any concentration of test article was reported.

Results and Conclusion

Figure 19:
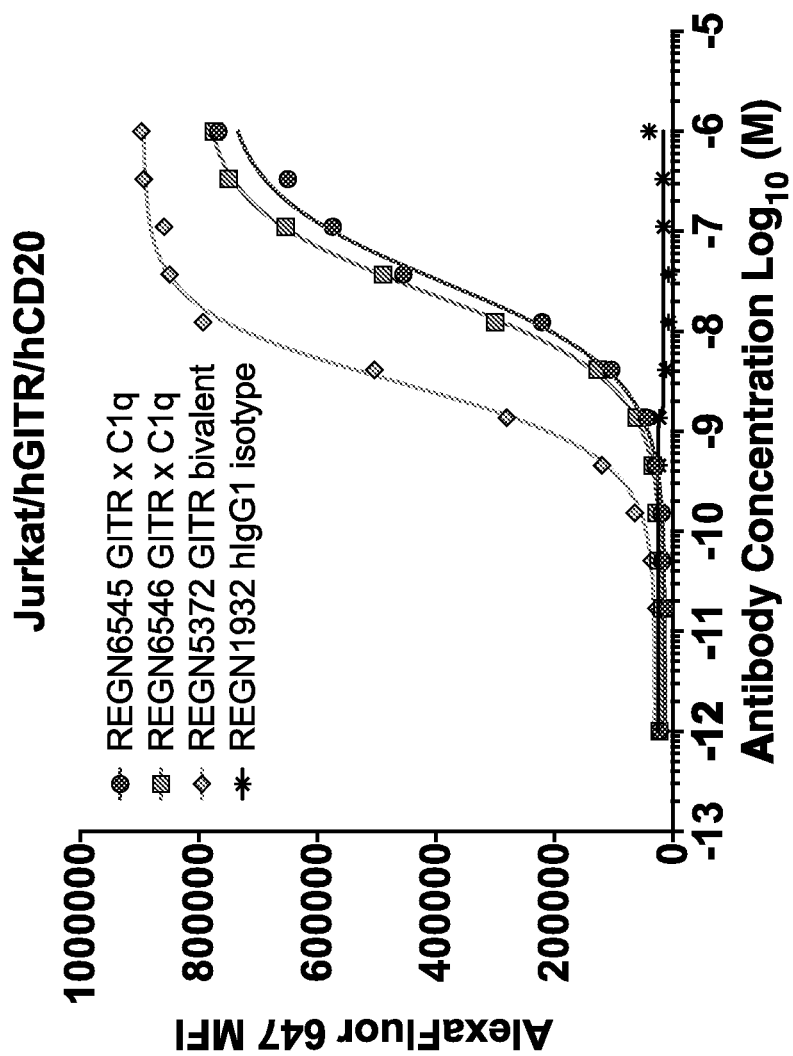
FIG. 19. Jurkat/hGITR/hCD20 cells were incubated with a range of concentrations (1 pM to 1 µM) of anti-GITR× anti-C1q bispecific antibody REGN6545 (blue circles), anti-GITR× anti-C1q bispecific antibody REGN6546 (red squares), anti-GITR bivalent antibody REGN5372 (orange diamonds), and an IgG1 isotype-matched control antibody REGN1932 (black asterisks). Cell-surface binding of each antibody was detected by an Alexa647-anti-hIgG secondary antibody and the resultant fluorescence intensity of Alexa647 staining was plotted as MFI. Representative data from an assay performed in triplicate wells are presented as mean±SD. The x-axis indicates the molar concentration of antibodies. Abbreviations: SD, standard deviation; MFI, mean fluorescence intensity.

Flow cytometric analysis of anti-GITR× anti-C1q bispecific antibodies and anti-GITR bivalent antibodies bound to Jurkat/hGITR/hCD20 cells is disclosed in Table 42 and FIG. 19. As shown in Table 42, a first anti-GITR× anti-C1q bispecific antibody (REGN6545), a second anti-GITR× anti-C1q bispecific antibody (REGN6546), and anti-G1TR bivalent antibody (REGN5372) bound in a dose dependent manner to Jurkat/hGITR/hCD20 cells with $EC_{50}$ values of 31, 24, and 3.1 nM, respectively. In contrast, an anti-IgG1 isotype control antibody (REGN1932) did not bind to Jurkat/hGITR/hCD20 cells.

TABLE 42

| Antibody ID | Description | Jurkat/hGITR/hCD20 | |
|---|---|---|---|
| | | Maximum MFI | $EC_{50}$ (M) |
| REGN6545 | Anti-GITR × anti-C1q, hIgG1 | $7.67 \times 10^5$ | 3.10E−08 |
| REGN6546 | Anti-GITR × anti-C1q, hIgG1 | $7.75 \times 10^5$ | 2.35E−08 |
| REGN5372 | Anti-GITR bivalent, hIgG1 | $8.97 \times 10^5$ | 3.07E−09 |
| REGN1932 | hIgG1 isotype (Control) | $3.99 \times 10^4$ | ND |

The ability of anti-GITR× anti-C1q antibodies (REGN6545; REGN6546) to mediate CDC in the presence of NHS was evaluated in engineered Jurkat/hGITR/hCD20 target cells.

Figure 20:
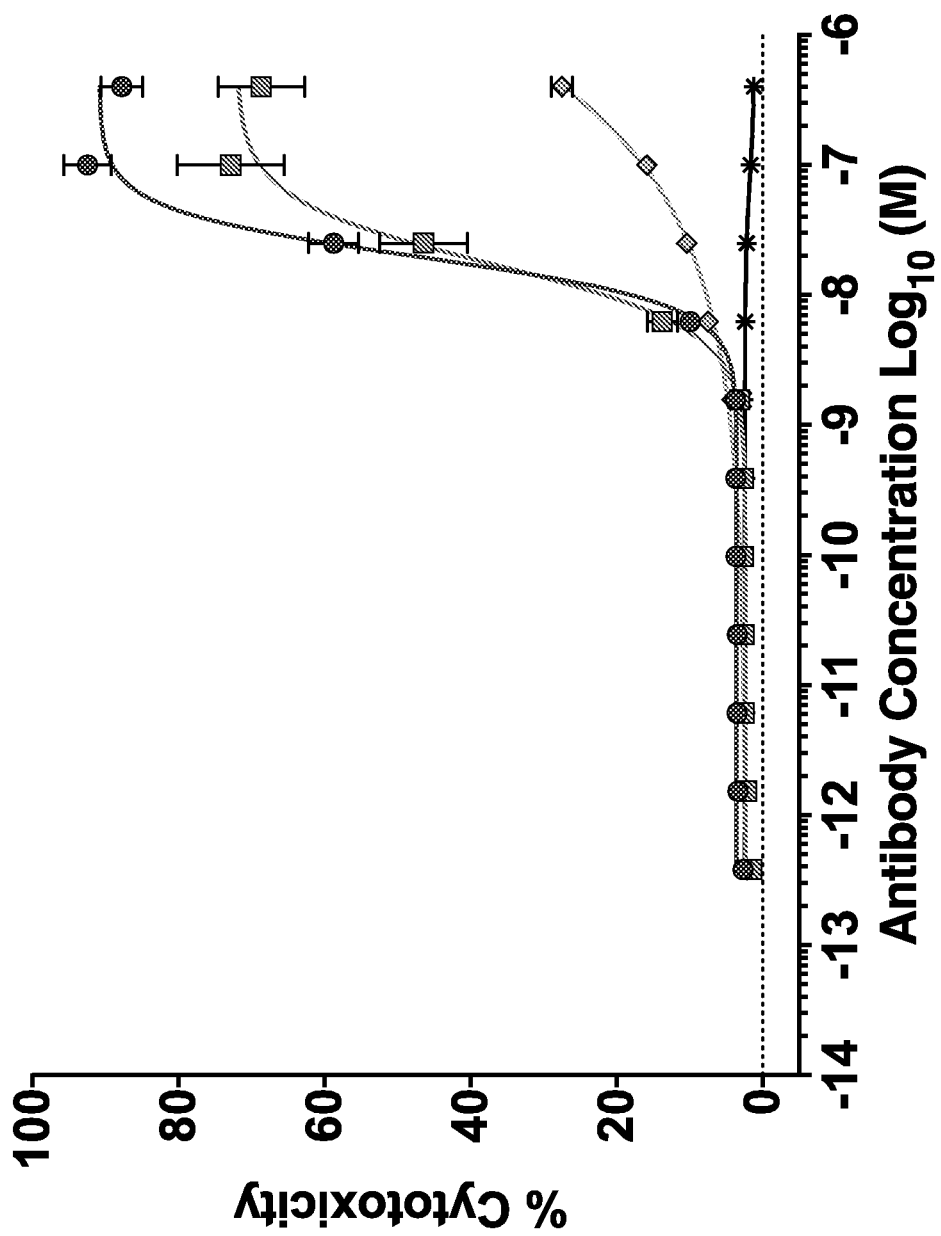
FIG. 20. Jurkat/hGITR/hCD20 cells were incubated with 5% NHS and a range of concentrations (0.5 pM to 500 nM) of anti-GITR× anti-C1q REGN6545 (blue circles), anti-GITR× anti-C1q bispecific antibody REGN6546 (red squares), anti-GITR bivalent antibody REGN5372 (orange diamonds), and an IgG1 isotype-matched control antibody REGN1932 (black asterisks). Cytotoxicity was determined using the commercially available CytoTox-Glo assay which measures the number of dead cells within a general cell population using a luminescence readout. Data from an assay performed in triplicate wells are plotted as mean±SD.

As shown in Table 43 and FIG. 20, the CDC activity of both anti-GITR×anti-C1q antibodies, REGN6545 and REGN6546, was evaluated as compared to a parental bivalent GITR antibody, REGN5372, using Jurkat/GITR/CD20 target cells in the presence of Normal Human Serum (NHS). In contrast to REGN5372, which induced weak CDC activity (28% maximum cytotoxicity against Jurkat/GITR/CD20 cells), and despite the increased expression levels of complement inhibitors on the surface of Jurkat cells compared to Raji cells (see Table 33), both anti-GITR× anti-C1q antibodies (REGN6545 and REGN6546) induced 93% and 73% maximum cytotoxicity, with $EC_{50}$ values of 19.7 nM and 17.4 nM, respectively. No activity was observed with any of the antibodies in the absence of Normal Human serum.

In summary, anti-GITR× anti-C1q bispecific antibodies induced complement dependent lysis, with REGN6545 having a 93% maximum cytotoxicity and an $EC_{50}$ of 1.97E-08 M and REGN6546 having a 73% maximum cytotoxicity and an $EC_{50}$ of 1.74E-08. These results, and results shown elsewhere herein, demonstrate that a C1q-recruiting platform can result in potent, targeted killing of diverse cell types by either imparting novel CDC activity or enhancing pre-existing CDC activity of a given antibody.

TABLE 43

| Antibody ID | Description | Jurkat/hGITR/hCD20 | |
|---|---|---|---|
| | | Maximum Cytotoxicity | $EC_{50}$ (M) |
| REGN6545 | Anti-GITR × anti-C1q bispecific, hIgG1 | 93% | 1.97e–08 |
| REGN6546 | Anti-GITR × anti-C1q bispecific, hIgG1 | 73% | 1.74e–08 |
| REGN5372 | Anti-GITR bivalent, hIgG1 | 28% | Not determined |
| REGN1932 | hIgG1 isotype (control) | 3% | Not determined |

SUMMARY

The wide-applicability of the C1q-bispecific platform approach was shown by demonstrating targeted killing of both bacterial and mammalian cells. Additionally, this approach overcomes the dependence on the antigen density and orientation of antibody binding to antigen in order to engage multiple C1q heads. The C1q-recruiting bsAb can activate complement when targeted to many different antigens including multiple S. aureus antigens, as well as antigens on P. aeruginosa, influenza-infected mammalian cells, D-cells, and T-cells. The platform should also be widely applicable to patients of different ages, genders, and immune status: the classical complement pathway and its protein components are abundant in circulation and stably expressed, whereas innate immune effector cells such as neutrophils, macrophages and T-cells have impaired function with age. Therefore a C1q-based therapeutic has the potential to be used in immune compromised patients including those on immunosuppressive therapies. Furthermore, the platform may have the potential to enhance the efficacy of existing treatments, such as antibiotics and tumor targeting agents.

Immunomodulatory therapeutics, including bsAbs, are currently being investigated as powerful ways to eliminate a variety of pathogenic cell types. The C1q-targeting platform disclosed herein represents a novel approach to leverage the cytotoxic effector functions of the immune system. The bsAbs described herein increased complement-mediated killing of bacterial and mammalian cells when targeted to antigens with diverse characteristics. The novel mechanism of this C1q-targeting platform has the possibility to be effective despite resistance mechanisms that can confound existing treatment modalities.

Example 22: Reduced C1q Depletion with Bispecific Antibodies Having an IgG4 or IgG1 Uber Stealth Fc In this example, the effect of the Fc region on the levels of C1q in circulation was tested using anti-IsdB× anti-C1q bispecific antibodies differing in their Fc region. REGN5066 is an anti-IsdB× anti-C1q bispecific antibody having an IgG1 Fc region, and is described in Example 11 above. REGN5331 is an anti-IsdB× anti-C1q bispecific antibody having the same VH and VL sequences as REGN5066 (i.e., the anti-IsdB heavy chain variable region of SEQ ID NO:26, the anti-C1q heavy chain variable region of SEQ ID NO:2, and the universal light chain variable region of SEQ ID NO:10) and having an IgG4 Fc region. REGN7017 is an anti-IsdB× anti-C1q bispecific antibody having the same VH and VL sequences as REGN5066 (i.e., the anti-IsdB heavy chain variable region of SEQ ID NO:26, the anti-C1q heavy chain variable region of SEQ ID NO:2, and the universal light chain variable region of SEQ ID NO:10) and having an IgG1 "uber stealth" Fc region comprising the mutations GGG- at positions 233-236 (by EU numbering) in the hinge region.

Experimental Procedure

Humanized C1q ($C1q^{Hu/Hu}$) mice in a mixed background (MAID1615) were infected intraperitoneally with 200 μl volume of S. aureus Newman ($1.5\times10^8$ colony forming units (CFUs) per mouse). All three S. aureus strains were grown to log phase, $OD_{600}\leq1$, in TSB at 37° C. and washed 3 times in PBS and adjusted to the desired density for infection. Both infected and uninfected mice were dosed subcutaneously with 100 μg of the anti-IsdB× anti-C1q IgG1 bispecific antibody (REGN5066), the anti-IsdB× anti-C1q IgG1uber stealth bispecific antibody (REGN7017), the anti-IsdB× anti-C1q IgG4 bispecific antibody (REGN5331) or a control antibody (REGN1932) in a 100 μl volume. Blood was collected prior to infection and at 1 hr, 24 h, 48 h, and 72 h post antibody treatment (or 25 h, 48 h, 72 h, and 96 h post infection) and serum was prepared using gold-capped serum separator tubes (BD). Serum was diluted 1:2000 and analyzed by ELISA to determine C1q levels.

Results Summary and Conclusion

Figure 21:
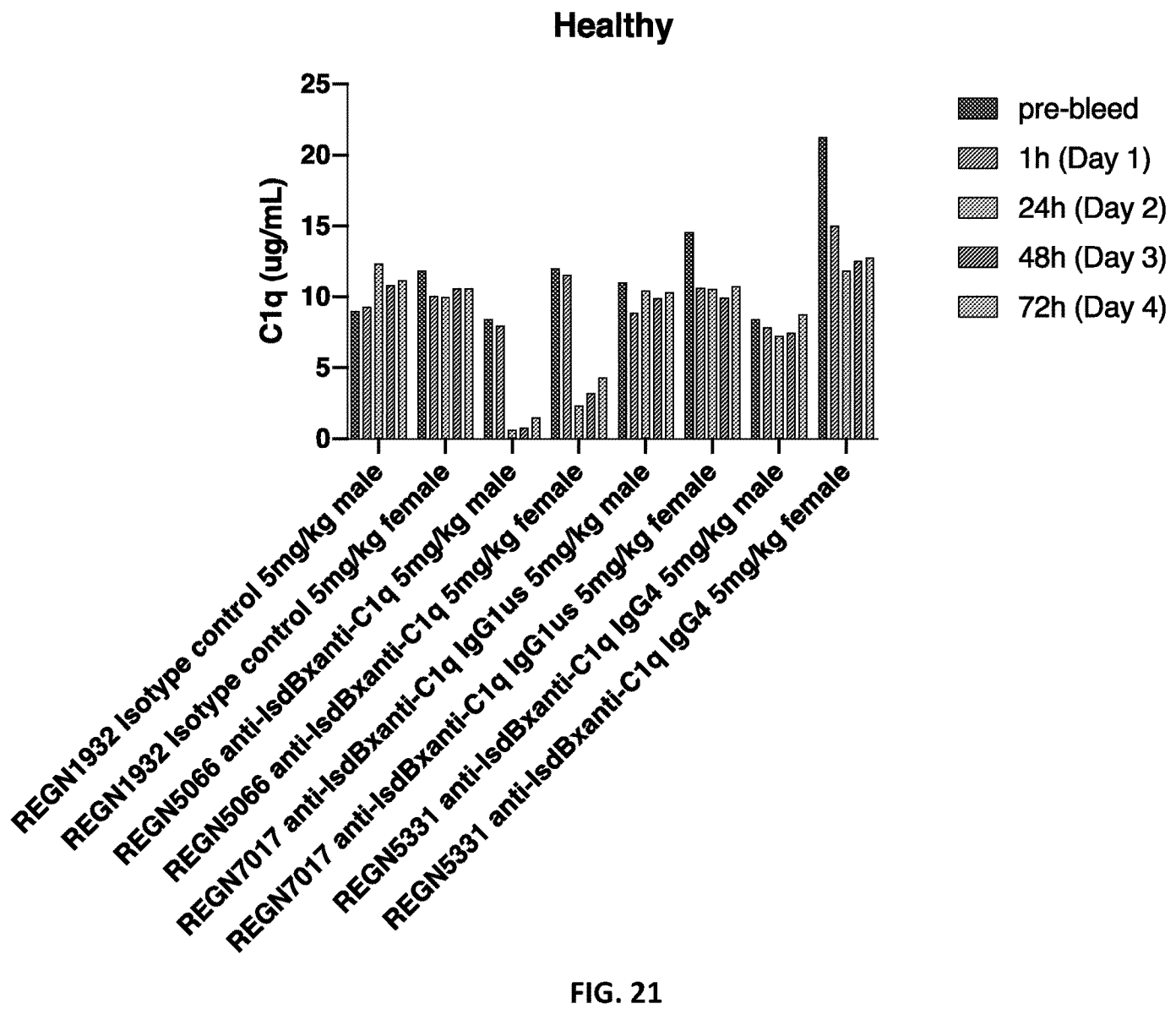
Figure 22:
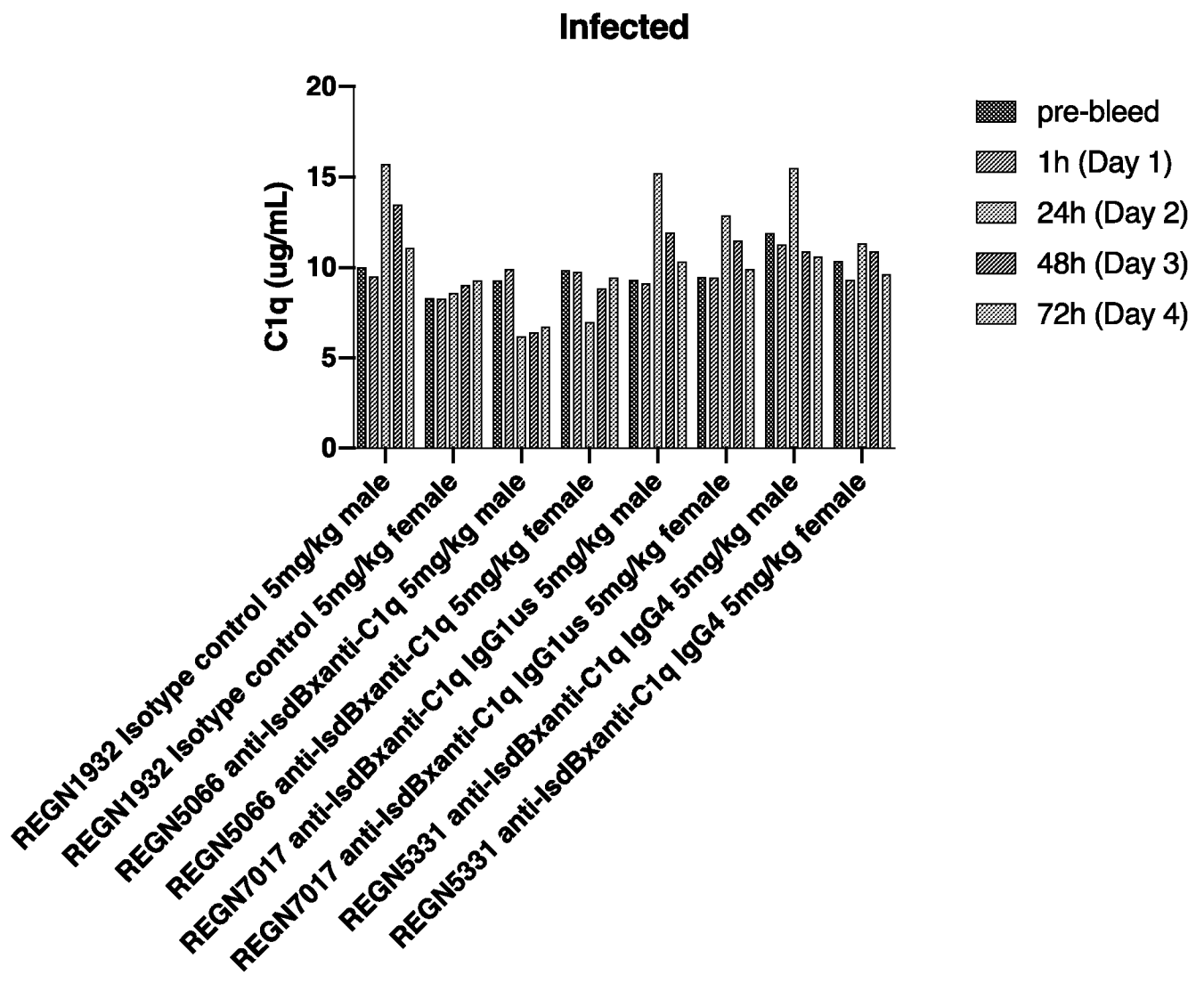

Bispecific anti-IsdB× anti-C1q antibody, REGN5066, was tested alongside IgG4 and IgG1 uber stealth versions and a control antibody to determine their effects on levels of C1q in circulation using male and female MAID1615 mice (FIGS. 21 and 22). In the uninfected animals, a 4- or 10-fold decrease in circulating C1q concentrations was observed when female or male animals, respectively, were dosed with the bispecific anti-IsdB× anti-C1q IgG1 antibody (as indicated by the arrows in FIG. 21). In contrast, C1q levels were stable throughout the course of the 4 days for uninfected mice administered an anti-IsdB× anti-C1q bispecific antibody comprising an Fc that is an IgG4 Fc or an IgG1 "uber stealth" Fc with reduced or no FcgR interactions (FIG. 21). In infected animals, where the IsdB target is present, there was a 10-35% reduction in circulating C1q concentrations in mice administered the bispecific anti-IsdB× anti-C1q IgG1 antibody, REGN5066 (FIG. 22). Similar to the uninfected animals, for female and male MAID 1615 mice administered the IgG4 or IgG1 uber stealth versions of the anti-IsdB× anti-C1q bispecific antibody (REGN5331 or REGN7017, respectively), C1q levels were stable throughout the course of the infection over 4 days (FIG. 22). These experiments show that an IgG4 Fc and an IgG1 uber stealth Fc reduced C1q depletion that was observed with an anti-IsdB× anti-C1q IgG1 bispecific antibody both in the absence and presence of S. aureus target.

The present disclosure is not to be limited in scope by the specific embodiments described herein. Indeed, various modifications of the disclosure in addition to those described herein will become apparent to those skilled in the art from the foregoing description. Such modifications are intended to fall within the scope of the appended claims. All publications, patents, and patents applications referred to herein are hereby incorporated by reference.

---

What is claimed is:

1. An isolated bispecific antigen binding molecule comprising:
   (i) a first antigen-binding domain that binds CD20 on an immune cell, wherein the first antigen binding domain comprises:
      (A) a heavy chain variable region (HCVR) comprising the amino acid sequence of SEQ ID NO: 34; and
      (B) a light chain variable region (LCVR) comprising the amino acid sequence of SEQ ID NO: 10; and
   (ii) a second antigen-binding domain that binds complement component C1q, wherein the second antigen binding domain comprises:
      (A) an HCVR comprising the amino acid sequence of SEQ ID NO: 2; and
      (B) an LCVR comprising the amino acid sequence of SEQ ID NO: 10.

2. The isolated bispecific antigen binding molecule of claim 1, wherein the bispecific antigen binding molecule promotes human C1q deposition on the immune cell with an $EC_{50}$ of about 10 nM or less.

3. The isolated bispecific antigen binding molecule of claim 1, wherein the complement component C1q is a human C1q.

4. The isolated bispecific antigen binding molecule of claim 1, wherein the second antigen binding domain binds to complement component C1q with a $K_D$ of less than about 25 nM, less than about 20 nM, less than about 15 nM, less than about 10 nM, less than about 5 nM, less than about 1 nM, less than about 500 μM, less than about 400 μM, less than about 300 pM, less than about 200 pM, less than about 100 pM, less than about 90 pM, less than about 80 pM, less than about 70 pM, less than about 60 pM, less than about 50 pM, less than about 40 pM, less than about 30 pM, less than about 20 pM, less than about 10 pM, less than about 5 pM, less than about 4 pM, less than about 2 pM, less than about 1 pM, less than about 0.5 pM, less than about 0.2 pM, less than about 0.1 pM, or less than about 0.05 pM, as measured in a surface plasmon resonance assay.

5. A pharmaceutical composition comprising the isolated bispecific antigen binding molecule of claim 1 and a pharmaceutically acceptable carrier.

6. The isolated bispecific antigen binding molecule of claim 1, wherein the first antigen binding domain that specifically binds CD20 comprises a heavy chain/light chain (HC/LC) pair comprising the amino acid sequences of SEQ ID NOs: 86/85.

7. The isolated bispecific antigen binding molecule of claim 6, wherein the second antigen binding domain that specifically binds C1q comprises an HC/LC pair comprising the amino acid sequences of SEQ ID NOs: 83/85.

* * * * *

UNITED STATES PATENT AND TRADEMARK OFFICE
CERTIFICATE OF CORRECTION

PATENT NO.         : 12,459,991 B2
APPLICATION NO.    : 17/430117
DATED              : November 4, 2025
INVENTOR(S)        : Christos Kyratsous et al.

Page 1 of 1

It is certified that error appears in the above-identified patent and that said Letters Patent is hereby corrected as shown below:

In the Claims

Claim 4, Column 204, Line 21, "...about 500µM..." should read "...about 500 pM..."

Claim 4, Column 204, Line 21, "...about 400µM..." should read "about 400 pM..."

Signed and Sealed this
Thirteenth Day of January, 2026

John A. Squires
*Director of the United States Patent and Trademark Office*